July 26, 1960 H. S. BEATTIE ET AL 2,946,504

ACCOUNTING MACHINE

Filed Dec. 23, 1955 59 Sheets-Sheet 1

INVENTORS.
HORACE S. BEATTIE
THEODORE L. BULEY
BERNARD M. MUENZER

BY Harry T. Berriman

AGENT

July 26, 1960 H. S. BEATTIE ET AL 2,946,504

ACCOUNTING MACHINE

Filed Dec. 23, 1955

59 Sheets-Sheet 2

INVENTORS
HORACE S. BEATTIE
THEODORE L. BULEY
BERNARD M. MUENZER

BY Harry T. Berriman

AGENT

July 26, 1960 H. S. BEATTIE ET AL 2,946,504
ACCOUNTING MACHINE
Filed Dec. 23, 1955 59 Sheets-Sheet 3

INVENTORS
HORACE S. BEATTIE
THEODORE L. BULEY
BERNARD M. MUENZER
BY Harry T. Berriman
AGENT INVENTORS
HORACE S. BEATTIE
THEODORE L. BULEY
BERNARD M. MUENZER
BY Harry T. Berriman
AGENT

ACCOUNTING MACHINE

Filed Dec. 23, 1955 59 Sheets-Sheet 5

*INVENTORS*
HORACE S. BEATTIE
THEODORE L. BULEY
BERNARD M. MUENZER

BY Harry T. Berriman

AGENT

July 26, 1960 H. S. BEATTIE ET AL 2,946,504

ACCOUNTING MACHINE

Filed Dec. 23, 1955 59 Sheets-Sheet 6

INVENTORS
HORACE S. BEATTIE
THEODORE L. BULEY
BERNARD M. MUENZER

BY Harry T. Berriman
AGENT

July 26, 1960 H. S. BEATTIE ET AL 2,946,504

ACCOUNTING MACHINE

Filed Dec. 23, 1955 59 Sheets-Sheet 7

INVENTORS
HORACE S. BEATTIE
THEODORE L. BULEY
BERNARD M. MUENZER

BY Harry T. Berriman
AGENT

July 26, 1960 H. S. BEATTIE ET AL 2,946,504

ACCOUNTING MACHINE

Filed Dec. 23, 1955 59 Sheets-Sheet 8

*INVENTORS*
HORACE S. BEATTIE
THEODORE L. BULEY
BERNARD M. MUENZER

BY Harry T. Berriman
AGENT

July 26, 1960 H. S. BEATTIE ET AL 2,946,504

ACCOUNTING MACHINE

Filed Dec. 23, 1955 59 Sheets-Sheet 10

INVENTORS
HORACE S. BEATTIE
THEODORE L. BULEY
BERNARD M. MUENZER

BY Harry T. Berriman
AGENT

INVENTORS
HORACE S. BEATTIE
THEODORE L. BULEY
BY BERNARD M. MUENZER
Harry T. Berriman
AGENT July 26, 1960 H. S. BEATTIE ET AL 2,946,504

ACCOUNTING MACHINE

Filed Dec. 23, 1955 59 Sheets-Sheet 13

REPRESENTATIVE SUBTRACT OPERATION

215 — MINUEND IN CTR GROUP #2
102 — SUBTRAHEND IN ADDRESSES 5,6 AND 7 OF CARD TRACK
113 — DIFFERENCE RESULTING IN CTR GROUP #2

SUBTRAHEND 15 LISTED IN COLUMNS 14, 15 AND 16 OF PRINT RECORD

| | | | | | |
|---|---|---|---|---|---|
| FIG. 13A | FIG. 13B | FIG. 13C | FIG. 13D | FIG. 13E | FIG. 13F |
| FIG. 13G | FIG. 13H | FIG. 13I | FIG. 13J | FIG. 13K | FIG. 13L |

| | | |
|---|---|---|
| FIG. 14A | FIG. 14B | FIG. 14C |

INVENTORS
HORACE S. BEATTIE
THEODORE L. BULEY
BERNARD M. MUENZER
BY Harry T. Berriman
AGENT July 26, 1960 H. S. BEATTIE ET AL 2,946,504

ACCOUNTING MACHINE

Filed Dec. 23, 1955 59 Sheets-Sheet 16

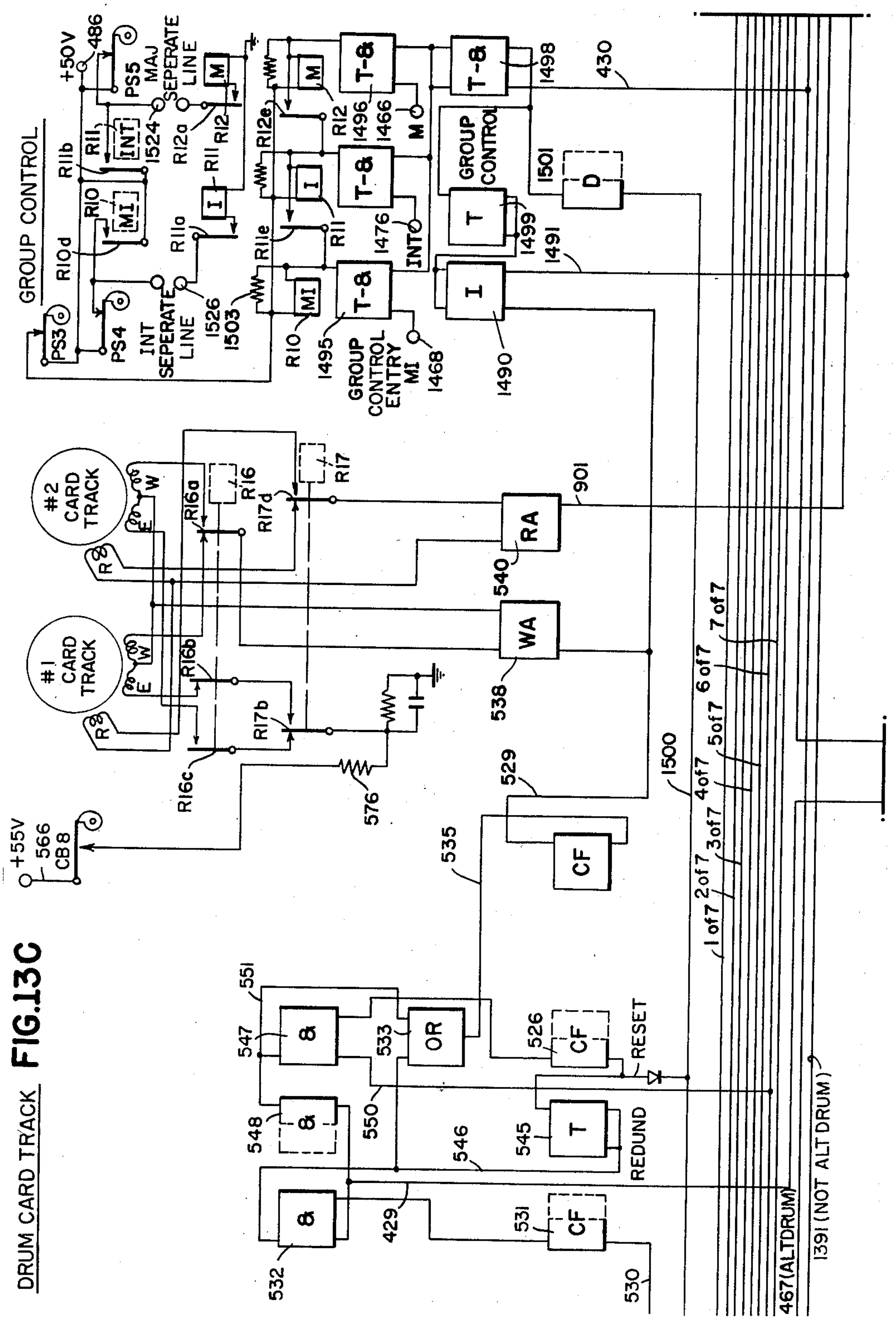
FIG.13C DRUM CARD TRACK

DRUM TRACKS

July 26, 1960 H. S. BEATTIE ET AL 2,946,504

ACCOUNTING MACHINE

Filed Dec. 23, 1955 59 Sheets-Sheet 23

CARD LIST & CTR READOUT CONTROLS

July 26, 1960 H. S. BEATTIE ET AL 2,946,504

ACCOUNTING MACHINE

Filed Dec. 23, 1955 59 Sheets-Sheet 24

EMITTERS

INVENTORS
HORACE S. BEATTIE
THEODORE L. BULEY
BERNARD M. MUENZER
BY Harry T. Berriman
AGENT INVENTORS
HORACE S. BEATTIE
THEODORE L. BULEY
BERNARD M. MUENZER
BY Harry T. Berriman
AGENT July 26, 1960 H. S. BEATTIE ET AL 2,946,504

ACCOUNTING MACHINE

Filed Dec. 23, 1955 59 Sheets-Sheet 29

INVENTORS
HORACE S. BEATTIE
THEODORE L. BULEY
BERNARD M. MUENZER

BY Harry T. Berman

AGENT

July 26, 1960 H. S. BEATTIE ET AL 2,946,504

ACCOUNTING MACHINE

Filed Dec. 23, 1955 59 Sheets-Sheet 30

July 26, 1960 H. S. BEATTIE ET AL 2,946,504

ACCOUNTING MACHINE

Filed Dec. 23, 1955 59 Sheets-Sheet 31

INVENTORS
HORACE S. BEATTIE
THEODORE L. BULEY
BERNARD M. MUENZER
BY Harry T. Berriman
AGENT July 26, 1960 H. S. BEATTIE ET AL 2,946,504

ACCOUNTING MACHINE

Filed Dec. 23, 1955 59 Sheets-Sheet 34

INVENTORS
HORACE S. BEATTIE
THEODORE L. BULEY
BERNARD M. MUENZER

BY Harry T. Berriman

AGENT

INVENTORS
HORACE S. BEATTIE
THEODORE L. BULEY
BERNARD M. MUENZER
BY Harry T. Berriman
AGENT INVENTORS
HORACE S. BEATTIE
THEODORE L. BULEY
BERNARD M. MUENZER
BY Harry T Berriman
AGENT July 26, 1960 H. S. BEATTIE ET AL 2,946,504

ACCOUNTING MACHINE

Filed Dec. 23, 1955 59 Sheets-Sheet 37

| PRINT MAGNETS | CARD CODE | 2R 4R: 12 | 4R: 11 | 2R: 0 | NUM |
|---|---|---|---|---|---|
| 3H | 1 | A | J | / | 1 |
| 1H | 2 | B | K | S | 2 |
| 3-1H | 3 | C | L | T | 3 |
| 1R | 4 | D | M | U | 4 |
| 3H 1R | 5 | E | N | V | 5 |
| 1H 1R | 6 | F | O | W | 6 |
| 3-1H 1R | 7 | G | P | X | 7 |
| 2H | 8 | H | Q | Y | 8 |
| 3-2H | 9 | I | R | Z | 9 |
| 3-2-1H | 8-3 | • | $ | , | # |
| 2H 1R | 8-4 | ¤ | * | % | @ |
| 3-2H 1R | 8-5 | | | | |
| 3-2-1H 1R | 8-7 | | | | |
| | | Ɛ | – | 0 | |

| | 1-2-8 / 3-2-1 H | 1-8 / 3-2 H | 1-2 / 3-1 H | 1 / 3H | 8 / 2H | 2 / 1H | PRINT MAGNETS | | BINARY CODE → |
|---|---|---|---|---|---|---|---|---|---|
| 7 | | | G | E | ¤ | F | D | 4-2-1R | $Z_1 Z_2 4$ |
| 6 | • | I | C | A | H | B | Ɛ | 4-2R | $Z_1 Z_2$ |
| 5 | | | P | N | * | O | M | 4-1R | $Z_2 4$ |
| 4 | $ | R | L | J | Q | K | – | 4R | Z |
| 3 | | | X | V | % | W | U | 2-1R | $Z_1 4$ |
| 2 | , | Z | T | / | Y | S | O | 2R | $Z_1$ |
| 1 | | | 7 | 5 | @ | 6 | 4 | 1R | 4 |
| HOME POSITION 0 | # | 9 | 3 | 1 | 8 | 2 | | | |
| | 6 | 5 | 4 | 3 | 2 | 1 | 0 (BANDS) HOME POSITION | | |

INVENTORS
HORACE S. BEATTIE
THEODORE L. BULEY
BERNARD M. MUENZER
BY Harry T. Berriman
AGENT INVENTORS
HORACE S. BEATTIE
THEODORE L. BULEY
BERNARD M. MUENZER
BY Harry T. Berriman
AGENT

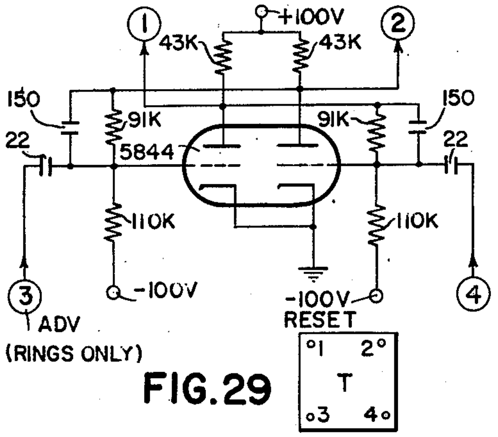
FIG. 29
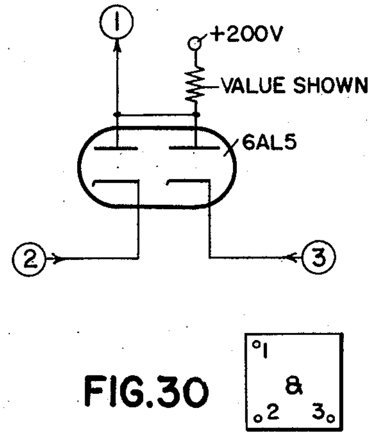
FIG. 30
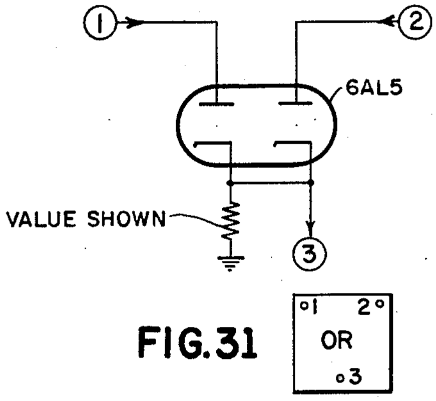
FIG. 31
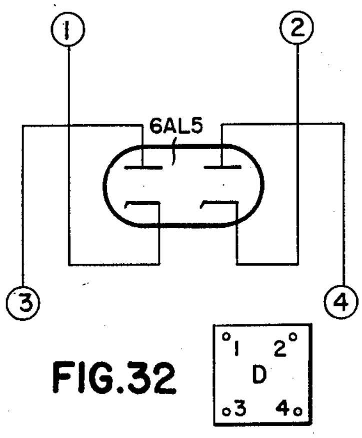
FIG. 32
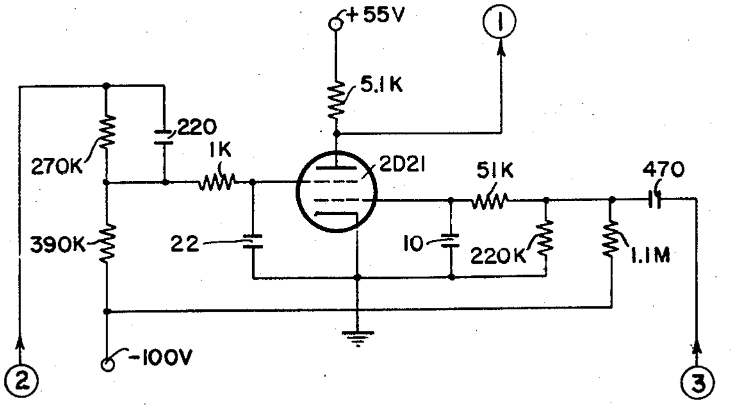
FIG. 33
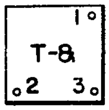
INVENTORS
HORACE S. BEATTIE
THEODORE L. BULEY
BERNARD M. MUENZER
BY Harry T. Berriman
AGENT INVENTORS
HORACE S. BEATTIE
THEODORE L. BULEY
BERNARD M. MUENZER
BY Harry T. Berriman
AGENT

COUNTER TRACK

| COUNTER GROUP NO | UNITS ORDER | TENS ORD. | HUND. ORD. | THNDS. ORD. | T THNDS ORD. | H.THNDS ORD. | MILLIONS ORD. | T.MILLIONS ORD. |
|---|---|---|---|---|---|---|---|---|
| 1 | ADDRESS 1 | 2 | 3 | 4 | 5 | 6 | 7 | 8 |
| 2 | ADDRESS 9 | 10 | 11 | 12 | 13 | 14 | 15 | 16 |
| 3 | ADDRESS 17 | 18 | 19 | 20 | 21 | 22 | 23 | 24 |
| 4 | ADDRESS 25 | 26 | 27 | 28 | 29 | 30 | 31 | 32 |
| 5 | ADDRESS 33 | 34 | 35 | 36 | 37 | 38 | 39 | 40 |
| 6 | ADDRESS 41 | 42 | 43 | 44 | 45 | 46 | 47 | 48 |
| 7 | ADDRESS 49 | 50 | 51 | 52 | 53 | 54 | 55 | 56 |
| 8 | ADDRESS 57 | 58 | 59 | 60 | 61 | 62 | 63 | 64 |
| 9 | ADDRESS 65 | 66 | 67 | 68 | 69 | 70 | 71 | 72 |
| 10 | ADDRESS 73 | 74 | 75 | 76 | 77 | 78 | 79 | 80 |

*INVENTORS*
HORACE S. BEATTIE
THEODORE L. BULEY
BERNARD M. MUENZER
*BY* Harry T. Berman
AGENT

| CHARACTER | MACHINE CODE WORD | OUTPUT CODE: PRINT SETUP RELAYS | PRINT MAGNETS | TOTAL TYPE | MOTION CYCLINDER |
|---|---|---|---|---|---|
| A | $Z_1$ $Z_2$ 1 | $Z_1$ $Z_2$ 1 R | $Z_1$ $Z_2$ 1 R | 3H | 6R |
| B | $Z_1$ $Z_2$ 2 | $Z_1$ $Z_2$ 2 R | $Z_1$ $Z_2$ 2 R | 1H | 6R |
| C | $Z_1$ $Z_2$ 1 2 | $Z_1$ $Z_2$ 1 2 | $Z_1$ $Z_2$ 1 2 | 4H | 6R |
| D | $Z_1$ $Z_2$ 4 | $Z_1$ $Z_2$ 4 R | $Z_1$ $Z_2$ 4 R | 0H | 7R |
| E | $Z_1$ $Z_2$ 1 4 | $Z_1$ $Z_2$ 1 4 | $Z_1$ $Z_2$ 1 4 | 3H | 7R |
| F | $Z_1$ $Z_2$ 2 4 | $Z_1$ $Z_2$ 2 4 | $Z_1$ $Z_2$ 2 4 | 1H | 7R |
| G | $Z_1$ $Z_2$ 1 2 4 | $Z_1$ $Z_2$ 1 2 4 R | $Z_1$ $Z_2$ 1 2 4 R | 4H | 7R |
| H | $Z_1$ $Z_2$ 8 | $Z_1$ $Z_2$ 8 R | $Z_1$ $Z_2$ 8 R | 2H | 6R |
| I | $Z_1$ $Z_2$ 1 8 | $Z_1$ $Z_2$ 1 8 | $Z_1$ $Z_2$ 1 8 | 5H | 6R |
| J | $Z_2$ 1 | $Z_2$ 1 | $Z_2$ 1 | 3H | 4R |
| K | $Z_2$ 2 | $Z_2$ 2 | $Z_2$ 2 | 1H | 4R |
| L | $Z_2$ 1 2 | $Z_2$ 1 2 R | $Z_2$ 1 2 R | 4H | 4R |
| M | $Z_2$ 4 | $Z_2$ 4 | $Z_2$ 4 | 0H | 5R |
| N | $Z_2$ 1 4 | $Z_2$ 1 4 R | $Z_2$ 1 4 R | 3H | 5R |
| O | $Z_2$ 2 4 | $Z_2$ 2 4 R | $Z_2$ 2 4 R | 1H | 5R |
| P | $Z_2$ 1 2 4 | $Z_2$ 1 2 4 | $Z_2$ 1 2 4 | 4H | 5R |
| Q | $Z_2$ 8 | $Z_2$ 8 | $Z_2$ 8 | 2H | 4R |
| R | $Z_2$ 1 8 | $Z_2$ 1 8 R | $Z_2$ 1 8 R | 5H | 4R |
| S | $Z_1$ 2 | $Z_1$ 2 | $Z_1$ 2 | 1H | 2R |
| T | $Z_1$ 1 2 | $Z_1$ 1 2 R | $Z_1$ 1 2 R | 4H | 2R |
| U | $Z_1$ 4 | $Z_1$ 4 | $Z_1$ 4 | 0H | 3R |
| V | $Z_1$ 1 4 | $Z_1$ 1 4 R | $Z_1$ 1 4 R | 3H | 3R |
| W | $Z_1$ 2 4 | $Z_1$ 2 4 R | $Z_1$ 2 4 R | 1H | 3R |
| X | $Z_1$ 1 2 4 | $Z_1$ 1 2 4 | $Z_1$ 1 2 4 | 4H | 3R |
| Y | $Z_1$ 8 | $Z_1$ 8 | $Z_1$ 8 | 2H | 2R |
| Z | $Z_1$ 1 8 | $Z_1$ 1 8 R | $Z_1$ 1 8 R | 5H | 2R |
| 1 | 1 | 1 R | 1 R | 3H | 0R |
| 2 | 2 | 2 R | 2 R | 1H | 0R |
| 3 | 1 2 | 1 2 | 1 2 | 4H | 0R |
| 4 | 4 | 4 R | 4 R | 0H | 1R |
| 5 | 1 4 | 1 4 | 1 4 | 3H | 1R |
| 6 | 2 4 | 2 4 | 2 4 | 1H | 1R |
| 7 | 1 2 4 | 1 2 4 R | 1 2 4 R | 4H | 1R |
| 8 | 8 | 8 R | 8 R | 2H | 0R |
| 9 | 1 8 | 1 8 | 1 8 | 5H | 0R |
| 0 | $Z_1$ | $Z_1$ R | $Z_1$ R | 0H | 2R |
| . | $Z_1$ $Z_2$ 1 2 8 | $Z_1$ $Z_2$ 1 2 8 R | $Z_1$ $Z_2$ 1 2 8 R | 6H | 6R |
| $ | $Z_2$ 1 2 8 | $Z_2$ 1 2 8 | $Z_2$ 1 2 8 | 6H | 4R |
| , | $Z_1$ 1 2 8 | $Z_1$ 1 2 8 | $Z_1$ 1 2 8 | 6H | 2R |
| # | 1 2 8 | 1 2 8 R | 1 2 8 R | 6H | 0R |
| ¤ | $Z_1$ $Z_2$ 4 8 | $Z_1$ $Z_2$ 4 8 | $Z_1$ $Z_2$ 4 8 | 2H | 7R |
| * | $Z_2$ 4 8 | $Z_2$ 4 8 R | $Z_2$ 4 8 R | 2H | 5R |
| % | $Z_1$ 4 8 | $Z_1$ 4 8 R | $Z_1$ 4 8 R | 2H | 3R |
| @ | 4 8 | 4 8 | 4 8 | 2H | 1R |
| - | $Z_2$ | $Z_2$ R | $Z_2$ R | 0H | 4R |
| / | $Z_1$ 1 | $Z_1$ 1 | $Z_1$ 1 | 3H | 2R |
| ε | $Z_1$ $Z_2$ | $Z_1$ $Z_2$ | $Z_1$ $Z_2$ | 0H | 6R |
| | | | | 0H | 0R |

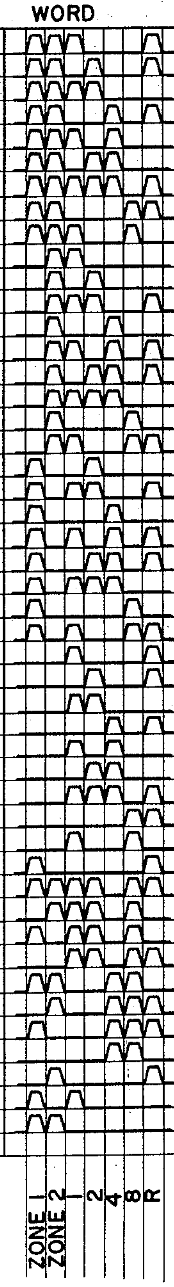

FIG.38

INVENTORS
HORACE S. BEATTIE
THEODORE L. BULEY
BERNARD M. MUENZER
BY Harry T. Berriman
AGENT INVENTORS
HORACE S. BEATTIE
THEODORE L. BULEY
BERNARD M. MUENZER
BY Harry T. Berriman
AGENT INVENTORS
HORACE S. BEATTIE
THEODORE L. BULEY
BERNARD M. MUENZER
BY Harry T. Berriman
AGENT July 26, 1960 H. S. BEATTIE ET AL 2,946,504

ACCOUNTING MACHINE

Filed Dec. 23, 1955 59 Sheets-Sheet 46

INVENTOR.
HORACE S. BEATTIE
THEODORE L. BULEY
BERNARD M. MUENZER

BY Harry T. Berriman
AGENT

INVENTORS
HORACE S. BEATTIE
THEODORE L. BULEY
BERNARD M. MUENZER
BY Harry T. Berriman
AGENT

OPERATION: READOUT CTR GROUP # 2 TO COLUMNS 15 TO 22 OF PRINT RECORD

INVENTORS
HORACE S. BEATTIE
THEODORE L. BULEY
BERNARD M. MUENZER

BY Harry T. Berriman
AGENT

INVENTORS
HORACE S. BEATTIE
THEODORE L. BULEY
BERNARD M. MUENZER
BY Harry T. Berriman
AGENT INVENTORS
HORACE S. BEATTIE
THEODORE L. BULEY
BERNARD M. MUENZER
BY Harry T. Berriman
AGENT

REPRESENTATIVE
ADD OPERATION

511 — Augend inctr group # 2
913 — Addend in addresses 2,3 and 4 of card track
1424 — Sum resulting in ctr. group # 2

ADDEND IS LISTED IN COLUMNS
7,8 AND 9 OF PRINT RECORD

INVENTORS
HORACE S. BEATTIE
THEODORE L. BULEY
BY BERNARD M. MUENZER
Harry T. Berriman
AGENT INVENTORS
HORACE S. BEATTIE
THEODORE L. BULEY
BERNARD M. MUENZER
BY Harry T. Berriman
AGENT

DIAGRAMATIC OF SUBT OPERATION

*INVENTORS*
HORACE S. BEATTIE
THEODORE L. BULEY
BERNARD M. MUENZER
*BY* Harry T. Berriman
AGENT

DIAGRAMATIC OF SUBT OPERATION 1 0 2 ----- IN COUNTER GROUP #2
-2 1 5 ----- IN CARD TRACK ADDRESS 5,6 AND 7
-1 1 3 ----- DIFFERENCE (IN CTR GROUP #2

2 0 1 0 0 0 0 0 TEN MILLIONS ORDER OPERATION
9 (ENTRY OF 9'S COMPLEMENT OF 0)
2 0 1 0 0 0 0 9 MILLIONS ORDER OPERATION
9 (ENTRY OF 9'S COMPLEMENT OF 0)
2 0 1 0 0 0 9 9 HUNDRED THND'S ORDER OPERATION
9 (ENTRY OF 9'S COMPLEMENT OF 0)
2 0 1 0 0 9 9 9 TEN THNDS ORDER OPERATION
9 (ENTRY OF 9'S COMPLEMENT OF 0)
2 0 1 0 9 9 9 9 THNDS ORDER OPERATION
9 (ENTRY OF 9'S COMPLEMENT OF 0)
2 0 1 9 9 9 9 9 HUNDS ORDER OPERATION
7 (ENTRY OF 9'S COMPLEMENT OF 2)
2 0 8 9 9 9 9 9 TENS ORDER OPERATION
8 (ENTRY OF 9'S COMPLEMENT OF 1)
2 8 8 9 9 9 9 9
4 UNITS ORDER OPERATION
(ENTRY OF 9'S COMPLEMENT OF 5)
6 8 8 9 9 9 9 9

FIG.55

INVENTORS
HORACE S. BEATTIE
THEODORE L. BULEY
BERNARD M. MUENZER
BY Harry T. Berriman
AGENT INVENTORS
HORACE S. BEATTIE
THEODORE L. BULEY
BERNARD M. MUENZER
BY Harry T. Berriman
AGENT July 26, 1960 H. S. BEATTIE ET AL 2,946,504

ACCOUNTING MACHINE

Filed Dec. 23, 1955 59 Sheets-Sheet 56

INVENTORS
HORACE S. BEATTIE
THEODORE L. BULEY
BERNARD M. MUENZER
BY Harry T. Berriman
AGENT

REPRESENTATIVE USE OF CO SELECTOR

INVENTORS
HORACE S. BEATTIE
THEODORE L. BULEY
BERNARD M. MUENZER
BY Harry T. Berriman
AGENT FIG.68A
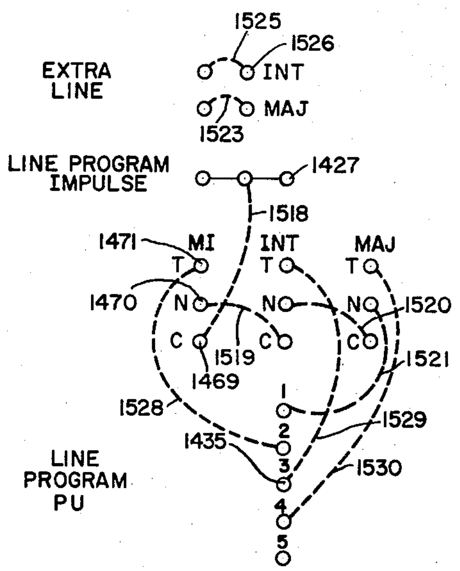
FIG.68B
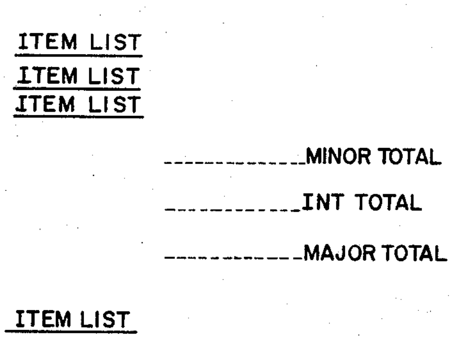
FIG.64
REPRESENATIVE USE OF CLASS SELECTOR
FIG.69
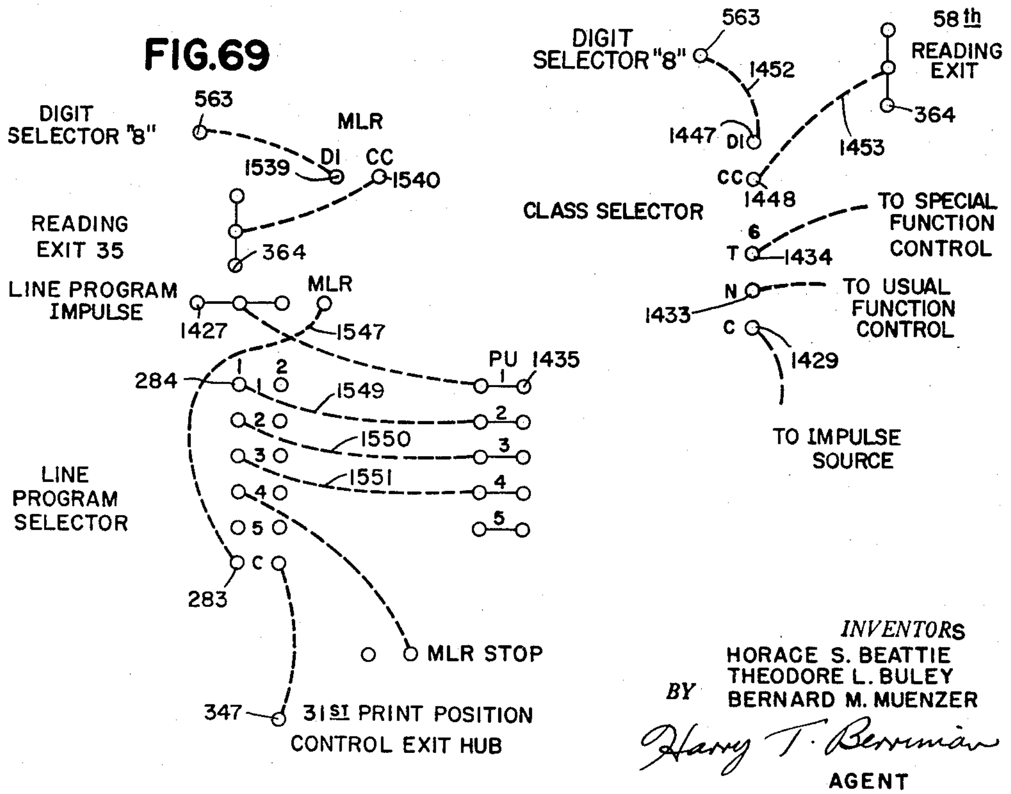
INVENTORS
HORACE S. BEATTIE
THEODORE L. BULEY
BERNARD M. MUENZER
BY Harry T. Berriman
AGENT July 26, 1960 H. S. BEATTIE ET AL 2,946,504

ACCOUNTING MACHINE

Filed Dec. 23, 1955 59 Sheets-Sheet 59

*INVENTORS*
HORACE S. BEATTIE
THEODORE L. BULEY
BERNARD M. MUENZER

*BY* Harry T. Berriman

AGENT

United States Patent Office

2,946,504
Patented July 26, 1960

2,946,504

ACCOUNTING MACHINE

Horace S. Beattie and Theodore L. Buley, Poughkeepsie, and Bernard M. Muenzer, Hyde Park, N.Y., assignors to International Business Machines Corporation, New York, N.Y., a corporation of New York Filed Dec. 23, 1955, Ser. No. 555,026

93 Claims. (Cl. 235—61.9)

This invention relates to accounting machines and more particularly to accounting machines of the serial type wherein record cards serve as the input media.

The principal object of the invention is to provide a serial type, card input, accounting machine having flexible control features similar to parallel type accounting machines, while at the same time fully exploiting the economies of circuitry and structure possible with a serial type operation over a parallel type operation.

The flexibility of the improved accounting machine is obtained by a unique electro-mechanical interaction of a serial type card feeding and sensing apparatus, a multi-track magnetic storage drum, and a serial type of print mechanism.

The entry records are of the conventional 80 column type having data represented therein in the IBM code. The data in an entry record is read therefrom by advancing the columns of the record successively under a single line of sense brushes there being one sense brush for each so-called index point of a record column. Each column of sensed data is translated from the IBM code to a seven bit code comprised of two zone bits, four binary bits and a redundancy bit. Alphabet, numeric or special characters can be represented in the seven bit code. The redundancy bit position is utilized for check purposes so that the bit count of any character is always even. The translated data from a card column is recorded serially, bit by bit in a storage position of either of two so-called card tracks of the magnetic storage drum. Each card track contains 80 storage or address positions, one for each card column. Each card track thus contains 80 addresses times 7 bit storage positions per address or 560 bit storage positions in all. Data is represented in the 7 bit code by binary ones only in the desired bit positions. The data on the card tracks and other tracks of the drum is erased when desired by the application of a steady D.C. voltage to a so-called erase head. Data is also erased by permanent magnet erase devices.

Each card track address in which the data from a sensed column is stored corresponds to the column of the record, and is selected through the interaction of an electronic addressing device, which is driven by impulses generated by the passage of magnetized teeth of a so-called clock track of the magnetic drum past a magnetic reading head and thus is always representative of the angular position of the drum, and a routing or so-called card feed emitter, which is synchronized with the apparatus for advancing the entry record under the sense brushes. Each successive address position of the address device, as energized, emits a corresponding address impulse or gate impulse from a corresponding output hub or a pluggable control panel. Each such address impulse may be utilized as a controlling gate for initiating any one of a multitude of possible pluggable accounting functions at that address time. The address device also controls various internal and fixed functions and is accordingly the principal controlling medium for most machine functions, fixed and pluggable.

The storage drum makes one complete revolution during each columnar advance of the entry record. The arrangement is such that although the sense brushes may be physically sensing a column for a complete drum cycle, it is only during the relatively short interval when the corresponding address is displaced past a recording head to receive the translated columnar data from the columns of the card mating the aforementioned address, that the sense brush circuit is electrically actuated.

The data from any two successive entry records is loaded into alternate ones of the two card tracks, so that during the loading of the data from a record to the one card track, the card data of the previously sensed record in the alternate card track, is available to the machine for processing. Group control functions as normally effected on a parallel machine by a comparison of the data simultaneously sensed in each of a pair of records in associated separate sense stations, is achieved in the subject machine with only one brush sense station. This improved action is effected by comparing the data in a record, column by column as sensed, to the corresponding stored representation in the card track of the previously sensed record. Four classes of group controls are provided, Minor, Intermediate, Major and Final.

The printing mechanism of the improved accounting machine comprises a single type element having numeric, alphabetic, and special characters embossed thereon. Carriage mechanism is provided for advancing the print element, column by column to a maximum of 80 print columns of a print record. The carriage is advanced at a rate of 1 column per 2 complete revolutions of the storage drum. Printing is thus effected at ½ of the rate at which entry records are sensed (1 column per drum cycle).

The advance of an entry record and the print carriage are each under control of separate clutch mechanisms. The card feed and carriage advance mechanisms are usually clutched in at the beginning of each machine cycle and advance in synchronism. The data on a loaded card track may be listed simultaneously with the loading of the other track in response to the sensing of an entry record. As the print element advances into a desired print column, the print element is adjusted by a so-called set-up mechanism in response to the desired drum address data so as to present the corresponding character to the print line. With the desired type character positioned at the print line, a hammer forces the print record and an intervening inked ribbon against the selected character to complete that print operation.

The print set-up mechanism is controlled by a group of so-called set-up relays there being one for each of the 7 bit positions of the 7 bit machine code. These relays are actuated singly or in combination in response to the data sensed in the desired card track address, or in the desired address of other tracks of the magnetic drum. Each setup relay when actuated, effects the energization of a corresponding print magnet which, in turn, initiates an operation of an associated actuating member to effect a corresponding selection movement of the print element. The particular drum address from which a print operation is desired and the actual print column of the record in which the data is to be printed, are selected through the interaction of the address device and its plugboard associated output hubs, and routing emitters, the various positions of which also terminate at plughubs on the control panel. These routing emitters are also synchronized with the advancing action of the print carriage and with the movement of an entry record through the sense station if a card feed operation is being effected. With two complete revolutions of the storage drum being effected for each columnar advance of the print carriage relative to the print record, it is evident that the data from any storage position of the drum may be printed in any desired column of the print. Thus, the data originally in columns 70 through 80 of an entry record may be printed in columns 5 through 15 of the print record, or columns 1, 6, 7, 14, 19, 21, etc. if so desired.

After the completion of a print line, the carriage is returned, the print record line space actuated, and a new machine cycle is initiated. One, two, or four line spaces may be effected between print lines as desired, through flexible plughub control. A paper tape type device is provided for effecting forms skipping, etc. This device is also under flexible plugboard control.

The print apparatus includes a so-called print position control exit emitter which is synchronized with the advancing of the carriage. Each position of the print position control exit emitter terminates at a plughub on a control panel and an impulse is emitted therefrom, during the interval that the print element is in the corresponding columnar print position. Any position of the print position emitter after the 40th can be plugwired to a so-called line stop hub the latter, when impulsed, initiating the carriage return operation. As the 40th print column is being printed, the 80th column of the entry record is being sensed. Carriage return and a new machine cycle may accordingly be initiated thereafter since the entry record sense operation is completed. If the print carriage is not returned under plubboard control, it will be returned automatically after it reaches the 80th column print position. When printing is being effected in columns beyond the 40th, the machine cycle is lengthened proportionately so that entry records are handled at some speed less than the maximum. Thus, if printing is effected through the 80th column, entry records are handled at only ½ their maximum speed.

Accumulation is accomplished serially, one digit at a time, and accordingly requires only a single digit binary adder. Another 80 position storage track of the drum is referred to as the counter track and is divided into 10 individual counter groups of 8 orders (positions) each. Entry of data from any desired column or columns of the record into any desired counter, readout of any selected counter to any desired print positions, or transfer operations between counters, may be effected with complete flexibility by the proper interconnection through plughub circuitry of the address device, and counter selection and adder controls (plus and minus entry). The counter emitter is linked with the other emitters of the machine and is synchronized therewith.

The sequence of an adding operation is as follows: A digit is listed and a set of points of the print element set up relays are simultaneously representative of the digit to be added or subtracted. This digit will be entered into the binary adder for the counter desired through the interaction of the counter selection circuit, counter emitter and counter controls, as selected under plugboard control. The digit represented in the set-up relay contacts is entered therefrom in binary form in a one shot parallel fashion at the beginning of the address time when the desired order of the selected counter is starting under a counter read head.

A so-called counter program unit actually controls the sequence of the counter operation thereafter. The counter program causes the amount in the desired order of the selected counter, as it sensed serially bit by bit as it rotates under the counter read head, to be entered in a corresponding serial manner, bit by bit into the adder. Thereafter, a so-called seven bit ring controls the transfer of the new accumulated amount from the binary adder into a so-called write register. The write register amount is then written therefrom into a so-called temporary storage track of the storage under control of the write function of counter program in such a position that is 7 address intervals in advance of an associated temporary storage read head. The counter program also controls the erasing of the originally read digit in the desired order of the selected counter of the counter track. This erased portion will arrive at a counter track write head six address intervals after erasing, at which time the new accumulated sum digit on the temporary storage track arrives at its associated read head. The new accumulated sum digit is accordingly read from the temporary storage track and recorded into the counter track in place of the original digit therein. Thereafter, the sum digit or any digit in the temporary storage track is erased therefrom as it rotates under an erasing permanent magnet associated with the temporary storage track. The process is repeated for each order of the addend value to be entered into the selected counter, so that counter entry is effected at a rate of 1 digit per two drum cycles. Although each digit to be entered into a counter is physically set up in the print position, the actual printing thereof may be prevented, when so desired, by suppressing the firing of the print hammer. The hammer suppress function is also under plugboard control.

Subtraction is effected by entering the complement of the listed digit into the binary adder through a "complement side" of the set-up relay contacts connected to the adder.

When the new sum digit in the case of an add operation, or the difference digit in the case of a subtract operation, is transferred from the binary adder to the write register, it is equated from the 7 bit machine code to a decimal basis in order to determine if a decimal carry is required. If a carry is required, the counter program controls the entry of the carry to the next higher counter position during the subsequent address time of the same drum cycle. Carry's propagate from counter position to next higher counter position during the following address time with the exception of an end around carry (carry from the highest counter order to the lowest). End around carry is effected by recording a carry bit on the counter track in the Zone 2 list position of the units order of the counter group. This carry bit will be entered into the units order of its respective counter during the next drum cycle and also any carry propagation to higher order counters caused by the end around carry will be effected during the following address intervals of this same drum cycle.

If on converting a binary sum digit of the adder to its appropriate decimal sum in the write register, generates a decimal carry, the carry is effected as above, and as a companion action, the remaining single order sum digit (original binary sum digit minus the decimal carry) is translated into the binary internal machine code and transferred from the write register to the temporary storage track. All counter values are carry propagated by the end of the 2nd drum cycle after any related counter operation is initiated, and thus always in condition to be read out.

Any desired counter or counter totals may be readout therefrom, transferred to other counters or total printed in any desired print columns. Counter readout is effected through the interaction of the electronic address device, the counter selection circuitry and a so-called counter readout emitter, which like all the machine emitters is mechanically synchronized with the print device advancing action. The particular counter or counters for which readout is desired, may be preselected through flexible plugboard control.

Means are provided for proving the accuracy of printing whether printing from the card track or from a counter. Print proving is effected by comparing a bit count representation of the type character, as actually set up for printing, to the bit count as indicated by the particular set-up relays energized to initiate that print selection operation. The bit count representative of the type element position is determined through circuitry including an individual switch operatively associated with each of the mechanical activating members by which the type element selection motion is effected. Upon an operation of any of the type selection actuators, the corresponding switch thereof is closed. The actuator switches closed at the completion of any particular type element positioning operation, are accordingly representative of the bit count of that selected type character. If the bit count of the type element positioned in printing position, differs from the bit count as represented by the set-up relays, a print error is indicated. As a result, an error light is energized and the machine latches up at the end of that print operation.

During any adder action, the redundancy check bit is generated or not, as required for the particular sum digit or difference digit generated for each order. Any redundancy bit so generated is recorded in the temporary storage track and transferred to the counter track in the proper order so that during a counter readout, the printing will prove in the same manner as if listing from a card track.

The improved accounting machine includes a number of banks of so-called line program switches. The various plugboard impulse sources etc. for initiating machine functions, may be plugwired to desired so-called common plughub terminals, each of which is internally connected by a common bus to the one side of corresponding switches of the banks of switches. The other side of each line program switch terminates in a related individual plughub on the control panel. The latter plughubs may be plugwire linked to the particular function desired to be controlled, when the related bank of program contacts are closed. Consequenty, as determined by the particular bank or banks of line program contacts closed, a related predetermined program of operation is followed by the machine. The particular bank or banks of line program contacts closed and the associated "program" accordingly effective, may be controlled selectively in response to various operational states of the accounting machine, such as group control indications, etc. The sensing of preselected control designations in preselected columns of the entry records may also be utilized to select the operational program desired. A counter may be reset as a companion action to counter readout, when so desired, under plugboard control. In the reset action, all the data in the desired counter group is erased therefrom.

The improved serial accounting machine includes the further features of negative balance counter test, true printing of negative complement amounts, the performance of cross-footing operations with total printing on the same listed line, special character printing and suppression of the printing of zeros to the left of the highest order. As a companion action to the true printing of complement counter amounts, there is provided novel circuitry for properly adjusting the redundancy position in the print proving apparatus, so that print errors are not erroneously indicated as a result the complement counter amount being set up in the print setup relays, and the corresponding true amount actually printing.

Multiplication is effected by writing the multiplicand ten times on a so-called multiplicand track of the storage drum. Thereafter the multiplier is listed digit by digit. As each multiplier digit is set up in the print relays, an associated set of so-called multiplier controls cause the multiplicand to be added to itself in accordance with the magnitude of the multiplier digit as represented in the print relays. The final partial product for each multiplier digit is stored first on a so-called partial product accumulation track of the storage drum and then transferred therefrom to the so-called temporary storage track. The partial product is thereafter entered into the adder and added to the sum of any previously generated products which are stored in the last two counters of the counter track during the multiply operation. The new partial product sum accordingly generated is transferred to the temporary storage track and then to the counter track, this action column shifting the product sum 1 order as required. This partial product sum is subsequently added to the partial product resulting from the next order multiplier digit. This process is repeated until with the completion of the print cycle for the lowest order of the multiplier, a 15 position product is available in the counter track for counter readout.

It is accordingly an object of the invention to provide a serial type, card input accounting machine where a magnetic storage drum serves as the main internal information handling device and wherein the storage drum is tied into all mechanical actions in such a manner as to minimize the electrical and electronic circuitry.

Another object is to provide a serial type, card input accounting machine wherein great flexibility of control is obtained through a unique electro-mechanical interaction of a serial type card feeding and sensing apparatus, a multi-track magnetic storage drum, and a serial type of print mechanism.

Another object is to provide an improved serial type accounting machine wherein a relatively slow serial type card entry apparatus can load data into a substantially faster operating internal storage.

Another object is to provide an improved serial type accounting machine wherein information flow between a relatively slow card input apparatus of the serial type, and a relatively slow serial type printing apparatus, is effected through an intervening information handling medium operating at a much greater speed.

Another object is to provide an improved serial type accounting machine wherein the movement of data between a relatively slow card input, a relatively faster intermediate information handling apparatus, and a relatively slow serial printer, is effected through the joint action between an electronic reference address unit for the fast storage, and emitters synchronized with the card input and printer output apparatus.

Another object is to provide serial type accounting apparatus wherein data is entered therein from multi-column records which are sensed serially, column by column as advanced under a line of sense members, and wherein each column of sensed data is translated and recorded in a corresponding address of a storage drum operating at a speed greater than the speed of motion of a record past the sense brushes by a multiple equal to the total columns in an entry record, the selection of the drum address being effected through the cojoint action of an electronic addressing device, which is driven by impulses generated by the passage of magnetized teeth of a clock track of the drum past a magnetic reading head and is thus always representative of the angular position of the drum, and a routing emitter which is synchronized with the apparatus for advancing the entry record under the sense brushes.

Another object is to provide an improved serial type accounting machine wherein a magnetic storage drum comprises the information handling apparatus within the machine proper and wherein an electronic address device driven by impulses generated by a sync track of the drum and accordingly always representative of the angular rotation of the drum, serves as the master controlling medium for all machine functions.

Another object is to provide an improved serial type accounting machine wherein data is loaded therein serially by advancing a multi-column record card, column by column, under a line of sense brushes, and wherein group control comparison may be effected column by column between a record as sensed, and a stored representation of the previously sensed record.

Another object is to provide an improved serial type accounting machine having an information storage device having two alternate input sections, one section being loaded serially in response to the column by column sensing of an entry record, while the alternate section in which is stored the data of the previously sensed entry record, is available as a data source for a single element printer, the speed of operation of the storage device being such as to permit any selected one of the stored columnar representations of the data available thereto to be readout to initiate a corresponding print operation during the sensing of each column of the entry record.

Another object is to provide an improved serial type accounting machine having a multi-digit storage device from which coded data may be read out digit by digit into a corresponding group of coded relays, one set of the relay contacts serving as the control for initiating a selection operation of the corresponding type character of a single type element for printing, while another set of the relay contacts serving as the control for entering the same digit to a single order coded counter.

Another object is to provide an improved serial type accounting machine having a single digit adder and a multi-track magnetic storage drum which serves as the main internal information handling device, each track having a multitude of storage positions, one storage track being designated as the counter track and being divided in effect into a number of counter groups, each having the same number or orders, and wherein numeric amounts in any desired storage position or positions of another storage track of the drum, may be entered into the adder serially, order by order, in synchonism with the entry of corresponding orders of a selected counter into the adder, the resulting sum digit for each order, properly corrected for carry's being recorded in the same counter order from which the one factor for that operation was supplied, this latter factor having been erased from its counter order after entry into the adder.

Another object is to provide an improved accounting machine having a single order adder, card entry apparatus of the serial type which has emitter mechanically synchronized therewith, a single type element, a serial printer which also has emitter mechanically synchronized therewith, a multi-track storage drum which serves as the main internal information handling device, each of a pair of card tracks of the drum receiving the data from alternate entry records, with another track of the drum being divided in effect into a number of counter groups, the drum including a clock track for driving an associated electronic address which accordingly is indicative of the drum rotational position at all times, and counter selection and adder control circuitry; the counter selection and adder controls, the address device, and the emitters all having operational terminals available on a pluggable control panel to permit flexible control connections therebetween so that entry of data from any desired column or columns of a record, as represented in the card track, may be entered into any selected counter, any desired column or columns of the card track data may be printed in any desired print columns, any counter may be readout to any desired print positions, or transfer operations may be effected between any counters, as desired.

Another object is to provide an improved serial type accounting machine having a single type element with a plurality of print characters therein and wherein the actual character to be printed is selected by properly positioning the type element, through the operation of coded actuators, singly or in combination, the operation of the actuators in turn being controlled through circuitry set up in response to the reading of a coded digit from a desired position of a multi-position storage, each character as actually selected for printing being proved as correct by comparing the bit counts between a first circuit as operated in response to the set-up circuitry, and a second circuit operated in response to the closing of individual contacts by each of the selection actuators actually operated.

Another object is to provide apparatus as in the object immediately above and including means for determining if a stored digit to be printed is negative or positive, the set up circuitry being controlled in accordance with the absolute value of the stored digit regardless of its sense, with the provision of modifying circuitry selectively operable when the sense of the stored digit is negative, to cause said set-up circuitry to select the 9's complement of the digit represented therein for printing, if desired; and wherein any discrepancy between the bit count circuitry operable in response to the set-up circuitry and the bit count circuitry operable in response to the type character actually selected for printing, when the 9's complement of the stored digit is selected for printing, is properly adjusted so that the digit printed will print prove as if it were actually the absolute value of the stored digit.

Another object of the invention is to provide an improved serial type accounting machine where there are provided a plurality of banks of switches, the various impulse sources of the machine by which machine functions are controlled being linked to common inputs of all the banks of switches, with each bank of switches having its corresponding outputs linked to the function desired if the related bank is actuated, wherein the actual program or sequence of functions effected by the machine corresponds directly to the particular bank or banks of switches closed.

Another object of the invention is to provide an improved accounting machine as in the object set forth immediately above, wherein the particular bank or banks of switches closed at any time is selected in response to the generation of predetermined operational states of the machine itself.

A further object of the invention is to provide an improved serial accounting machine wherein there may be effected cross footing operations with total printing on the same listed line.

Still a further object is to provide an improved accounting machine having a single print element having various print characters thereon, the print element being carried on a reciprocal carriage which is advanced in fixed increments to present the type element to successive print columns of a print record, the type element including set-up mechanism carried on stationary structure and which is connected through control cables to the type element to impart a type character selection motion thereto wherein there is also provided a compensation carriage movable at one-half the speed of the print carriage and carrying pulleys over which the control cables pass in their path between the set-up mechanism and the print element, the position of the compensating carriage serving to compensate at all times for the position of the print carriage so that the control cables are always maintained taut and any selection motion of a control cable by the set-up mechanism has a fixed selection effect on the type element regardless of the columnar position of the print carriage.

Other objects of the invention will be pointed out in the following description and claims and illustrated in the acocmpanying drawings, which disclose, by way of example, the principle of the invention and the best mode, which has been contemplated, of applying that principle.

Figure 11A:
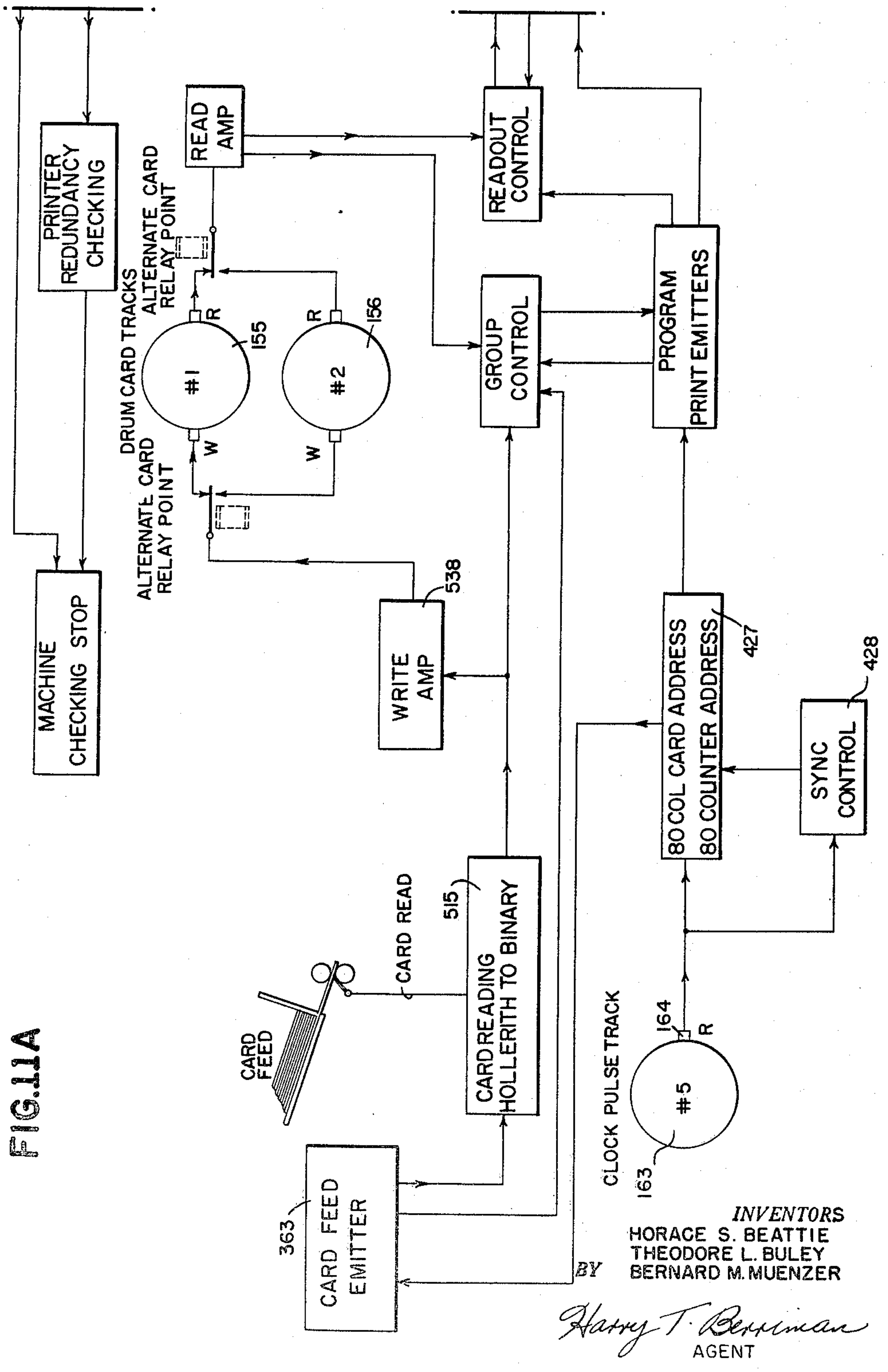
Figure 11B:
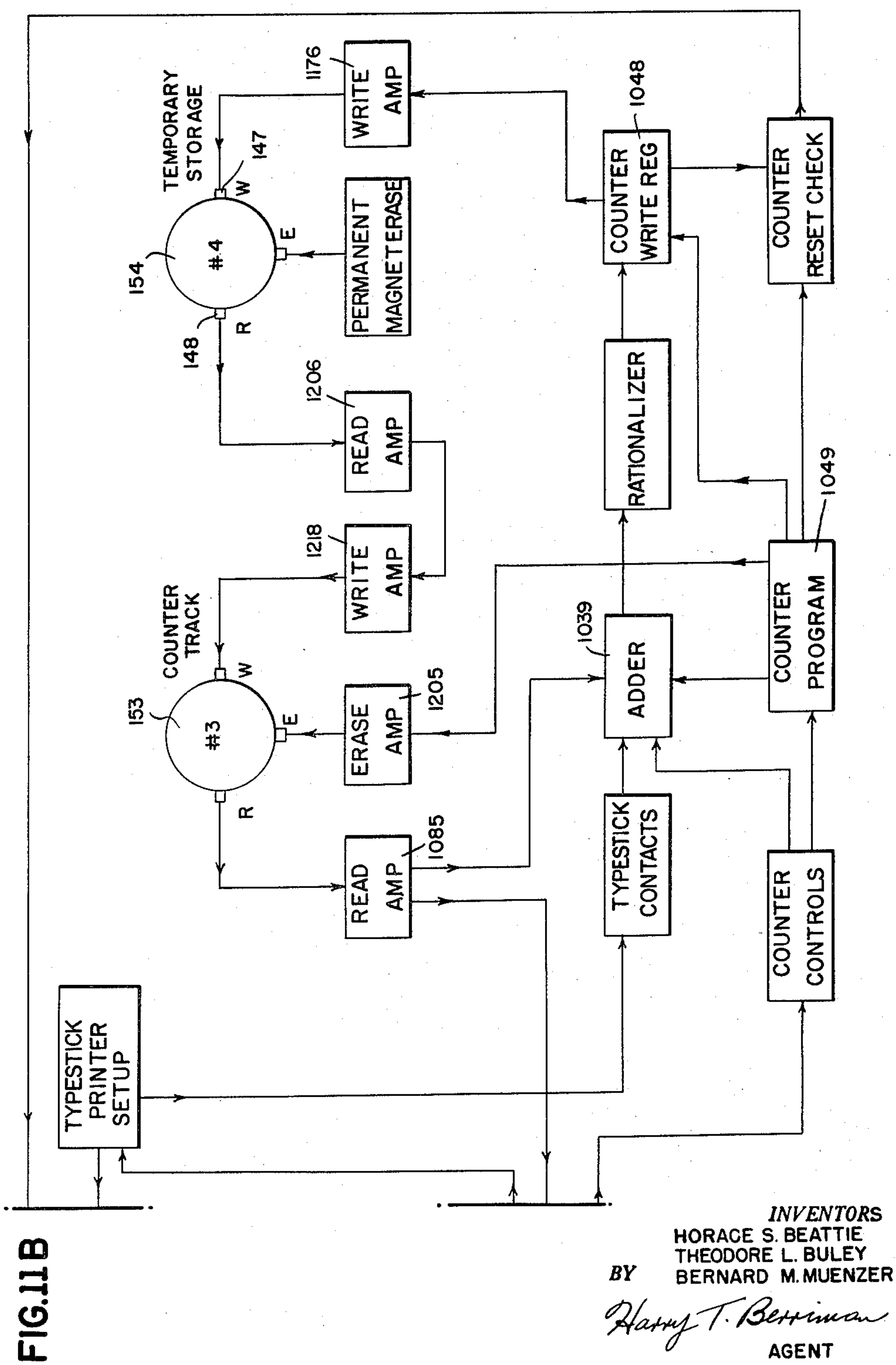

Figs. 11A and 11B comprise a simplified block diagram of the improved accounting machine.

Figure 12A:
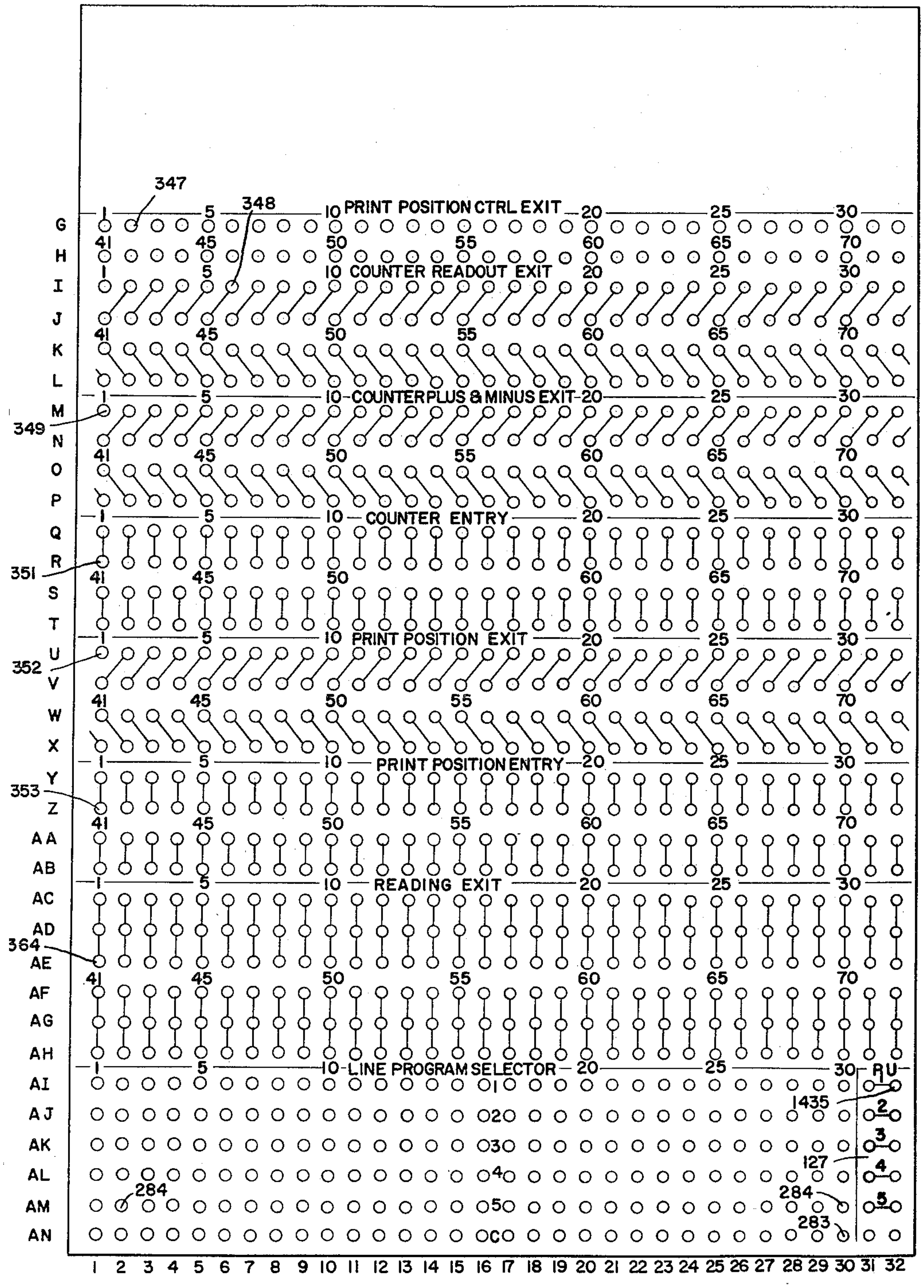
Figure 12B:
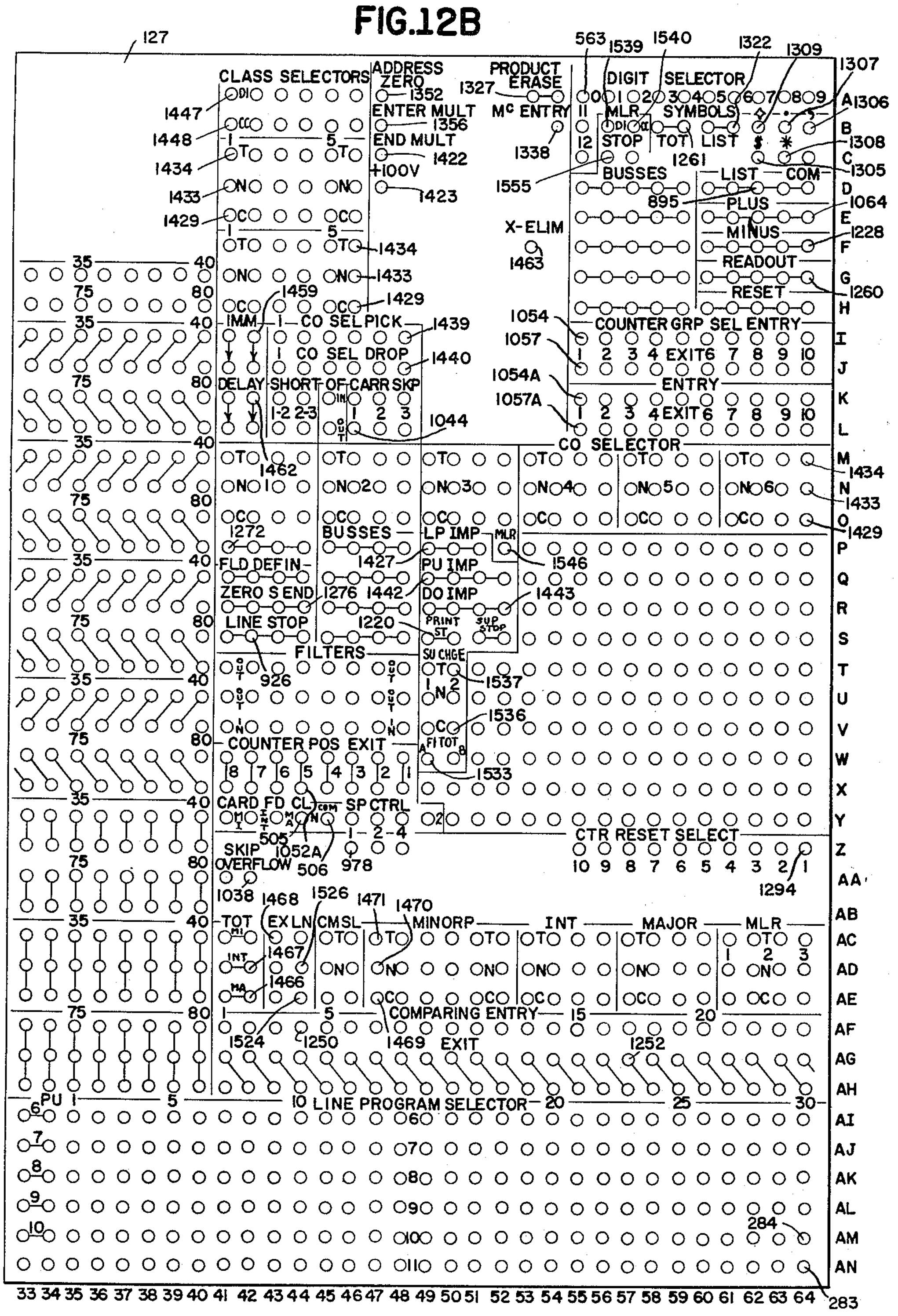

Figs. 12A and 12B illustrate the face of the pluggable control panel for the accounting machine.

Figures 13, 14, 53:
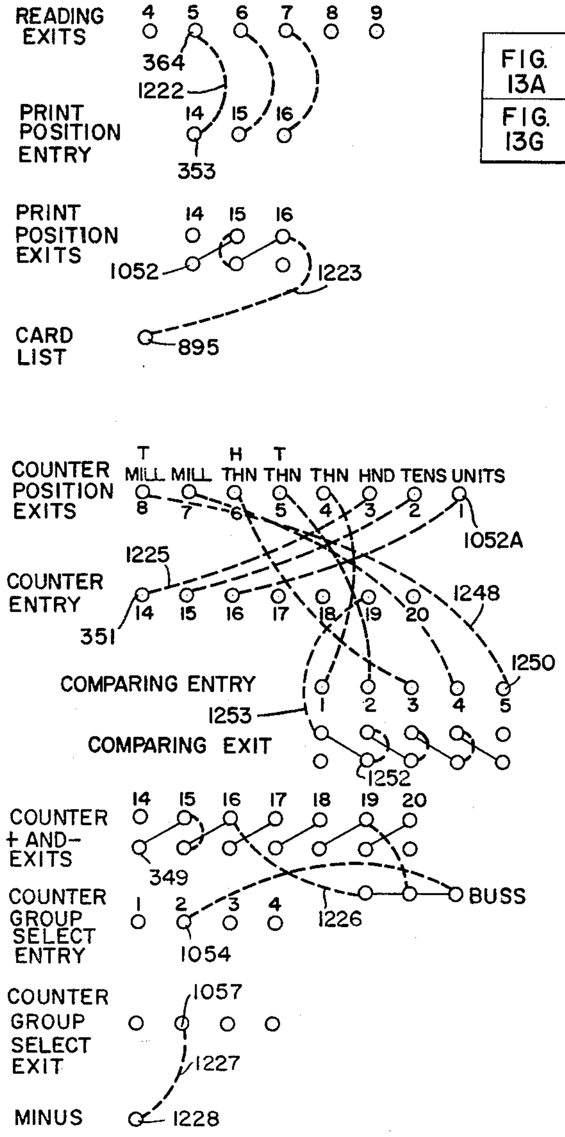
Figure 13A:
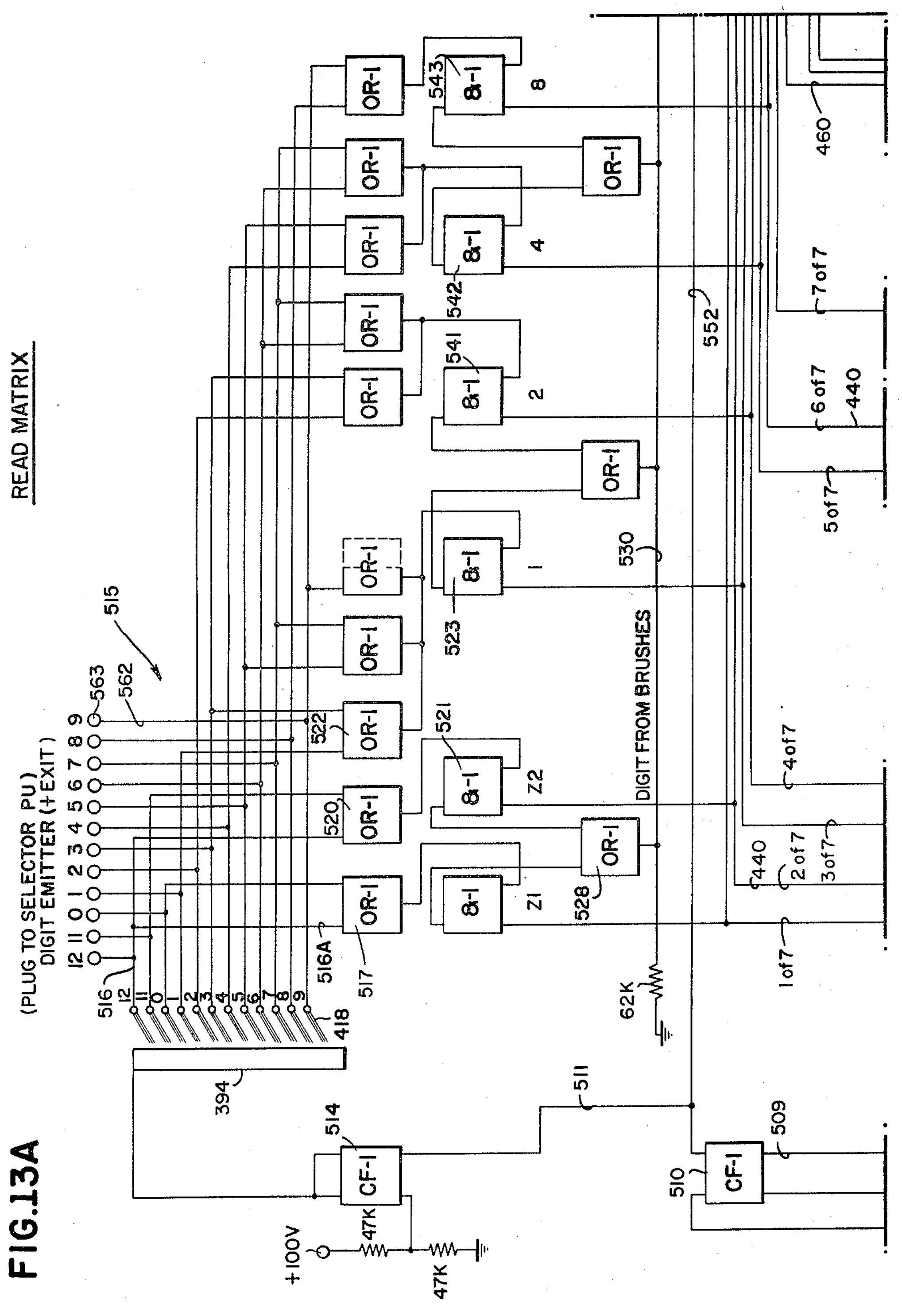

Figs. 13A, B, C, D, E, F, G, H, I, J, K, and L taken together as shown in Fig. 13, comprise a diagram of the electronic and allied circuitry of the accounting machine.

Figure 14A:
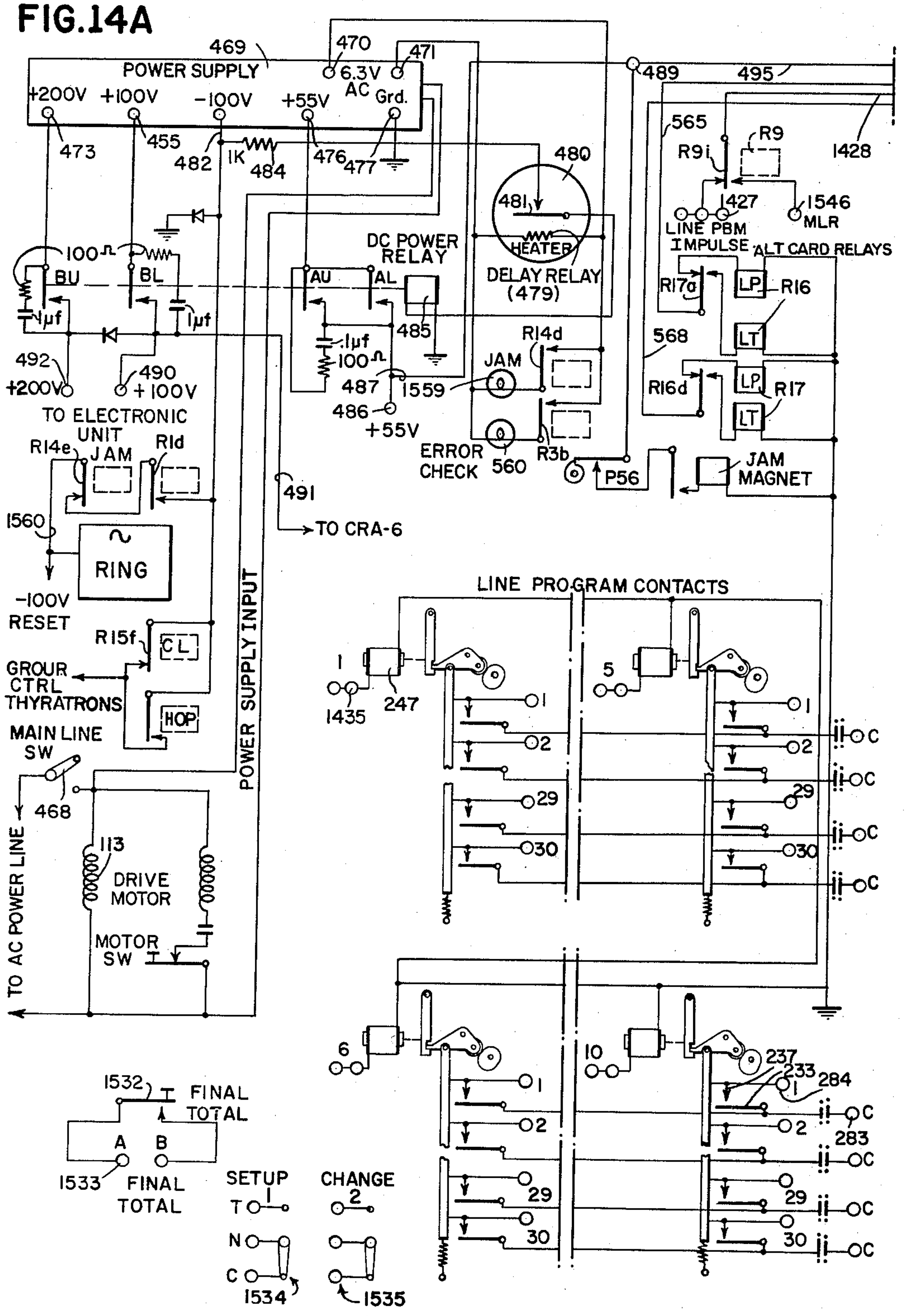

Figs. 14A, B, and C taken together as shown in Fig. 14 comprise a diagram of the relay and allied circuitry of the accounting machine.

Figures 15, 15A:
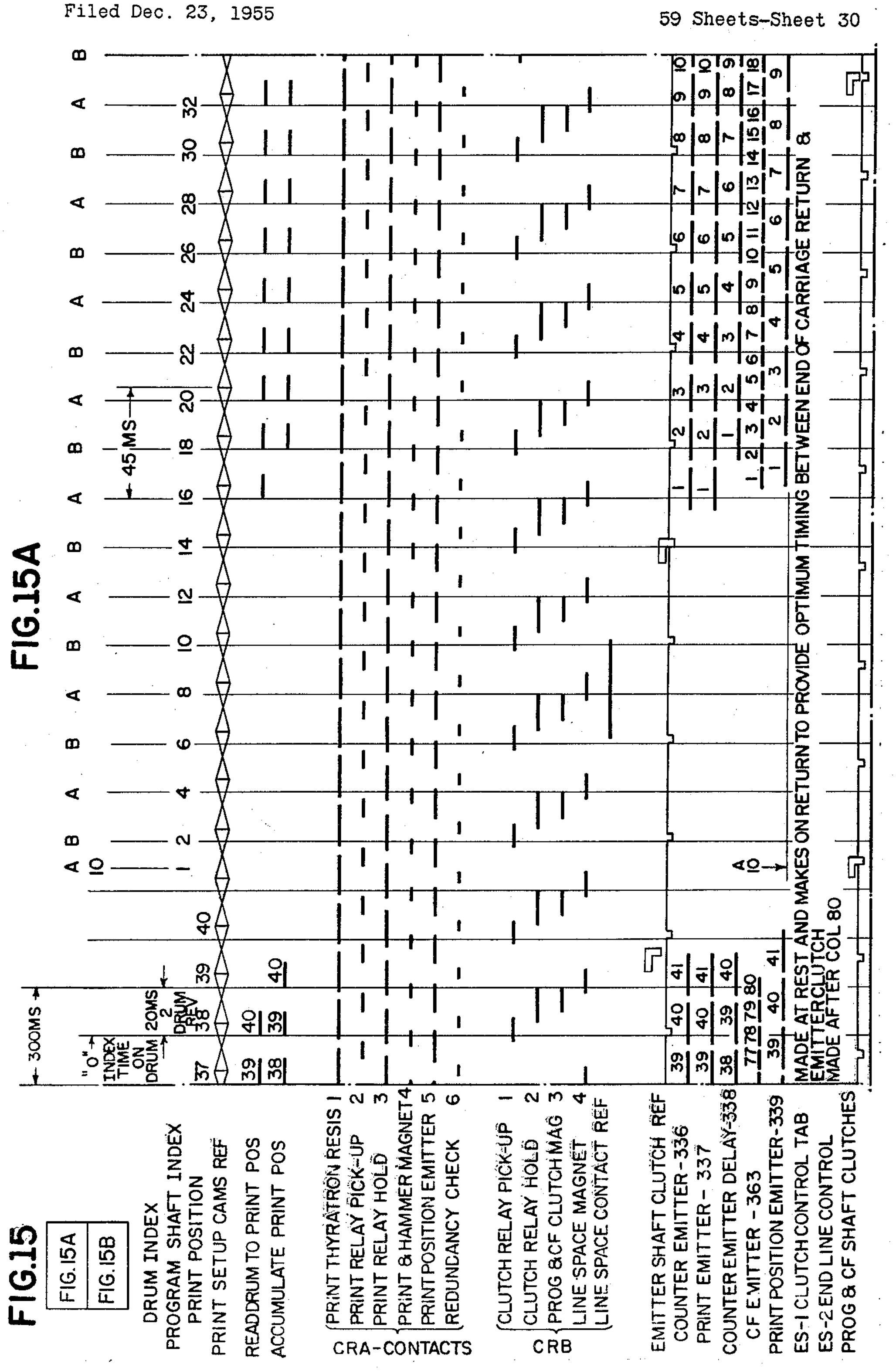

Figs. 15A and B taken together as shown in Fig. 15 comprise the general timing diagram of the accounting machine.

Figure 16:
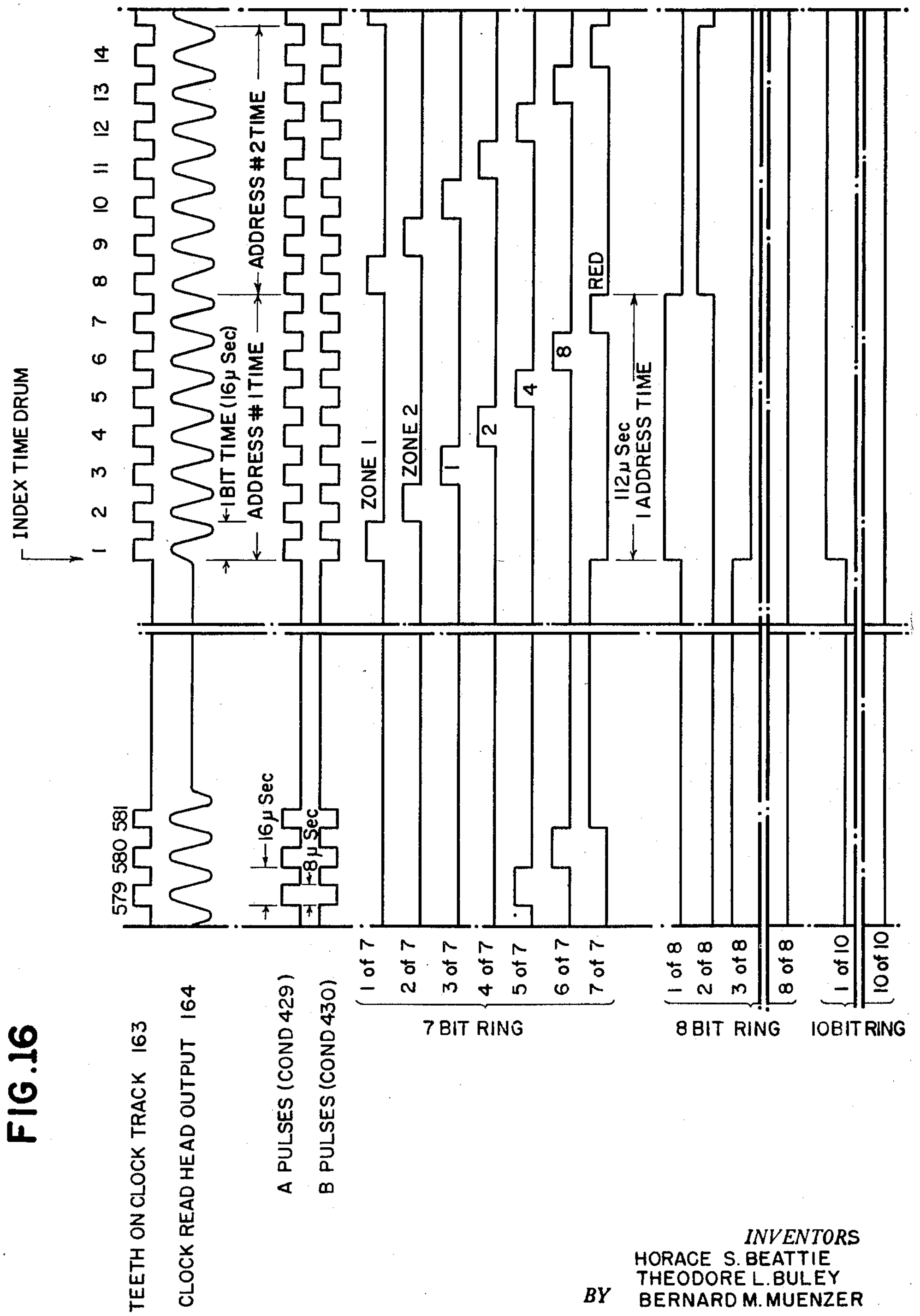

Fig. 16 comprises a timing diagram of the electronic Address Device of the accounting machine.

Figure 17:
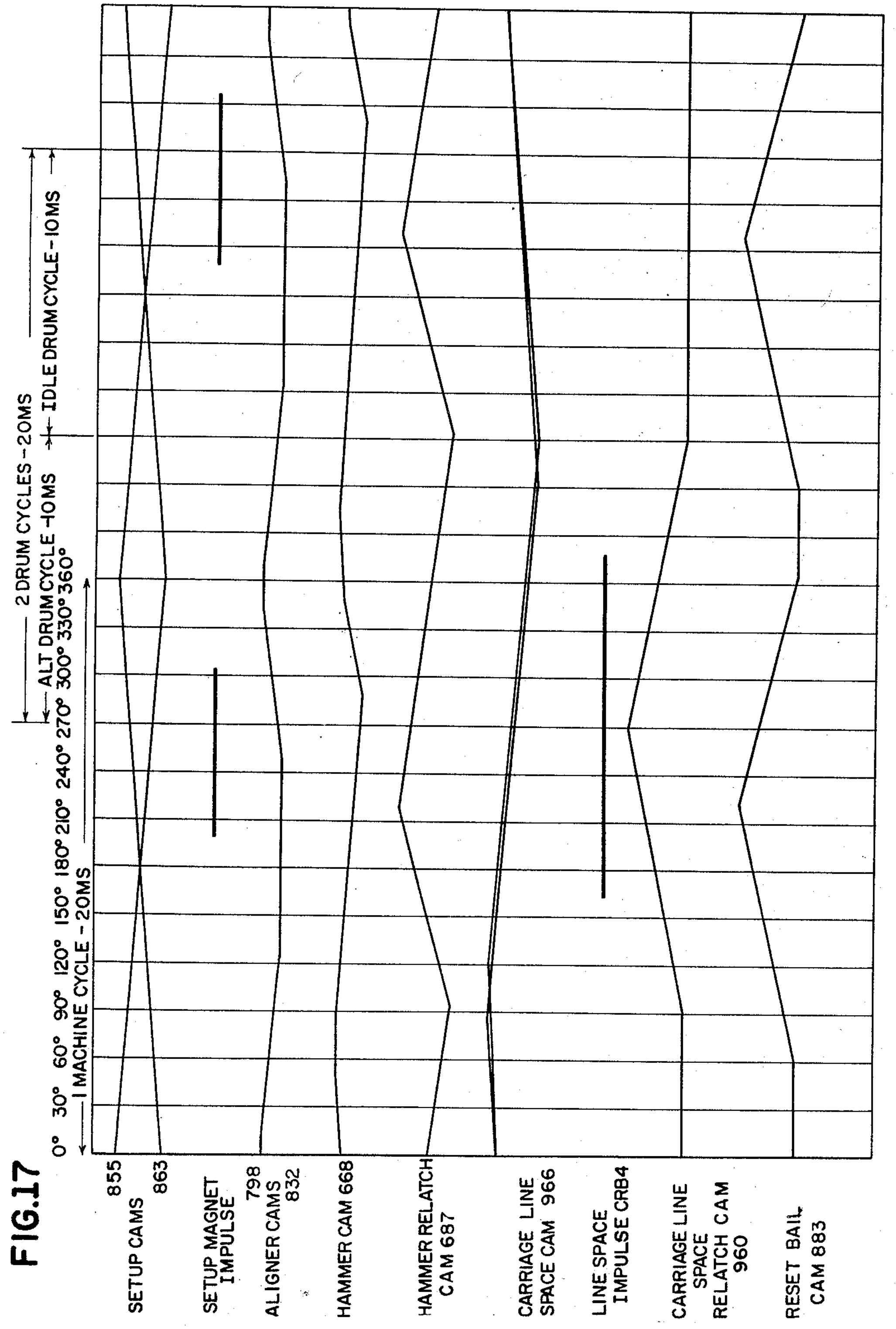

Fig. 17 comprises a timing device of the printer portion of the accounting machine.

Figure 1:
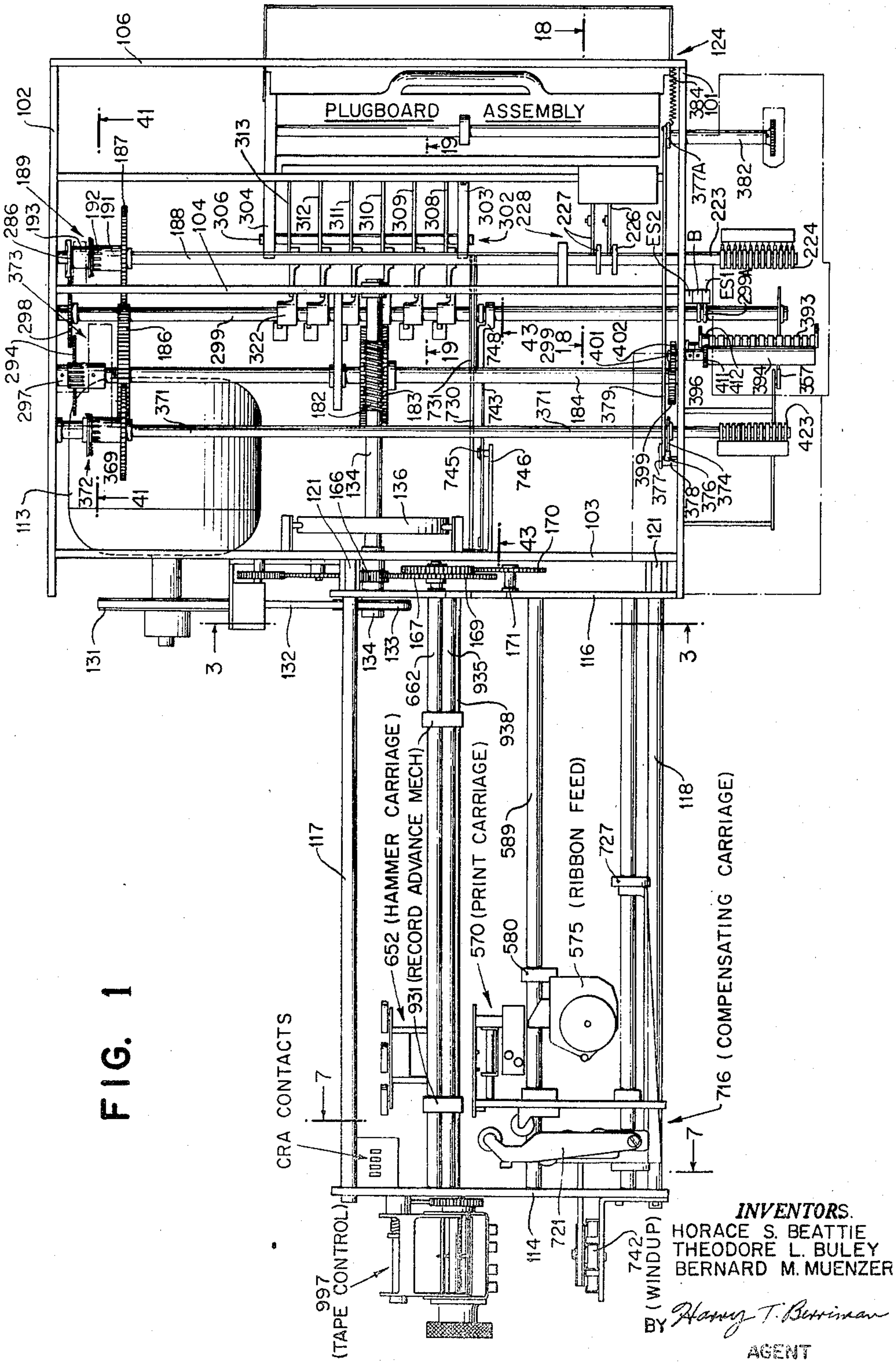
Fig. 1 is a simplified plan view of mechanical structure of the improved accounting machine, various parts being deleted to aid in illustration.
Figure 18:
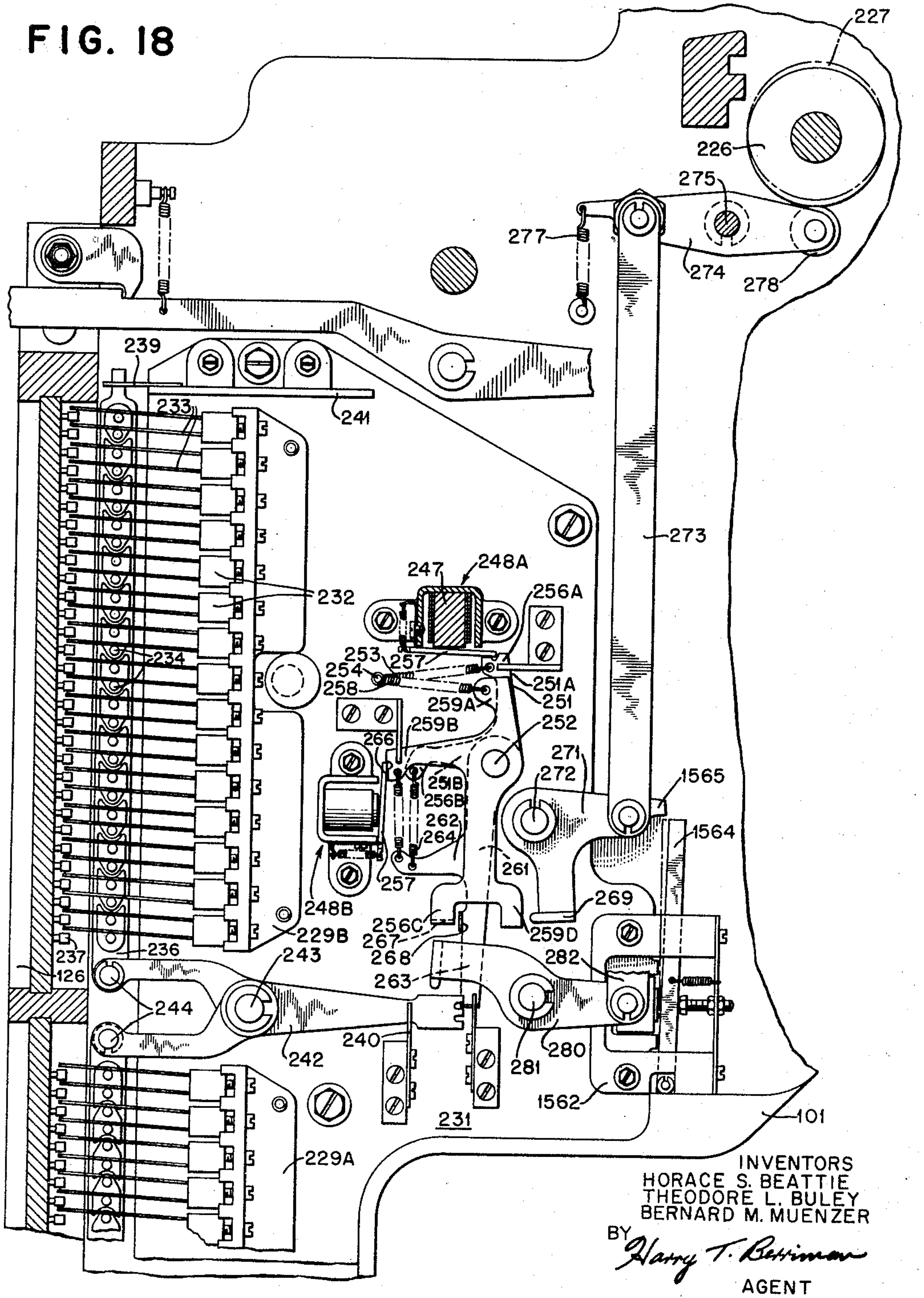

Fig. 18 comprises a vertical section taken on the line 18—18 of Fig. 1 and shows the detail structure of the line program switch assembly.

Figure 19:
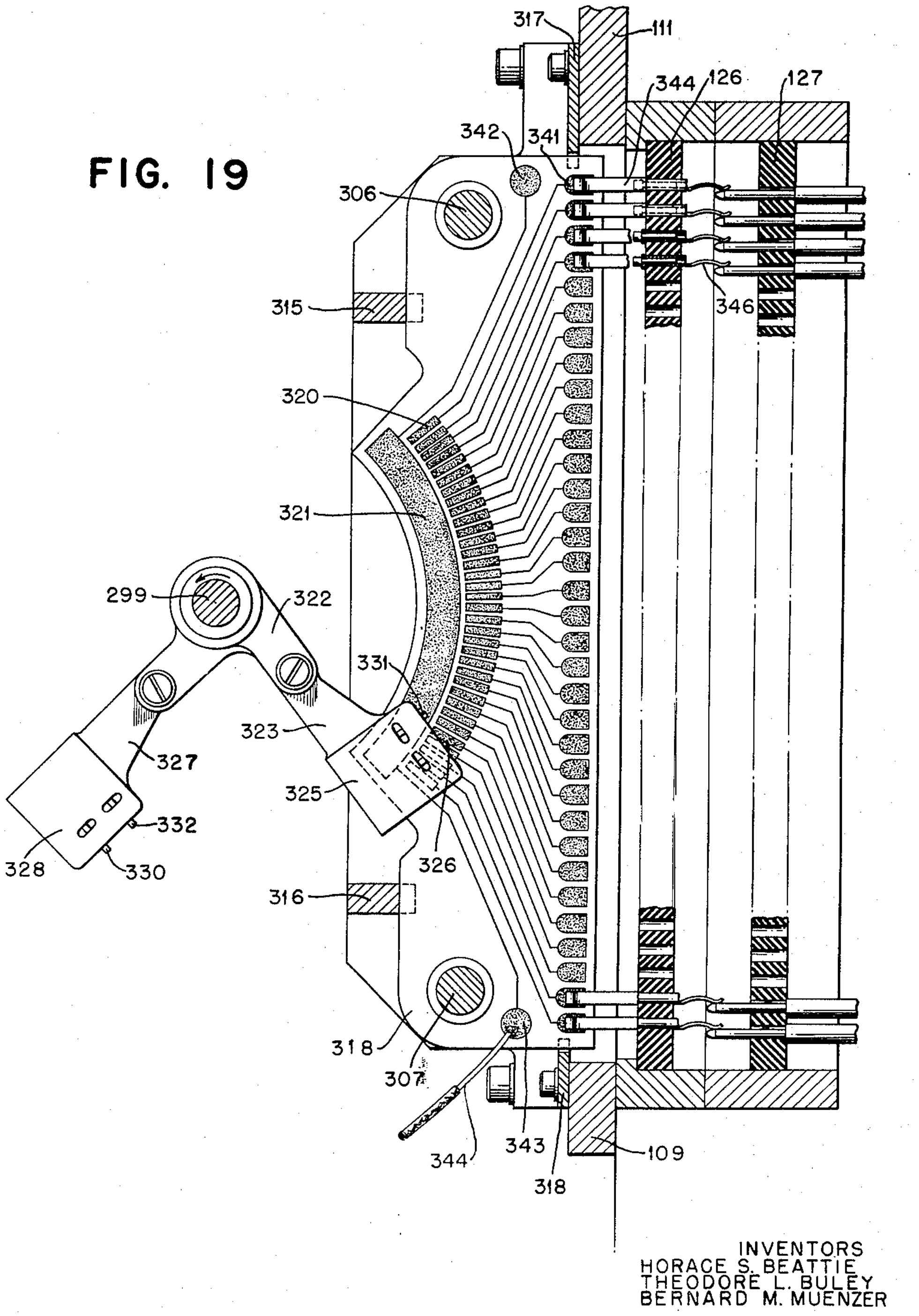

Fig. 19 is a vertical section taken on the plane of the line 19—19 of Fig. 1 and shows the detail structure of the emitter assembly.

Figure 20:
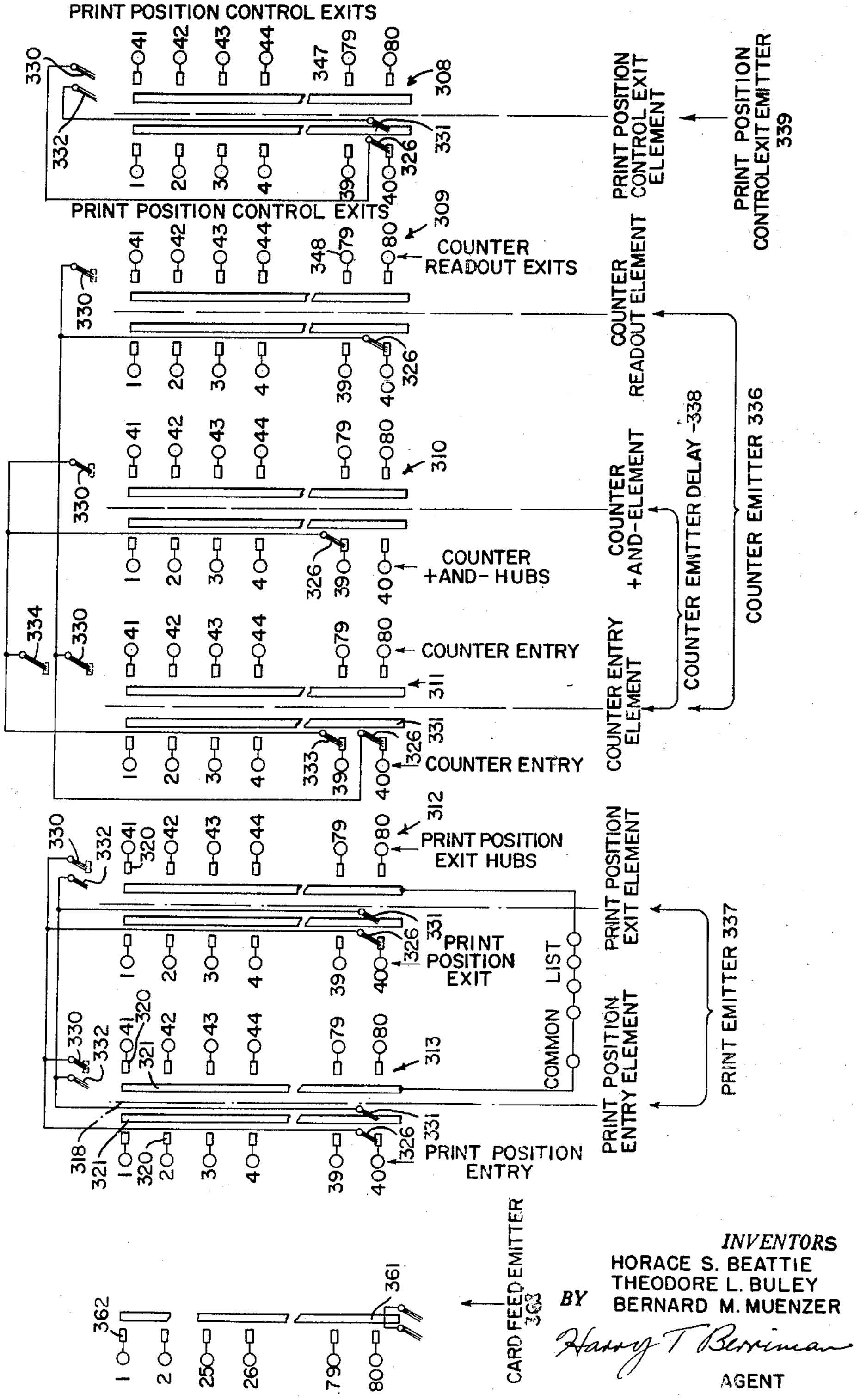

Fig. 20 is a diagrammatic representation of the emitter structures.

Figure 21:
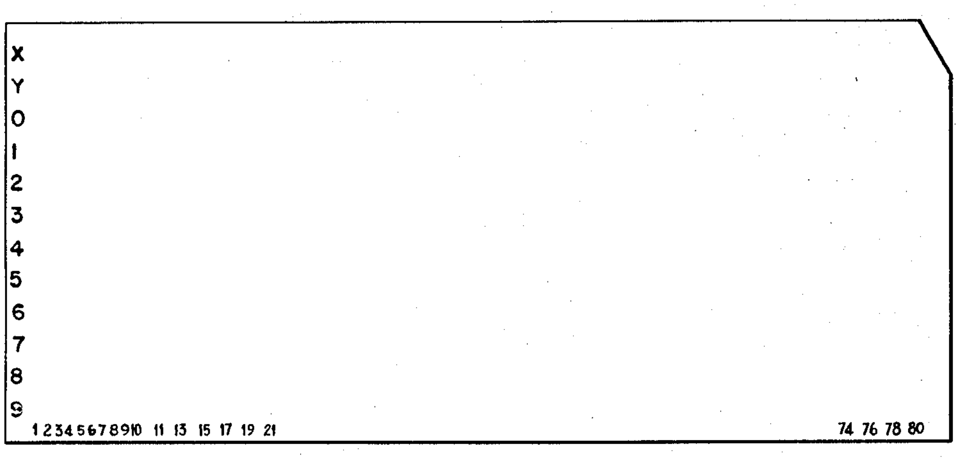

Fig. 21 is diagrammatic representation of the type of entry records utilized with the accounting machine.

Figures 22A, 22B, 23:
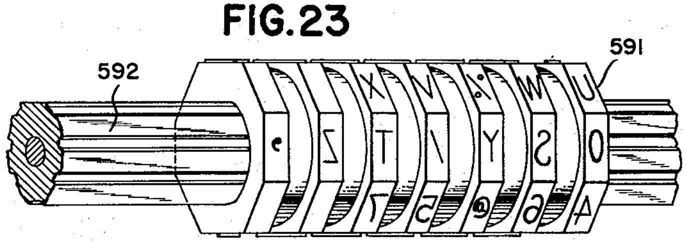

Fig. 22A is a table showing the manner in which the various possible entry characters are represented in the IBM code in the entry records.

Fig. 22A also shows the correlation between each possible coded input character and the equivalent print magnet operation for effecting a printing of that character.

Fig. 22B is a conversion table showing the equivalent internal binary coded machine form for each of the possible machine characters.

Fig. 22B also shows the correlation between each binary coded machine character and the equivalent print magnet operation for printing each such coded character. In Fig. 22B that portion of the table showing the type character is also representative of a development view of the single print element.

Fig. 23 is a diagrammatic representation of the single print element.

Figure 24:
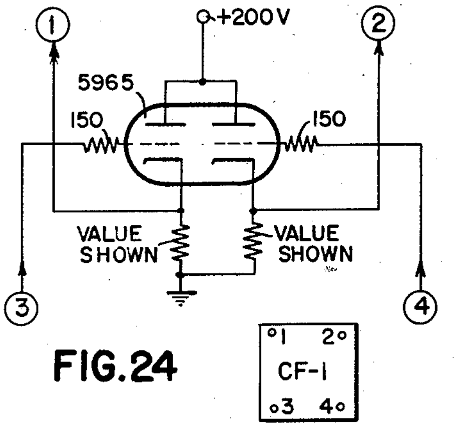
Figure 25:
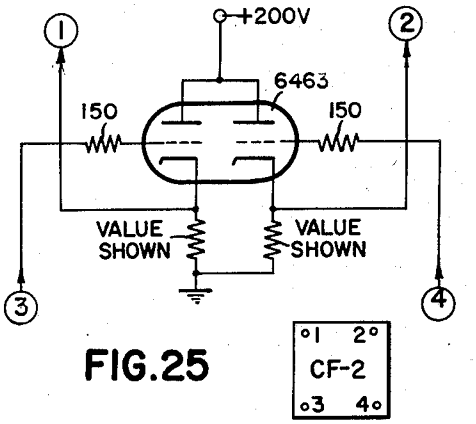
Figure 26:
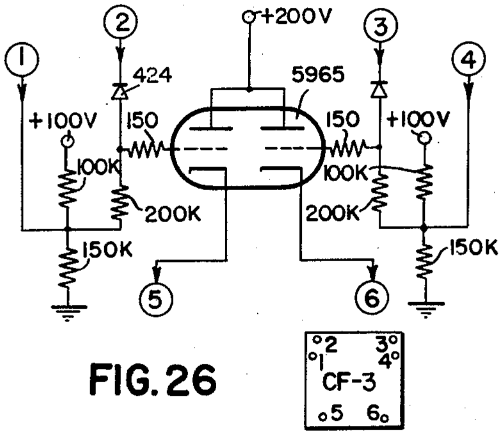

Figs. 24, 25, and 26 are detail circuit diagrams, and corresponding block symbols, respectively, of the various electronic cathode follower units utilized in the accounting machine.

Figure 27:
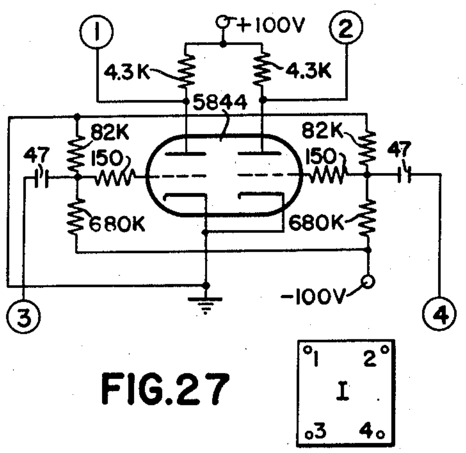

Fig. 27 is a detail circuit diagram and corresponding block symbol, respectively, of the inverter units utilized in the accounting machine.

Figure 28A:
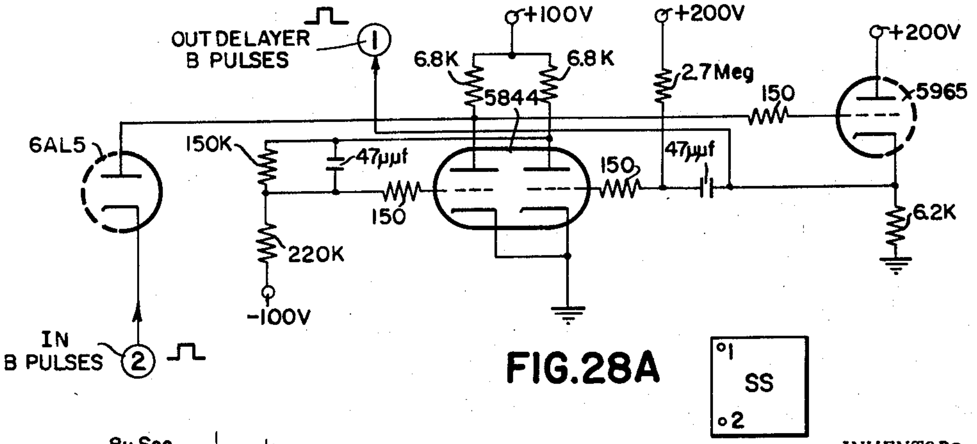

Fig. 28A is a detail circuit diagram and corresponding block symbol, respectively, of the single shot multivibrator utilized in the accounting machine.

Figure 28B:
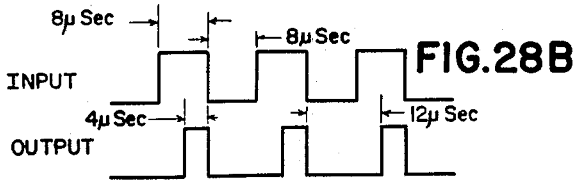

Fig. 28B is a representative timing diagram of the operation of the single shot multivibration shown in Fig. 28A.

Fig. 29 is a detail circuit diagram and corresponding block symbol, respectively, of the trigger unit used in the accounting machine.

Fig. 30 is a detail circuit diagram and corresponding block symbol, respectively, of the AND unit used in the accounting machine.

Fig. 31 is a detail circuit diagram and corresponding block symbol, respectively, of the OR unit used in the accounting machine.

Fig. 32 is a detail circuit diagram and corresponding block symbol respectively, of the vacuum tube Diode unit used in the accounting machine.

Fig. 33 is a detail circuit diagram and corresponding block symbol, respectively, of the Thyratron AND unit used in the accounting machine.

Figure 34:
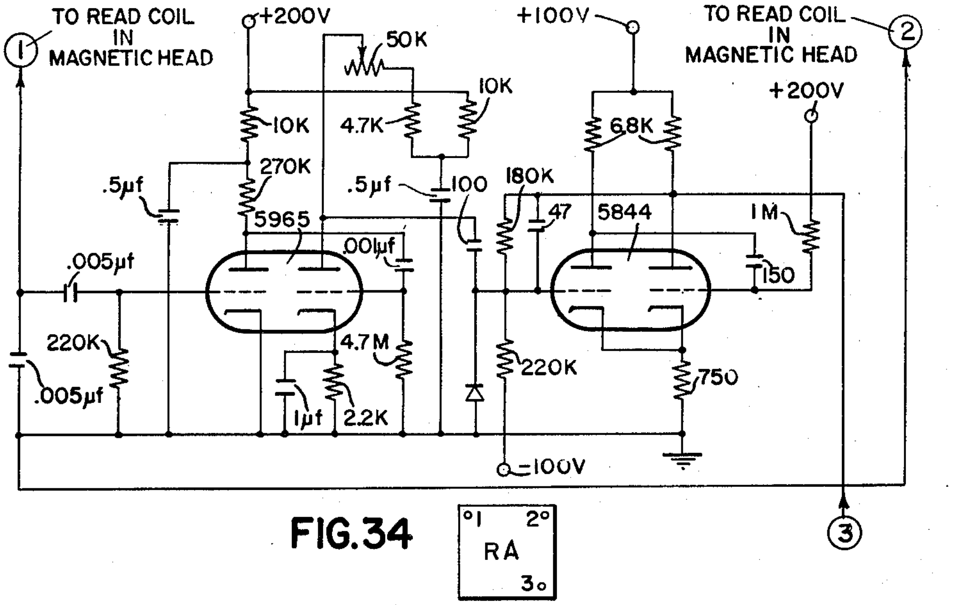

Fig. 34 is a detail circuit diagram and corresponding block symbol, respectively, of the read amplifier used in the accounting machine.

Figure 35:
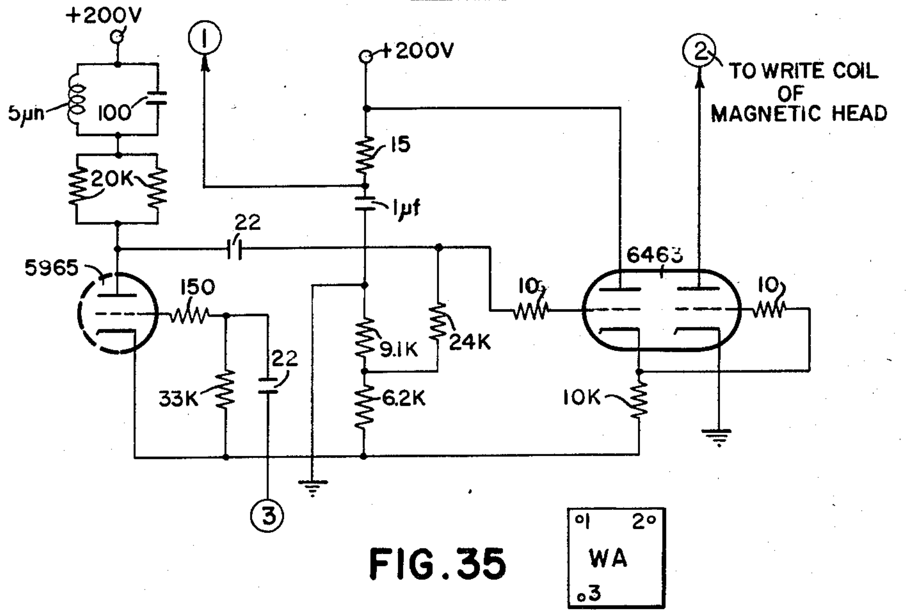

Fig. 35 is a detail circuit diagram and corresponding block symbol, respectively, of the Write amplifier used in the accounting machine.

Figures 36A, 36B:
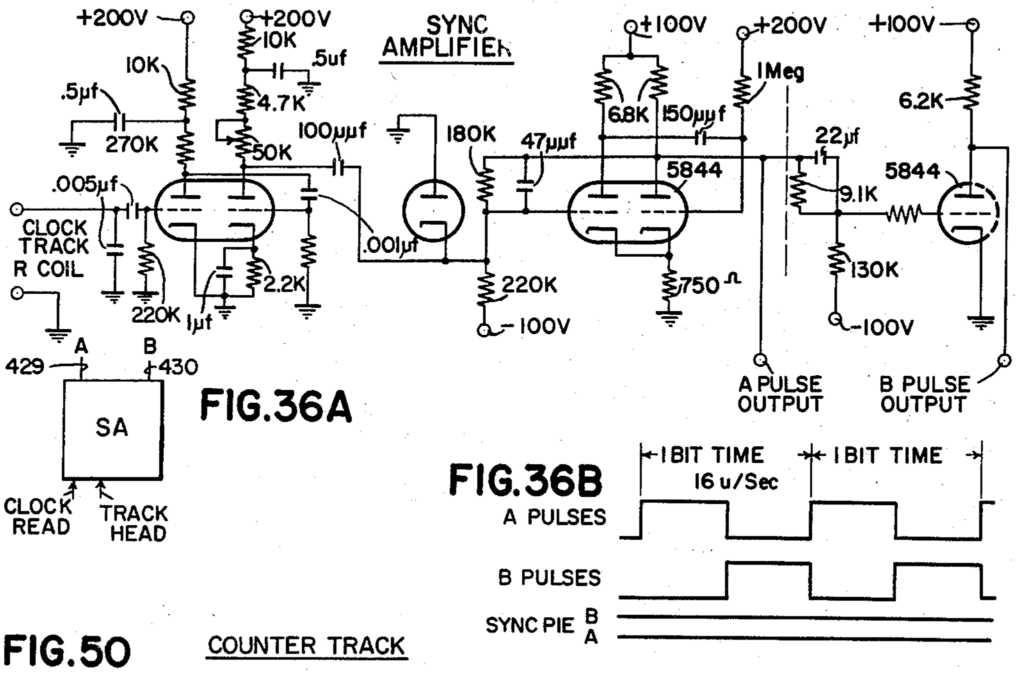

Fig. 36A is a detail circuit diagram and corresponding block symbol, respectively, of the Sync amplifier used in the accounting machine.

Fig. 36B is pulse timing diagram of the output of the Sync amplifier of Fig. 36A.

Figure 37:
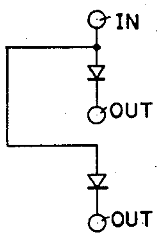

Fig. 37 is a detail circuit and corresponding block symbol, respectively, of the expander units used in the accounting machine.

Fig. 38 is a table summarizing the internal machine code form for each representative input character the equivalent serial pulse in word form (2nd column from the left) for each character, and the equivalent type element operation to effect a printing of each such character.

Figure 39:
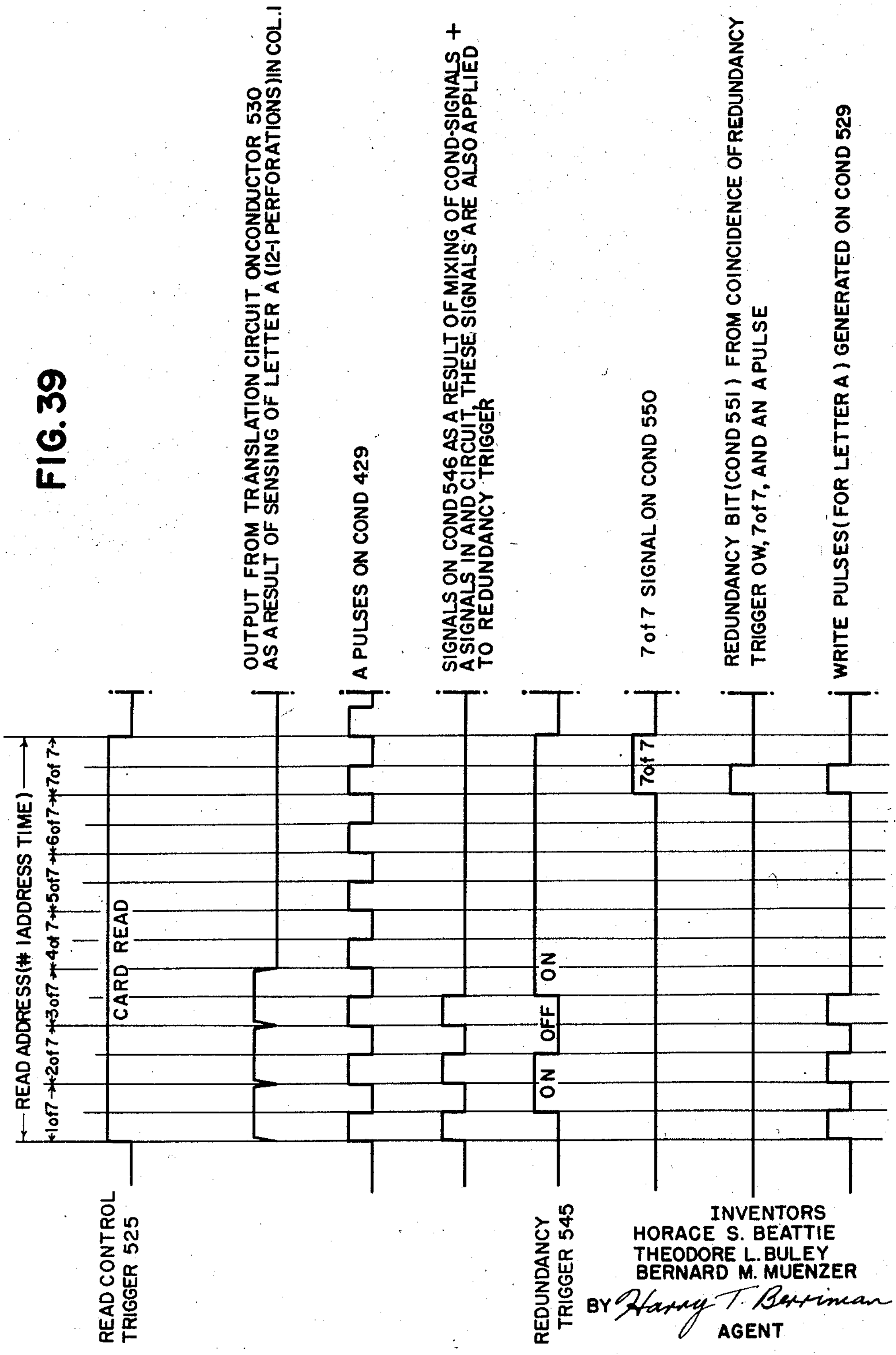

Fig. 39 is graphic representation of a card read operation for an entry character "A."

Figure 7:
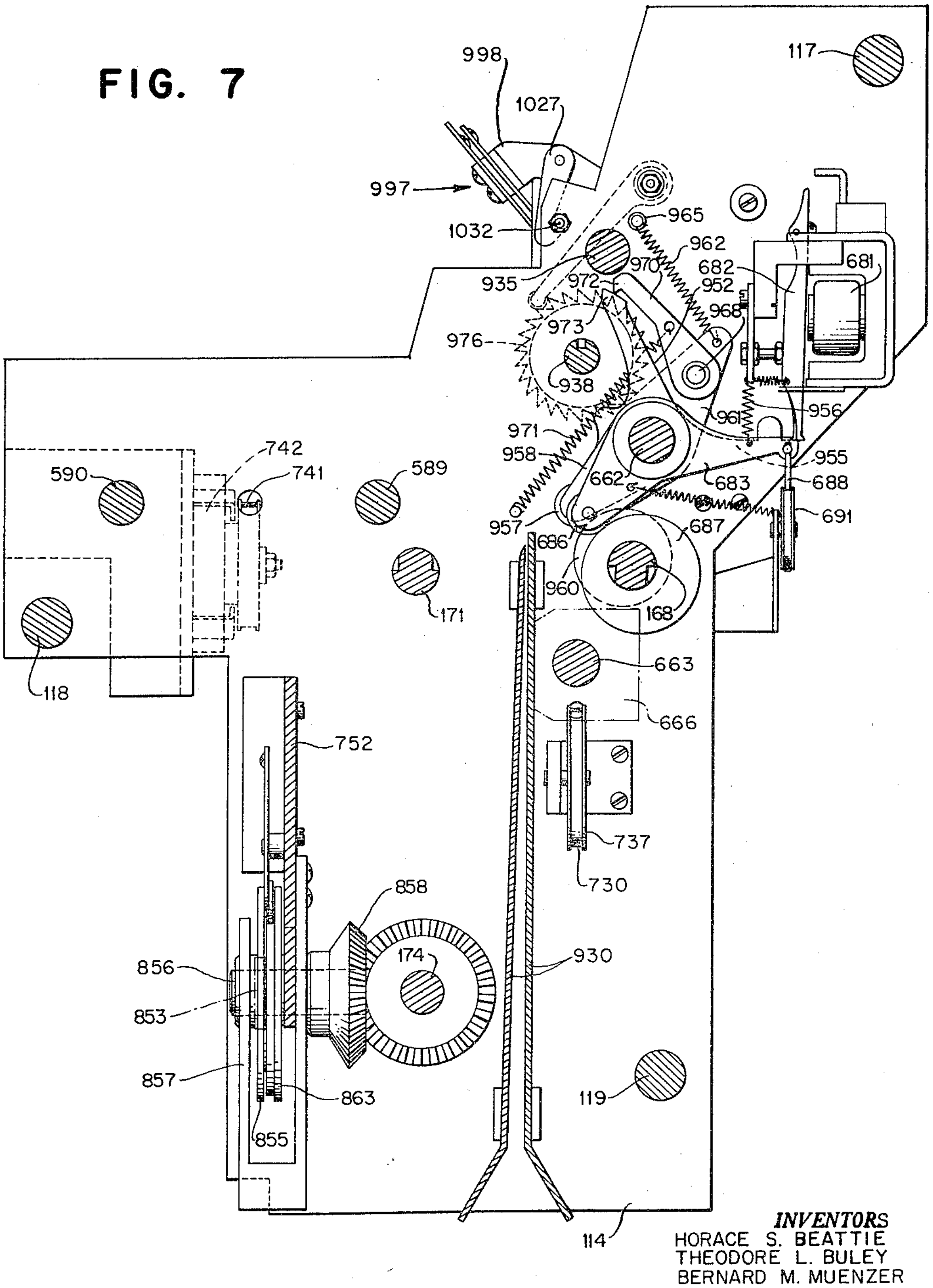
Fig. 7 is an enlarged vertical section view taken on the plane of the line 7—7 of Fig. 5.
Figure 40:
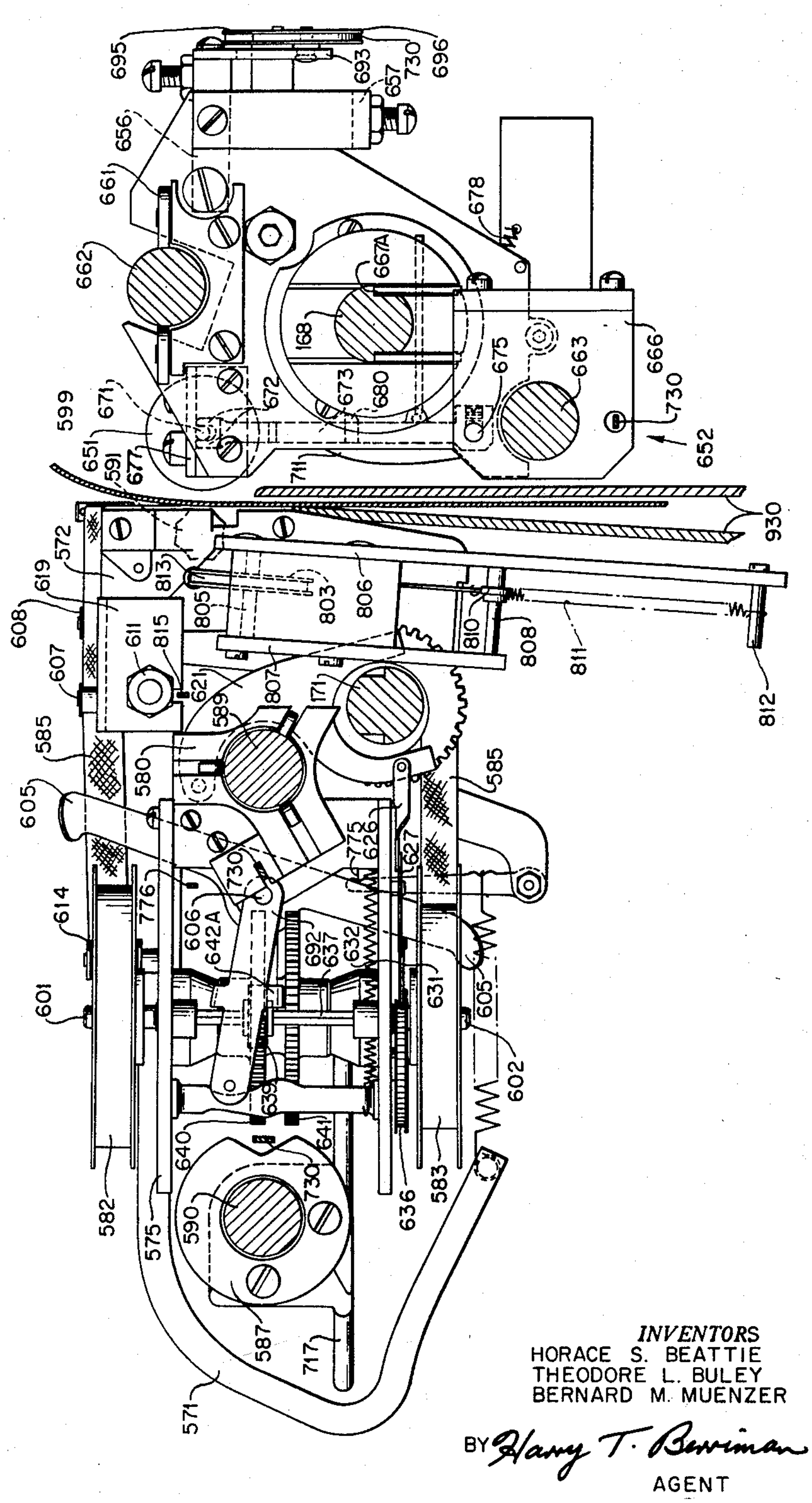

Fig. 40 is partial vertical section taken on the plane of the line 40—40 of Fig. 7.

Figure 5:
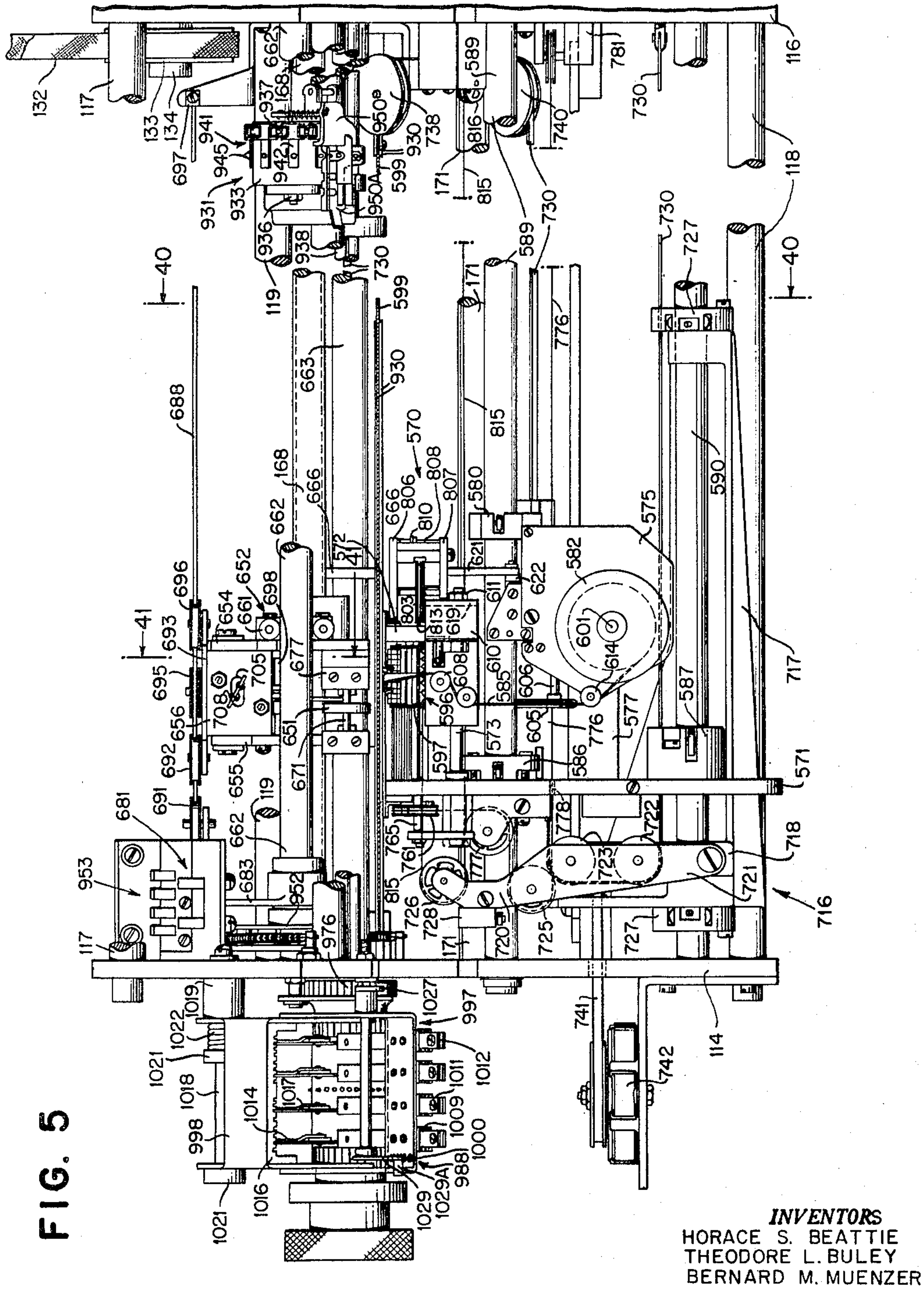
Fig. 5 is a detail plan view of the print mechanism.
Figures 41, 43, 44A, 44B:
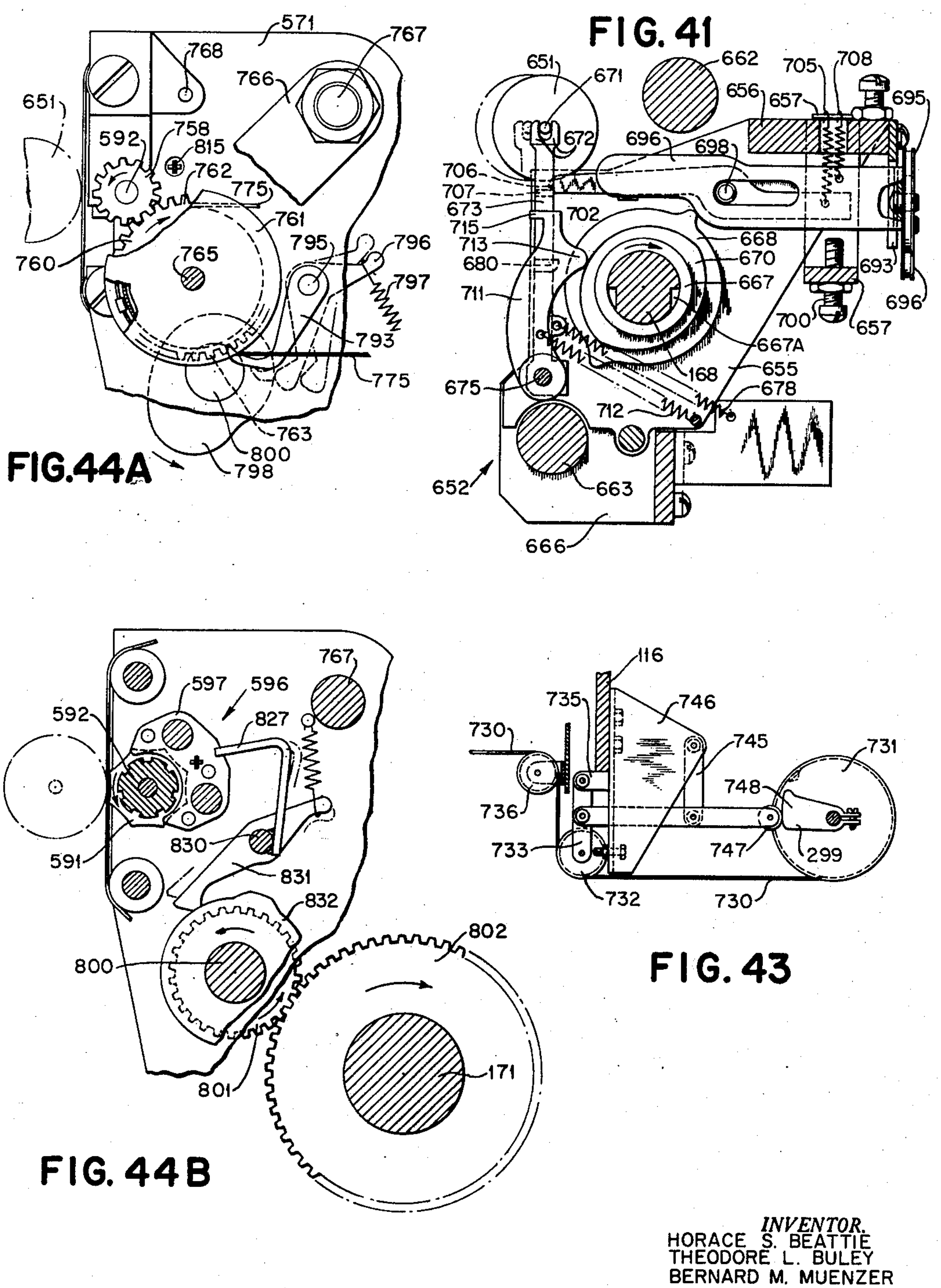

Fig. 41 is a vertical section taken on the plane of of the line 41—41 of Fig. 5 through the hammer carriage.

Figure 42:
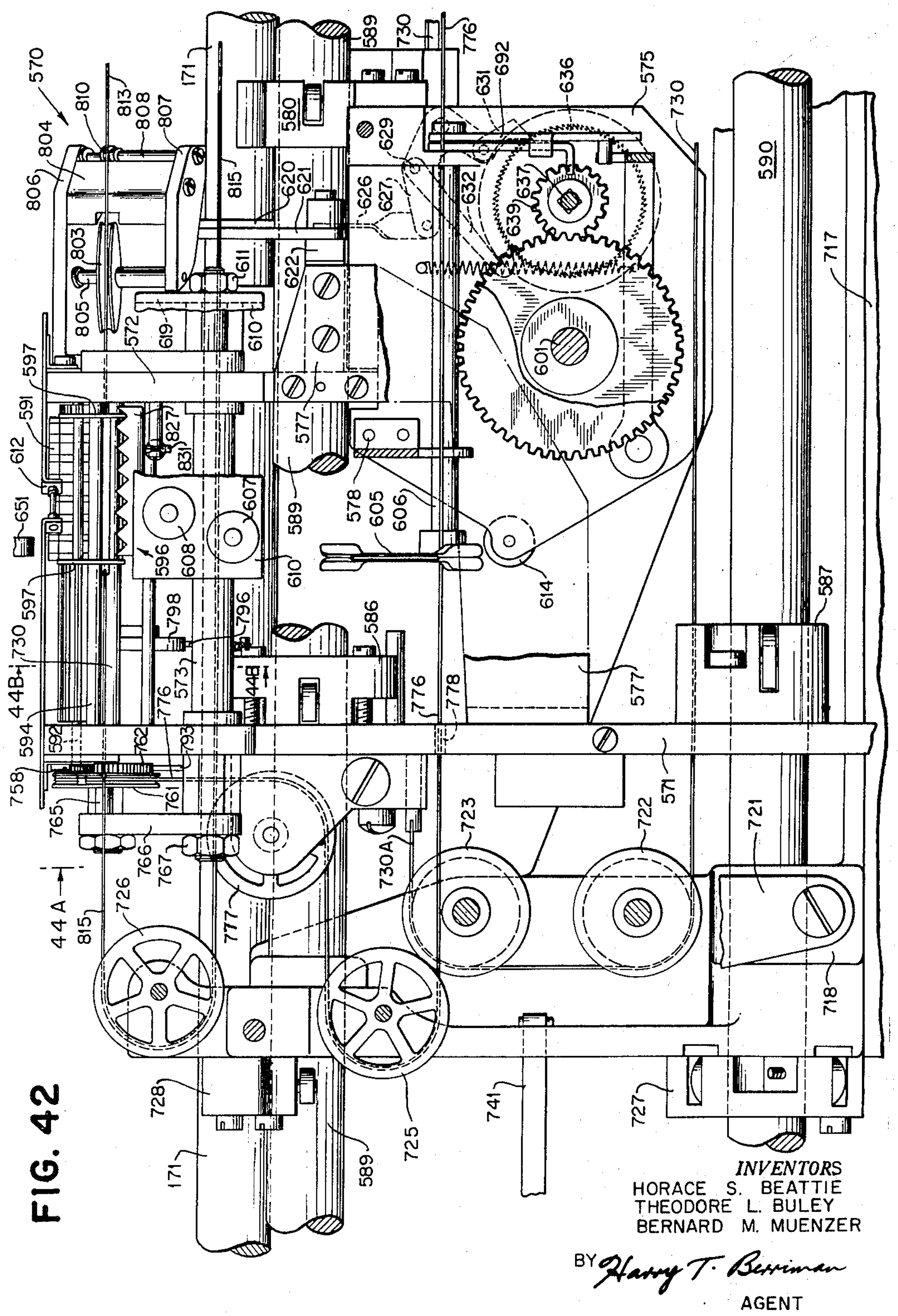

Fig. 42 is a partial enlarged plan view of the print apparatus.

Fig. 43 is a vertical section taken on the plane of of the line 43—43 of Fig. 1 and shows the detail construction of the carriage advance mechanism.

Fig. 44A is a vertical section taken on the plane of of the line 44A—44A of Fig. 42.

Fig. 44B is a vertical section taken on the plane of the line 44B—44B of Fig. 42.

Figure 45:
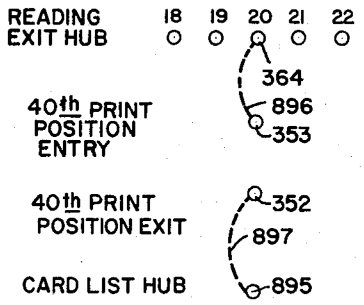

Fig. 45 shows the control panel wiring required to effect a representative so-called card list operation.

Figure 46:
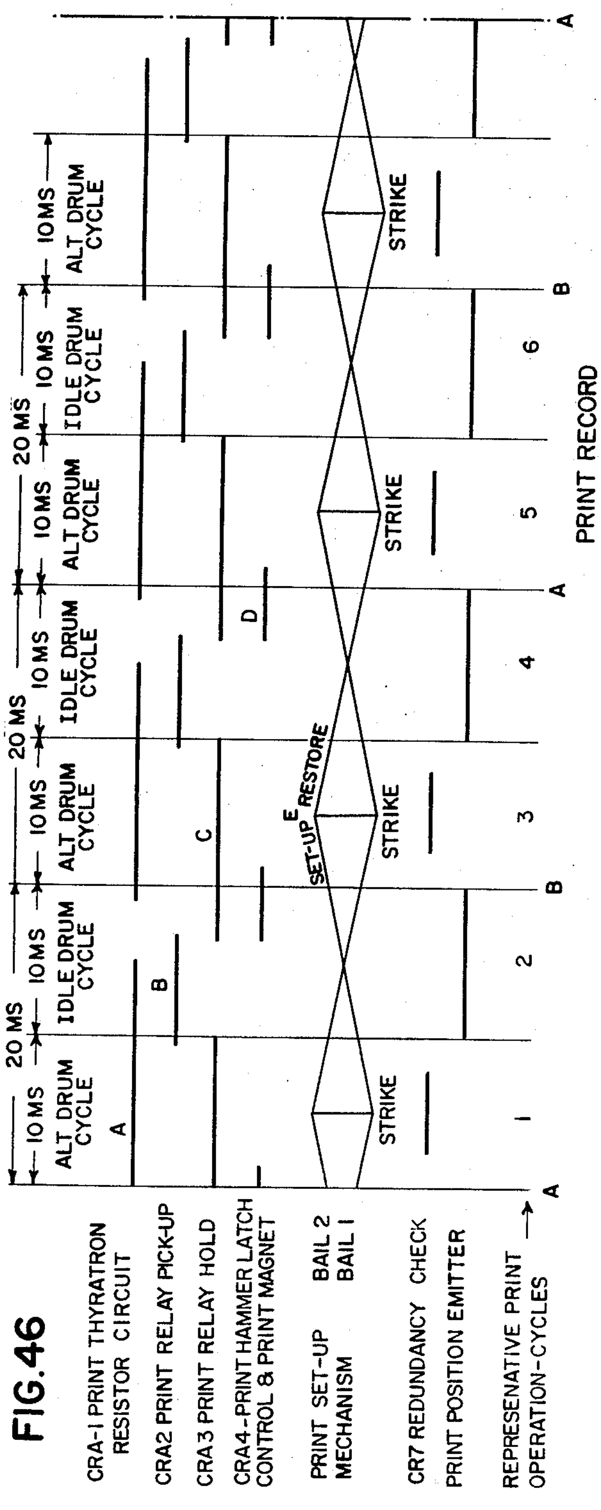

Fig. 46 is a timing diagram of the various interrelated machine functions in effecting a representative print operation.

Figures 47, 48:
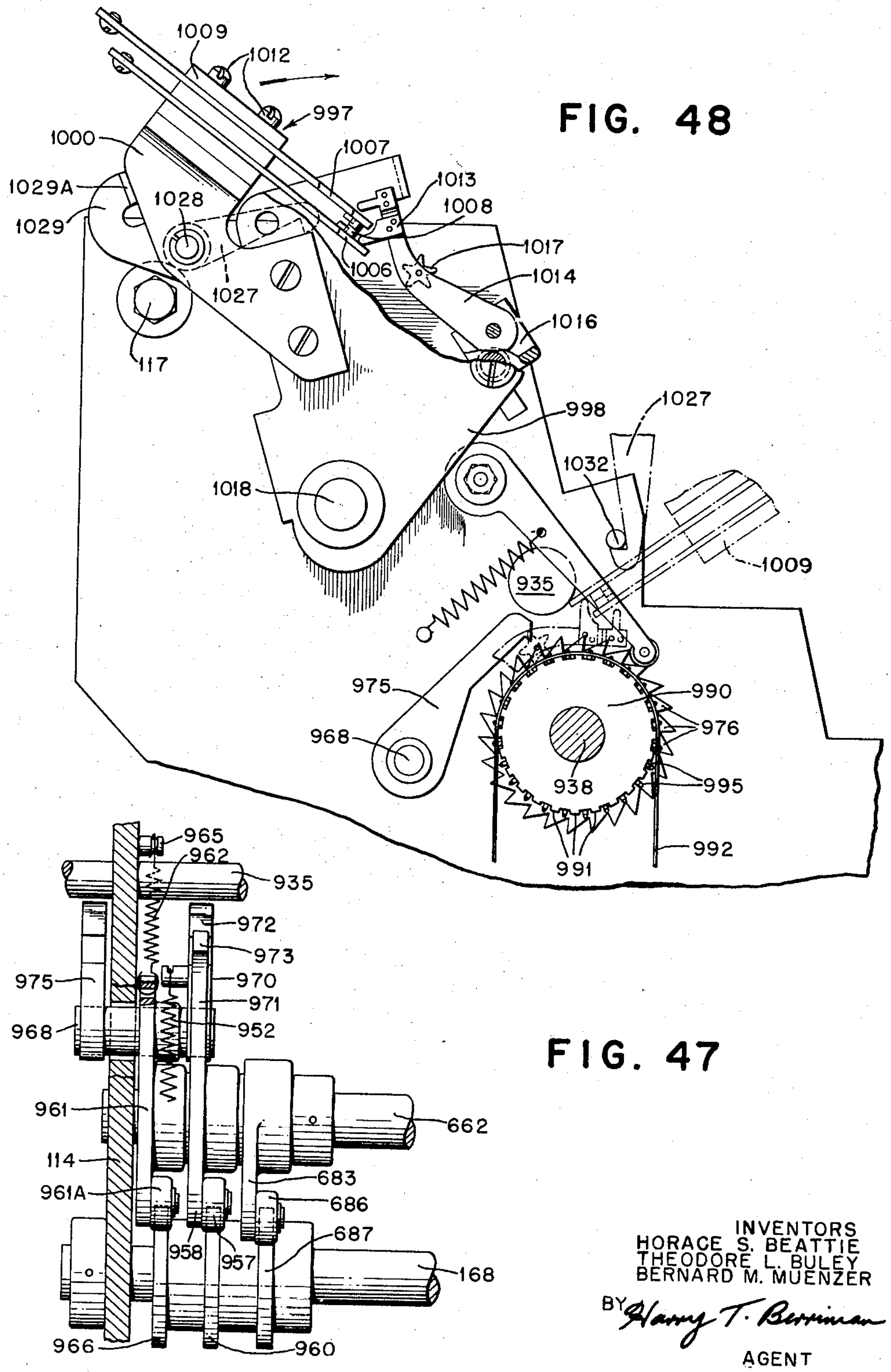

Fig. 47 is a vertical section taken on the plane of the line 47—47 of Fig. 7.

Fig. 48 is an elevational view of the print apparatus and shows the detail structure of the forms skip control device in an inoperative position clear of the control paper tape.

Figure 49A:
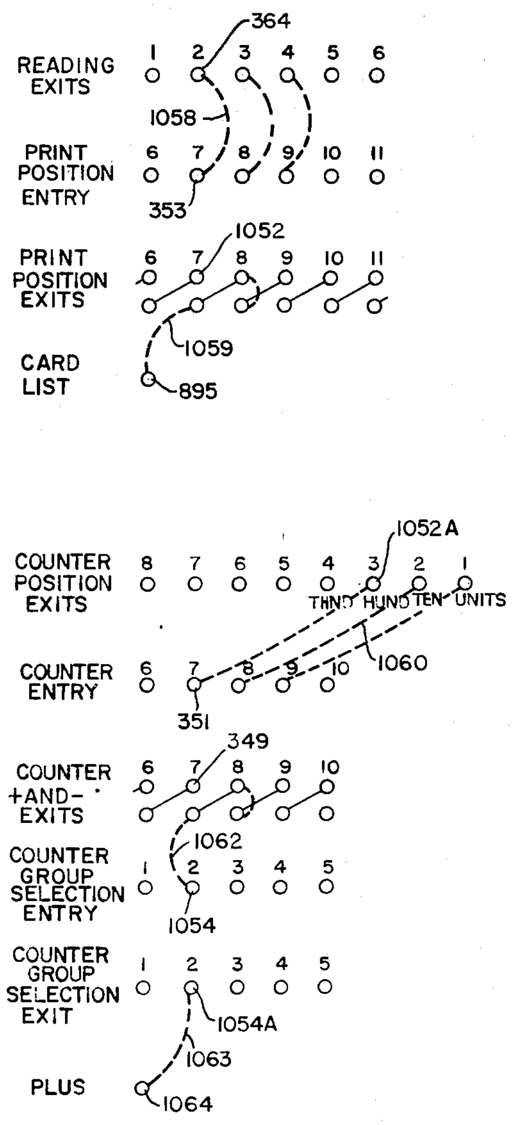

Fig. 49A shows the plugboard wiring required for effecting a representative add operation.

Figures 49B, 49C, 49D:
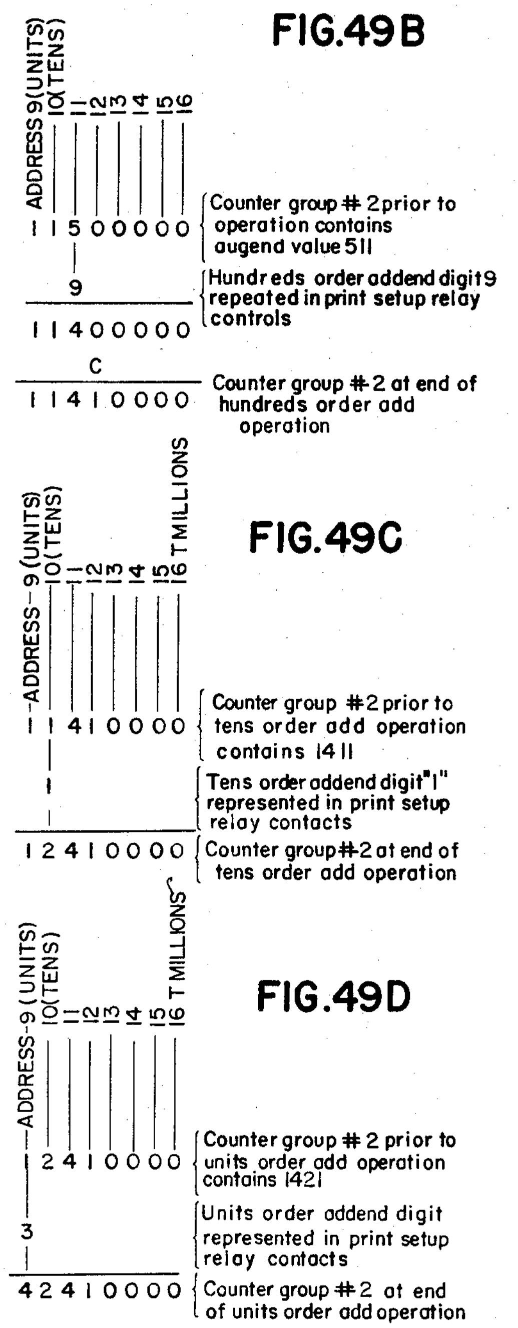

Figs. 49B through D are diagrammatic representations of the successive steps in effecting the representative add operation.

Figure 50:
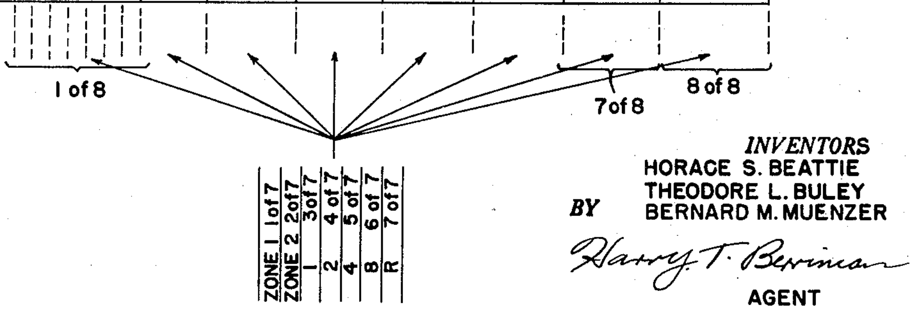

Fig. 50 is a diagrammatic representation of the manner in which the 80 address positions of the counter track are divided up into 10 counter groups of 8 orders each.

Figure 51A:
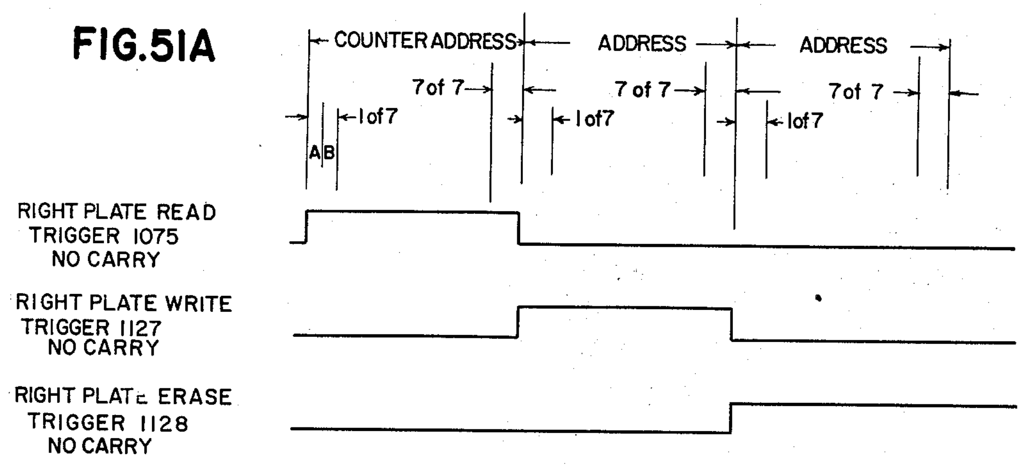

Fig. 51A is a diagrammatic representation of the manner in which the counter program unit operates during a single order add operation wherein no carry is generated.

Figure 51B:
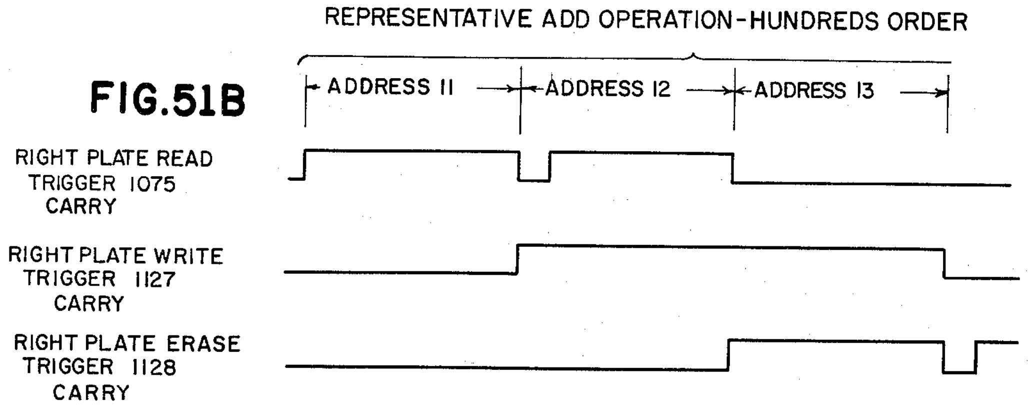
Figure 51C:
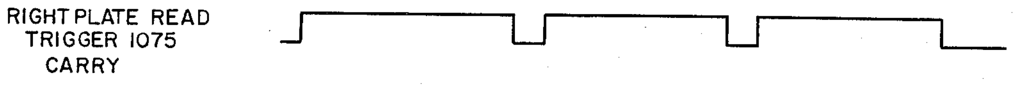

Fig. 51B is representative of the operation of the program unit when order carry is generated, while Fig. 51C is a representation of the operation of the program unit when several carry's are generated.

Figure 52:
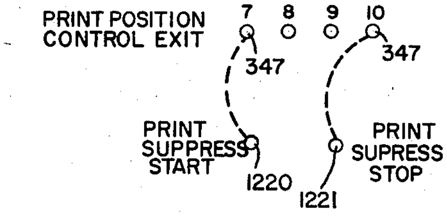

Fig. 52 shows the control panel plugwriting for suppressing printing in a particular predetermined field of the print record.

Fig. 53 shows the plugboard wiring required for effecting a representative subtract operation.

Figures 54A, 54B:
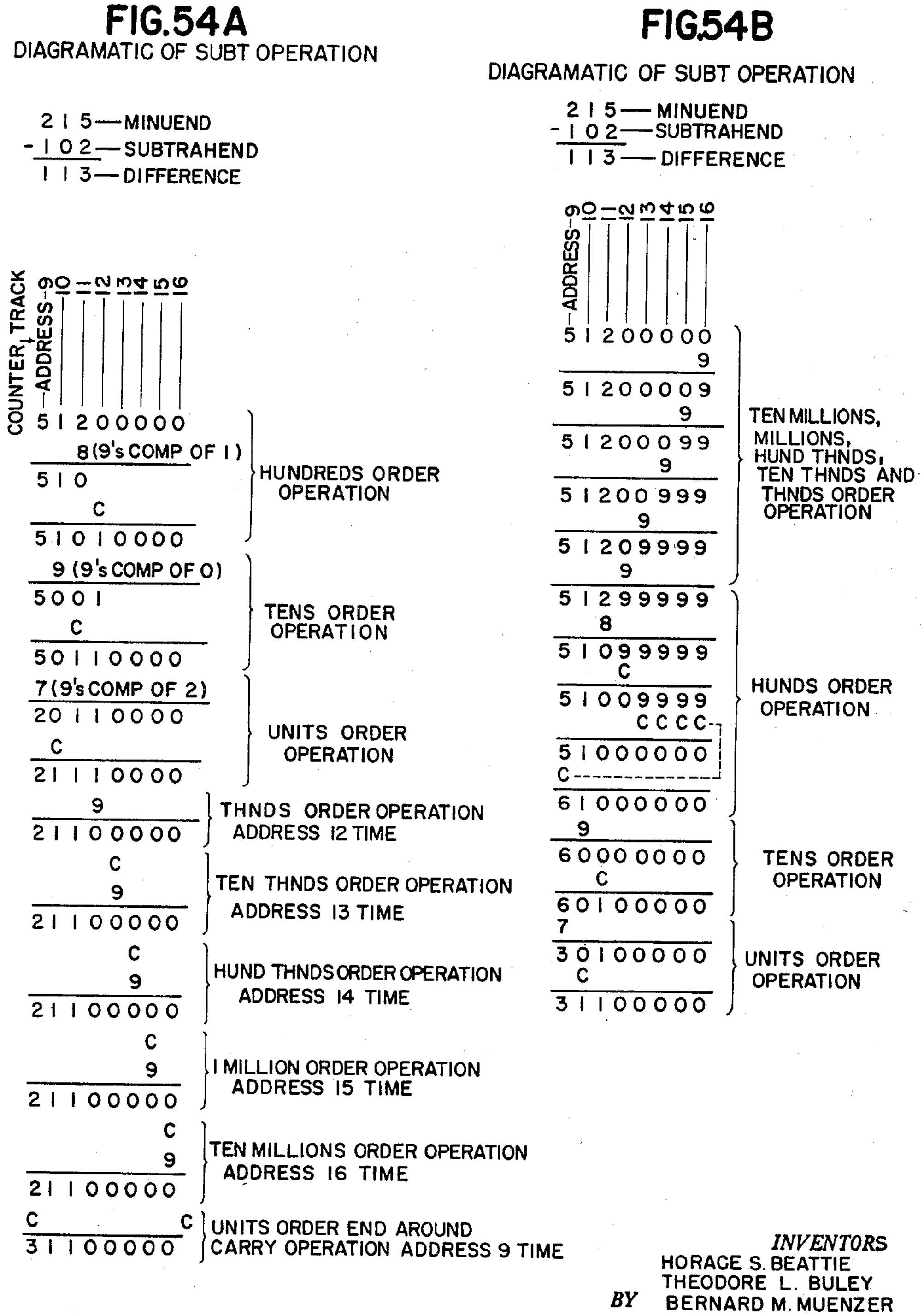

Fig. 54A is a diagrammatic representation of the counter operation during a representative subtract operation, where the entry of 9's into the orders above, the most significant digit of the actual operands, is effected subsequent to the operations in the significant digit orders.

Fig. 54B is a diagrammatic representation of the counter operation during a representative subtract operation, where the entry of 9's into the orders above the most significant digit of the operands, is effected prior to the operations in the significant digit orders.

Fig. 55 is a diagrammatic representation of the counter operation during a representative subtract operation wherein the difference value generated is negative.

Figure 56:
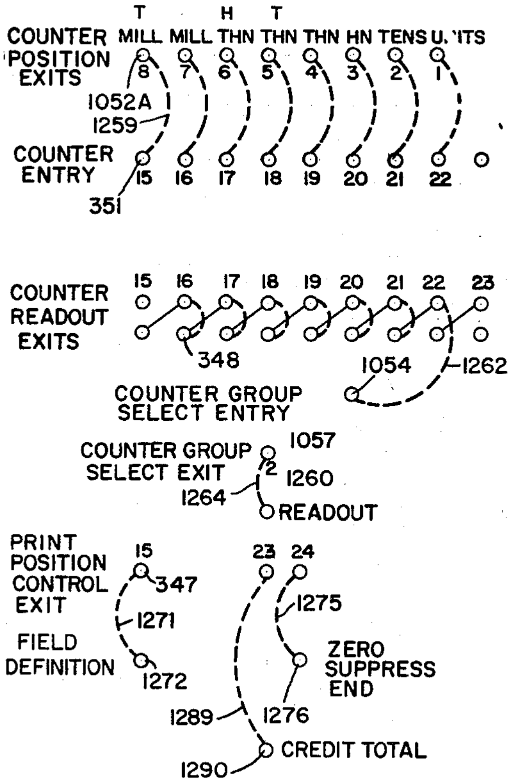

Fig. 56 shows the plugboard wiring required for effecting a representative counter readout operation.

Figure 57:
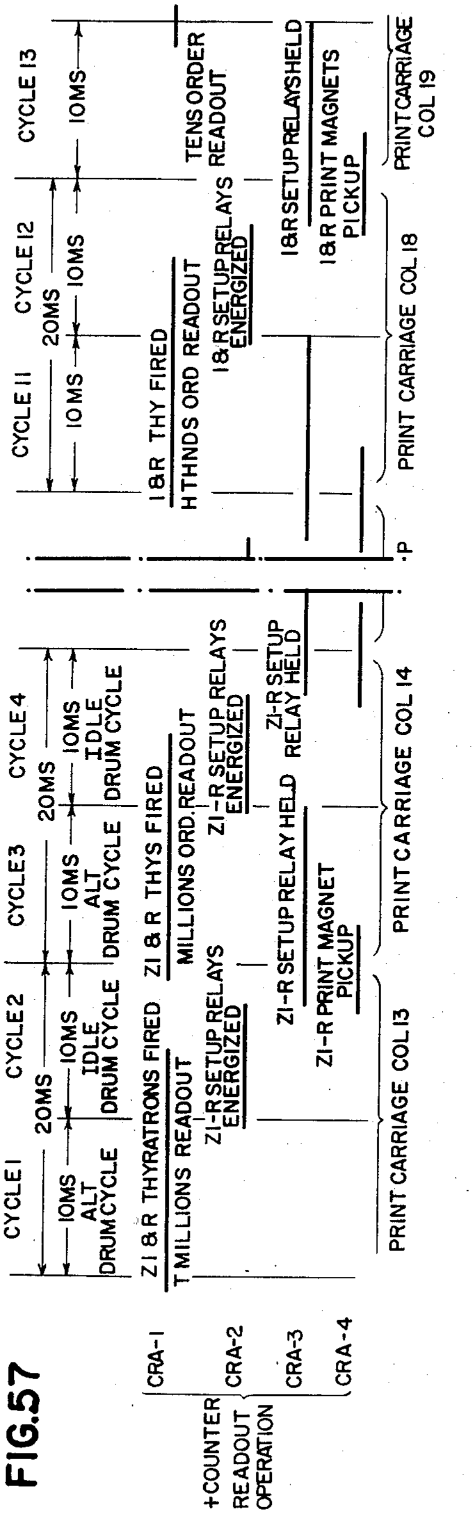

Fig. 57 is a timing chart of the machine action for a representative counter total readout operation.

Figure 58:
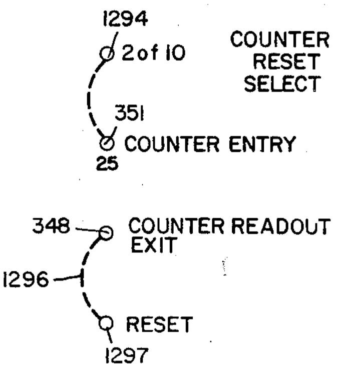

Fig. 58 shows the control panel plugwiring for effecting a representative counter reset operation.

Figure 59:
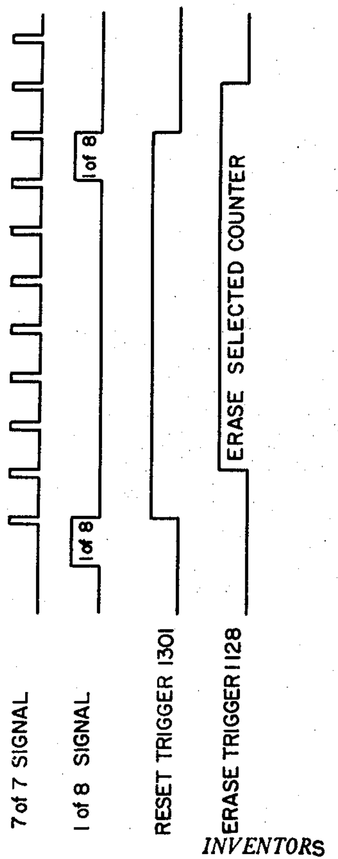

Fig. 59 is a timing diagram of the counter reset action.

Figure 60:
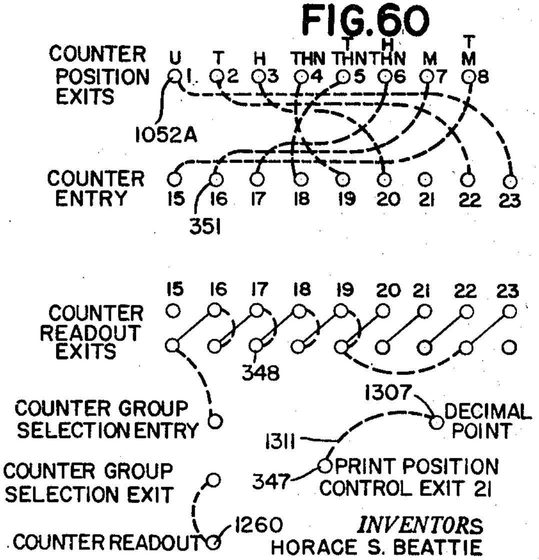

Fig. 60 shows the plugboard wiring for effecting a representative counter readout operation including a special character print operation.

Figure 61:
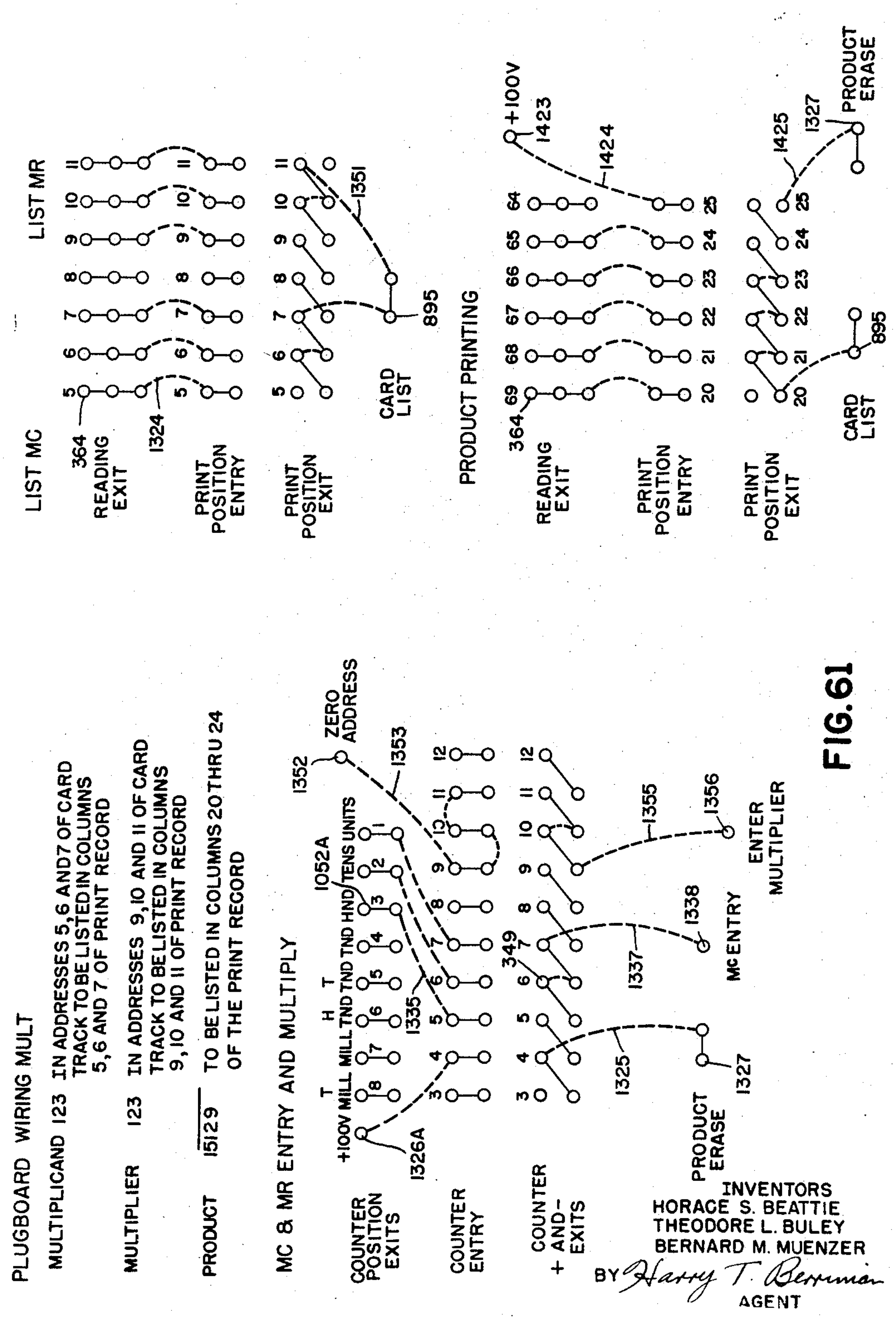

Fig. 61 shows the control panel plugwiring for effecting a representative multiply operation.

Figure 62:
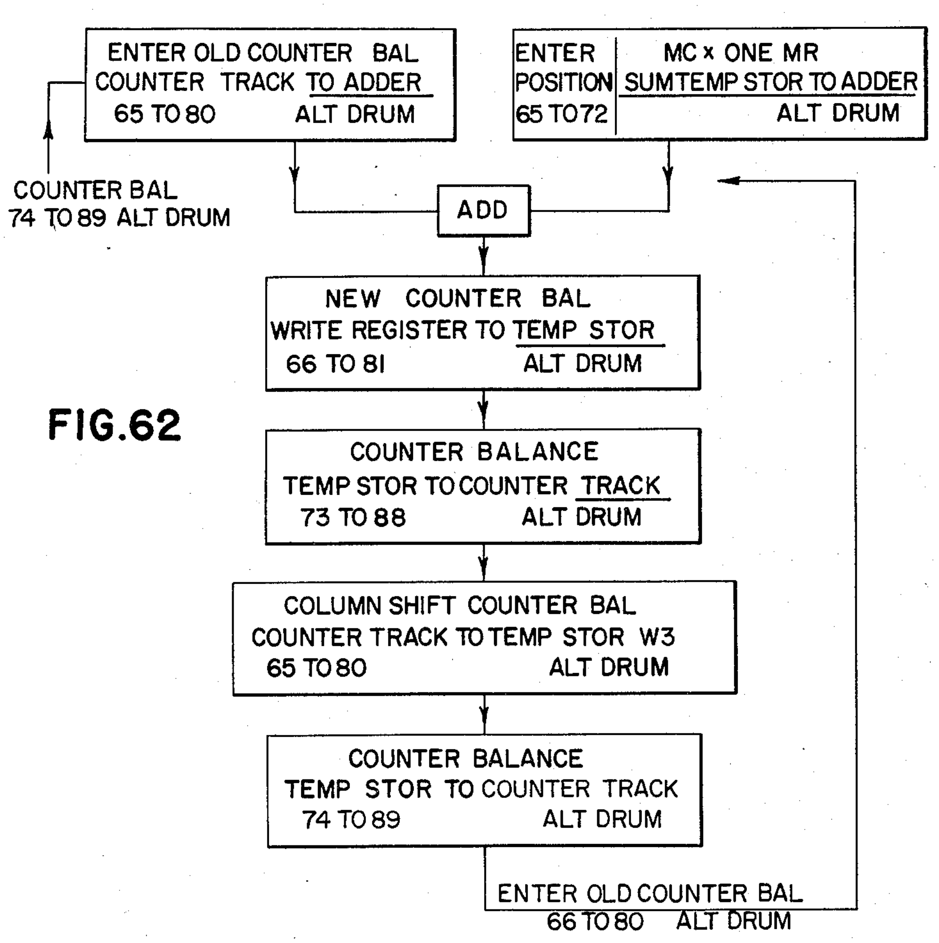

Fig. 62 is a timing diagram and flow chart of the machine operation in effecting the multiplication of a multiplicand times a single order multiplier and totaling with old counter balance.

Figure 63:
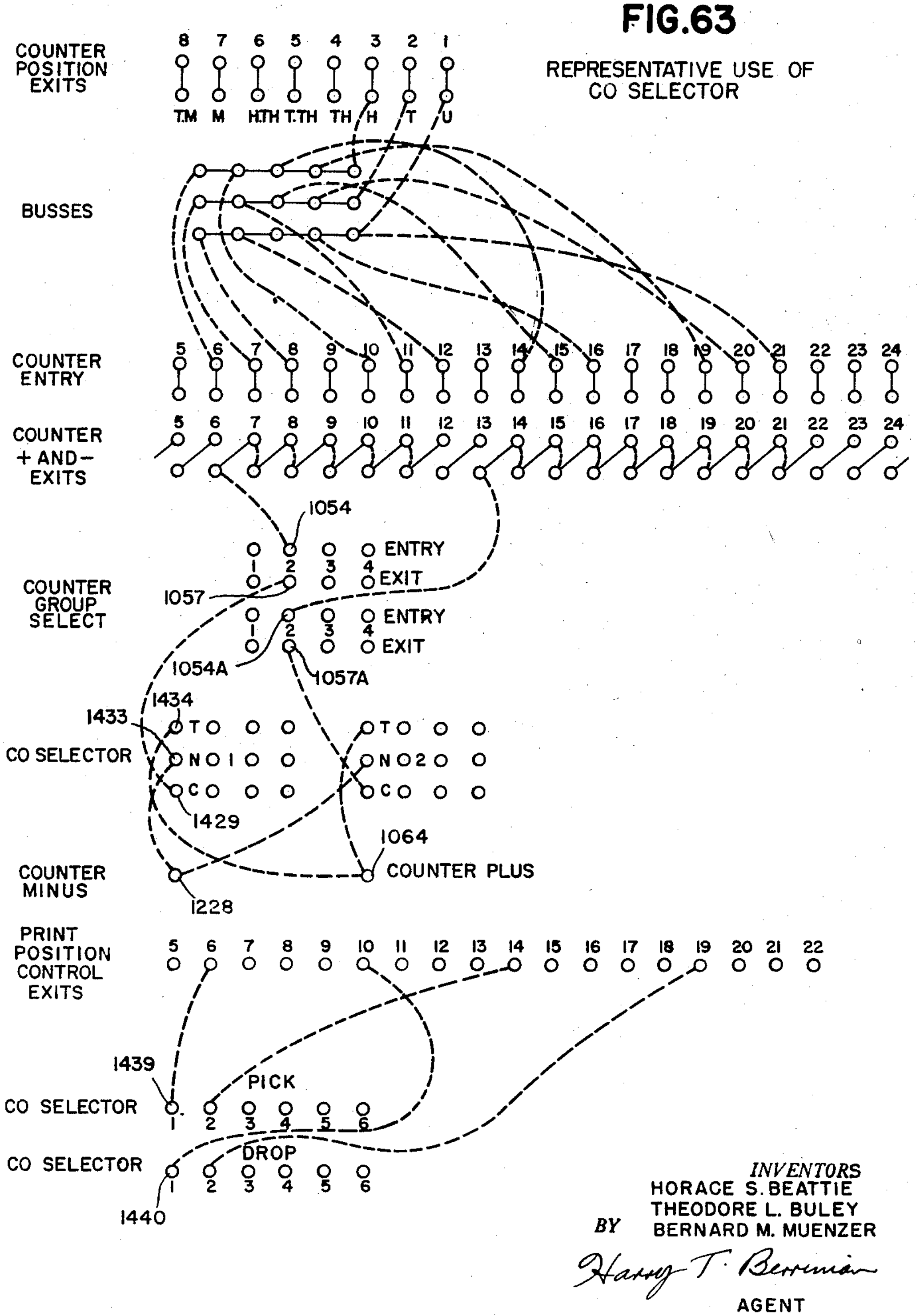

Fig. 63 shows the plugboard wiring for effecting an operation wherein a pair of CO Selectors are utilized in a representative manner.

Fig. 64 shows the plugboard wiring for a representative use of a class selector.

Figure 65:
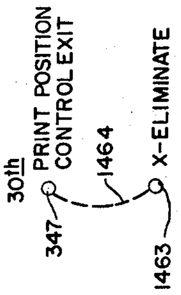

Fig. 65 shows the plugboard wiring for effecting an X-eliminate operation for the 30th print position.

Figure 66:
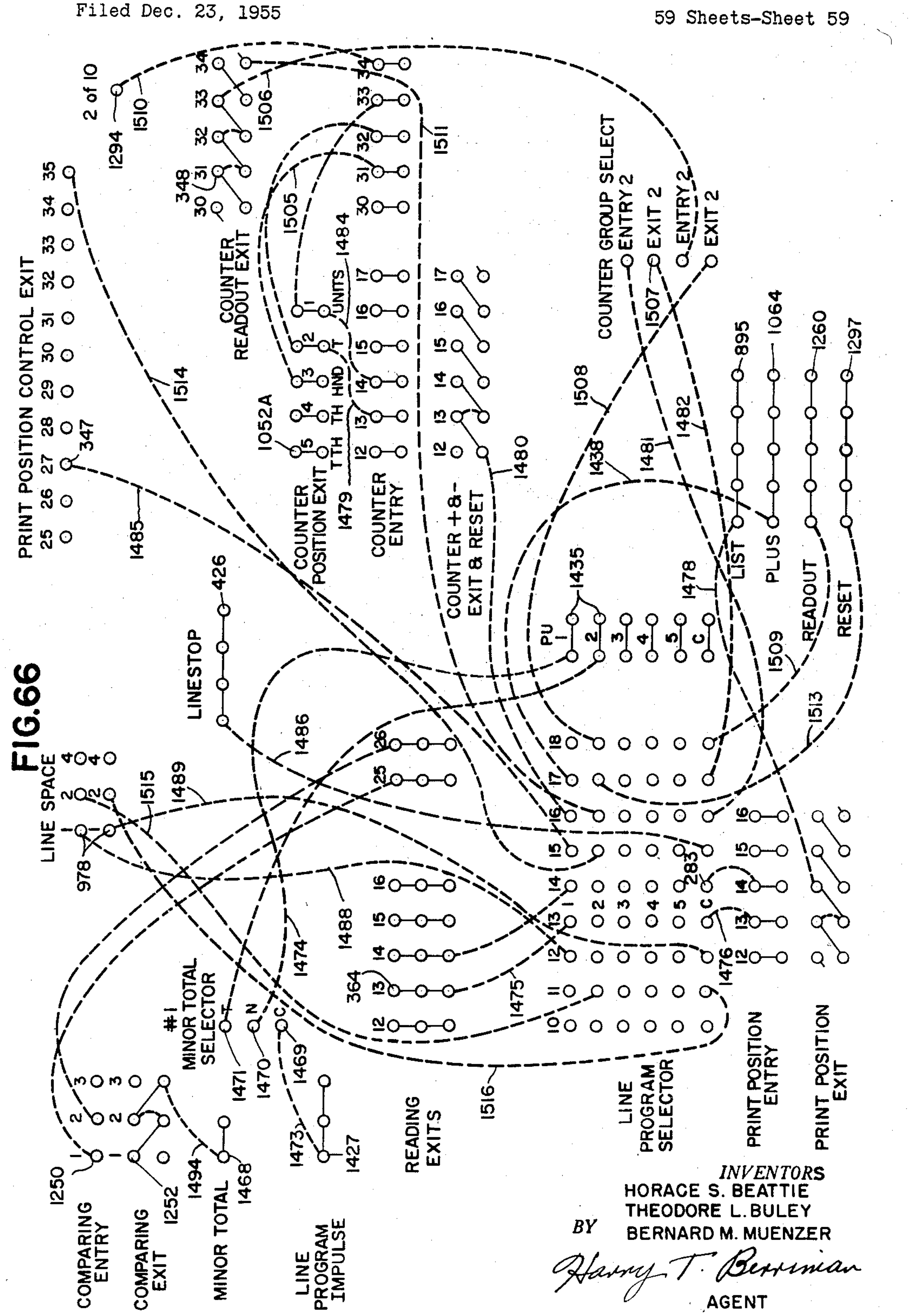

Fig. 66 shows the plugboard wiring for effecting a representative group total operation.

Figure 67:
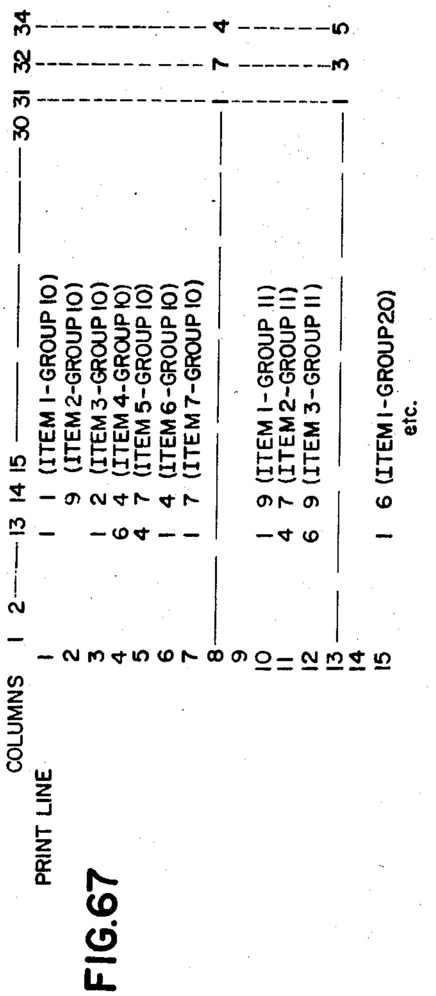

Fig. 67 shows the form of the print record obtained for the operation as effected by the plugboard wiring indicated in Fig. 66.

Fig. 68A shows the plugboard wiring required for effecting a representative group total operation, wherein each class of total (Major, Intermediate, and Minor) prints on a separate print line.

Fig. 68B illustrates the form of the print record obtained in accordance with the control panel wiring as in Fig. 68A.

Fig. 69 shows the plugboard wiring for effecting a representative multi-line-read operation.

Figure 2:
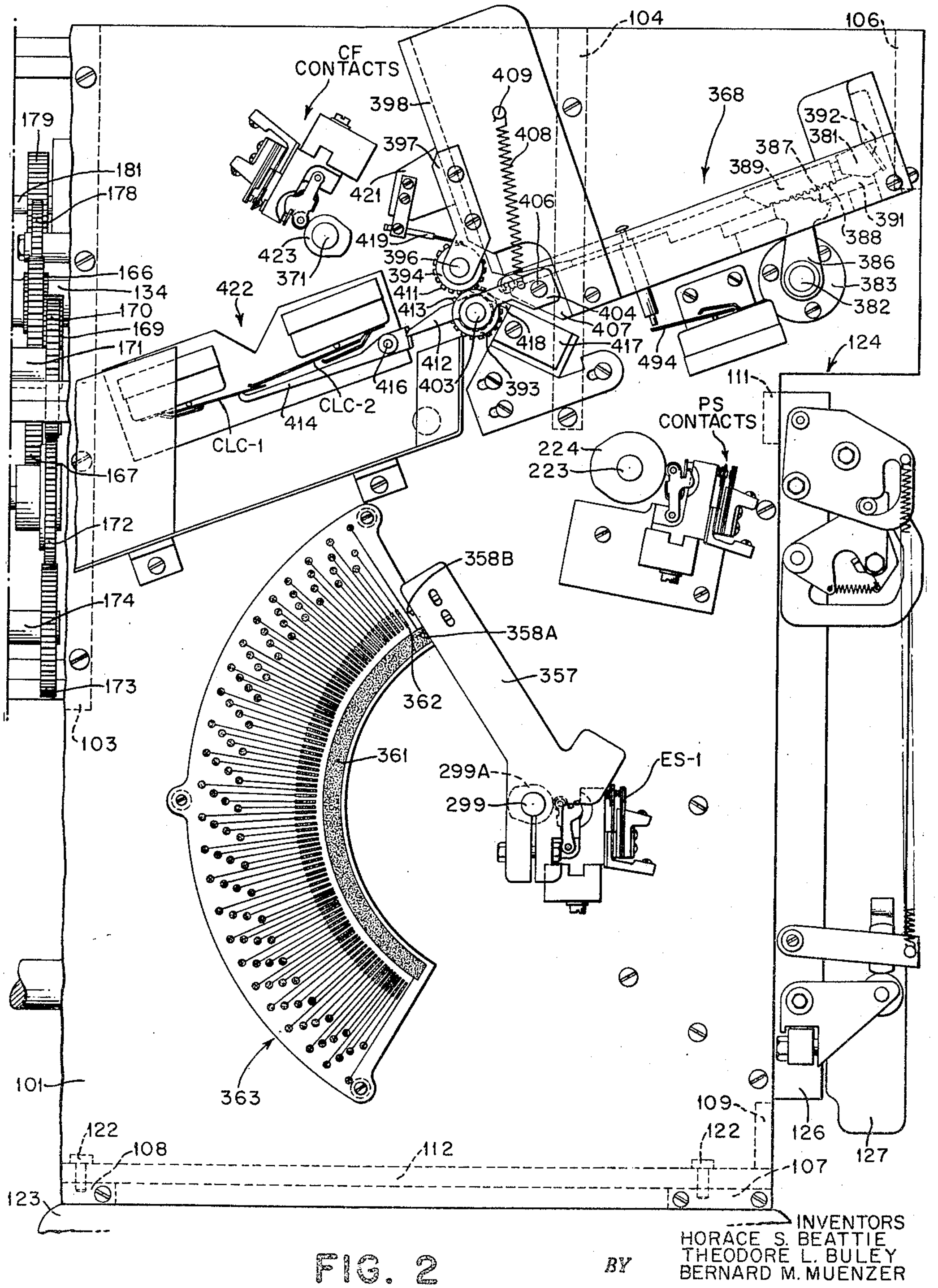
Fig. 2 is a partial front elevation view of the mechanical structure of the improved accounting with one of the frame members being partially broken away to facilitate illustration.

Referring now to Figs. 1 and 2, the supporting structure of the accounting machine comprises a vertical front plate 101 and back plate 102 tied together by cross plates 103, 104 and 106 and cross bars 107, 108, 109, and 111. A plate 112 (Fig. 2) is secured to the cross bars 107 and 108 and supports a drive motor 113 for the machine.

Figure 3:
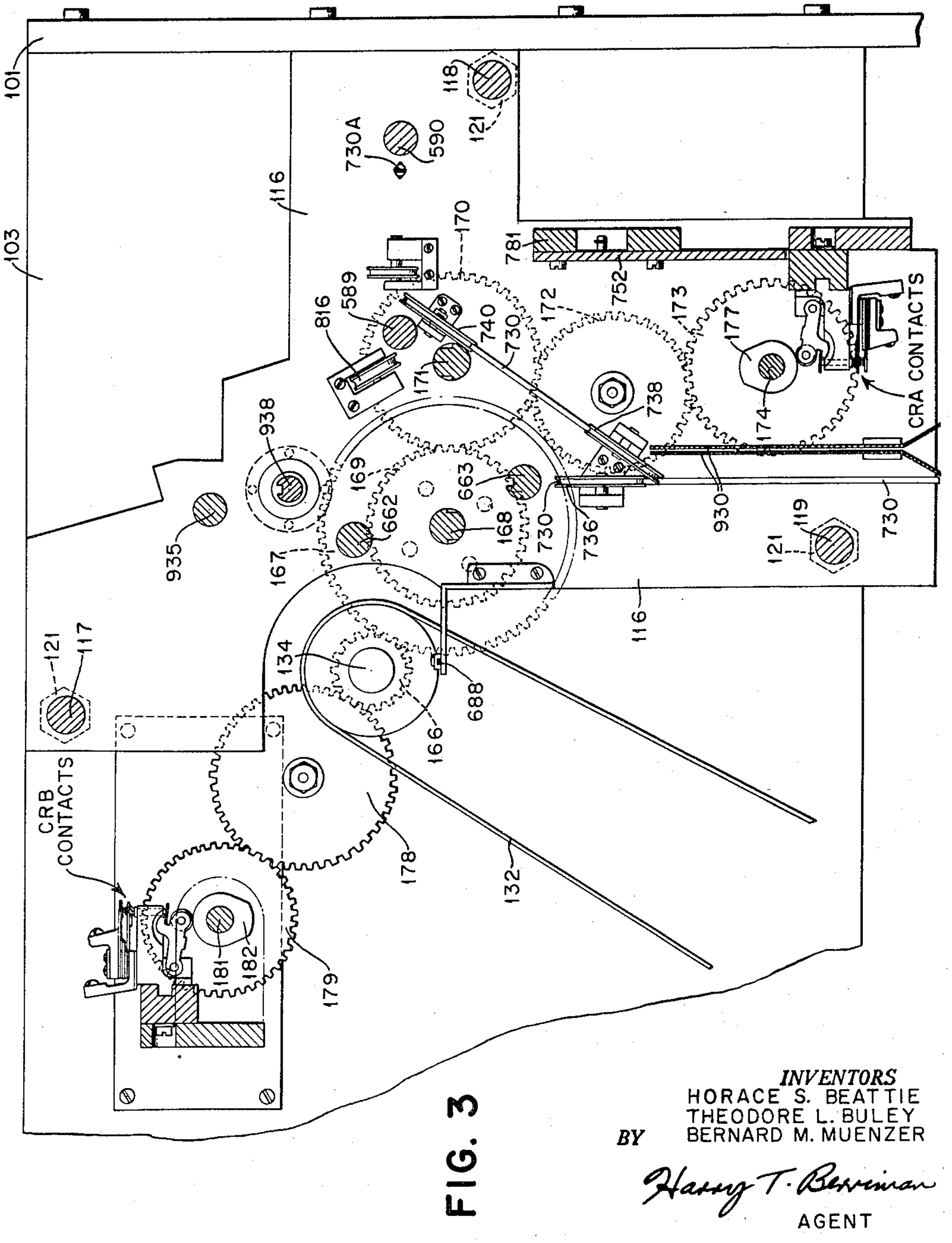
Fig. 3 is a vertical section view taken on the plane of the line 3—3 of Fig. 1.

The supporting structure of the print device of the machine comprises a left end plate 114 and right end plate 116 tied together by cross rods 117, 118, and 119 (Figs. 1 and 3) and cross member 120. The right end plate 116 is rigidly secured to and spaced from the cross plate 103 by spacers 121. The space between the plates 103 and 116 forms a housing in which are arranged some of the various driving gear trains of the machine.

Bolts 122 through the cross bars 107 and 108 secure the above described structure to the top of a base housing 123 in which are arranged the various electronic and relay circuits of the machine. Secured to the cross bars 109 and 111 is a conventional plugboard assembly 124 having a fixed contactor panel 126 and a removable plugboard control panel 127. Various electrical cables from the relay and electric circuits in the housing 123, extend through suitable openings in the top thereof and are permanently wired to the usual wiper type contact member of the fixed panel 126. The usual mating contact wiper is provided on the movable panel 127 for each of the contact wipers of the fixed panel, and with the panel 127 in place, the mating wipers of the two panels are engaged. Each of the wiper contacts on the removable panel 127 (see Figs. 12A and 12B) is electrically connected to an associated plug hub thereon. With the panel 127 in place, the various electrical control circuits etc. of the machine are accordingly interconnected as determined by the usual plug wire plugged between the various plug hubs.

*Mechanical drive*

Referring now to Fig. 1, there is shown the mechanical driving chain for the various mechanisms of the machine. The chain comprises the motor 113 which through an associated pulley 131, belt 132, and a pulley 133 secured to a so-called main drive shaft 134, continuously rotates the shaft 134 which is supported by suitable bearing inserts in the cross plates 103 and 104. A magnetic storage drum 136 is secured to the shaft 134 and has a plated circumferential storage surface sufficient to accommodate six spaced storage tracks, these tracks being referred to as Card Track #1, Card Track #2, the Counter Track, the Temporary Storage Track, the Multiplicand Track, and the Partial Product Accumulator Track.

Secured to the cross plate 103 and arcuately arranged around the storage drum 136 for cooperation therewith are 12 magnetic heads 140 through 151 (see also Figs. 13C, D, G and I) and each contains a read, write, or erase coil. Depending upon the particular coil energized, the related head reads information in the form of magnetized spots from the related storage track, writes information in the form of magnetized spots onto the related storage track, or erases the magnetic information in the related storage track, respectively. The heads 143, 144, and 145 are properly aligned so as to cooperate with the counter track 153; the heads 146, 147, 148, and 149 with the temporary storage track 154; the head 140 with the #1 card track 155, the head 141 with the #2 card track 156, the head 142 with the multiplicand track 157, and the heads 150 and 151 with the partial product accumulator track 158. In the heads 145, 146, 147 and 149, only the write coils therein are actually used, and these heads are accordingly referred to as the write heads. Similarly, in the heads 143, 148 and 151, only the read coils thereof are utilized and these heads are accordingly referred to as read heads. In both the card track heads 155 and 156, all three coils, read, write, and erase, are actually used at one time or another. Also secured to the plate 103 for cooperation with the temporary storage track 154, is a permanent magnet erase device 161. A similar permanent magnet erase device 162 is provided for the partial product track 158.

The storage drum 136 includes a so-called clock track 163 which is comprised of a series of teeth cut in the drum. The teeth are magnetized and as each rotates under an associated read head 164 carried on the plate 103, a "clock pulse" is induced therein. The clock pulses are utilized for initiating and timing various machine functions as will be later evident. The speed of the motor 113 and the belt-pulley driving arrangement to the shaft 134, is such that the shaft 134 is continuously rotated at a speed of approximately 6000 r.p.m. This gives a drum speed of one revolution per ten milliseconds.

The main drive shaft 134 through a gear 166, drives a gear 167 secured to rotatably mounted shaft 168. The shaft 168 through another gear 169 (see Fig. 3) secured thereto, drives a gear 170 secured to a shaft 171 the gear 170 through a meshing idler 172 driving a gear 173 secured to a rotatably supported shaft 174. The gear train traced above is such that the shaft 174 is continuously rotated at a speed of approximately 3000 r.p.m. The shaft 174 is rotatably supported by suitable bearing inserts carried by the plate 103 and a support 176 (Fig. 6) which is rigidly secured to and spaced from the plate 103. The shaft 174 is also referred to as continuously rotating shaft A (CRA). Secured to the shaft 174 are a number of cams 177 (Fig. 3) for actuating associated contacts CRA1 through CRA7 at particular times relative to the rotation of the drum 136, as indicated in Figs. 15A and B. The purpose of the contacts CRA1–7 will be later explained.

In similar manner, the shaft 134 acts through the associated gear 166, an idler 178 (Fig. 3) and a gear 179 secured to a shaft 181, to continuously rotate the latter at a speed of 1500 r.p.m. The shaft 181 is also referred to CRB (continuously rotating shaft B). Secured to the shaft 181 are a number of cams 182 for actuating associated contacts CRB–1 through 5 at particular intervals relative to the rotation of the drum 136, as indicated in Figs. 15A and B. The purpose of the cam actuated contacts CRB–1 through 5 will be later explained.

The main drive shaft 134 also acts through a worm gear 182 secured thereto and a meshing gear 183 secured to a shaft 184 to continuously rotate the latter, the shaft being supported by suitable bearing inserts in the front plate 101 and back plate 102. The shaft 184, in turn, through a gear 186 (Fig. 1) secured thereto, continuously rotates a gear 187 which is rotatably mounted on a so-called program shaft 188, the shaft 188 being rotatably supported by the front plate 101 and back plate 102.

Figure 4:
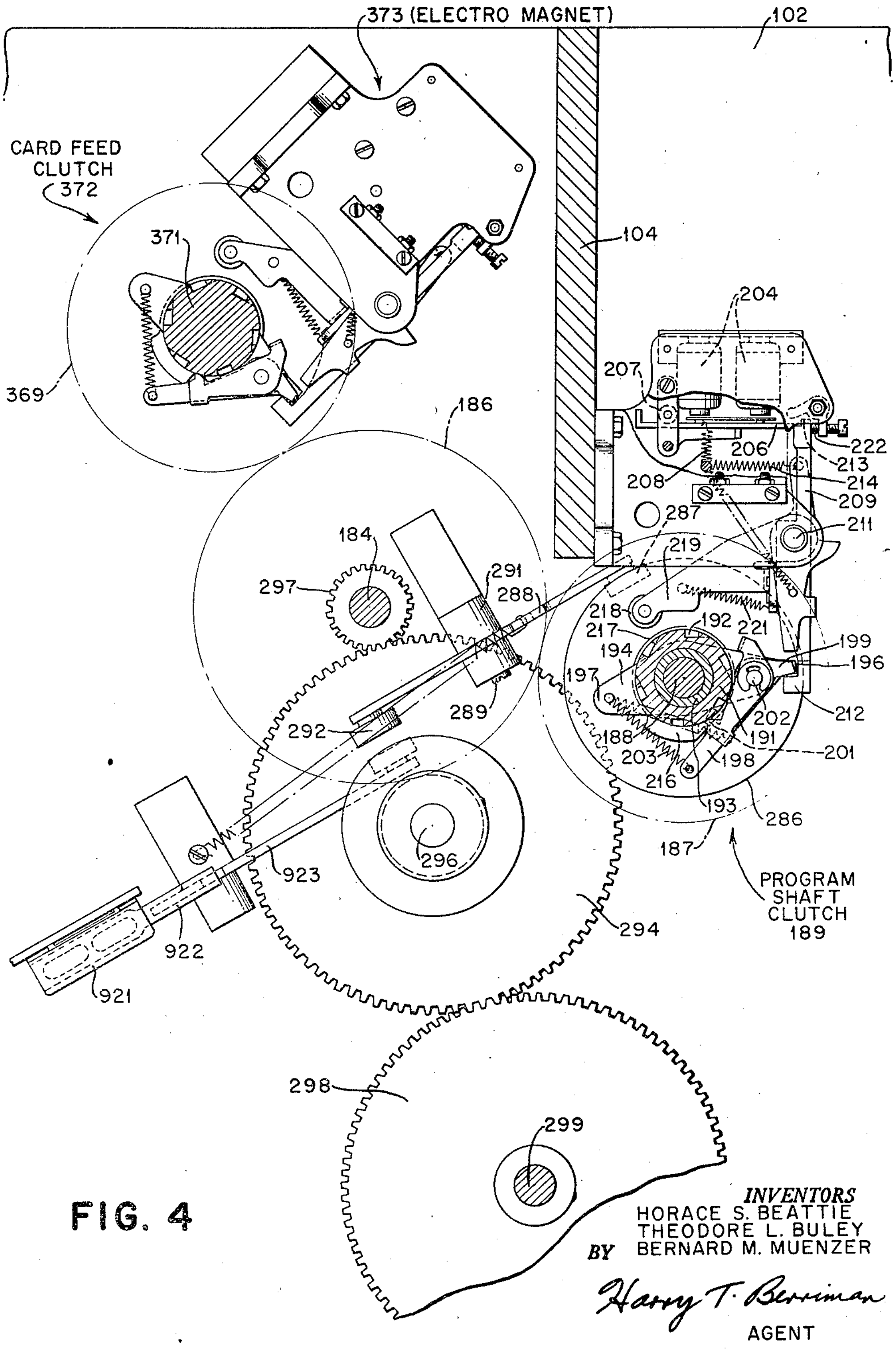
Fig. 4 is a vertical section view taken on the plane of the line 4—4 of Fig. 1, with various parts being indicated in phantom to facilitate illustration.

The gear 187 is a component part of a well-known pawl-ratchet type single revolution clutch 189, the latter also being referred to hereinafter as the program shaft clutch. The gear 187 includes an integral extending collar portion 191 having eight spaced notches 192 around the periphery thereof, as shown in Fig. 4, the hub 191 serving as the driving "ratchet portion" of the clutch.

Secured to the shaft 188 is a collar 193 which, in turn has a pawl arm 194 secured thereto, the arm 194 having a nose portion 196 and tail portion 197. A clutch pawl 198 having a nose portion 199 and a toothed portion 201 is pivotally mounted at 202 to the arm 194. The pawl 198 is continuously biased clockwise in Fig. 4 relative to the arm 194, by a spring 203 linking a lower end of the pawl 198 and the tail 197 of the arm 194.

The clutch 189 includes an actuating magnet 204 having an armature 206 pivoted at 207. With the magnet 204 unenergized, an armature return spring 208 urges the armature 206 free of the cores of the magnet 204 so that the end of the armature 206 abuts the upper end of a latch arm 209, the latter being pivoted at 211 to stationary structure. With the arm 209 in the position shown in Fig. 4, the nose of both the arm 194 and its associated pawl 198 engage a hooked lower end 212 of the arm 209, thus latching the toothed portion 201 of the pawl clear of the ratchet collar 191 of the continuously rotating gear 187. This is referred to as the latched position of the clutch.

To engage the clutch, the magnet 204 is impulsed which attracts the associated armature 206 so that the end thereof moves free of the upper end of the latch arm 209 and into alignment with a recess 213 thereof. The latch arm 209 is accordingly freed for limited rotation counter-clockwise rotation in Fig. 4 under the urging of an associated spring 214. As the latch arm rotates, the hooked lower end 212 thereof releases the clutch pawl arm 194 and clutch pawl 198. As a result, the clutch pawl 198 rotates clockwise around its pivot 202 under the urging of spring 203 until the toothed portion 201 rests against the ratchet collar 191 of the continuously rotating gear 187. As the next notch 192 in the ratchet rotates into alignment with the toothed portion 201, the latter drops therein and locks the pawl to the ratchet 191. Since the pawl 198 and associated pawl arm 194 are secured to the collar 193 which in turn is secured to the shaft 188, the program shaft 188 is accordingly rotated clockwise in Fig. 4 with the ratchet 191.

As the collar 193 rotates, a high dwell 216 in an associated cam 217 secured thereto engages a roller 218 on a so-called knockoff arm 219 to rock the arm clockwise in Fig. 4 on its mounting pivot 211. As the knockoff arm rocks, the tension of a spring 221 connected therefrom to the latch arm 209, is increased sufficiently to overcome the tension of the spring 214. As a result, the latch arm 209 restores clockwise and into engagement with a stop 222, the upper end of the arm 209 relatching on the end of the now restored armature 206, and its lower hooked end 212 again extending into the rotational path of the nose of the clutch pawl arm 194 and the clutch pawl 198.

It will be recalled that with the release of the clutch pawl 198 and clutch pawl arm 194 by the latch arm 209, the clutch pawl 198 rotated relative to the pawl arm 194 so as to engage the pawl with the ratchet 191. This rotation causes the nose of the pawl 198 to "lead" the nose of the pawl arm 194 during their subsequent rotation with the ratchet 191. As a result of this "lead" of the pawl 198, it engages with the restored latch arm after slightly less than one revolution of the shaft 188. With the pawl 198 latched, the further rotation of the shaft 188 displaces the pawl 198 counter-clockwise on its pivot 202 relative to the pawl arm 194 so as to lift the pawl tooth 201 from driving engagement with the ratchet 191. The clutch 189 is accordingly relatched in the position indicated in Fig. 4 after one complete revolution of the shaft 188 and rotation of the shaft 188 ceases. With the clutch latched, the gear 187 again rotates freely in the shaft 188. It is thus evident that for each impulsing of the program shaft control magnet 204, one revolution of the program shaft 188 is effected.

Referring now to Fig. 15A it will be noted that the timing relationship between the gear 187 and its integral ratchet collar 191, and the drum shaft 134 is such, that during the interval required to rotate the ratchet 191 through the distance from a point of one of the eight notches therein, to the same point of the succeeding notch (⅛ of a revolution of the ratchet 187), the drum 136 makes four complete revolutions. Consequently, upon an impulsing of the clutch control magnet 204, the maximum possible time lag until the clutch is engaged, is equivalent to four revolutions of the drum 136 or 40 milliseconds. It will be noted that the time of engagement of the clutch is coincident with the beginning of the related drum cycle. If the time of engagement of the clutch 189 is referred to as the beginning of drum cycle 1, as shown in Fig. 15A, the clutch 189 is not latched until the end of the 32nd complete drum cycle thereafter.

Figure 15B:
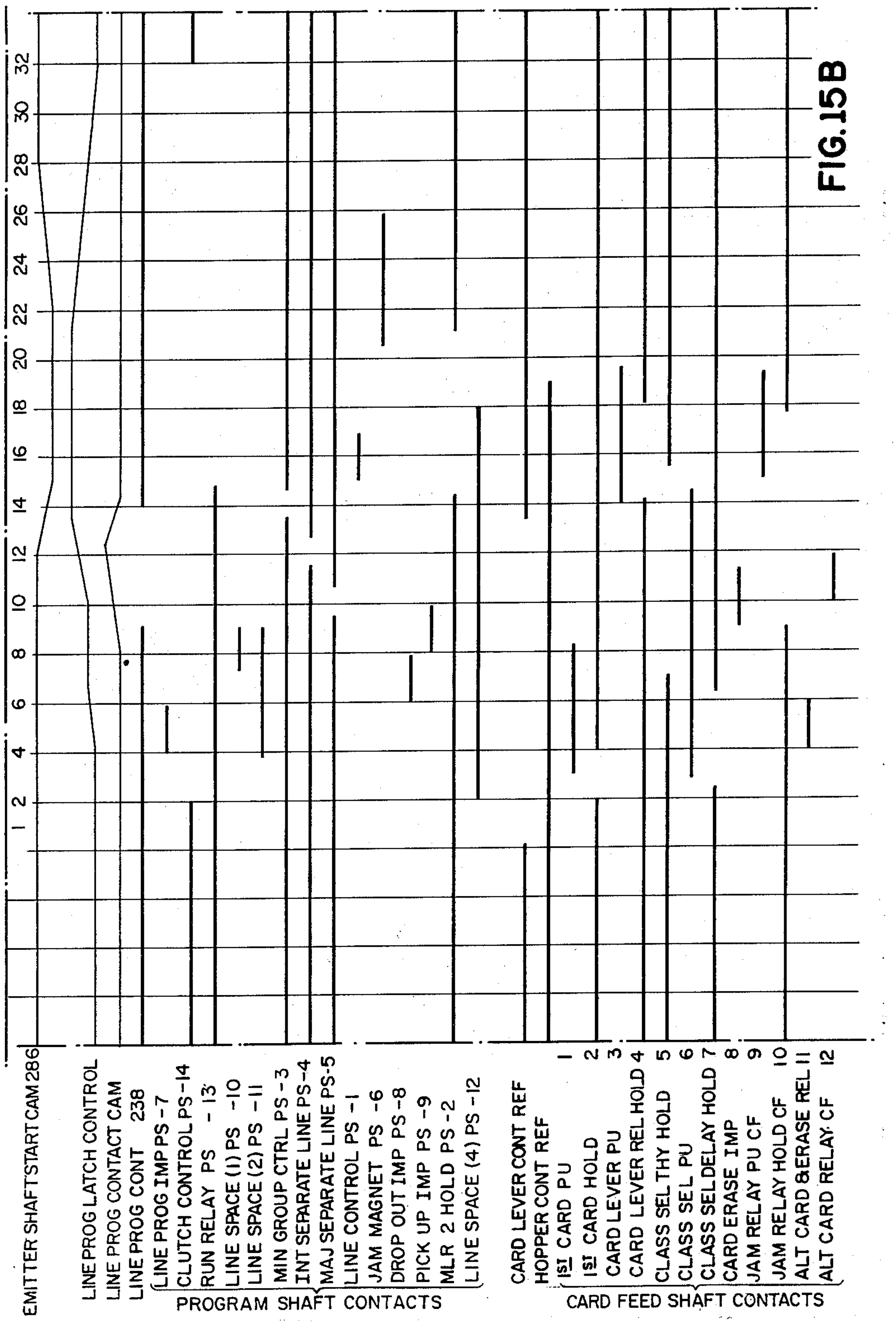

Secured to a portion 223 (see Fig. 1) of the shaft 188 which extends beyond the front plate 101 are a plurality of cams 224 for actuating contacts P.S. (program shaft) 1 through 14 at particular intervals of each revolution of the shaft, as indicated in Fig. 15B. The purpose of each of the contacts PS–1 through 14 will be explained later.

*The line program contacts*

Also secured to the line program shaft 188 for rotation therewith are two cams 226 and 227 which are utilized with a so-called line program switch assembly as hereinafter explained. Referring now to Fig. 18, the assembly comprises rigid, vertically extending frame members 229A and 229B which are secured to a plate 231 which, in turn, is secured to the inner side of the front plate 101 in a position behind the left end of the control panel assembly 124. Rigidly secured to each of the frames 229A and 229B, and equally spaced from each other in a vertically extending direction, are 15 so-called contact support members 232 which are formed of a non-conductive material. Secured to the underside of each member 232 and extending outwardly therefrom is a structure formed of a conductive material and having 5 equally spaced, horizontally extending contact fingers 233. An identical group of 5 contact fingers 233 is also secured to the upperside of each member 232.

Corresponding ones of the 5 contact fingers 233 of each group are aligned vertically with each other thus forming 5 banks or lines or banks of 30 contact fingers 233 each for the fingers associated with frame 229A and 5 banks of 30 contact fingers each for the fingers associated with frame 229B, or 10 banks of 30 contacts each in all. The contact fingers of each bank extend over a corresponding extending pin 234 carried by an associated vertically arranged contact operating bail 236. Each contact finger 233 extends beyond its related bail and finally into a position above the extending end of a related one of the contact elements 237 of the fixed panel 126. Each of the fingers 233 and its related contact element 237 accordingly form a single pole switch which is referred to hereinafter as a line program contact 238.

Each of the bails 236 (Fig. 18) is formed of a non-conductive material and is guided for lengthwise movement by the engagement of one end thereof with a suitable opening in a related guide member 239, the latter being secured to a bracket 241 which, in turn, is secured to the plate 231.

There is provided an individual actuating lever 242 for each bail 235, each lever being mounted on a pivot shaft 243 carried by the plate 231. The one end of each lever is pivotally connected at 244 to the free end of its related bail 236. The other end of each lever 242 is formed as a latch, as best shown in Fig. 18, and is guided in a mating slot of a fixed comb like guide member 240. The actual operation of each lever 242 is controlled by a related so-called line program magnet 247. The 5 control magnets 247 for the "upper" 5 banks of line program contacts are arranged horizontally in an "upper" assembly 248A (see Fig. 18) and secured to the plate 231, while the 5 control magnets 247 for the lower 5 banks of line program contacts are arranged horizontally in a similar lower assembly 248B and secured to the plate 231. The actual structure through which a magnet 247, if impulsed, effects a operation of the related bail 242 to close one associated bank of contacts, is identical, regardless of whether the magnet is an "upper" or "lower" group.

There is provided for each of the 5 "upper" magnets 247, an associated latch lever 251A pivotally supported at 252. A similar latch lever 251B is provided for each of the 5 lower magnets 247. Each lever 251A has four arms 256A, B, C and D, while each lever 251B has four arms 259A, B, C and D. An individual spring 253 is connected from a fixed stud 254 to the one arm 256A of each lever 251A. It will be noted that each arm 256A also includes a latch surface for cooperation with the armature 257 of the associated upper magnet 247. An individual spring 258 is also connected from the stud 254 to the one arm 259A of each lever 251B. Pivotally mounted at 252 adjacent each of the latch levers 251A and B is a related member 261 having two arms 262 and 263. The lower end of each arm 263 includes a latch surface for cooperation with the end of the associated lever 242. A spring 264 links the other arm 262 of each lever 261 associated with a lever 251A with the arm 256B thereof. Similarly, a spring 266 links the other arm 262 of each lever 261 associated with a lever 251B with the arm 259B thereof. It will be noted that each arm 259B also includes a latch surface for cooperation with the armature 257 of the associated lower magnet 247. Each machine cycle during drum cycle #3 and #4, any selected one or combination of the magnets 247 may be energized in a manner that will be later evident.

With a magnet 247 energized, the associated lever 251A or B, as the case may be, is released and pivots counterclockwise on 252 under the urging of related spring 253 or 258. As a lever 251A or B pivots counterclockwise, a laterally extending ear 267 of associated arm 256C (or 259C) engages a laterally extending portion 268 of the arm 263 of the associated lever 261. With the arm 256C (or 259C) engaging the lever 261, any further counterclockwise motion of lever 251A or B will rotate the lever 261 counterclockwise to release the associated lever 242. This release action is prevented at this particular time, however, by a limiting of the motion of lever 251A or B by the engagement of the arm 256D or 259D thereof with the edge 269 of a bail 271. The bail 271 is pivoted at 272 and is connected through a link 273 to a cam follower 274 pivoted at 275. A spring 277 connected between the one end of the follower 274 and a fixed stud tensions the follower so as to maintain a roller 278 carried on the other end thereof in continuous engagement with the previously mentioned cam 226 carried on shaft 188. The cam 226 contains an operational dwell as indicated in Fig. 15B.

As the roller 278 engages the operational dwell of cam 226 starting at the beginning of drum cycle #9, the bail 271 is accordingly rocked counterclockwise on its pivot 272 to permit further counterclockwise motion of the "released" lever 251A or B. The further motion of lever 251A or B effects a corresponding counterclockwise motion of the associated member 261. This latter action rotates the latch end of member 261, free of the associated lever 251A or B which is then free to rotate counterclockwise under the urging of tension applied through the fingers 233 against the pins 234 of the associated bail 236. The counterclockwise rotation of the lever 242 and the resultant downward motion of the associated bail 236 permits each of the related contact fingers 233 to engage their mating contact member 237 to "close" that line program contact. The bank or banks of line program contacts closed, will remain closed until after the 8th drum cycle of the following machine cycle at which time a bail 280 is rocked counterclockwise on a pivot 281 onto engagement with the "released" lever 242 to relatch it in the new restored associated lever 261. This relatch action opens the associated bank of previously closed line program contacts. For rocking the bail 280 there is provided the previously mentioned cam 227 which is operationally engaged by the usual spring tensioned follower which is connected through a link 282 to the bail 280.

The net effect of the above described action is that as a result of the impulsing of magnet 247, during drum cycles 3 and 4, the associated bank of line program contacts 238 are closed after a fixed time delay at the beginning of drum cycle #13 of the same machine cycle. A bank of line program contacts, once closed, remain closed until the beginning of drum cycle #9 of the following machine cycle. At this time the mechanism actuated as a result of the energization of the desired magnet 247 during drum cycles of 3 and 4 of the same cycle, is operationally positioned so as to subsequently close the related line program contacts at drum cycle #13. The reason for this delayed type of operation will be later evident.

There are sixty so-called line program common hubs 283 provided on the plugboard 127, each of which is connected through a mating contact element 237 of the fixed panel 126, when the panel 127 is in place, through a connecting wire to a related group of 5 contact fingers 233. The 30 common hubs 283 associated with the "upper" 5 banks of line program contacts are positioned on the plugboard as shown in Fig. 12A (coordinates AN, 1–30) and are labeled 1 through 30, as indicated. The common hubs 283 associated with the "lower" 5 banks of line program contacts are positioned on the plugboard as shown in Fig. 12B (coordinates AN, 35–64), and are also labeled 1 through 30, as indicated. The contact element 237 cooperating with each of the fingers 233 is, of course, connected to a related hub 284 (coordinates AI–AM; 1–30 in Fig. 12A and AI–AM; 35–64 in Fig. 12B) on the plugboard 127 when the latter is in operational position. Each of the 30 hubs 284 relating to a particular bank of contacts are labeled 1 through 30 as indicated. Each such group of 30 hubs is further designated on the plugboard as 1, 2, 3, 4, 5, 6, 7, 8, 9 or 10 in correspondence to the particular bank of line program contacts to which they relate. It is thus evident that up to 30 individual input circuits, each linked by suitable plugwiring to a related one of the common hubs 283, may be simultaneously switched upon the impulsing of one of the magnets 247, to provide corresponding outputs at the group of hubs 284 associated with the particular magnet 247. As the nomenclature "line program contacts" implies, they are utilized to switch multiple programming circuits of the accounting machine, as will be later evident.

*Mechanical drive—the emitter shaft*

Referring again to Figs. 1–4 it will be noted that also secured to the shaft 188 for rotation therewith is a cam 286 which is engaged by a roller 287 carried by one arm of a spring biased follower 288, the latter being mounted on a pivot 289 carried by a block 291 which is secured to the back plate 102. Another arm of the follower 288 carries a roller 292 which extends into the plane of a gear 294. The gear 294 is rotatably mounted on a stub shaft 296 which is secured at one end of the plate 102. The gear 294 meshes with a splined member 297 of the shaft 184 and is continuously rotated thereby. The gear 294 is movable on the shaft 296 between a position wherein it meshes with a gear 298 secured to a so-called emitter shaft 299, which is rotatably supported in suitable bearing inserts carried by the plates 101 and 102, to a position wherein the gear 294 is free of engagement with the gear 298.

Upon an impulsing of the control magnet 204 of the program clutch 189, the clutch is engaged and the program shaft 188 and associated cam 286 are driven by the gear 187. At the beginning of the #11th drum cycle of the program shaft rotation, a dwell 301 of the cam 286 (see Fig. 15B) acts against the roller 287 and displaces the follower 288 against the tension of an associated spring. As the follower rotates the roller 292 carried by the other arm of the follower 288 acts against the forward surface of the gear 294 in Fig. 4 and accordingly displaces the gear 294 on the shaft 296 so as to engage its teeth with the gear 298 on the shaft 299. As a result, the shaft 184, through gear 294 and gear 298, effects a rotation of the emitter shaft 299 from a so-called home position. After the motion of the follower 288 by which the gear 294 and 298 are engaged, the roller 287 drops from the high dwell portion 301 of the cam 286 to restore the follower 288 to its normal position. This restoring motion of the follower 288 has no effect on the engaged position of the gears 294 and 298, however, and rotation of the emitter shaft 299 continues.

Operatively associated with the emitter shaft 299 in a manner to be explained hereinafter, is a so-called emitter assembly 302. The emitter assembly 302 comprises side frame members 303 and 304 which are secured to the cross bars 111 and 109 in a position behind the plugboard assembly 124 as best shown in Fig. 1. Extending between the side frames 303 and 304 are two supporting rods 306 and 307 (see Fig. 19) on which are mounted six emitter plates 308, 309, 310, 311, 312, and 313. Each of the emitter plates is rigidly and accurately spaced from its adjacent plate or plates, by the engagement of the various edges thereof with aligning recesses in cross bars 315 and 316 and plates 317 and 318, the bars 315 and 316 being secured to and extending between the side frames 303 and 304, while the plates 317 and 318 are secured to cross bars 111 and 109 respectively.

Each of the emitter plates 308, 309, etc., comprises a non-conductive plate 318 in each side of which is embedded 40 spaced conductive contact segments 320, the segments being arranged in an arcular path as shown in Fig. 19. Also embedded in each side of a plate 318 in an arcular path parallel to the path of the related segments 320, is a common contact segment 321. Rigidly secured to the emitter shaft 299 are six rotators 322, one for each of the emitter plates 318. Secured to the outer end of a first arm 323 of each rotator 322, is a non-conductive block 325 on which is supported a contact wiper 326. Each contact wiper 326 extends beyond its related block 325 and with the shaft 299 rotating, the wiper is adapted to engage successively each of the associated segments 320 on the left side (as viewed in Fig. 1) of the related emitter plate.

In a similar manner, there is secured to the outer end of a second arm 327 of each rotator 322, a non-conductive block 328 on which is supported a contact wiper 330. The wiper 330 is adapted to cooperate with the segments 320 of the Right side of the related plate 318, as viewed in Fig. 1. The arms 323 and 327 are displaced angularly from each other so that with the shaft 299 engaged, the wiper 326 sweeps over all forty of its related segments 320 whereafter the wiper 330 sweeps over its associated segments 320. The arrangement is such that by electrically commoning the wipers 326 and 330 of each rotator 322 as indicated in Fig. 20 which is a diagrammatic representation of the emitter structures associated with the shaft 299, both sides of an emitter plate 308, 309 etc., may be considered as forming a single eighty segment emitter element.

Each of the blocks 325 of the rotator members 322 provided for the emitter plates 308, 312 and 313 includes a second contact wiper 331 which cooperates with the common segment 321 of the left side of the related emitter plates. In a similar manner, each of blocks 328 of these rotator members also includes a second contact wiper 332 which cooperates with the common segment 321 of the Right side of the related emitter plate. Each of the blocks 325 and 328 of the rotator members associated with the plate 311 also includes a second contact wiper 333 and 334, respectively, which also cooperates with the segments 320 of the related side of the emitter plate. The wiper 333 is positioned so that it lags its associated wiper 326 by 1 segment position while the wiper 334 is similarly positioned so that it lags its associated wiper 330 by one segment. For example: when wiper 326 associated with plate 311 engages the related 40th segment 320, the associated wiper 333 is engaging the 39th segment 320 thereof as indicated in Fig. 20. Similarly, the wiper 334 associated with plate 311 is positioned so that it lags its associated wiper 330 by one segment. For example, when the wiper 330 is engaging the associated 42nd segment 320 of plate 311, the wiper 334 is engaging the 41st segment 321 thereof.

Referring now to Fig. 20 the emitter elements formed by each of the plates 308, 309, 310, 311, 312 and 313 and their allied structure, are referred to respectively, as the print position control exit emitter element, the counter read out emitter element, the counter, + and − (plus and minus) emitter elements, the counter entry emitter element, the print position exit emitter element, the print position entry emitter element, as indicated. The counter entry emitter element may actually be considered as two distinct elements, a so-called "On time" emitter element including the contact wipers 326 and 330, and a "delayed" element including the delayed contact wipers 333 and 334. The timing of the print position entry element, print position exit element, and counter readout element is identical with the timing of the "On time" portion of the counter entry emitter element, so that they may accordingly be also defined as "On time" elements. Similarly, the timing of the counter + and − emitter element and the delayed portion of the counter entry emitter element correspond, and they may accordingly be defined as "delayed" emitter elements.

It will be noted in Fig. 20 that by connecting the commoned contact wipers 326 and 330 (On time) of the counter readout element, to the similarly commoned wiper 326 and 330 of the counter entry element, an On time, 80 position isolation emitter results, which is referred to as the "On time" counter emitter 336 as diagrammatically represented in Fig. 20. The purpose of the On time counter emitter 336 will be later evident. Similarly, by connecting the commoned contact wipers 326 and 330

(On time) of the print position exit element to the similarly commoned wipers 326 and 330 of the print position entry element, an On time, 80 position isolation emitter results which is referred to as the On time print emitter 337 as diagrammatically represented in Fig. 20. The purpose of the On time print emitter will be later evident. It will be noted also in Fig. 20 that the common segment wipers 331 of these two emitter elements 312 and 313 are also electrically commoned. The reason for this arrangements will be later evident. An 80 position "delayed" isolation emitter referred to as the "delayed" counter emitter 338, as diagrammatically represented in Fig. 20, is formed in a similar manner by connecting the commoned contact wipers 333 and 334 of the counter entry emitter element, to the similarly commoned wipers 326 and 330 of the counter + and − emitter element. The purpose of the "delayed" counter emitter 338 will be later evident. The wipers 326 and 330 of the print position control exit emitter element are electrically commoned, as are the associated wipers 331 and 332, as indicated in Fig. 20, so as to form an 80 position so-called Print position control exit emitter 339, the emitter 339 being shown in a more simplified form in Fig. 13K. The timing of the emitter 339 "lags" the previously mentioned "On time" emitter 336 and 337 and "leads" the "delayed" emitter 338, as will be evident upon an examination of Fig. 15A.

Figure 13B:
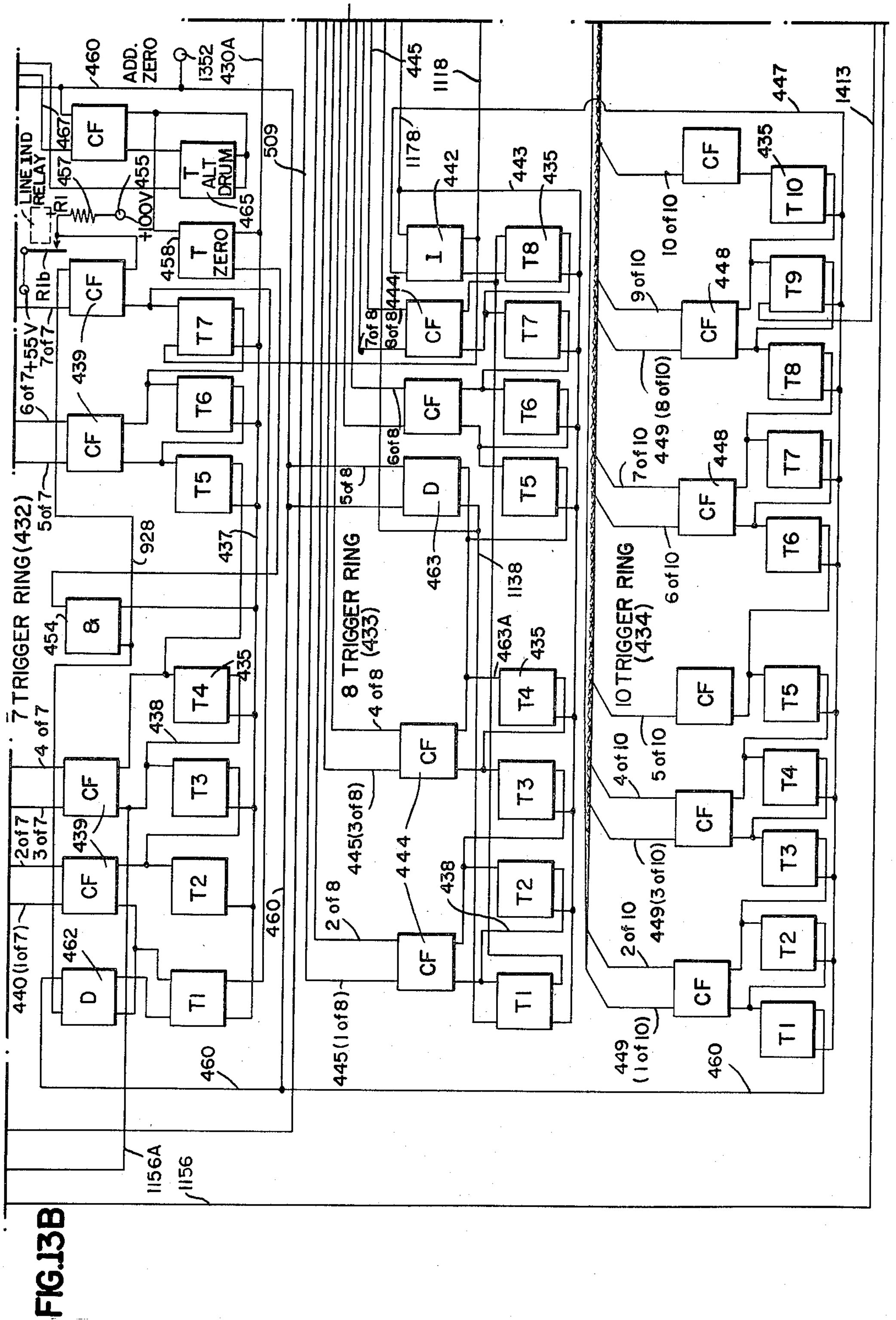
Figure 13D:
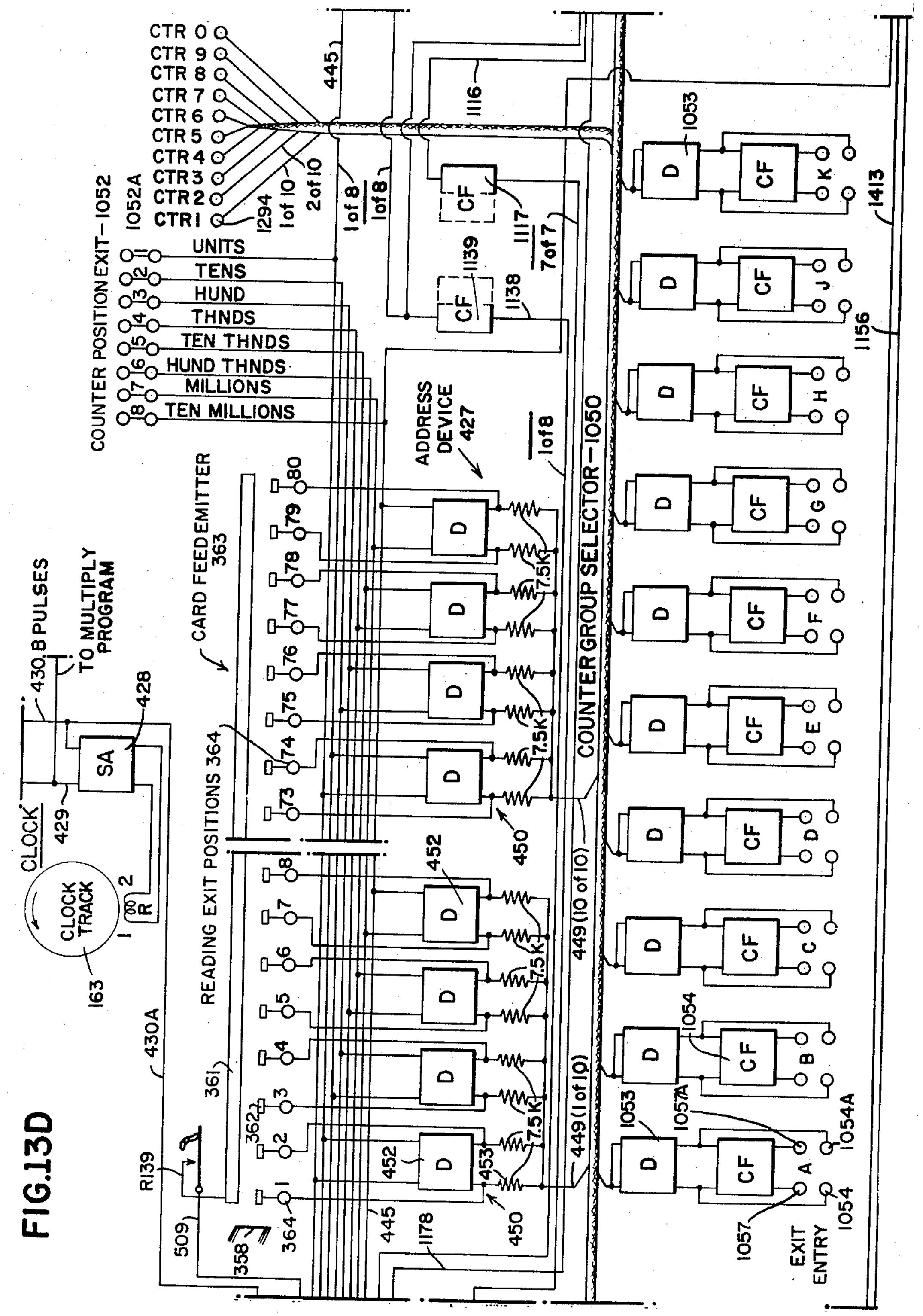
Figure 13E:
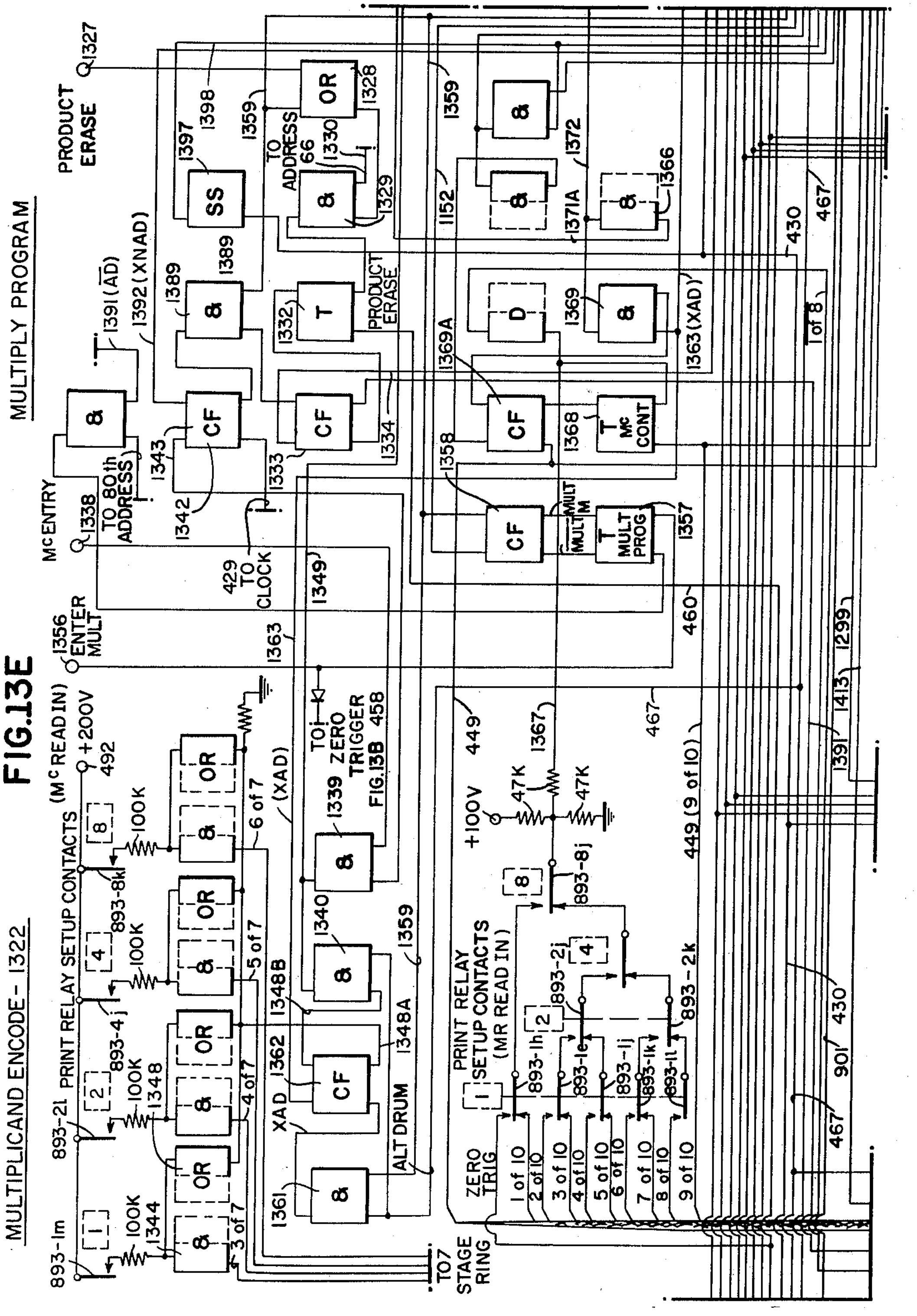
Figure 13F:
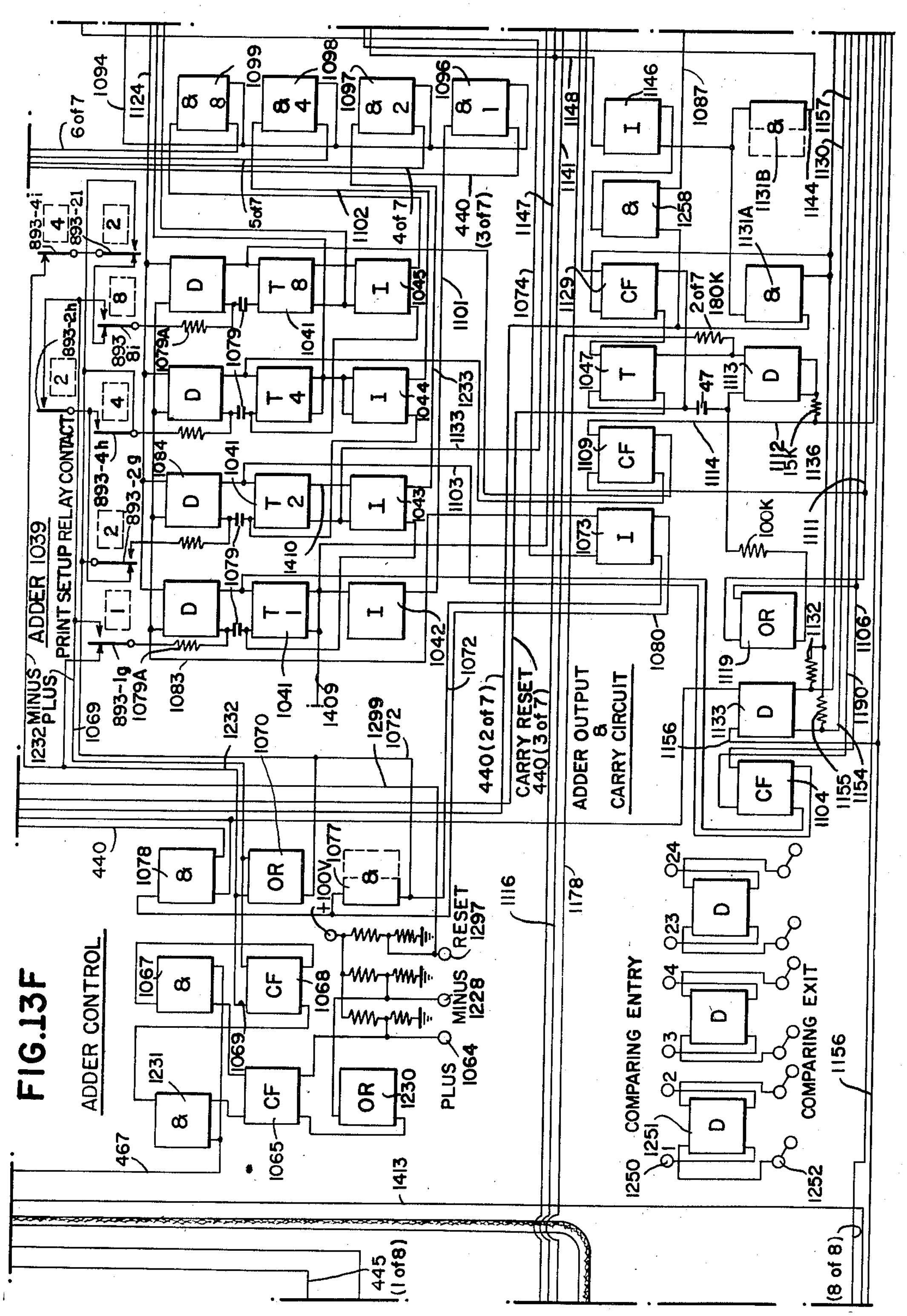
Figure 13G:
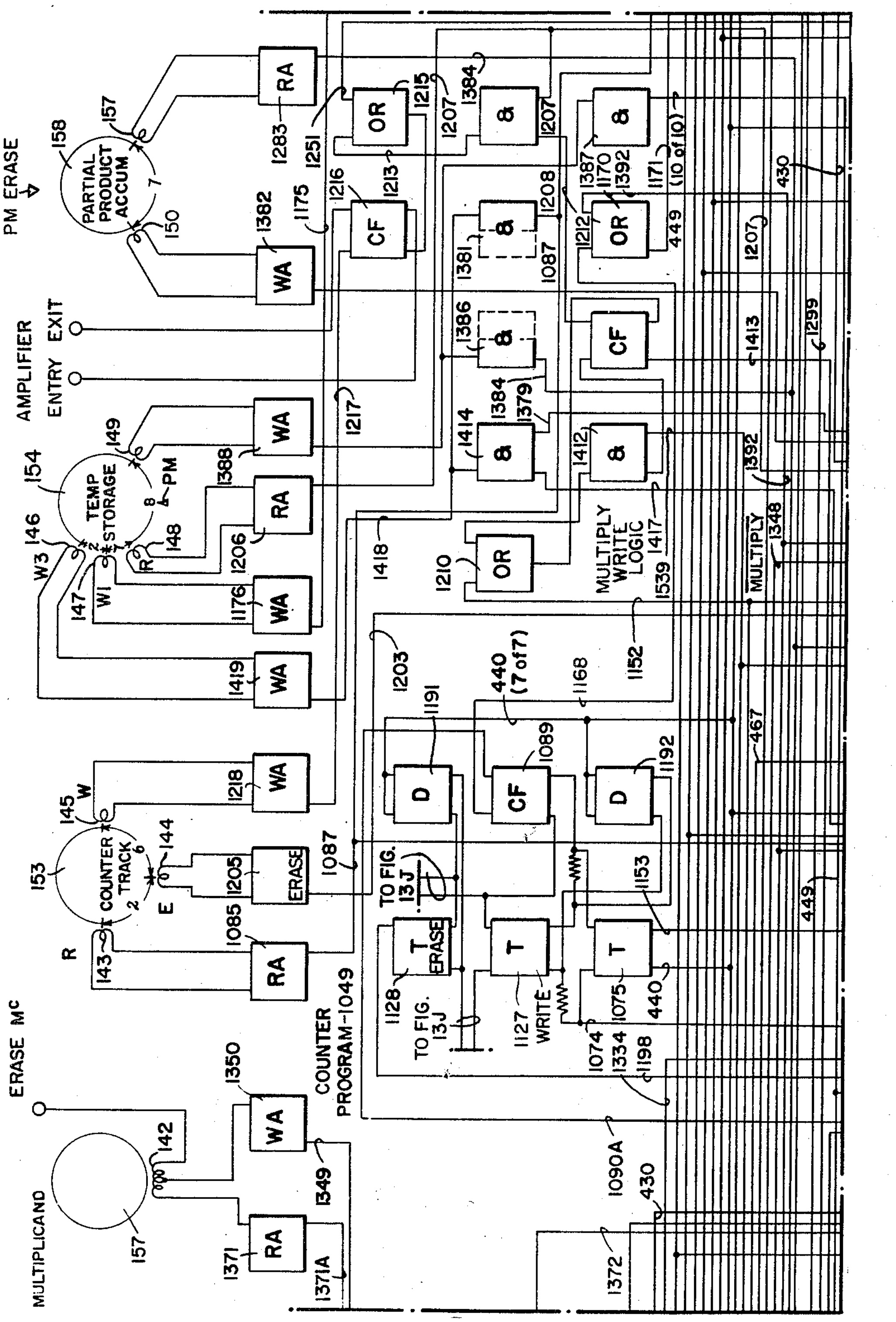
Figure 13H:
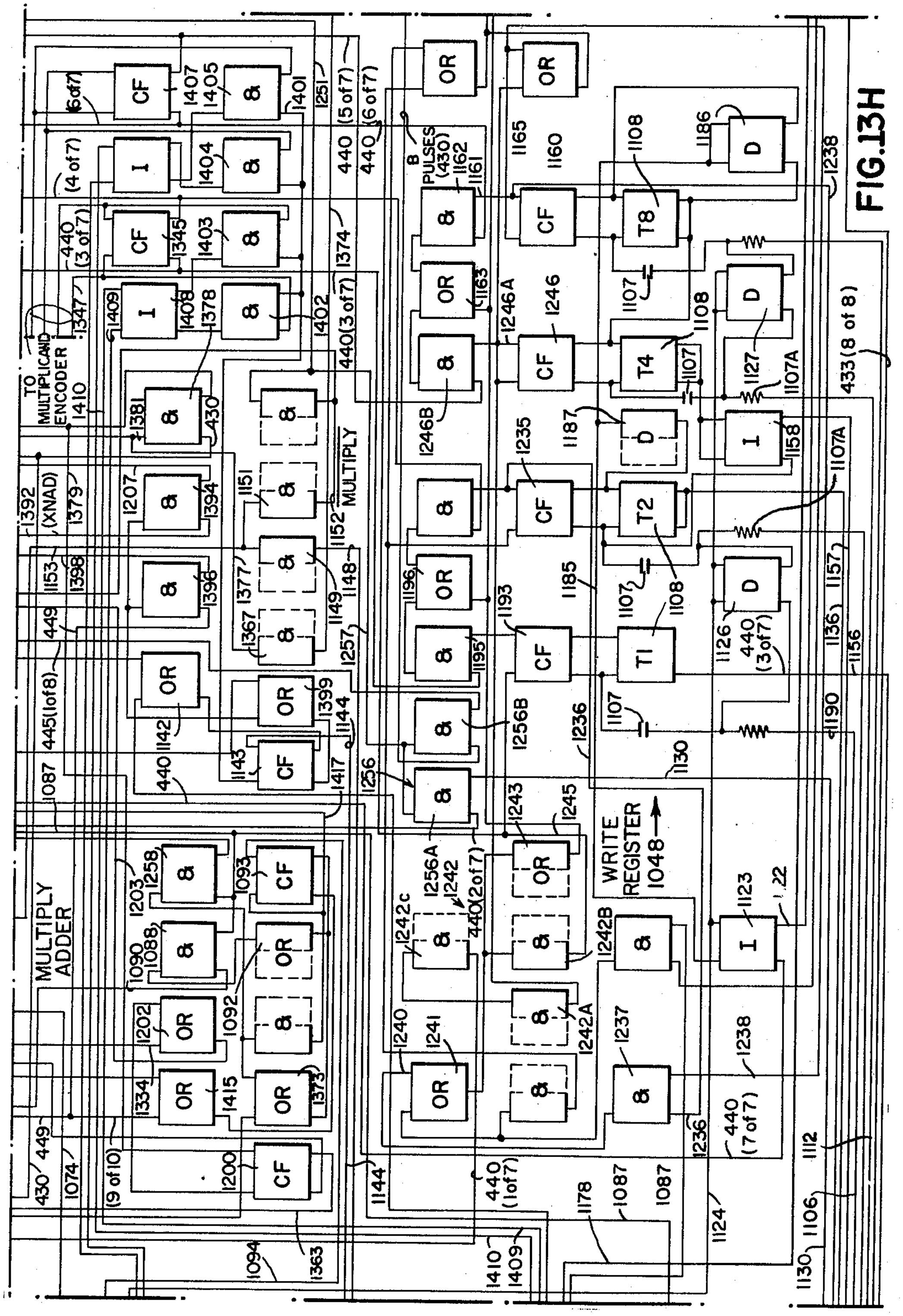
Figure 13I:
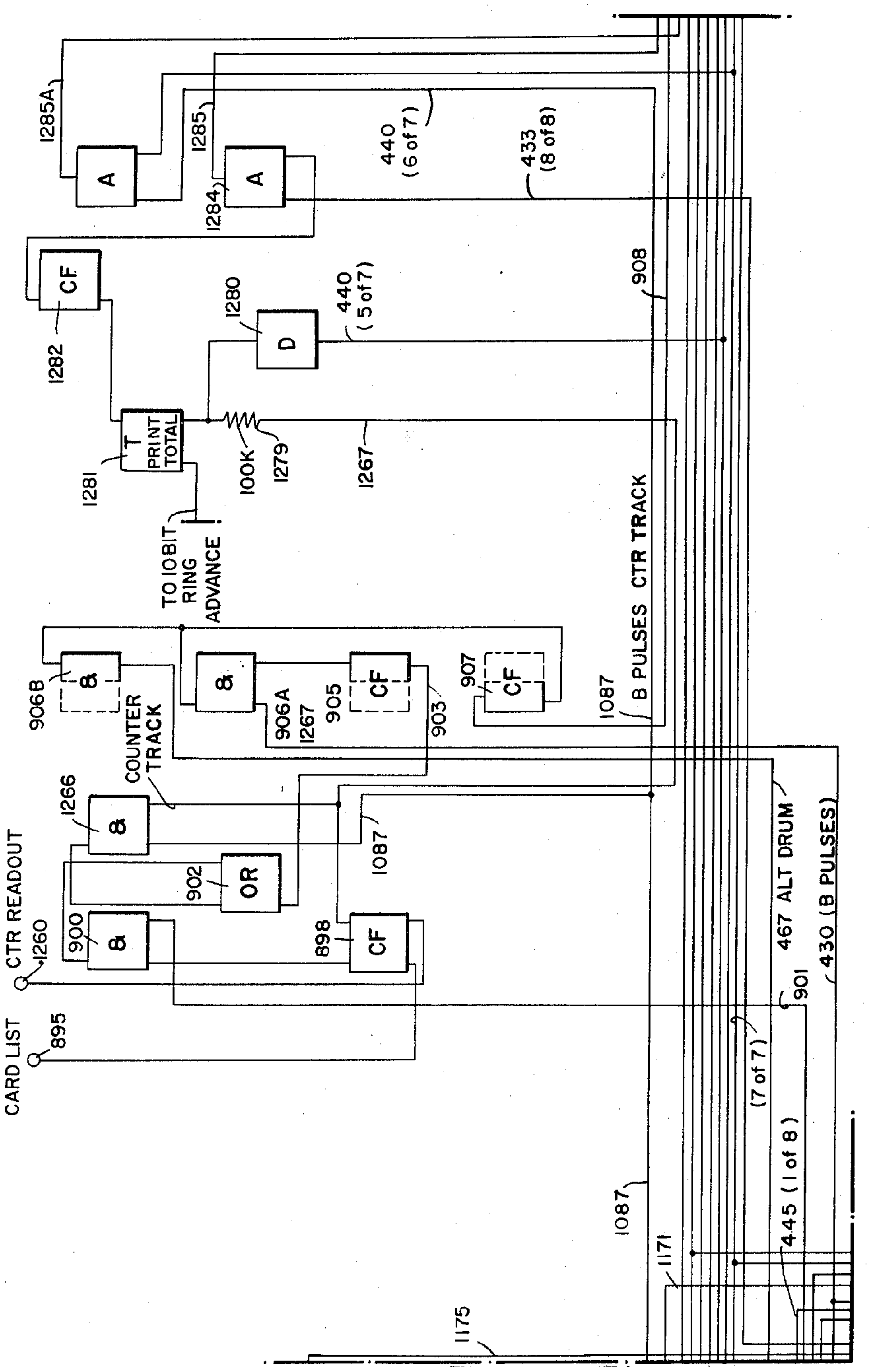
Figure 13J:
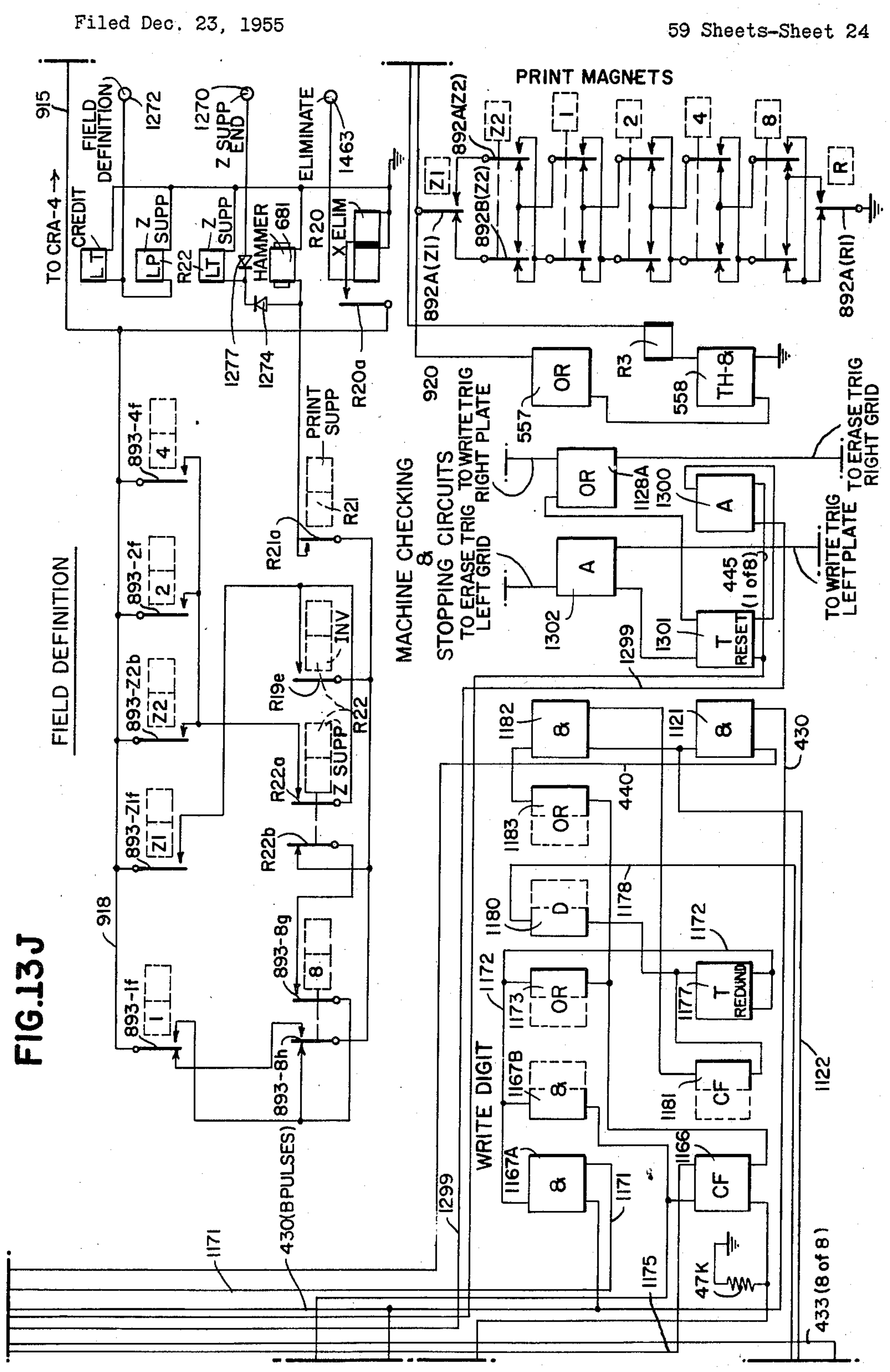
Figure 13K:
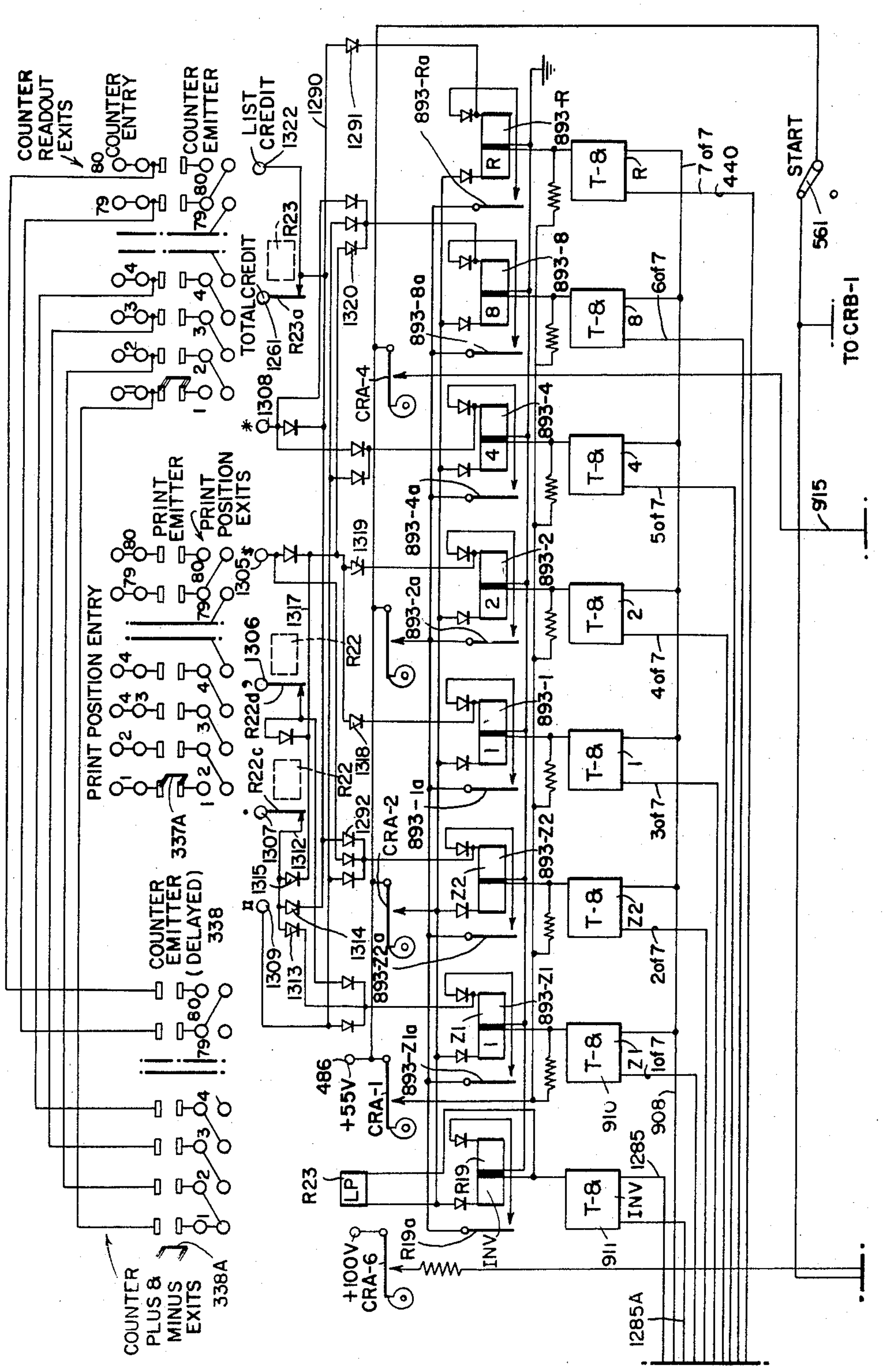
Figure 14B:
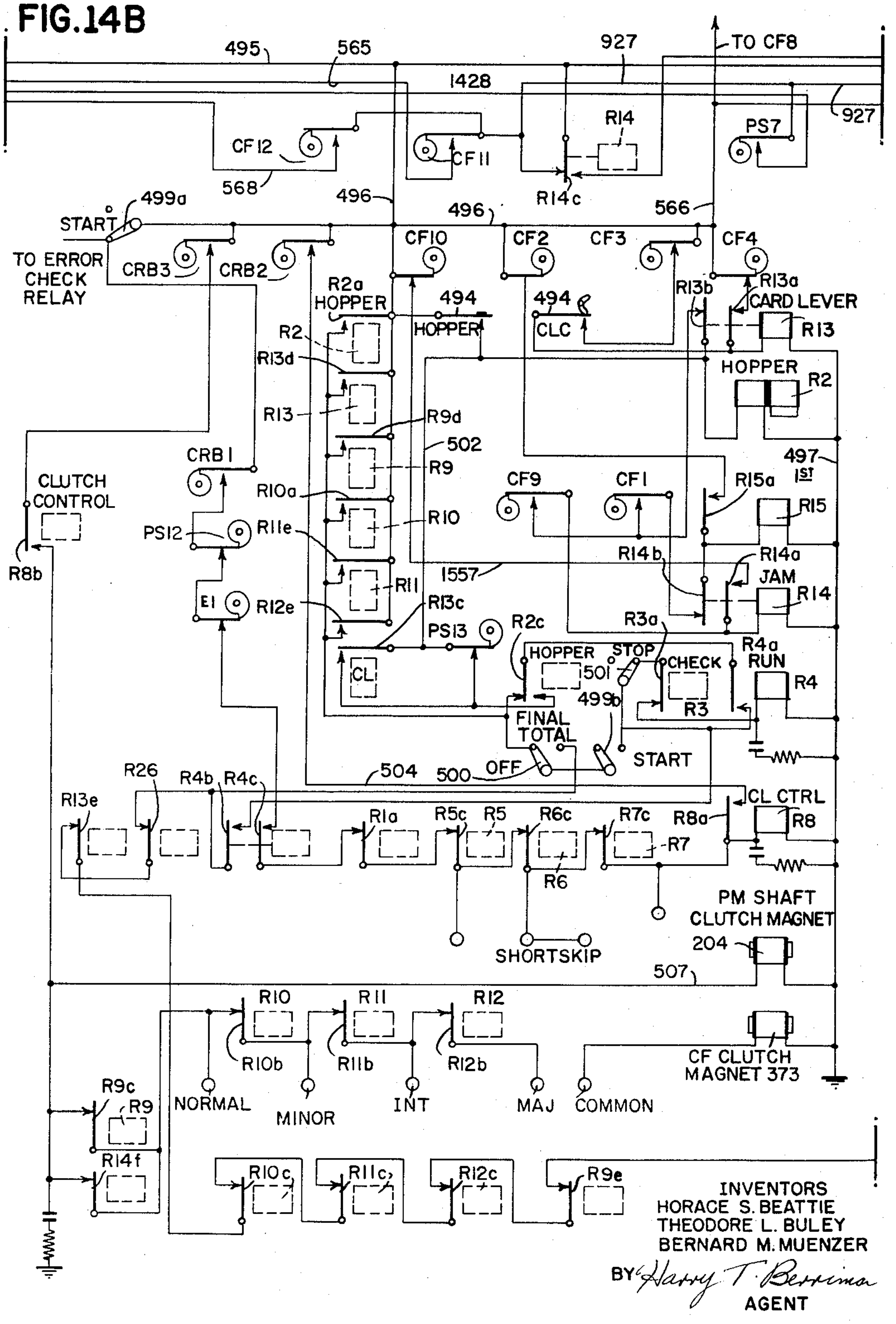
Figure 14C:
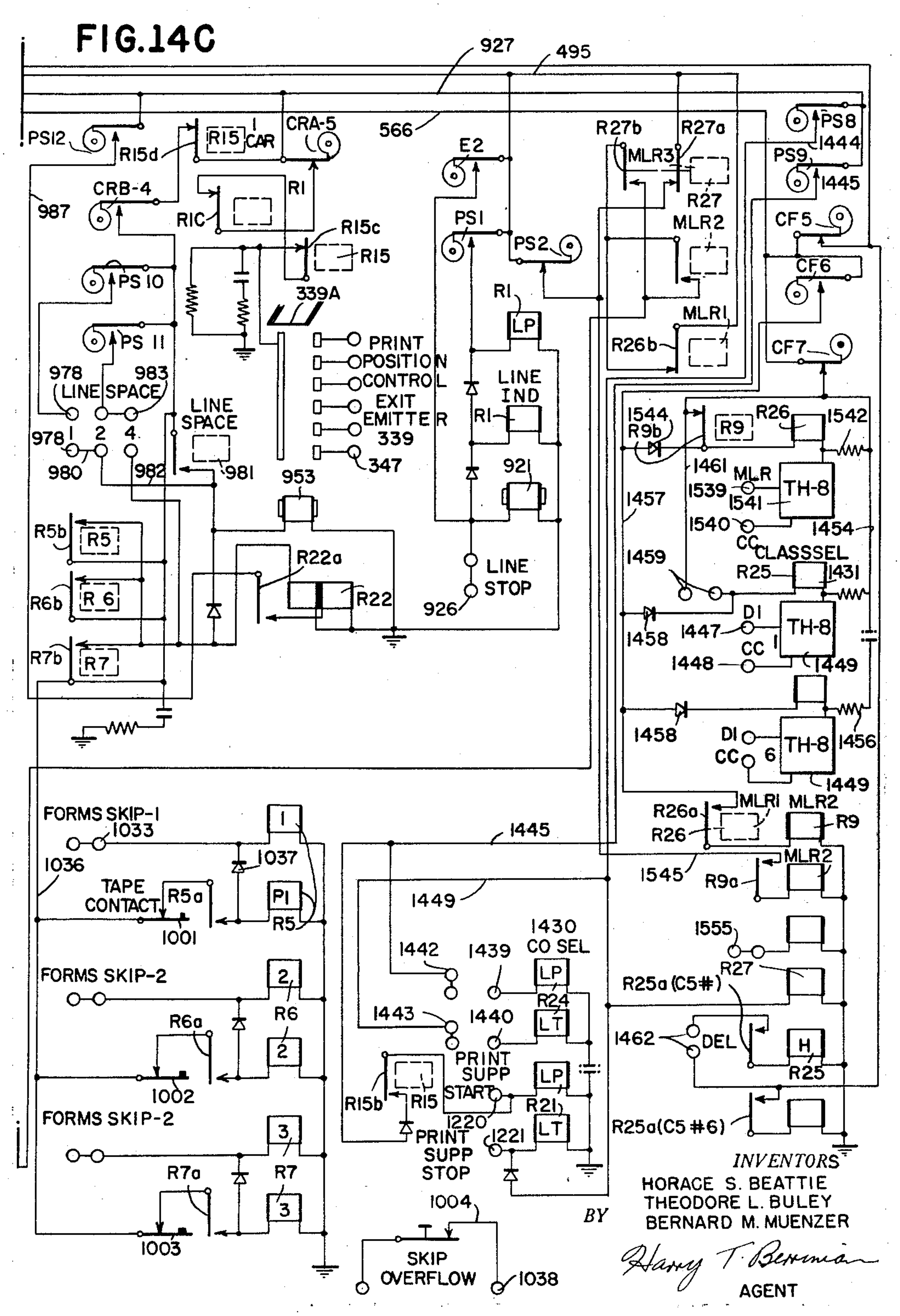

The wiper 337A of the print element 337 as shown in Fig. 13K is, of course, an electrical composite of the commoned contact wipers 326, 331, 330 and 332 and of the print position entry emitter element and the corresponding contact wipers 1A and 1B of the print position exit emitter element. The wiper 338A of the counter emitter "delayed" and the wiper 336A of the counter emitter, as shown in Fig. 13K, are each similarly an electrical composite of the commoned wiper contacts of their related emitter plate elements, as shown in Fig. 20. In a similar fashion the wiper 339A of the print position control exit emitter 339 as shown in Fig. 14C, is the electrical composite of the wiper contacts emitter plate 308, as shown in Fig. 20.

Referring again to Fig. 19, it will be noted that each of the segments 320 in a side of an emitter plate terminates in an enlarged contact area 341 at the one edge thereof. It will also be noted that the common segment 321 of each side of an emitter plate terminates in a pair of enlarged contact areas 342 and 343 at the edge of the plate. Each of the individual contact areas 341 is engaged by an associated suitably supported conductive finger 344 with the latter being connected through a predetermined one of the contact elements 346 of the fixed panel 126, to the related plug hub on the panel 127. Thus each of the 80 segments 320 of the print position control exit plate 308 is connected to a related print position control exit hub 347 (coordinates G and H; 1 to 40 in Fig. 12A and 12B) of the panel 127, each of the 80 segments 320 of the counter readout plate 309 is connected as indicated diagrammatically in Fig. 20, to a related counter readout exit hub 348 (coordinates I to L; 1 to 40 in Figs. 12A and 12B); each of the 80 segments 320 of the counter + and − plate 310 is connected to a related counter + and − exit hub 349 (coordinates M to P; 1 to 40) each of the 80 segments of the counter entry plate 311 is connected to a related counter entry hub 351 (coordinates Q to T; 1 to 40 in Figs. 12A and 12B); each of the 80 segments 320 of the print position exit plate 312 is connected to a related print position exit hub 352 (coordinates U to X; 1 to 40 in Figs. 12A and 12B); and each of the 80 segments 320 of the print position entry plate 313 is connected to a related print position entry hub 353 (coordinates Y to AB, 1 to 40 in Figs. 12A and 12B).

In a similar manner the common segment 321 of each side of an emitter plate may be connected through a suitable contact finger 344 engaging either of the related areas 342 and 343 to any desired external circuit. For example, it will be noted in Fig. 20, that the common segments 321 of plate 312 are indicated as connected to a group of four so-called list hubs 354 (coordinates D, 60 to 63 in Fig. 12B) on the panel 127, while the common segments of the plate 313 are indicated as connected to a so-called list common hub 356 (coordinates D, 64 in Fig. 12B).

Referring now to Figs. 1 and 2 it will be noted that the emitter shaft 299 extends through the front plate 101 and secured thereto is a rotator 357 carrying a pair of electrically commoned contact wipers 358A and 358B for cooperation with the common segment 361 and 80 individual segment 362, respectively of a so-called card feed emitter plate 363 which is secured to the front plate 101. The plate 363 is shown diagrammatically in Fig. 20 and each of the segments 362 thereof is connected in the same manner as previously explained for the other emitters, to a related so-called reading exit hub 364 (coordinates AC to AH; 1 to 40 in Figs. 12A and 12B) on the panel 127. The wiper 358 in Fig. 20 is representative of the wiper 358A and 358B as they are electrically connected together. During each counterclockwise rotation of the emitter shaft 299 in Fig. 2, each of the segments 362 of the plate 363 is engaged successively by the associated wiper 358 as indicated in Fig. 15A. The purpose of the card feed emitter 363, and each of the other emitters associated with the shaft 299, will be explained in detail later.

Also secured to the position of the emitter shaft 299 which extends beyond the front plate 101 are 2 cams 299A and B (Fig. 2) for actuating so-called emitter shaft contacts ES–1 and ES–2 which are supported on the plate 101. The purpose of these contacts will be later explained.

*The card feed mechanism*

The information on which accounting operations is to be performed is entered into the machine through the medium of record cards which are perforated in accordance with the well-known IBM code. Each entry record card 367 has 80 columns, with each column having the twelve index point positions 12, 11, 0, 1, 2, 3, 4, 5, 6, 7, 8, and 9 as illustrated in Fig. 21. The 12 and 11 index points are defined as zone positions, the 1 through 9 index points are defined as numeric positions, while the 0 index point is a combined numeric-zone position.

Any desired digit value is represented in a desired column of the record by perforating the corresponding numeric index point thereof. Alphabetical characters are represented by combinations of a perforation in a zone and a numeric position of the desired column. For example, an A is represented by the combination of a perforation in the 12 and 1 index points, a B by the combination of a perforation in the 12 and 2 index points, etc., as shown in the "card code" columns of the table shown in Fig. 22A. Special characters, with the exception of a minus sign (−) and the ampersand (&) are also represented by combinations of 2 or 3 index point perforations, as also indicated in Fig. 22. A minus sign (−) is represented by a perforation in the 11 index point of a desired column while one ampersand (&) is represented by a perforation in the 12th index point perforation. The record cards containing the information to be processed are arranged in a stack and inserted in a card hopper 368 which is secured to the front plate 101 as best shown in Fig. 2.

Referring now to Fig. 4, it will be noted that the shaft 184 through the gear 186 secured thereto, continuously rotates a gear 369 which is rotatably mounted on a so-called card feed shaft 371, the shaft 371 being rotatably supported by the suitable bearing inserts in the front plate 101 and back plate 102. Associated with the gear 369 is a conventional single revolution type clutch mechanism 372 controlled by a related electromagnet 373. The clutch 369, which is referred to as the card feed control clutch, is identical in construction and operation to the previously described program shaft clutch 189. Upon an impulsing of the magnet 373, the clutch is engaged to lock the gear 369 to the shaft 371. The gear 369 accordingly drives the shaft 371 for one revolution whereafter, unless the magnet 373 is reimpulsed, the clutch mechanism latches and the gear 369 is again freely rotatable on the shaft 371.

Secured to the card shaft 371 for rotation therewith is a cam 374 (see Fig. 1) which is engaged by a roller 376 carried on the one end of a follower 377, the latter being pivoted at 378 on the front plate 101. A link 379 connects the follower 377 to an arm 381 which is secured to a shaft 382, the shaft being rotatably supported by a suitable bearing insert 383 carried by the front plate 101. A spring 384 connected between the arm 381 and a spring stud carried by the plate 101, continuously biases the above structure in a direction so as to maintain the roller 376 engaged with the cam 374.

The shaft 382 extends through and beyond the front plate 101 and secured to this extending portion is an arm 386 (Fig. 2) having an internal gear section 387 which meshes a gear rack 388 cut in the lower surface of a member 389, the latter being slidably mounted on suitable guide rails 391 secured to the bottom of the hopper 368. The usual picker knife 392 is attached to the member 381 and extends into the place of the lower record of a record stack in the hopper 368.

The contour of the cam 374 is such that during the initial portion of each revolution of the shaft 371, the shaft 382 and its associated arm 386 are rocked counterclockwise in Fig. 2 through the linkage described above. This rocking of the arm slides the member 389 on its supporting guides 391 toward the left in Fig. 2 which causes the associated picker knife 392 thereof to "pick" the bottom card in the hopper 368 and advance it lengthwise, first column first, from the record stack into engagement with card feed rollers 393 and 394.

The roller 394 which is formed of a conductive material, is secured to a shaft 396 which is rotatably supported by the front plate 101 and a block 397 secured to a forward side wall 398 of the hopper 368. The shaft 184 through a gear 399 (see Fig. 1) secured thereof, a meshing idler gear 401, and a gear 402 secured to the roller shaft 396, continuously rotates the roller 394 clockwise in Fig. 2. The roller 393 which is formed of a non-conductive material is secured to a shaft 403 which is rotatably supported in suitable bearing inserts carried by arms 403 pivotally attached at 406 to the base of the hopper 368. An individual spring 408 connected between each arm 404 and a stud 409 carried by the related side wall of the hopper, continuously biases the arms 404 in a direction to maintain the roller 393, engaging the roller 394. The shaft 396 through a gear 411 secured thereto and a meshing gear 412 carried on the roller shaft 403, continuously rotates the roller 393 counterclockwise in Fig. 2.

As the leading edge of the bottom record advances between the rollers 393 and 394, the roller 393 and its supporting arms 404 are deflected slightly thereby. This deflection of the inner arm 404 in Fig. 2 is applied through an extending finger 413 thereof to rock a lever 414 pivoted at 416 to the front plate. The rocking of the lever 414 actuates (closes) so-called card lever contacts CLC–1 and CLC–2 which are secured to the front plate 101. The purpose of the card lever contacts will be later evident. The contacts CLC–1 and CLC–2 remain closed as long as a record is passing between the rollers 393 and 404.

Rigidly secured to the front plate 101 and extending outwardly thereupon is an insulating member 417 to which is secured a line of twelve individual sensing brushes 418, one for each of the twelve index points of a record card. Each sense brush 418 extends through a guiding groove in the roller 393, which it will be recalled, is formed of a non-conductive material, and finally into engagement with the conductive roller 394 at a point past which a related index position of any record being fed by the rollers 393 and 394 will pass. As each column of the entry record passes over the brushes 418, the brushes finding perforations contact the conductive roller 394 there-through to establish related electrical sense circuits. The information in each entry record is thus sensed, serially, column by column. Electrical contact from the conductive roller 394 to the sense circuitry, is effected through a common contact brush 419 continually engaging the roller 394, the brush 419 being secured to and insulated from the front plate 101 by suitable structure 421. After the last column of the entry record is sensed the record is discharged from the rollers 393 and 394 and drops into a stacker 422 which is secured to the front plate 101.

Referring now to Figs. 1 and 2 it will be noted that the card feed shaft 371 extends through and beyond the front plate 101. Secured to this extending portion are a plurality of cams 423 for actuating related so-called CF (card feed) contacts CF–1 through CF–12 at particular intervals of each revolution of the shaft 371, as indicated in Fig. 15B. The purpose of each of the contacts CF–1 through CF–12 will be explained later.

During the latter portion of each revolution of the shaft 371, the shaft 382 through the linkage previously traced, is rocked counterclockwise to restore the picker knife 392 to the proper position for the next card feed operation.

During the column by column advance of a record card under the sense brushes 418 as a result of the engagement of the card feed clutch 372, the actual sensing operation of each column is controlled in part by a circuit completed through a corresponding segment of the so-called card feed emitter 363. Thus, when column one of the entry record is under the sense brushes 418, the corresponding 1st segment 362 of the card feed emitter 363 must be engaged by its related wiper 358B (Fig.2) etc. This action accordingly requires that the card feed clutch 372 and the program shaft clutch 189 be energized simultaneously, so that the rotation of the card feed shaft 371, the program shaft 188 and the emitter shaft 299 are timed as indicated in Figs. 15A and 15B, it being remembered that the program shaft clutch 189 not only controls the rotation of the shaft 189 but indirectly through shaft 296 controls the rotation of the emitter shaft 299.

*Conversion of input data*

The sensed information in each record column is translated from the IBM coded form into a six bit code recorded serially, bit by bit, on either card track #1 or card track #2 of the drum 136 in a particular record column sensed. The information in successive record cards senses is recorded alternately in the card tracks #1 and #2 of the drum. For example, the information in the first record sensed is stored on card track #1; the information in the second record sensed is stored in card track #2; the third record data on card track #1, etc. This arrangement permits the machine to be processing information from one card track of the drum, simultaneously with the loading of the successive record information into the alternate card track. This action, of course, increases the speed with which information may be processed in the machine. The card tracks #1 and #2 are utilized only to store the record card information, in six bit code, prior to its processing by the machine.

All information processed within the machine is handled in six bit code form. The six bit code is comprised of two so-called zone bits (zone 1 and zone 2) and four, binary coded-decimal bit positions 1, 2, 4 and 8. An additional seventh bit position is provided for the six bit code and is known as the redundancy bit position. Each storage position or address of the drum may be considered, therefore, to have seven cells or bit areas. When reading information out of, writing information in, or erasing the information in an address, the cells in an address rotate under the related magnetic head serially in the sequence zone 1, zone 2, 1, 2, 4, 8 and Redundancy.

Referring now to Fig. 22B, there is shown a conversion table which illustrates the manner in which the sensed record card information in the IBM code is translated into the six bit internal machine code. All information processed within the machine is in this six bit form, as mentioned previously. In the six bit code, the zone 2 bit position may be considered the equivalent of the 11 zone in the IBM code, the zone 1 bit, the equivalent of the 0 zone in the IBM code, while the zone 1 and zone 2 combinationally may be considered the equivalent of the 12 zone in the IBM code. The binary coded bit areas 1, 2, 4, 8 taken singly or in combination, may be considered the equivalent of the numeric index points of the IBM code. For example, an A which is represented in the IBM code by the combination of a 12 and 1 index point perforation, is represented in the six bit code by recording a binary 1 in the zone 1, zone 2, and 1 bit areas, as indicated. As further example, the number six is represented by a binary 1 in the 2 and 4 bit areas (combination total 6) of the six bit code.

The redundancy or check bit position, is utilized or not utilized with each number, letter, or special character, dependent upon whether the total number of bits thereof is odd or even. Checking of the accuracy of writing or reading information to or from the drum is facilitated if the number of bits of each number, letter, or character is always even. Thus, the letter A having 3 bits (odd) requires an additional binary one in the associated redundancy bit area, to achieve an even bit count. However, the numeric value 6, since it already has an even bit count, does not require the redundancy bit. The information recorded in a seven bit cell or address on the drum, whether numeric, alphabetic, or a special character, is referred to as a "word."

It is evident that in order to store the record information on one eighty column record on the drum, card tracks #1 and #2 must each have a capacity of at least 80 7-cell addresses, or 560 cells in all. Actually, each of the storage tracks on the drum has 83 7-cell addresses to give a total of 581 cells, while an additional area equivalent to 19 cells is available for synchronization purposes.

When the machine is in operation, the drum 136 is continuously rotated at a speed of 6000 v.p.m. through the driving chain previously described. Thus, each revolution of the drum takes 10 milliseconds. Card sensing is effected at a rate of one column every 10 milliseconds or per 1 revolution of the drum. Thus, 800 milliseconds (80×Col.×10 milliseconds per col.) are required to sense one record. A space equivalent to approximately 200 milliseconds is provided between records when records are being fed continuously which results in a total machine time of 1 sec. (800+200 milliseconds) per record. The maximum speed of sensing records is, therefore, approximately 60 per cards per minute. It will be appreciated, however, that during the 800 milliseconds that a record is being sensed, or during the 200 milliseconds between records, previous information in the machine may be processed.

During the sensing of a record card, the information sensed in column #1 of the record is written in address #1 of either card track #1 or #2, during 1 revolution of the drum; the information sensed in column 2 is written in address 2, during the next drum cycle, etc. It is evident therefore, that there must be apparatus for gating each column of sensed data to the proper address of the drum. This action is effected through the medium of a so-called addressing device 427 (Fig. 11A) in conjunction with the so-called card feed emitter 363 (Fig. 11A) in a manner to be later explained.

*Component description*

Before proceeding with a detailed description of the various control circuits, a brief description of representative ones of the various circuit units or components utilized in these circuits will be given. It will be noted in the various circuit drawings, that the individual components or units making up each circuit, are indicated merely as a box or block. Each component box is labeled with a letter or a letter-number designation indicating the particular type of unit that it is. By referring to Figs. 24 to 36 inclusive, the respective detailed circuitry of any component block may be determined by identifying the letter or letter-number designation. Each of the particular letter designations in the component boxes, in addition to acting as a reference designation, also denotes the function of the component. Thus, the units shown in Figs. 24 to 26, are cathode followers and are accordingly labeled with the letter CF; the unit shown in Fig. 27 is an inverter and is accordingly labeled with the letter I; the unit shown in Fig. 28A is a single shot multivibrator and is accordingly labeled with the letters SS; the unit shown in Fig. 29 is a trigger and is accordingly labeled with the letter T; the unit shown in Fig. 30 is an "and" unit and is accordingly labeled with an Ampersand; Fig. 31 is an "or" unit and is accordingly labeled with the letter O; Fig. 33 is a thyratron "and" unit and is accordingly labeled with the letters T&; Fig. 34 is a "read" amplifier and is accordingly labeled with the letters RA; Fig. 35 is a "write" amplifier and is accordingly labeled with the letters WA; and Fig. 36 is a "sync." amplifier and is accordingly labeled with the letters SA. The unit shown in Fig. 32 is a diode unit and is designated by a diagrammatic representation of the diodes thereof rather than a letter designation.

It will be noted in Fig. 24, that the value of the cathode resistor of the cathode follower, is not specifically indicated. This value may vary dependent upon the magnitude of signal desired in the particular circuit application. Each of the CF units is accordingly further labeled at each particular circuit application with the size of the cathode resistor therein. Other units such as CF II, the AND units, OR units, etc., may also have the resistors thereof varied from application to application, and are accordingly labeled at each particular circuit application with the size of the resistor therein.

Referring now to Fig. 24, a CFI unit comprises a dual triode vacuum tube—type 5965. The plate of each triode section is connected to a +200 v. supply potential, while the related cathode is connected through an associated cathode resistor to ground. Upon the application of an input signal through the grid resistor to the grid of one of the triode sections, a corresponding in phase output signal is generated on the cathode side of the related cathode resistor by the well-known "cathode follower" action. This generated cathode signal is fed therefrom to the particular circuit to be controlled thereby. A CF II unit (Fig. 25) is essentially similar to a CF I unit except that a dual triode type 6463 is used therein rather than a type 5965.

Referring now to Fig. 26, a CF III unit also comprises a dual triode type 5965. The grid potential of each section of the triode is normally maintained at a predetermined level through a connection from the grid, through series connected resistors of 150 ohm and 200K ohms, to the midpoint of a related voltage divider comprised of a 2–150K ohm resistors connected between a +100 v. supply potential and ground, as indicated. The plate of each section of the triode is connected to a supply potential of 200 v. A first input terminal for each section is connected to the midpoint of the related voltage divider, while a second input terminal for each section is connected through a diode 424 and the 150 ohm grid resistor to the related grid. The arrangement is such that upon the coincident application of positive voltage signals to the first and second inputs of a cathode follower section, the associated triode section is rendered heavily conductive and a corresponding in phase signal is generated on the related cathode and, in turn, in the output terminal linked thereto.

Referring now to Fig. 27, the inverter unit I, comprises a dual triode type 6211 with the cathode thereof being commoned and connected to ground. Grid bias circuitry linked to a −100 v. supply potential is provided for each section, as indicated. Upon the application of a positive input signal of sufficient magnitude from an input terminal, through a related 47 micro-microfarad capacitor, and a 150 ohm grid resistor, to the related grid, the related section of the triode conducts heavily and a corresponding inverted signal results in the associated plate terminal. The 180° inverted plate signal is fed from the plate to a related output terminal and then to the desired circuit to be controlled thereby.

Referring now to Fig. 28A, the Single Shot Multivibrator is conventional in construction and comprises a dual-triode type 5844 vacuum tube, and a duo-triode type 5965 vacuum tube, only one of the triode sections of the latter being used. The grid of the right section of 5844 tube is connected through series connected resistors of 150 ohms and 2.7 megohms to a +200 volt supply potential. The grid of the right section of tube 5844, is accordingly maintained at a potential so that the right triode section is normally conducting. The grid of the left section of tube 5844 is connected through a 150 ohm grid resistor to the common connection of voltage divider comprised of a 220K and a 150K resistor. The one end of the voltage divider (150K resistor) is connected to the plate of the right section of the 5844 tube, while the other end of the divider (220K resistor) is connected to a −100 v. bias supply. With the right section of the 5844 tube conducting and its plate at a corresponding low potential, the left grid is maintained at such a potential through the associated voltage divider so that the left section is now cut off. The plate of the left section of the 5844 tube is connected through a diode (½-6AL5) to an input terminal to which so-called B pulses are applied. A B pulse is a positive square wave of magnitude from +50 to +100 volts and 8 microseconds' duration as indicated in Fig. 28B.

With the single shot multivibrator in its normal position (right section of 5844 conductive), the application of a B pulse to the input terminal effects the following action. The positive or leading edge of the B pulse has no effect on the plate of the left section of the 5844 since the plate is already at +100 volts. As the trailing edge of the B pulse is applied, however, the left plate is pulled down therewith. This negative shift of the left plate is applied through a 150 ohm resistor to the grid of the left section of the 5965 type tube, which is connected as a cathode follower. The resultant negative going shift of the tube side of the 6.2K ohm cathode resistor is applied through the 47 micro-microfarad condenser and the 150 ohm resistor to the grid of the right section of the 5844 tube to render the right section non-conductive. The resultant rise of potential of the right plate terminal is applied therefrom through a 47 micro-microfarad condenser and a 150 ohm resistor to the grid of the left section of the 5844 tube to render it conductive. The above action of the flipping of conduction from the right to the left section in response to the negative going shift of the applied input B pulse, is almost instantaneous. The multivibrator remains in the flipped position (left side conductive) until the 47 micro-microfarad condensers in the right grid discharges sufficiently through the 2.7 megohm resistor so that the associated grid of the right section of the 5844 rises above cutoff potential. The time constant of the right grid circuit is selected so as to maintain the right section non-conductive for about 12 microseconds. At the end of the 12 microsecond interval, as the right section again starts to conduct, the resulting negative shift of the associated plate is applied to the grid of the left section to render it less conductive. The retroactive coupling between the left and right sections of the trigger is such that an effect, conduction is flipped from the left section to the right section almost instantaneously. An output terminal for the multi-vibrator is connected to the cathode of the cathode follower resistor. It is evident from the above description that there is accordingly generated on the output terminal, for each applied B pulse, a corresponding delayed pulse of 4 microseconds' duration, as indicated in Fig. 28A. These "delayed" B pulses are utilized in a manner that will be described later.

Referring now to Fig. 29, the trigger unit T is conventional in construction and comprises two retroactively coupled triode sections of a 5844 vacuum tube. By proper selection of circuit components, the unit T is so arranged that only one of the triode sections is conductive at a time, in accordance with well-known trigger operation. With the right-hand triode conducting, the trigger is defined as being in an Off position. With the right-hand triode conducting, the associated plate and an output terminal linked thereto, are at some potential below the plate supply potential of 100 volts due to the current being drawn through the right-hand triode section. As a result, a voltage sensitive circuit connected to this output terminal may be accordingly controlled. With the trigger in the cut off state, the plate terminal and an associated output terminal linked thereto are at approximately the plate supply potential of +100 volts. As a result, a voltage sensitive circuit connected to this output terminal may be accordingly controlled. If a negative going waveform is applied to the input terminal of the right triode section, the associated right-hand grid starts to shift negative. As a result, the related triode section is rendered less conductive. The resultant positive shifting of the associated plate is applied through a 100 micro-microfarad condenser to the grid of the left-hand triode section and renders this triode conductive. The resultant negative shifting of the plate of the left-hand triode is then applied through an associated 150 micro-microfarad condenser to the grid of the right-hand triode and renders it less conductive. With the right-hand triode less conductive, the left-hand triode is rendered more conductive. This retroactive action between the left and right-hand triodes continues until the left-hand triode is full conductive and the right-hand triode is non-conductive. This retroactive action is very rapid so that in effect, the application of the negative shift to the right-hand grid, almost instantaneously initiates the "flipping" of conduction from the right to the left-hand triode.

With the left-hand triode conducting, the trigger is defined as being in an On condition. With the trigger On, the plate terminal of the left-hand triode is at a low potential, while the plate output terminal of the right-hand triode is at approximately the supply potential of 100 volts. With this shift of potential of the two output terminals of the trigger, associated circuits connected thereto are controlled accordingly. All triggers T may be reset Off when so desired, by making the −100 volt bias circuit to the right grid more positive. With the bias potential reduced sufficiently the right-hand triode of each trigger T is rendered conductive if the trigger is not already in the Off state.

Referring now to Fig. 30, the AND (&) unit comprises a 6AL5 duo-diode type of tube. The plates of both diode sections are commoned and connected through a plate resistor to a +200 volt supply. If either or both of the cathodes are at some potential below the plate supply potential, the related diode conducts so that the tube side of the plate resistor and an associated output terminal are at some potential below the supply potential. Upon a positive shifting of both input terminals and the associated cathodes above the potential of the plate supply, both diodes are cut off. The tube side of the plate resistor accordingly rises to the plate supply potential and a corresponding output signal results.

Referring now to Fig. 31, the OR unit (O) comprises a 6AL5 duo-diode type of tube. The cathode of both diodes are commoned and connected through a load resistor to ground. The tube side of the load resistor is also connected to an output terminal as shown. The plate of each diode is connected to a related input terminal. If either or both input terminals are shifted above ground potential, the associated diode conducts and the tube side of the load resistor is shifted above ground. A corresponding output indication is accordingly available on the output terminal.

Referring now to Fig. 33, the thyratron AND unit TA comprises a 2D21 thyratron. Each of the two grids of the thyratron are linked to a −100 volts bias potential as indicated. Each grid is also connected to an individual input terminal. The plate of the thyratron is connected through a 5.1K resistor to a 55 volt plate supply. The tube side of the plate resistor is connected to an output terminal as indicated. When both inputs are simultaneously at a potential sufficient to overcome the related grid bias, the thyratron is fired. The firing of the thyratron effects a corresponding drop in potential of the plate, this drop being available at the output terminal for energizing a relay etc.

Referring now to Fig. 32, a diode unit comprises a 6AL5 dual diode type of tube. The plate and cathode of each diode section are connected to related terminals as indicated. The diode units are utilized for isolation purposes etc. as will be later evident.

Referring now to Fig. 34, a read amplifier "RA" comprises a pair of dual triodes type 5965 and 5844, connected as a 2 stage amplifier and a single shot multivibrator. The input signal from a "read" coil of a magnetic head is applied through suitable circuitry between the grid of the left section of the 5965 tube and ground. The resulting amplified and inverted signal generated on the associated plate is applied through a .001 microfarad condenser to the grid of the right section of the 5965 for further amplification. The resulting amplified signal generated on the right plate of the 5965 tube, this signal being in phase with the originally applied input signal, is applied to the left section of the tube 5844. The right hand grid of the 5844 is kept conducting by the 1 megohm resistor returned to +200 v. The static voltage on the left hand grid is determined by the divider network between −100 v. and the right-hand plate. As a positive signal is developed at the right-hand 5965 plate the principle part of the signal is applied through the 100 micro-microfarad capacitor since the diode supplies any charge occasioned by the right-hand plate of the 100 micro-microfarad capacitor falling below ground potential. This results in an extremely rapid turning on of the left-hand triode in the 5844. As the left-hand 5844 plate falls the 150 micro-microfarad transpose condenser from left-hand plate to right-hand grid will cut off the right-hand triode of the 5844. The time constant determined by 1M to +200 v. from right-hand grid 5844 and aforementioned 150 micro-microfarad transpose condenser determine the period that the right-hand 5844 diode remains in the cut off state. The output signal generated on the right plate terminal of the 5844 tube, is available on an associated output terminal through which it is directed to the external circuit desired. It will be noted that by reason of the 4 stages of amplification, the output signal from the right plate of the 5844 tube, is in phase with the originally applied input signal from the read coil.

Referring now to Fig. 35, a Write amplifier "WA" comprises a duel-triode type 6463 tube, or suitable equivalent, and a dual-triode type 5965, with only one section of the latter being used in the Write amplifier circuit. The 5965 triode is conducting at approximately zero bias current. The input signal is applied to the grid of the right section of the 5965 tube in the example shown.

The grid signal rises without affecting the plate current which is already at about maximum for zero grid bias. After decay of the input pulse due to the 22 micro-microfarad and 33K, or suitable equivalent, the input falls sharply causing the grid side of the 22 micro-microfarad input coupling condenser to fall cutting off its triode. A large positive pulse generated at the 5965 plate is augmented by the LC plate tank circuit to produce a large positive grid signal on the left hand 6463 grid, which it will be noted is connected as a cathode follower. The resulting in phase signal accordingly generated on the cathode resistor of the left section of the 6463 tube, is applied therefrom to the grid of the right section of that tube. The output signal resulting on the related plate, this signal being negative, is then utilized to drive the Write coil of a magnetic head, as indicated.

Referring now to Fig. 36, the Sync Amplifier SA is identical with the Read amplifier R (Fig. 34) previously described with the exception that it included an added inverter stage. The inverter stage comprises one-half of a dual-triode tube-type 5844. It will be noted that the output of the right section of the 5844 tube, which is in phase with the input signal applied to the amplifier from the sync or clock track Read head, is not only available on an output terminal indicated as "A pulse output," but also drives the added D.C. coupled inverter stage. The resulting signal output of the inverter stage is available on a so-called "B" pulse output terminal, as indicated, and it will be appreciated that the "B" pulse output is accordingly 180° out of phase with the "A" pulse output. During that portion of the sync track that no teeth are passing under the sync clock track read coil, the so-called sync pie, A pulses are in a low or "Off" state, while the B pulses are in a high or "On" state. This out of phase relationship of the A and B pulse outputs is indicated in Fig. 36B.

There is also provided for the accounting machine, expander units such as shown in Fig. 37. Each of these units, comprises a pair of selenium diodes which have their plates commoned and connectel to an "In" hub, while the cathodes are each connected to a related individual "Out" hub. The expander units are utilized as expansion mediums for any so-called 50 volt cam pulse as will be later evident.

*The clock track pulse*

The addressing device 427 (Fig. 11A) is a counting device which is driven from clock pulses furnished by the previously mentioned so-called clock 163 track of the drum 136. The clock track 163 comprises 600 teeth, 581 of which are magnetized and a group of 19, which are unmagnetized. Each of the 581 magnetized teeth accordingly corresponds to the 581 cells in the card track #1 and #2, while the 19 unmagnetized teeth form the drum area wherein the address device is positively synchronized with the drum position in preparation for the next drum cycle. In most cases, only the first 560 cells of the possible 581 cells of each of the drum tracks are utilized so that each track may be considered to have only 80 addresses. Through inherent delays in the machine, the machine time of the 21 cells 561 to 581 is required to complete operations that may be started in the cells 79 and 80.

As each of the magnetized teeth of the clock track 163 rotates under the clock track read head 164, a signal is induced therein as indicated in Fig. 16. Through each drum cycle, a train of 581 sinusoidal signals is accordingly generated in the head 164. These signals are applied to the grid input of the first stage of a sync amplifier 428 (Fig. 13D). As a result of the input signals applied to the amplifier 428, a train of 581 so-called A pulses (Fig. 16) is generated on the conductor 429. The amplifier 428 includes the inverter stage shown at the extreme right in Fig. 36A. This inverter stage is driven by the generated A pulses to give a train of 581 so-called B pulses on the conductor 403 the latter being 180° out of phase with the A pulses, as indicated in Figs. 16 and 36A. The A pulses are utilized throughout the machine to control and time the writing of information on the drum tracks, and also for other purposes to be later explained. The B pulses are utilized to drive the address device 427 and also for other purposes to be later explained. It will be noted in Fig. 16 that A pulses are generated approximately coincident with the actual teeth of the clock track, while the B pulses are generated approximately coincident with the spaces between teeth.

*The address device*

Referring now to Fig. 13B, the Address Device 427, comprises three conventional ring circuits, a 7 stage ring 432, an 8 stage ring 433, and a 10 stage ring 434. Each of the three rings comprises a number of conventional trigger units 435, one for each stage thereof. The stages of each ring are connected in a well-known manner so only one stage of that ring may be On at any one particular time. A particular stage of a ring is considered to be On when that trigger is conductive on its left-hand side (right plate high).

The 7 stage ring 432 is connected as a closed or recycling ring in that a flipping Off of the 7th stage thereof flips the one stage thereof On to initiate a new cycle of the ring. The 7 stage ring is advanced one stage every 16 microseconds through the medium of the previously mentioned B pulses, which are applied through conductor 430A to a common ring advance conductor 437 linking the grid inputs of the left section of each of the seven triggers thereof. The negative going or trailing edge of each B pulse flips the particular trigger of the ring that happens to be On to its Off stage, but has no effect on the other triggers since they are already Off. As the On trigger flips Off, the resultant negative shift of the right plate is applied through an associated conductor 438 to the grid input of the right section of the succeeding stage trigger to flip the latter On (right plate high).

When a particular stage of a ring is On, the resultant high potential of the right plate terminal thereof is applied through either the right or left-hand section of an associated cathode follower 439 to a related output conductor 440. As a result, during the 116 microsecond period when stage 1 of the seven stage ring 432 is On, the so-called corresponding 1 of 7 (stage 1 of 7 possible stages) output conductor 440 is high in potential; when stage 2 is On, the 2 of 7 conductor 440 is high in potential, as indicated in Fig. 16. The output signal generated on the 1 of 7 output conductor is accordingly referred to as 1 of 7 signal, the output signal generated on the 2 of 7 output conductor is referred to as a 2 of 7 signal, etc. The various stage output signals from the 7 stage ring are utilized in the machine for various timing purposes as will later be evident.

During the 116 microsecond interval when the 1 of 7 stage is On, the 1st or zone 1 cell of the particular drum address is passing the clock track read head 164 (considered purely as a reference point since only the clock track teeth themselves actually rotate directly under the clock track read head). Similarly, when the 2 of 7 stage is On, the zone 2 cell is passing the clock track head (considered purely as a reference point). Consequently, the On time of stage 1 may also be referred to as zone 1 time, the On time of stage 2, zone 2 time, the On time of stage 7, redundancy time, etc. The time required for 1 complete cycle of the 7 stage ring 432 is 7×16 or 112 microseconds which is, of course, equivalent to the time period for 1 complete address (7 cells), of the drum to pass a fixed reference point.

The 8 stage ring 433, which is a closed or recycling ring, is identical to the 7 stage ring except for the additional 8th stage. Each complete cycle of the 7 stage ring, as the 7th stage trigger thereof flips Off, the resultant positive shift of the left plate terminal thereof is applied through the right section of an inverter 442 to a ring advance conductor 443 of the 8 stage ring to advance the latter one stage. Each stage of the ring 433 is accordingly on for approximately 112 microseconds or a period equivalent to the time required for the 7 cells of an address of the drum tracks to pass a fixed reference point. The time required for one complete cycle of the 8 stage ring is 8×112=896 microseconds.

When a particular stage of 8 stage ring is On, the resultant high potential of the right plate terminal thereof is applied through either the right or left-hand section of an associated cathode follower 444 to a related output conductor 445. The signal generated on the output conductor 445 of the first stage of the 8 stage ring is referred to as 1 of 8 signal (1 stage On of 8 possible stages), the signal generated on the output conductor 455 of the 2nd stage of the 8 stage ring, is referred to as 2 of 8 signal, etc. The various stage output signals from the 8 stage ring are utilized in the machine for various timing purposes as will be later evident.

The 10 stage ring 434 is of conventional construction but unlike the 7 and 8 stage rings, it is not connected for recycling. Consequently, the flipping Off of the 10th stage trigger 435 does not flip the corresponding first stage trigger On and if the ring is to again cycle, the first stage must be flipped On from an external source. Each complete cycle (896 microseconds) of the 8 stage ring, as the 8th stage trigger thereof flips Off, the resultant positive shift of the left plate terminal thereof is applied through the left section of the inverter 442 to a ring advance counter 447 of the 10 stage ring to advance the latter one stage. Each stage of the 10 stage ring is accordingly On for a period of 896 microseconds or period equivalent to the time period for 8 complete addresses (of 7 cells each) of the drum to pass a fixed reference point. The time required for one complete cycle of the 10 stage ring is 10×896=8960 microseconds or the time required for 560 cells (80 complete addresses) of the drum to pass a fixed reference point.

When a particular stage of the 10 stage ring is On, the resultant high potential of the right plate terminal thereof is applied through either the right or left-hand section of an associated cathode follower 448 to an output conductor 449. The output signal generated on the output conductor 449 of the first stage of the 10 stage ring is referred to as 1 of 10 signal (1 stage On of 10 possible stages), the signal generated on the output conductor 449 of the 2nd state, is referred to as 2 of 10 signal, etc. The various stage output signals from the 10 stage ring are utilized in the machine for various timing purposes as will be later evident.

Recapitulating the operation of the 3 rings 432, 433 and 434 of the Address Device, the 7 stage ring is stepped 1 stage for each B pulse (16 microseconds), the 8 stage ring is stepped 1 stage for each cycle (112 microseconds) of the 7 stage ring, and the 10 stage ring is stepped 1 stage for each cycle (896 microseconds) of the 8 stage ring. The 7 and 8 stage rings are connected so as to recycle, while the 10 stage ring is not connected to recycle.

Referring now to Fig. 13D, it will be noted that each of the output conductors 449 of the 10 stage ring 434 is connected through an associated network 450 to the 8 output conductors 445 of the 8 stage ring, there accordingly being 10 such networks in all. Referring now to the network associated with output conductor 449 (1 of 10) it is noted that there are provided 8 individual diodes (units 452), the cathode of each of which is connected to a related one of the 8 output conductors 445 of the 8 stage ring. The plate of each of the diodes 452 is connected through an associated resistor 453 to 1 of 10 conductors 449. The plate terminal of the diode 452 connecting a 7.5K resistor to the 1 of 10 conductors (the cathode of the diode being connected to the 1 of 8 conductors) is connected to the "1" reading exit hub 364 (AC–AE; 1 on Fig. 12A) on the control panel 127, it being recalled that this "1" reading exit 364 is also connected to the "1" segment 362 of the card feed emitter 363. Similarly, the plate terminal of the diode 452 connecting a 7.5 resistor to the conductor 449 (1 of 10), with the cathode terminal of the diode being connected to the 2 of 8 conductor 445 is connected to the "2" reading exit hub 364 and so forth, as indicated, with the 8 of 8 conductor diode 452 being linked to the "8" reading exit hub. The 2 of 10 network (not shown) is similarly constructed with its 8 diodes feeding reading exit hubs "9" through "16." The networks associated with the succeeding conductors of each of the 10 stage ring are similarly arranged with the diodes thereof controlling corresponding reading exit hubs, the diodes 452 of the final network associated with the 10 of 10 conductor 449, feeding associated reading exit hubs 73 through 80, as shown in Fig. 13D.

A positive output is available from a reading exit hub 364 only upon the coincident application of output pulses from the 10 and 8 stage rings to the 7.5 resistor connected to the plate and cathode of the diode 452 respectively associated with that particular hub 364. For example, with the 1 of 10 stage of the 10 stage ring On approximately +100 volts is applied to the 1 of 10 conductors 449 and the 7.5K resistors leading to the plates of the 8 diodes. If the 1 of 8 stage of the 8 stage ring is also considered to be On, approximately +100 volts from the associated 1 of 8 output conductor is applied to the cathodes of the diodes asociated with the "1," "9," "17," "25," "33," "4," "49," "57," "65" and "73" reading exit hubs. The only diode unit 452 which has both its plate and cathodes of a diode thereof positive under these conditions, is the "1" reading exit diode and its plate terminal is accordingly at approximately +100 volts. This +100 volt potential is, in turn, also present on the associated #1 reading exit hub 364. The "1" reading exit hub is at 100 volts for approximately 112 microseconds whereupon the advance of the 8 stage ring from its 1st to 2nd stage, deactivates the "1" hub and activates the following "2" reading exit hub. It is evident therefore, that if the 8 and 10 stage rings are considered to both start with their 1st stages On simultaneously, the 80 reading exit hubs 364 are activated in sequence as the rings are advanced. During the time that each address hub is activated, 7 cells of the drum track or one address position, rotates past any fixed reference point.

It is obvious that if the 7, 8 and 10 stage rings are each reset to their 1st position prior to the generation of the first B pulse of the 581 train of such pulses, the reading exit hubs 364 will be energized, one by one, in sequence with the passage of each related 7 cell address of the drum past the clock track read head as a reference point. At the end of the 560th B pulse, the "80th" reading exit hub is deactivated by the flipping Off of both the last stages of the 8 and 10 stage ring. The flipping Off of the 8th stage of ring 433 flips the first stage thereof On. The flipping Off of the 10th stage of the 10th stage ring ends the operation of the 10 stage ring since it is not connected to recycle. The B pulses 561 through 580 cause the 7 stage ring and in turn the 8 stage ring to advance as before so that at the end of the 580th B pulse, the 7 of 7 stage of the 7 stage ring is On, while the third stage of the 8 stage ring is On. During this period from 561 to 581, no output is possible from any reading exit hub 364 since all stages of the 10 stage ring are Off.

The output signal available at each of the reading exit hubs 364 during its corresponding address time of a drum cycle, may be plugwired therefrom to initiate any of the possible accounting machine operations on the information stored in the corresponding address of the drum. The control of machine functions under plugwire connections from the reading exit hubs, will be described later in detail. It is thus evident that the address device is in effect, utilized to select the particular operation desired, at the unique time identified by the selected address.

*Address device synchronization*

The Address Device 427 is synchronized with the rotational position of the drum 136 immediately prior to each drum cycle in the following manner. During that portion of each drum cycle when the 19 tooth unmagnetized portion of the clock track is rotating past the clock track read head 164, the B pulse output line 430 is accordingly maintained by sync amplifier 428 at its maximum potential of +100 volts, while the A pulse output line 429 is maintained at its minimum potential of +50 volts, as indicated in Fig. 16. Referring now to Fig. 13B, the steady positive potential of the conductor 430 is applied through conductor 430A to the one input of an "AND" circuit 454 (Fig. 13B). If it is assumed for the present that a so-called Line Indicate Relay contacts R1–*a* open (the purpose of the relay R1–*a* will be later explained), +100 volts is applied from a power source 455, through a resistor 457 (Fig. 13B), the right section of the cathode follower 439, to the other input of the "AND" circuit 454 to render the latter operable. The operation of the circuit 454 is such that it is inoperable due to small time duration changes because of the "and" circuit 454 load resistor and the distributed capacity existing on the output of the "and" circuit. At the time of the 19 unmagnetized teeth, the "and" circuit 454 output tends to float up to +100 volts because of the longer period of time that the "and" inputs are at +100 volts. The resultant positive output potential of "and" circuit 454 is accordingly applied during the 19 tooth unmagnetized portion to the grid input of the left section of a so-called zero trigger 458.

As the first tooth of the clock track rotates under the clock track read head 164, the conductor 430A shifts negative (from +100 volts to +50 volts) and flips the "7" of "7" stage trigger Off, this action in turn, flipping the "1" of "7" stage trigger On in the usual manner. The negative shift of conductor 430A also deactivates the "AND" circuit 454 (output goes negative) and accordingly flips the trigger 458 Off (right plate low). The resultant negative shift of the right plate terminal of trigger 458 is applied through the right section of the follower 459, and a conductor 460 to the right grid of the 1 of 10 trigger 435 to fiip it On, and through the left section of diode unit 463 to the left plate of the "1 of 8" trigger to flip it On. It will be recalled that the "3 of 8" trigger was On at the end of the previous drum cycle as a result of the 3 extra cycles of the 7 stage ring 432 effected by the 561 through 581 B pulses. The 7 of 7 stage going off, as previously described, turns off the 3 of 8 stage. The 4 of 8 stage tends to turn on due to the negative shift of the right hand plate of 3 of 8 connected to the right hand grid of 4 of 8, but is prevented by the negative shift of the conductor 460 applied through the right section of diode unit 463 and a conductor 463A to the right plate of the "4" of "8" trigger to keep it Off. With the 1 of 7, 1 of 8 and 1 of 10 trigger of the address device now On as a result of the passage of the first tooth of the clock track under the head 164, the address device 427 and drum position are in synchronism.

As the second tooth of the clock track moves under the read head 164, the trailing or negative going edge of the 1B pulse (B pulse generated as a result of the 1 tooth of the clock track) on the conductor 430A flips the 1 of 7 trigger Off which in turn flips the 2 of 7 trigger On. The "counting" action of the address device 427 continues thereafter in the manner previously described. The negative going edge of the 1B pulse is also applied through the conductor 430A to the right grid of the trigger 458 thus flipping it Off (right side high). It is evident, therefore, that the trigger 458 is On for only the 16 microsecond interval from the beginning of the 1A pulse (the A pulse generated as a result of the 1 tooth of clock track) to the end of the 1B pulse. The 16 microsecond interval during which the trigger 458 is On may be referred to as 1AB time since it is the interval spanned by the A and B pulse generated as a result of the passage of the 1 tooth of the clock track under the read head 164. This 16 microsecond interval is also a 1 of 7 cell time of address No. 1. If a positive pulse of duration of 1AB is referred to as a 1AB pulse, the negative signal generated by the right plate of trigger 458 may be referred to as a negative 1AB pulse. The output from right plate of trigger 458 is positive at all times except 1AB time and this positive pulse may be referred to as a $\overline{1AB}$ (not 1AB) pulse. The above type of pulse nomenclature is also utilized hereinafter in reference to other pulses.

The $\overline{1AB}$ pulse generated by the right plate of trigger 458 not only synchronizes the Address Device to the drum position, but is also applied to the binary connected input of a so-called alternate drum cycle trigger 465. This trigger 465 is accordingly flipped between On and Off positions on alternate drum cycles. The plate output of the right section of trigger 465 is applied through the left section of the follower 459 to a conductor 467. The conductor 467 is accordingly at a low potential during one drum cycle and a high potential during the following or succeeding drum cycle. The positive potential of conductor 467 during the alternate drum cycle is utilized as a gating means for various circuits, as will be later evident.

*Card read-in to card track*

As mentioned previously, it requires the combined action of the so-called card feed emitter 363 in combination with the address device 427 to properly route the entry record information in each column thereof, as sensed, to the corresponding address of either card track #1 or #2. It will also be recalled that the movement of a record card under the sense brushes 418 by the rollers 393 and 394 is effected at a rate of one column per complete drum cycle (10 milliseconds). However, it is only during 6 milliseconds of each 10 millisecond drum cycle, that the sense brushes 418 actually engage the contact roll 394 through the particular perforation or perforations present in the column being sensed.

Referring now to Fig. 2, it will be recalled that the card feed emitter 363 comprises the common contact segment 361 and 80 individual contact segments 362 arranged adjacent thereto. Each one of the 80 segments 362 is connected to one corresponding one of the 80 reading exit hubs 364, it being recalled that each hub 364 is also connected to a corresponding output position of the address device 427 (see Fig. 13D). The wiper members 358A and B of the emitter are mechanically synchronized with the card feed means in a manner previously explained so that during the above-mentioned 6 millisecond interval when the perforation(s) in column 1 of the entry record is under the related one of the sense brushes 418, the "1" segment 362 is connected to its common segment 359 by the associated wiper finger 358 (358A and 358B). Similarly, during the next drum cycle when the perforation(s) in column 2 is under the related one of the sense brushes 418, the wiper 358 engages the "2" segment 362 of the emitter 363, etc.

Even though the wiper 358 connects the common 361 to each segment 362 for an appreciable portion of the related drum cycle, it is only during the relatively short 112 microsecond interval when the corresponding reading exit hub 364 is activated to the On +100 v. state, that a circuit is completed therethrough to effect the sensing of the perforated data in the corresponding column of the entry record. During this 112 microsecond interval, the record column information is sensed, translated into the 6 bit (+ redundancy) coding, and recorded serially in the corresponding address of the #1 or #2 card track of the drum 136 as the cells thereof rotate under the associated write heads in the sequence zone 1, zone 2, 1, 2, 4, 8, and redundancy.

The circuitry by which the above sequence of operation is effected will be explained by describing a representative sense operation. The representative operation will include a description of the manner in which the machine is "started" or put in operation. For example, assume that column 1 of the bottom record in a stack of entry records is perforated to represent an A (12 and 1 index points contain perforations). The operator places the stack in the hopper 368 and turns the power switch 468 (Fig. 14A) of the machine On. With the switch On, the drive motor 113 is energized to continuously rotate the drum shaft 134, and the shafts 184, 174, and 181, etc., through the various mechanical linkages previously described. With the shafts 174 and 181 rotating, the associated cam actuated contacts CRA1 through 7, the CRB1 through 4, respectively, are being actuated as indicated in Fig. 15A. With the clutch 189 and 372 still inoperative at this time, the shafts 188, 371, and 299, and their associated cam actuated contacts PS1 through 13, CF1 through 11, and ES1 and ES2 are in their "latched" position as indicated to the left in Fig. 15A.

With the switch 468 On, a power supply 469 is also energized to supply 6.3 volts A.C. between terminals 470 and 471 thereof, and to supply the D.C. potentials of +200 volts, +100 volts, −100 volts, and +55 volts on related terminals 473, 455, 474, and 476 respectively, a terminal 477 serving as the ground return for the supply.

The 6.3 volts is applied from the terminals 470—471 to the filament circuits of the various electronic tubes utilized in the machine. The 6.3 volts is also applied to a heater element 479 of a thermal type time delay relay 480. After a time interval sufficient for the heaters of the electronic tubes to reach proper operating temperature, the temperature of the heater 479 of the relay 480 is such as to close the associated thermal contacts 481 thereof. With the contacts 481 closed, a circuit is completed from the −100 v. terminal 474, through a conductor 482, a resistor 484, the contacts 481 now closed, and a D.C. power relay 485 to ground. The resultant energization of the relay 485 causes its associated contacts AU, AL, BU, and BL to close. The AU and AL contacts are utilized in this embodiment to provide adequate current carrying capacity.

With the contacts AU and AL closed, a circuit is completed therethrough from the +55 v. terminal 476 to a terminal 486 of the electronic unit of the accounting machine, and also through a conductor 487 to a terminal 489. The terminal 486 is connected internally to all the various electronic circuits requiring a +55 volt potential. The terminal 489 serves as a voltage supply point for various controlling relay circuits etc. of the machine. Similarly, with the contact BL closed, the +100 v. terminal 455 is connected therethrough to a related supply terminal 490 of the electronic unit, and also through a conductor 491 to the relay circuits, while the contacts BU closed, the +200 volt terminal 473 is connected therethrough a related supply terminal 492 of the electronic circuits.

With the stack of records in the hopper 368, a hopper contact 494 (Fig. 14B) is closed thereby to complete a circuit from the terminal 489, through a conductor 495, a conductor 496 through contact 494, a hopper relay R2, through a conductor 497 to ground. The resultant energization of the relay R2 causes its associated contacts R2–*a* and *d* to close, R2–*b* to open, and R2–*c* to transfer. The purpose of each of these contacts will be later evident.

The operator then depresses a so-called start key 499 which causes associated contacts 499*a* and 499*b* to open and close, respectively. The arrangement of the start key 499 is such that the contact 499*a* opens before the contact 499*b* actually closes. With the contact 499*b* closed, a circuit is completed from the terminal 489, through a conductor 495, the contact R2–*a*, now closed, through a final total switch 500, assumed in the Off position indicated in Fig. 14B, the start key contact 499*b*, now closed through a "Stop" contact 501, assumed closed, the normally closed contacts R3–*a* of a Check Relay R3, a Run Relay R4 to ground. The resultant energization of the Run Relay R4 causes the associated contacts R4–*a*, *b*, and *c*, to close. With the contact R4–*a* closed, a circuit is completed from the power terminal 489, the conductor 495, the hopper contact 494, now closed, a conductor 502, a cam actuated contact PS–13 now closed (see Fig. 15B), the normally open side of the contact R2–*c* now closed, the contacts R4–*a*, the stop key contact 501 etc., to hold the Run Relay R4 energized.

Upon the release of the start key 499 by the operator, the associated contacts 499*a* and *b* restore to their normal open and closed positions, respectively. The opening of the contact 499*a* breaks the pickup circuit to the Run Relay R4 but this is of no consequence since it is now being held energized through the hold circuit traced above. With the contact 499*a* closed, a circuit is completed from the power terminal 489, through the conductor 495, the contact 499*a*, through the cam contact CRB–1, when closed (see Fig. 15B) through the cam actuated contacts PS–12, now closed as the shaft 188 is "latched," through the contact E–1 now closed as the shaft 299 is in its home position, through the contact R4–*c*, now closed, through the normally closed contact R1–*a* of the Line Indicate Relay R1, through the normally closed contacts R5–*c*, R6–*c*, R7–*c* of so-called Forms Skip Control Relays R5, R6 and R7 respectively, through a so-called clutch control relay R8 to ground. The resultant energization of the relay R8 causes its associated contacts R8–*a* and *b* to close. After the contacts CRB–1 open, the relay R8 is held energized for approximately 1½ drum cycles through a circuit extending therefrom through the associated contact R8–*a*, a conductor 504, and the cam actuated contact CRB–2, to the terminal 489.

With the contact R8–*b* closed, the closing of contact CRB–3 (see Fig. 15A) completes a circuit from the terminal 495, through the contacts CRB–3, the contacts R8–*b*, the normally closed contacts R9–*b* of a so-called multi-line read relay R9, through the normally closed contacts R10–*b*, R11–*b* and R12–*b* of associated so-called Minor total, Intermediate total, and Major total relay R10, R11, and R12, respectively, through a plugwire assumed connecting hubs 505 so-called normal hub and 506 so-called common hub (coordinates Y—44, 45 in Fig. 12B) on the control panel, through the controlling magnet 373 of the card feed clutch 369 to ground. A parallel circuit is also completed from the contacts R8–*b*, through a conductor 507, the controlling magnet 204 of the program shaft clutch 189, to ground. The resultant energization of the magnets 373 and 204 actuates the associated clutches 369 and 189, respectively, to simultaneously engage the associated program shaft 188, and card feed shaft 371 with their rotational driving sources, in a manner previously explained. The program shaft 188 and card feed shaft 371 are engaged at the beginning of a drum cycle which will be referred to as drum cycle 0 hereinafter and is so indicated in Fig. 15A. The subsequent drum cycles following drum cycle 0 are referenced in ascending order as also indicated in Fig. 15A.

With the card feed shaft 371 in rotation, the card picker 392 is actuated as previously explained and the bottom card having an A in column 1 is advanced from the hopper 368. Also, with the shaft 371 in rotation, the closing of the associated contact CF–1 at the beginning of drum cycle 2 completes a circuit from the power terminal 489, through the conductor 495, the hopper contact 494, the contacts R13–*b* of a so-called card lever relay R13 which are closed until the first record fed from the hopper engages the roller 403, through the contacts CF–1, the normally closed contacts R14–*b* of a so-called jam relay R14, through a so-called first card relay R15 to ground. The resultant energization of the relay R15 causes its associated contacts R15–*a* and *b* to close, and R15–*c* and *d* to open.

After the contact CF–1 opens to drop out, the pick-up circuit of the relay R15 at drum cycle 8.6, the relay R15 is held energized through a hold circuit extending from the power terminal 489, through conductor 495, through a cam contact CF–2 and the contact R15–*a*, until the end of drum cycle 0 of the subsequent program and card feed shaft cycle when CF–2 opens. The purpose of each of the other contacts of the relay R15 will be later evident.

With the program shaft 188 in rotation the closing of the cam actuated contact PS–1 at the beginning of drum cycle #14, completes a circuit from the power terminal 489, through conductor 495, through the contacts PS–1 (Fig. 14C), through a latch pick-up coil of the line indicate relay R1 to ground. The impulsing of the latch pick-up coil of relay R1 causes its associated contacts R1–*c* and *d* to be latched closed and R1–*a* and *b* to be latched open. With the contacts R1–*a* open, the pickup circuit to the clutch control relay R8 (Fig. 14B) is disabled. With the contacts R1–*b* open (Fig. 13B) the address device 427 and drum position are synchronized as previously described in detail. Prior to the opening of contacts R1–*b*, a +55 volt clamp potential is applied therethrough, through the right section of follower 439, a conductor 928, and the left section of diode unit 462 to the first stage of the 7 stage ring, thus preventing advance of the ring which, in turn, prevents advance of the associated rings. With contacts R1–*d* (Fig. 14A) and R14–*e* closed, the —100 v. bias from terminal 479 is reestablished to the address rings to permit normal operation thereof. The purpose of the contacts R1–*c* will be later evident. The contacts R1–*a*, *b*, *c*, *d*, remain in their above described latched positions, until an associated latch trip coil of relay R1 is impulsed in a manner that will be later explained.

As the leading edge of the record being advanced from the bottom of the hopper engages the rollers 393 and 394 shortly after the beginning of drum cycle 11, the card lever 494 is closed in a manner previously explained. Referring again to Fig. 15B, the closing of cam contact CF–3 at the beginning of drum cycle 14.0 completes a circuit from the power terminal 489, through the conductor 495, the conductor 496, the cam contact CF–3, the contact 494, the Card Lever Relay R13 to ground. The resultant energization of the relay R13 causes its associated contacts R13–*a*, *c*, *d*, and *g* to close, R13–*b* and *c* to open and R13–*f* to transfer. After CF–3 opens, the CL relay R13 is held energized by a circuit extending from the power terminal 489 through the conductor 495, the conductor 496, the cam contact CF–4 and the contacts R13–*a*, until drum cycle 14.2 time of the next cycle of operation of the program and card feed shafts. By this time, the subsequent card will be engaging the rollers 393 and 394 to re-establish the pickup circuit through contacts 494 and contacts CF–3 to the relay R13 so that, in effect, the CL relay R13 once energized, remains energized as long as nothing interferes with the feeding of records from the hopper 368. The first card relay R15 is de-energized when the hold circuit (CF–2) thereof is broken at the end of drum cycle 1 of the second card feed cycle and with the contact R13–*b* open as described above, the pickup circuit to the relay R15 cannot be re-established. Thus, under normal operation, the relay R15, as its name implies, is energized for only the first card feed cycle. The circuitry controlled through the various contacts of the relay R15 during the first card feed cycle will be later explained.

Returning again to our representative operation, with the program shaft 188 rotating, the emitter shaft 299 is engaged at the beginning of drum cycle 13, as indicated in Fig. 15B, through action previously explained in detail. With the shaft 299 engaged, the various associated emitters advance, step by step, as indicated in Fig. 15A.

Shortly before the end of drum cycle 14 through part of the 15th drum cycle, column 1 of the entry record is positioned under the sense brushes 418 and the contact wiper 358 of the card feed emitter 363 is engaging the "1" segment 362 thereof as indicated in Fig. 15A. Column 1 of the entry record in our representative operation is perforated to represent an A (12 and 1 index points contain perforations). With the emitter 363 and the entry record in the above positions, the positive pulse generated on the reading exit hub 362 during address 1 time of drum cycle 15, is applied therefrom through the 1 segment 362 of the emitter 363, the contact wiper 358, the common 361, the contacts R13–g now closed as the card relay R13 is energized, through a conductor 509, the right-hand section of a follower 510 (Fig. 13A), a conductor 511, a cathode follower 514, through the conductive roller 394 and the 12 and 1 index point sense brushes engaged therewith, through the perforations in column 1 of the record, to a translation circuit generally designated 515 in Fig. 13A.

The 12–1 sensed coding is translated in the circuit 515 to the equivalent, zone 1, zone 2, 1, and redundancy coding (see Figs. 22A and B) as follows: The circuit from the 12 sense brush 418 continues through a conductor 516, a conductor 516A, and a so-called zone 1 OR circuit 517 to condition the one input of a zone 1 AND circuit 519. The 12 brush circuit is also applied through the conductor 516 and a so-called zone 2 OR circuit 520 to condition the one input of a zone 2 AND circuit 521. The circuit from the "1" brush continues through a "1" OR circuit 522 to condition the one input of a "1" (6 bit code) AND circuit 523. The one input of each of the zone 1, zone 2, and "1" AND circuits 519, 521, and 523, respectively, are accordingly conditioned positive for the 112 microsecond address 1 time interval of drum cycle 15.

During each address of the drum it will be recalled that the 7 stage ring is advanced through 1 complete cycle. During the first 16 milliseconds (zone 1 time) of the 112 millisecond address #1 interval with stage 1 of the 7 stage ring on, the 1 of 7 signal is applied to the other input of the zone 1 AND circuit 519. With both inputs positive, circuit 519 is rendered operable during so-called zone 1 time and applies a positive signal through an OR circuit 528, a so-called card read conductor 530, the left section of a follower 531 to the one input of an AND circuit 532. Referring now to Fig. 16, it will be recalled that during the 16 microsecond interval when a single stage of the 7 stage ring is On, a related A and B pulse is generated on conductors 429 and 430, respectively, the A pulse being generated during the first 8 microseconds, with the B pulse being generated during the second 8 microseconds.

With the 1 input of the AND circuit positive 532 (1 of 7 time), as described above, the application of the associated A pulse through conductor 429 to the other input thereof, actuates the AND circuit 532 (Fig. 13C). The resultant A pulse generated on the related output thereof is applied through an OR circuit 533, a conductor 535, the right section of a follower 536, and a conductor 529 to the write amplifier 538. The resultant output of the amplifier 538 is applied therefrom to the transfer contact R16–*a* of a so-called alternate card relay R16. There is also provided another so-called alternate card relay R17. If in our above example we assume the contacts R17–*a*, *b*, *c* and *d* of the one alternate card relay R17, and the contacts R16–*a*, *b*, *c* and *d* of the other alternate card relay, in the positions indicated in the drawings, the following action takes place. The previously traced write circuit continues from the contact R16–*a*, through the normally closed side thereof and through the write coil of the #1 card track head 140, thus writing a binary 1 in the zone 1 position of address #1 of card track #1. It will be noted that with the contact R17–*d* in the above assumed normal position, the read coil of the head 141 of card track #2 is connected therethrough to the input of the read amplifier. Consequently, simultaneous with the writing of information on card track #1, information may be read from card track #2 so that accounting operations may be performed thereon, in a manner that will be later evident.

At 2 of 7 (zone 2 time), of drum cycle 15 our first card feed cycle, a 2 of 7 signal on related conductor 440 (2 of 7) interrogates the zone 2 AND circuit 521, the one input of which is already conditioned positive as previously described. A 2 of 7 signal is accordingly generated on the card read conductor 530 and in the same manner as previously described for the 1 of 7 signal (zone 1) and causes a binary 1 to be written in zone 2 of the #1 address of card track #1. At 3 of 7 ("1" time), a 3 of 7 signal on related conductor 440 interrogates the previously conditioned "1" AND circuit 523 and effects the writing of a binary one in the "1" area of the #1 address of card track #1.

Thereafter each of the sequentially generated 4 of 7, 5 of 7, and 6 of 7 signals generated on related conductors 440, interrogate an associated "2," "4," and "8" AND circuits 541, 542, and 543, respectively, but, since the other inputs of each of these AND circuits are unconditioned, no card read signal is generated on conductor 530. Consequently, the "2" (4 of 7), "4" (5 of 7) and "8" (6 of 7) cells of address #1 of the #1 card track remain blank or, in effect, representative of a binary zero (the alternate state from a binary 1).

It will be evident upon examination of the translation circuit of Fig. 13A, that if column 1 of the entry record contains any number, letter, or special character other than the representative letter "A" described, corresponding ones of the zone 1, zone 2, 1, 2, 4 and 8 AND circuits are conditioned as determined by the IBM code representation in the sensed card column. Thereafter, the sequential interrogation of these conditioned AND circuits by the 7 stage ring 432, effects the generation of corresponding serial signals in the 6 bit coding on conductor 430, as indicated in the second column from the left in the chart of Fig. 38.

The number of pulses generated on conductor 530 during zone 1 time (1 of 7) to the end of "8" time (6 of 7) during the sensing of the information in each card column and its translation and writing in a particular address of the card track, are counted by a so-called redundancy trigger 545 (Fig. 13C) to determine if a binary one is or is not required in the redundancy (7 of 7) cell of the particular address in which the writing is being effected. It will be recalled that it is desired to always have a "word" in an address comprised of an even number of binary ones. In our above example wherein an A is read in column 1 of the record, which gives equivalent coding in the 6 bit code of 3 binary bits (a zone 1, zone 2 and 1 bit), a redundancy bit is required. If the trigger 545 is assumed to be off (right plate low) the trailing edge of the first A pulse (zone 1 time) in our above example, is applied from the AND circuit 532 through conductor 546 to the binary connected input of trigger 545 to flip it on (right plate high). The trailing edge of the next A pulse (zone 2 time), flips the trigger back off, while the final A pulse at ("1" time) again flips the trigger on. With trigger 545 accordingly on at the end of "8" time (6 of 7), the high potential of the right plate thereof is applied through the left section of follower 526 to the input of the right section of AND unit 547. The units 547 and 548 are connected so as to form a 3-way AND circuit. A 7 of 7 pulse (redundancy bit time) is applied from conductor 440 through a conductor 550 to the input of the left section of unit 547. With two of the inputs of the 3-way AND circuit positive, the application of an A pulse from conductor 429 to the right section of unit 548, actuates the 3-way AND circuit. The resultant A pulse generated on the output thereof is applied through a conductor 551, the OR circuit 533, the conductor 535, the right section of follower 536, etc., and accordingly causes a binary 1 to be written in the 7th cell (redundancy bit) of address #1 of card track #1. This is the desired result in our particular example.

At the end of address 1, the resultant negative shift of the #1 reading exit hub 362 is applied through conductor 509, the follower 510, and a conductor 552, to the left grid of the redundancy trigger 545 to reset it off, if it is not already off.

Thereafter, with the advance of the second column of the record into the sense position and the simultaneous advance of the card feed emitter 363 to its #2 position, the information in column 2 of the entry record is sensed, translated, and written in address #2 of card track #1 during address #2 time of that drum cycle (drum cycle #16). This operation continues over and over so that at the end of 80 drum cycles, the information from the entire 80 column entry record is written on card track #1.

Referring now to Fig. 39, there is shown a graphic representation of the operation and interaction of the various circuits described above in sensing the representative letter A (12–1 perforation) in column 1 of the record, writing the equivalent binary coded information in address #1 of the card track. Similar circuit operations are effected during the sensing of the remaining 80 columns of the record information.

*The digit emitter*

Referring now to Fig. 13A, it will be noted that each of the 12 individual sensing brushes 418, in addition to being connected to a related input of the translation circuit 515, as previously described, is also connected through an associated conductor 562 to a related so-called digit emit hub 563 (coordinates A; 55 to 64 and B, C; 55 in Fig. 12B) on the plugboard. Each of the hubs 563 is referenced 12, 11, 0, 1, 2, etc. to correspond with the particular one of the 12 sense brushes to which it is connected. The 12 hubs 563 and allied circuitry are referred to as the digit emitter and it is obvious that as each column of the record is sensed, the hub 563 corresponding to the perforated position in the column, is activated or "emits" that assigned digit therefrom.

The digit emitter hubs 563 may be plugwired to various control circuitry for the accounting machine, in a manner to be explained, so as to permit adjustment in the operation of the machine in any predetermined manner, in direct correspondence with the digit emitted.

*The alternate card relays*

During the actual sensing of the above entry record, it was assumed that the contacts R17–*a*, *b*, *c*, *d*, and R16–*a*, *b*, *c*, and *d* of the alternate card relays R16 and R17 were in the positions indicated in Figs. 13C and 14A. As a result, the information in the record card was recorded in card track #1, while any information present in card track #2, as a result of previous operations, was simultaneously available to the machine for accounting purposes. During the actual sensing of the next entry record, the contacts R17–*a* through *d*, and R16–*a* through *d* of the alternate card relays R16 and R17 are transferred from the position indicated in Figs. 13C and 14A, in a manner to be explained. With the contacts R16–*a* and R17–*d* in their transferred position, the tracks #1 and #2 are, in effect, interchanged so that track #2 is available for loading from the entry record being sensed, while the card track #1 information from the previously sensed record is available for accounting purposes. The alternate card relays R16 and R17 are energized alternately in successive card feed cycles. The controlling circuit by which the alternate card relays R16 and R17 are alternately energized to effect the interchange of functions of the #1 and #2 card tracks in each successive card feed cycle, and also the controlling circuitry by which required associated functions are effected, is explained hereinafter.

During the second card feed cycle in our representative operation and prior to the actual engagement of the second entry record with the roller 393 and 394, the closing of the cam contact CF–11 (Fig. 14B) at the beginning of drum cycle #3, completes a circuit from the power terminal 489, through the normally closed contacts R14–*c* of Jam relay R14, the contacts CF–11, a conductor 565, the normally closed side of the R17–*a* contacts, through a latch pickup coil of the relay R16 to ground. The resultant energization of the pickup coil relay R16 causes its associated contacts R16–*a* and *d* to transfer, R16–*b* to open, and R16–*c* to close. These points remain latched in these positions until an associated latch trip coil of relay R16 is energized.

With the contact R16–*d* closed, as described above, the closing of the cam contacts CF–8 from end of drum cycle 8 through 10 of the second card feed cycle for our representative operation, completes a circuit from the power terminal 489, through the conductor 495 (Fig. 14B) the conductor 496, a conductor 566, the contacts CF–8 (Fig. 13C), a resistor 567, the normally closed side of the contacts R17–*b*, the normally open side of the contacts R16–*c*, now closed as described above, through the erase coil of the head 141 of card track #2 to ground. As a result, any information previously recorded in card track #2 is completely erased from all addresses thereof prior to an actual writing of the second entry record information therein, in a manner to be explained.

With the closing of cam contact CF12 (Fig. 14B) at the beginning of drum cycle #10 of the second card feed cycle, a circuit is completed from the power terminal 489, through conductor 495, the normally closed side of the contacts R14–*c*, the contacts CF12, a conductor 568, the normally open side of the contacts R16–*d*, now closed, the latch trip coil of the relay R17 to ground. The resultant energization of latch trip coil of relay R17 causes its associated contacts R17–*a*, *b*, *c*, and *d* to transfer. These contacts remain in the latter positions until an associated latch pickup coil of R17 is energized.

With the contacts R16–*a* transferred as described above, the write amplifier output is accordingly connected therethrough to the write coil of card track #2 during the second card feed cycle, while with the contacts R17–*d* transferred, the read coil of the head 140 of the card track #1 is connected therethrough to the input of the read amplifier. Consequently, as the second entry card data is loaded into card track #1, the data in card track #1 resulting from the first entry record, is available to the machine for accounting purposes.

During the initial portion of the third card feed cycle, the latch trip coil of the relay R16 is picked up by the closing of contacts CF–11. The associated contacts of relay R16 are accordingly restored to their normal positions as indicated in the drawings. With the contact R16–*b* in its normal position, the erase impulse is applied from contacts CF–8 through the normally open side of the contacts R17–*b*, still transferred at this time, through the contacts R16–*b*, now closed, to the erase coil of the head 140 of the #1 card track. As a result, the data from the first entry record is erased therefrom. With the contacts R16–*d* in their normal position, the closing of cam contacts CF–12 impulses one latch pick coil of relay R17 thus transferring the associated contacts. With the contacts of the relays R16 and R17 accordingly in above described positions during the remainder of this card feed cycle, the 3rd entry card data is loaded into the #1 card track, in a manner previously explained, while the #2 entry record data in card track #2 is available to the machine for processing. This interchange of functions of card tracks #1 and #2 continues during each succeeding card feed cycle by reason of the action of the relays R16 and R17.

*The print device*

Figure 6:
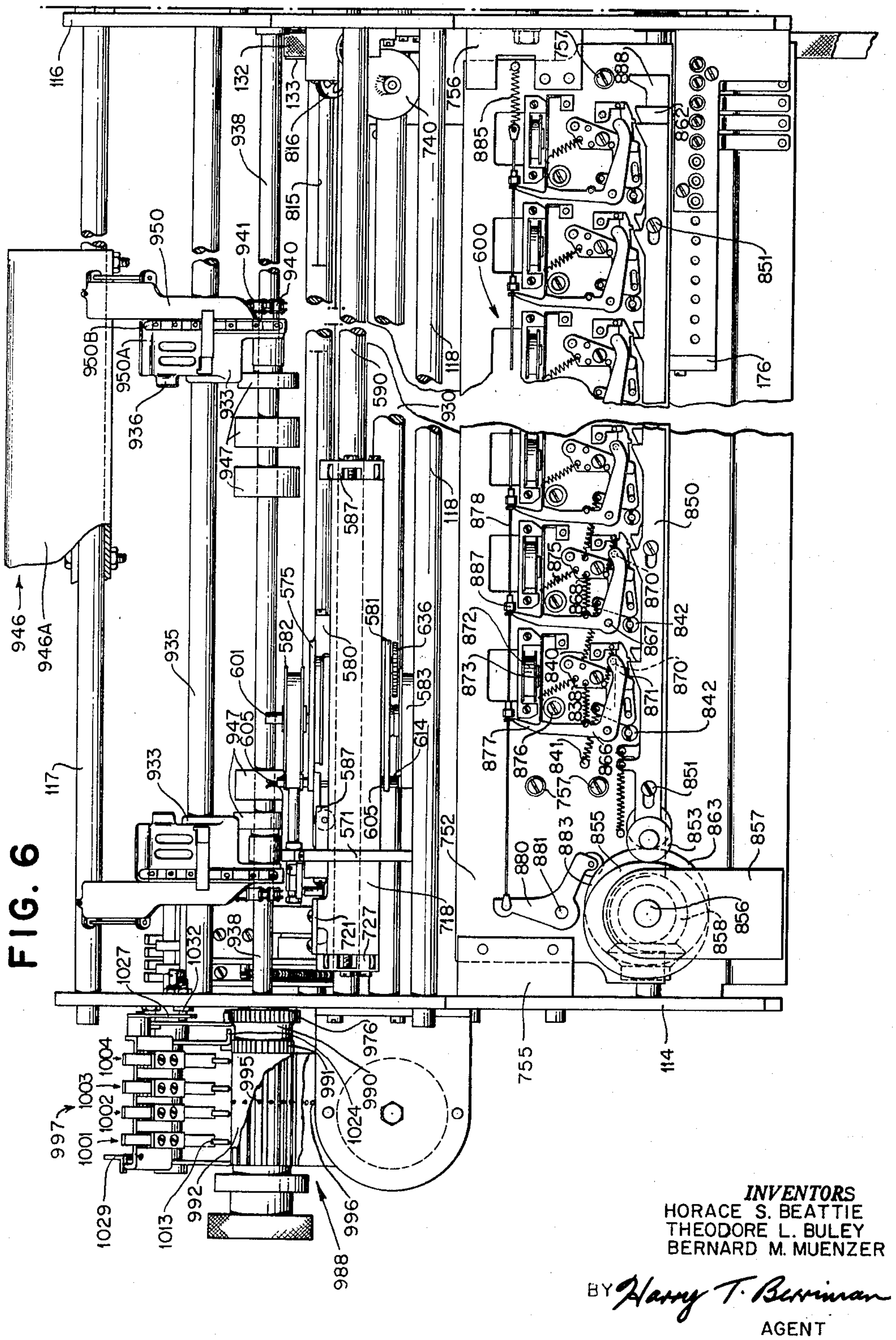
Fig. 6 is a front elevation view of the print mechanism.

Referring now to Figs. 5 and 6, the print mechanism of the accounting machine includes the previously mentioned supporting left end plate 114 and right end plate 116 which are tied together by cross rods 117, 118, and 119, and the cross member 120, the right end plate 116 being rigidly spaced from the frame member 103 of the machine by spacers 121. The print mechanism includes a print element carriage, generally designated 570 in Fig. 1, the carriage comprising parallel frame members 571 and 572 which are tied together by cross rods 573. The plates 571 and 572 are also tied together by structure comprised of a top plate 575, which is secured to the right end frame 572, the plate 575 in turn being rigidly fastened through a cross member 577 to the left end plate 571. Rigidly spaced parallel to the top plate 575 by a tie member 578 and a tie block 579, is a bottom plate 581. The structure comprised of the top plate 575 and bottom plate 581 supports spools 582 and 583 for an inked ribbon 585 of the printing device, in a manner to be explained. The left frame member 571 of the carriage 570 carries bearing members 586 and 587, while the right end block 580 includes similar bearing surfaces, by which the carriage 570 is slidably mounted on suitable guide rod 589 and 590, the guide rods being supported by and extending between the stationary end plates 114 and 116.

Referring now to Fig. 23, the actual printing element of the print device comprises a single prismoidal print element 591 having 47 separate type characters embossed thereon, as best shown in a development view of the print element surface in Fig. 22B. It will be noted that the 47 possible print characters are arranged on the print elements 91 in 7 bands with each band being divided angularly into 8 equal type element areas. The print character areas of all the "bands" are aligned so that in effect, 8 angularly spaced "lines" of type are formed. The 7 bands of type are labeled from 0 through 6 for reference purposes, as indicated in Fig. 22B. In a similar manner, each of the 8 angular "lines" of type are labeled from 0 through 7. The print element is slidably supported in a horizontal position on a splined shaft 592 which is rotatably supported by suitable bearing inserts in the plates 571 and 572 of the carriage 570. The splines of the shaft 592 are engaged by inner projecting portions of the print element thus "locking" the element to the shaft 592 for angular movement therewith.

Supported by the plates 571 and 572 and extending therebetween parallel to the shaft 592, are rods 594 and 595 which slidably support a member 596. The member 596 has projecting end portions 597, each of which engages a related end of the print element 591. By moving the member 596 on its supporting rods, in a manner to be explained, an equivalent horizontal movement of the print element on its supporting shaft 592 is effected.

There is provided suitable record sheet feeding and record guiding mechanism to be later explained, for maintaining a printing surface of a record 599 in a vertical plane adjacent to the movement path of the carriage 570. To effect a printing operation on a particular line of the print record 599, the carriage 570 is advanced from left to right in Figs. 5 and 6 to present the print element 591 successively to the columns of an adjacent print line of the record 599. The carriage 570 may be advanced, column by column, through a maximum of 80 columnar positions of the record 599.

Referring now to Fig. 22B, it will be noted that the type area at the intersection of the 0 band and 0 angular line is blank. This type area is referred to as the "home" type area. It will be noted in Fig. 22B that some of the type areas in the 5 and 6 band are also blank. With the type cylinder in a so-called "home" position, the "home" type area is positioned at the printing line of the particular column of the record in which the carriage 570 is positioned. During the advance of the carriage into each desired print column, the actual character to be printed therein is selected by the combined actions of shifting the print element 591 horizontally on the shaft 592, by the action of member 596, from 0 to 6 band positions; and rotating the element through its supporting shaft, from 0 to 7 angular increments. It will be appreciated that a type selection operation positions the element 591 relative to the carriage 570 so as to position the selected character in the position occupied by the home type area when the print element is in its so-called "home" position. For example, assuming the print element as initially in its "home" position, a subsequent shifting of the cylinder three band increments to the right (towards frame 571) in Fig. 23, and a simultaneous rotation of the cylinder through 6 angular increments, positions the type element A at the print line of the particular column of the record with which the carriage is then aligned.

It is evident from the above discussion that through the application of proper combinations of horizontal and rotational movement to the print element, this action being effected under the control of a so-called setup mechanism generally designated 600 in Fig. 6, which will be later explained, any one of the 47 type characters on the print element may be selected for printing. The arrangement of the setup mechanism is such that on successive print operations, the print element is moved directly from one character to the next without an intervening homing action. Due to the high type selection speed thus obtained, the column by column advancing motion of the carriage is continuous and unvarying so that printing is actually effected in each desired column on the "fly."

*Print device—the ribbon supply mechanism*

Referring now to Figs. 5 and 6, the inked ribbon supply mechanism of the print device comprises the upper ribbon spool 582 which is secured to a shaft 601 rotatably supported by the top plate 575 of the carriage 570, and the lower ribbon spool 583 which is secured to a shaft 602 rotatably supported by the bottom plate 581 of the carriage 570. The common inked ribbon 585 carried by the spools 582 and 583 extends therebetween in a path from the spool 582 over guide roller 604 mounted on top plate 575, and then through the top guide portion of a guide finger 605 which is secured at its midpoint to a shaft 606, the shaft being pivotally supported on the member 578 and an extending portion of the block 580. The ribbon path continues over guide rolls 607 and 608 carried by a plate member 610 secured with fastening 611 to the right frame 572 of the carriage, over a guide member 612, which guides the ribbon 585 vertically and adjacent the "print position" of the print element, the guide member 612 being supported at its ends by frames 571 and 572, over a pair of rollers 607A and 608A similar to rollers 607 and 608, and carried by carriage structure, through a lower guide portion of guide finger 605, and over guide rollers 614 carried on plate 581, to the lower ribbon spool 583.

Driving mechanism is provided for the spools 582 and 583 which is automatically shifted, in a manner to be explained, so that if the majority of the inked ribbon 585 is wound on spool 582, the associated spool 583 is continuously and positively driven to serve as a ribbon take-up spool with the spool 582 serving as an idler supply spool; while if the majority of the inked ribbon 585 is wound on the spool 583, the associated spool 582 is continuously and positively driven counterclockwise in Fig. 5 and serves as the ribbon take-up spool, with spool 583 serving as the idler ribbon supply spool.

Referring now to Fig. 5, the driving means from the ribbon comprises the previously mentioned driven shaft 171 which is rotatably supported by suitable bearing inserts carried by the end frames 114 and 116. The ribbon drive includes a collar 615 which is slidable lengthwise on the driven shaft 171 but is "locked" to the shaft for angular movement therewith by the engagement of inner projecting portion of the collar 615 with the splines of the shaft 171. The collar 612 contains a recess 617 which is engaged by a downwardly projecting member 619 rigidly secured to the plate 610. The arrangement is such that as the carriage 570 is advanced on its guide shafts 589 and 590, the collar 615 is advanced therewith on the shaft 616 through the engagement of the member 619 with the collar.

The collar 615 includes an eccentric cam portion 620 which is engaged by a follower 621 pivoted at 622 to fixed carriage structure 624. A link 626 connects the follower 621 to the one arm of a two armed lever 627 which is pivoted at 629 to fixed carriage structure. Pivotally mounted on the one arm 630 of lever 627, is a pawl 631. A similar pawl 632 is mounted on the other arm 634 of the lever 627. Each of the pawls is tensioned by an associated spring 635 so as to maintain its nose engaged with a ratchet wheel 636 secured to a shaft 637. The shaft 637 is rotatably supported by suitable bearing inserts carried by the previously mentioned top and bottom plates 575 and 581 of the carriage. It should be noted in Fig. 40 that the pawls 631 and 632 engage the ratchet 636 in opposite directions.

With the shaft 171 rotating, the cam 620 through the linkage traced above rocks the lever 627 through an angle sufficient to displace the related pawls 631 and 632 a distance equal to one tooth of the ratchet 636. As the lever 627 rocks clockwise in Fig. 42, the pawl 631 acts as a driving pawl to advance the ratchet 636 clockwise one tooth position. During this action the pawl 632 serves only as a detent pawl. On the subsequent counterclockwise rocking of lever 627, the functions of the pawls 631 and 632 are interchanged with pawl 632 effecting a one tooth clockwise advance of the ratchet 636 while pawl 631 serves as a detent pawl. It is thus evident that a two clockwise advance (in Fig. 40) of ratchet 636 is effected for each rocking cycle of the lever 627.

A gear 639 is secured to the shaft 637 for rotation therewith but is displaceable lengthwise on the shaft between a first position wherein the gear 639 meshes a gear 640 secured to the support shaft 602 of the spool 583, and a second position wherein the gear 639 meshes a gear 641 secured to the support shaft 601 of the spool 582. It is evident that when gear 639 is in its first position, the shaft 637 drives the shaft 602 and associated spool 583 so that the spool 583 functions as a ribbon take-up spool with the spool 582 serving as an idler ribbon supply spool, in the manner previously described. Similarly, when gear 639 is in its second position, the shaft 637 drives the shaft 601 and associated spool 582 so that the spool 582 functions as the driven ribbon take-up spool with the spool 583 serving as the idler supply spool.

The gear 639 is shifted from its first to its second position under the control of a forked lever 642 which is pivotally supported on the projecting end portion of the previously mentioned support shaft 606 of the ribbon guide finger 605. An upper arm 642A of the fork 642 extends into a plane above the gear 639, while the lower arm 642B thereof extends into a plane below the gear 639. Secured to the shaft 606 adjacent the lever 642, is another forked lever 644, an upper arm 644A thereof extending in a plane above the arm 642A of lever 642, while a lower arm 644B thereof extends into a plane above the arm 642B of lever 642. With the lever 642 positioned as indicated in Fig. 40, the arm 644A thereof engages the arm 642A of lever 642 so that the associated gear 639 is engaged with the gear 640. As a result, the ribbon 585 feeds from the idler spool 582 to the driven spool 583. Shortly before the ribbon is exhausted from the upper spool 582, a metal eyelet carried by the ribbon engages the upper guide portion of the finger 605, and as the ribbon continues to advance, the eyelet rocks the finger 605 and its associated shaft 606. As the shaft 606 rocks, the lever 644 moves therewith and the arm 644B engages the arm 642B of lever 642 to displace the gear 639 upward on its shaft free of engagement with the gear 641 of the upper spool 582. The ribbon feed is accordingly reversed, with the upper spool 582 now serving as the driven take-up spool and lower spool 583 serving as the supply spool. Shortly before the ribbon is exhausted from the lower spool 583, an eyelet near the associated end of the ribbon rocks the finger 605 to reverse the functions of the two spools. Secured to the lever 642 is a pin 645 which extends into the plane of a cam surface portion 646 of a lever 647. The lever 647 is pivotally mounted on a shaft 649 which is supported by the top plate 575 and bottom plate 581. A spring 650 connected between the lever 647 and fixed structure of the carriage maintains the cam surface 646 engaged with the pin 645. As the lever moves from one operational position towards the other, the pin 645 passes over a high midpoint section of the cam surface 646. As the pin advances beyond the high midpoint, the following cam surface through the tensioning action of the spring 650, acts against the pin 645 to positively throw the lever 642 completely into the desired operational position. Once the lever 642 is in the one or the alternate operational position, the tensioning action of lever 646 maintains it in the desired operational position until the next ribbon drive transfer operation.

After the desired type character is selected for printing in a column as described above, the actual physical printing operation is effected by the "firing" of a print hammer 651 which forces the print record 599 and the interposed inked ribbon 585 carried by the carriage 570, against the "selected" type character. The hammer 651 is carried on its own individual carriage, generally designated 652 in Fig. 5.

*Print device—the hammer carriage*

The hammer carriage 652 comprises a right end frame 654 and a left end frame 655 (Fig. 5) rigidly tied together by a top plate 656 and a U-shaped member 657 (Fig. 41). The carriage 652 is slidably mounted for movement in a path parallel to the type carriage 570 by the engagement of suitable bearing members 659 and 660 carried by the frames 655 and 654, respectively, with guide shaft 168; by the engagement of a bearing member 661 also carried by the right frame 654 with a guide shaft 662; and by the engagement with a shaft 663 of suitable right and left bearing members carried by a box-like structure 666, the latter being rigidly secured to the previously mentioned right and left frame members 654 and 655.

The shafts 662 and 663 are rigidly supported by the previously mentioned right and left end frames 114 and 116. The shaft 168 differs from its associated shafts 662 and 663 in that it contains a spline extending most of its length and is rotatably supported by suitable bearing inserts carried by the right end frame 114 and left end frame 116. It will be recalled that the main drive shaft 134 through the gear 166 secured thereto and a meshing gear 167 secured to the shaft 168, continuously rotates the latter when the accounting machine is in operation. The timing relationship between the shafts 134 and 168 is such that one revolution of the shaft 168 is effected for every four revolutions or so-called drum cycles of the shaft 134.

The hammer carriage 652 and the print element carriage 570 are advanced in synchronism so that the hammer 649 and the print element 591 are always aligned with each other. The carriages are advanced through a common driving mechanism, to be explained, which, in turn, is driven from the previously mentioned emitter shaft 299. It will be recalled from the discussion of Fig. 4 that the emitter shaft 299 is driven from the drum shaft 134, through shaft 184, by engaging the gear 296 with the gear 298 of the shaft 299. The timing of the main drive shaft 134, and the emitter shaft 229 and its associated carriage advancing mechanism, is such that for each columnar advance of the print carriage 570, the drum 136 makes two complete revolutions (drum cycle).

Referring now to Fig. 41, it will be noted that slidably mounted on the shaft 168 and confined between the end frames 654 and 655 of the hammer carriage 652 so that it is advanced therewith, is a collar 667 to which a so-called hammer cam 668 and a hammer rebound cam 670 are secured. The collar 667 has inwardly projecting portions 667A which engage the splines of the shaft 168 thus "locking" the collar 667 and its associated cams to the shaft 168 for rotational movement therewith, without restricting the longitudinal movement of the carriage 652 and collar 667 on the shafts 168, 662 and 663. The cam 668 contains two high dwell positions spaced 180° apart or ½ revolution apart relative to their driving shaft 168, this spacing being equivalent to two drum cycles of the shaft 136 as indicated in Fig. 17. The cam 670 also contains two high dwells spaced two drum cycles apart, as also indicated in Fig. 17.

Referring now to Fig. 41, the hammer element 651 is secured to a shaft 671 which is supported near each of its ends in upwardly extendng forked positions 672 of a lever 673, the latter being pivotally mounted at its lower end on a shaft 675 which extends between the end frames 654 and 655 of the hammer carriage 652. Movement of the shaft 671 and integral hammer 649 in a vertical direction out of the supporting forked portions of the lever 673, is prevented by the engagement of each end of the shaft 671 with a horizontally extending groove 676 in a related member 677 (Figs. 5 and 40) secured to the adjacent end frame 654 or 655. The lever 673 is continuously urged clockwise in Fig. 41, by a spring 678 connected therefrom to stationary carriage structure, so as to tend to engage a follower portion 680 of the lever 673 with the hammer cam 668. The lever 673 is normally latched, however, in a manner to be explained so as to prevent the engagement of the follower portion 680 with the cam 668.

Operation of the hammer 649 is effected under the control of a so-called hammer magnet 681 (see Fig. 7) which is secured to the inner surface of the left end frame 114. With the magnet 681 unenergized, the one end of the associated armature 682 thereof engages the one arm of a follower 683 which is pivotally mounted on the shaft 662 and is continually biased clockwise in Fig. 7 by a spring 685 extending therefrom to a fixed structure. As a result, the follower 683 is latched in the position shown in Fig. 7 against the action of its associated spring 685 and with a roller 686 carried by the follower 683 unable to follow various low dwells of an associated cam 687, the latter being secured to the previously mentioned drum driven shaft 168. The one end of a flexible wire 688 is secured to a pin 690 carried by the follower 683 and extends from the follower 683, over a guide pulley 691 carried by the frame 114, over a guide pulley 692 (Fig. 5) carried on a frame member 693 secured to member 656 of the hammer carriage 652, over a pulley 695 (Figs. 5 and 41) carried on the one end of a hammer latch lever 696, over a guide pulley 696 also carried by the frame member 693 of the hammer carriage and finally to a stud 697 to which it is secured, the stud 697 being carried by the right frame member 116.

Upon an impulsing of the hammer magnet 681, in a manner to be explained, the resultant attraction of its armature 682 releases the follower 683 which then rotates counterclockwise in Fig. 7 under the urging of associated spring 685, this action permitting the roller 686 of the follower to freely follow the contour of the related cam 687. The clockwise movement of the follower 683 also displaces the associated wire 688 longitudinally towards the left frame member 114 in Fig. 5. Since the other end of the wire is fixed to frame 116, the longitudinal movement of the wire 698 forces the pulley 695 in a direction toward the associated fixed pulleys 692 and 696 on the hammer carriage, this action rocking the associated hammer latch lever 696 clockwise in Fig. 41 on a supporting pivot shaft 698 carried by the frame 654 and finally into engagement with an abutment member 700 secured to the lower portion of the U-shaped member 657. As the latch lever 696 rocks clockwise, a laterally extending ear 701 thereof engages the underside of a hammer latch 702 and rocks it clockwise in Fig. 41 on the supporting pivot shaft 698, the rocking action of hammer latch 702 taking place against the action of an associated spring 705 connected therefrom to the member 657. As the latch 702 rocks clockwise, a nose portion 706 thereof, is rotated free of engagement with a cooperating latch portion 707 of the lever 673, thus releasing the latter. The lever 673 is accordingly free to rotate clockwise in Fig. 41 under the urging of its associated spring 678 until the follower portion 680 thereof engages the hammer cam 668. The lever 673 continues to rotate clockwise as a succeeding lower dwell portion of cam 668 is rotated into engagement therewith. Finally, as a high dwell of the cam is presented to the lever 673, the lever is rotated counterclockwise in Fig. 41 against the action of its associated spring 678. The lever is rocked counterclockwise with sufficient velocity to move the follower portion thereof clear of the cam 668 and forcibly impels the hammer 651 and interposed print records 599 and inked ribbon 585 against the selected type character of the print element 591, thus effecting a printing operation.

As a printing operation is being effected, the follower 683 is rocked counterclockwise on its pivot shaft 662 by a related dwell of cam 687 (see Fig. 17) thus relatching the follower 683 on the restored armature 682 of the now unenergized magnet 681. As the follower 683 is relatched, the resultant longitudinal movement of the wire 688 releases the tension on the pulley 695 so that the associated latch lever 696 is restored counterclockwise in Fig. 41 under the urging of a related spring 708 connected therefrom to member 657 and into its "latch" position shown in Fig. 41. As the hammer lever 673 restores clockwise in Fig. 41, after the print operation, the hammer latch 702 drops behind the latch portion 707 of the lever 673 and into engagement with the ear 701 of the latch lever 696, and the mechanism is in condition for the next desired print operation.

Referring now to Fig. 41, it will be noted that pivotally mounted on pivot 675 carried by the right frame 654 of the hammer carriage 652 is a so-called hammer rebound damper lever 711. The lever 711 is tensioned counterclockwise in Fig. 41 by a spring 712 connected therefrom to the member 711 so as to maintain a follower portion 713 thereof in engagement with the previously mentioned cam 670. The contour of the cam 670 is such that the lever 711 is rotated so as to position a finger 715 thereof in a path to intercept the hammer lever 673 if, during the relatching of the hammer lever after a print operation, the lever rebounds from the latch 702. This rebound damping action insures against "double" printing. During the actual machine time, when a printing operation is possible, the lever 711 is positioned with the finger 715 thereof clear of the printing path of the hammer lever 673.

*Print device—the compensating carriage*

The print device also includes a so-called compensating carriage which is generally designated 716 on Fig. 5. The compensating carriage comprises an L shaped frame member 717 having upwardly extending portions 718 and 720 to which a horizontally extending plate 721 is secured. In the cavity formed between the under surface of the plate 721 and the frame member 717 (Fig. 42), are arranged four pulleys 722, 723, 725 and 726, the supporting shaft for each pulley being rigidly supported at its ends by the plate 721 and frame 717. The carriage 716 is slidably mounted for movement in a path parallel to the type carriage 570 and hammer carriage 652 by the engagement of suitable bearing members 727 carried by the frame 717 with guide shaft 590 and the engagement of a bearing member 728, also carried by the frame 717, with guide shaft 589. The purpose of the compensating carriage 716 and the pulleys 722, 723, 725 and 726 thereof, will be later explained.

*Print device—the carriage advancing mechanism*

For advancing the carriages 570, 652, and 716, there is provided a laterally flexible tape 730 which is secured at its one end to a pulley 731 (see Figs. 43 and 1), the latter being secured to the previously mentioned emitter shaft 299. The tape 730 extends from the pulley 731 over a pulley 732 carried in the lower end of an arm 733 which is pivoted at its upper end to fixed structure 735 carried by frame 116, over a pulley 736 pivotally mounted on frame 116, and then to the hammer carriage 652 (Fig. 5) to which it is secured. The tape 730 continues from the hammer carriage 652 over a pulley 737 pivotally mounted on left frame 114, over a pulley 738 pivotally mounted on the right frame 116, over a pulley 740, also pivotally mounted on the right frame 116, and then to the print element carriage 570 to which it is secured. What may be considered as an extension of the tape 730, and will accordingly be referred to as 730A, extends from the print carriage 572, over the pulley 723 of the compensating carriage 717, over the pulley 722 of the compensating carriage, and finally to the right frame 116 to which it is secured.

A carriage restoring tape 741 having one end secured to the carriage 717 and its other end linked to a spring type wind-up mechanism 742 which is secured to the left frame 114, continuously biases the carriage 717 in a direction towards the left frame member 114.

It will be appreciated that the restoring tension of the spring 741 on the carriage 717, is reflected through the pulleys 722 and 723 carried on the carriage 717, and through the tapes 730A and 730 to the carriages 570 and 652, so as to also urge these carriages toward the left frame member and to maintain the various tapes taut. In Fig. 5 the carriages are shown in their extreme leftward or "home" position.

It will be recalled that the first tape guiding pulley 732 engaged by the tape 730 as it passes from the pulley 731, is carried on a pivoted arm 733. A link 743 has its one end pivotally connected to the arm 733 at a point above the pulley 732 thereof. The link 743 is pivotally connected at a point between its ends to the lower end of a supporting arm 745, the latter being pivotally supported at its upper end on a member 746 which is secured to the right frame 103. The other end of the link 743 carries a roller 747 adapted for cooperation with a cam 748 secured to the emitter shaft 299. With the shaft 299 disengaged, a high dwell of the cam 748 engages the roller 747 so as to position the associated mechanism as indicated in Fig. 43. With the shaft 299 engaged, the initial rotation thereof not only starts to wind the tape on the pulley 731, but also presents a progressive lower dwell portion of the cam 748 to the roller 747. As a result, under the urging of the tension of the tape 730 on the pulley 731, the entire structure comprised of the arm 733 and its pulley 731, the link 743, and the arm 745, shift in a direction toward the emitter shaft 299 to maintain the roller 747 in contact with the cam 748. This shifting action continues until an extending lip 750 of the arm 733 engages a fixed abutment 751, this abutting action taking place as the lowest dwell portion of the cam 748 rotates clear of the roller 747.

It will be appreciated that the counterclockwise rotation of the arm 733 and its pulley 731 during the above described action, in effect lengthens the tape during its initial lengthwise movement. As a result, the tapes 730 and 730A and the carriages 652, 570, and 716 are accelerated gradually from their "home" position in comparison to the almost instantaneous acceleration of the shaft 299 as it is engaged. The gradual acceleration of the tapes and the various carriages prevents possible damage thereto. Once the arm 733 engages the abutment 751, the longitudinal movement of the tape 730 as it winds on the pulley 731 is fully effective for advancing the carriages on their respective guide shafts. It will be evident upon an examination of Fig. 5 that the tape connection between the carriages 652 and 570 is such that these carriages are maintained continuously aligned as they advance. The advancing of the carriages 652 and 570 by the winding of the tape 730 on the pulley 731 may continue until the carriages have been advanced through a maximum of 80 columnar print positions from their so-called "home" positions.

It will be recalled that the tape 730A which is considered as an extension of the tape 730 through which the carriages 652 and 570 are advanced, extends from the print carriage 570 over the pulleys 722 and 723 of the compensating carriage 716, and finally to the right frame 116 to which it is secured. It will be noted in Fig. 5 that this arrangement of the tape 730A is such that it actually forms a loop having two parallel spaced portions extending from the pulley 723 to the carriage 570 and the other portion extending from the pulley 722 to the frame 116. By reason of this loop arrangement of the tape 730A it is obvious that as the print carriage 572 is advanced, the associated movement of the tape 730A is effective to advance the carriage 716 at only ½ the rate of advance of the print carriage. The reason for advancing the carriage 716 at only ½ the rate of the carriages 570 and 652 will be later evident.

Referring now to Figs. 15A and B, it will be noted that the contact wipers of the various emitters are all arranged (timed) on the shaft 299 relative to the carriage advancing mechanism, so that with the carriage in its #1 columnar position for example, the third segment of emitter 337 is engaged by its contact wiper, the 2 segment of emitter 338 is engaged by its wiper, etc., as indicated. The timing between the emitter shaft 299 and the drum shaft 134 is such that for each columnar advance of the print carriage 570, the drum 136 makes two complete revolutions.

*The print device—type character selection mechanism*

It will be recalled that during the advance of the carriage 570 and associated print element 591 into each desired print column of the record 599, the actual character to be printed therein of the 47 possible characters on the print element, is selected by the combined actions of shifting the print element horizontally on the shaft 592 from 0 to 6 band positions through a corresponding movement of member 596, and rotating the print element 591 from 0 to 7 angular movements through a corresponding rotational movement of the supporting shaft 592. This type selection operation positions the print element relative to the carriage 570 so as to move the selected type character into the position occupied by the blank home type area when the print element is in its so-called "home" position. The type character selection operation is effected under the control of the previously mentioned set-up mechanism 600 which is explained in detail hereinafter. The set-up mechanism 600 is arranged on vertically extending support plates 752 and 753, the plate 752 being rigidly secured at its left end in Fig. 6, to a member 755 and at its right end to a member 756, the members 755 and 756 being rigidly secured in turn to the left end frame 114 and right end frame 116, respectively. The plate 753 is rigidly spaced from and parallel to the plate 752 by spacers 757.

*The print device—type character selection (the rotary positioning mechanism)*

Referring now to Figs. 5, 44A and B, it will be recalled that the shaft 592 on which the print element 591 is supported is rotatably supported by suitable bearing inserts carried by end plates 571 and 572 of the carriage 570. Secured to a portion of the shaft 592 which extends beyond the plate 571 is a gear 758 (Fig. 44A) which meshes a gear-like member 760 integral with a pulley 761. It will be noted that the member 760 contains two spaced groups of teeth 762 and 763 cut in the periphery thereof, the one group 762 being meshed by the gear 758. The purpose of the other group of teeth 763 will be later evident. The pulley 761 is rotatably supported on a shaft 765 which is supported by the end frame 571 and a plate 766, the plate 766 being rigidly spaced from the frame 571 by spacers 767 and 768. A lever (not shown) is pivotally mounted at one end to an extending arm (not shown) of plate 766, in a position aligned with the pulley 761. The lever is tensioned by a spring (not shown) extending therefrom to an arm (not shown) which is rigidly secured to the end frame 571.

A cable 775 is secured to the free end of the lever and extends therefrom to a point on the periphery of the pulley 761 to which it is secured. The tension of the spring tensioned lever acting through pulley 761, the integral gear 760 thereof, and the meshing gear 758 carried by shaft 592, continuously biases the print element 591 towards its "home" angular position. The rotational type selection movement is applied to the shaft 592 against the bias of the spring tensioned lever (not shown) through a so-called rotational set-up cable 776, the one end of which is also secured to a point on the periphery of the pulley 761. The cable 776 extends from the pulley 761, over a pulley 777 rotatably supported on the left frame 571, over the pulley 725 carried by the compensating carriage 716, through a clearance opening 778 on the left frame 571 of the carriage, through an aligned clearance opening in the right frame 572 of the carriage, over a pulley 780 which is rotatably supported on a member 781, the latter rigidly secured to the right end frame 116, over a pulley 782 rotatably supported on the plates 752 and 753 (see Fig. 8) over a pulley 783 carried on the one end of a lever 785 which is pivotally supported at 786 on the rear of plate 752, over a pulley 787 carried by a lever 788 which is pivoted at 790 on the rear of plate 752, and finally to the one arm of a lever 791 to which it is secured, the lever 791 being pivoted at 792 on the rear of the plate 753.

The levers 785, 788, and 791, are all spring biased in a clockwise direction in Fig. 8 and may be rocked singly or in combination through the same angle in a counterclockwise direction, in a manner to be later explained. The parts are so proportioned that if the lever 785 is rocked along, the resultant displacement of the cable 778 is effective through the pulley 776 etc. to rotate the print element four angular increments from its home position. Similarly, if lever 788 is rocked alone, the print element is rotated 2 angular increments from its "home" position, while if lever 791 is rocked alone, the print element is rotated 1 angular increment from its "home" position. It is thus evident that by actuating the levers 785, 788, and 791, singly, and in combination, as indicated to the right of the print element development view in Fig. 22B, the print element 591 may be displaced angularly from 1 to 7 positions from its home position to present the corresponding "line" of type thereon to the print line. It will be particularly noted that the path of the cable 776 between the print element of the movable carriage 570 and the set-up mechanism 600 arranged on stationary structure, includes an operational engagement with the pulley 725 of the compensating carriage 716. Recalling that the carriage 716 advances at only ½ of the rate of the carriage 570, it is evident that the carriage 716, in effect, continuously compensates for the position of the carriage 570 so that the cable 776 is always taut and so that any actuation of the levers 785, 788, and 791 singly or in combination, and regardless of the columnar position of the carriage 570, effects an unvarying corresponding angular displacement of the print element 591.

The print mechanism includes a so-called rotary aligner 793 (Fig. 44A) which is secured to a shaft 795 rotatably supported by the end frames 571 and 572 of the carriage 570. Also secured to the shaft 795 is a follower 796 which is tensioned by a spring 797 so as to maintain it operatively engaged with an associated cam 798 carried by a shaft 800 which is rotatably supported by the end frames 571 and 572. The shaft 800 extends beyond the frame 572 and secured to this extending portion is a gear 801 (see Fig. 44B) which meshes a gear 802, the latter being secured to the one end of the previously mentioned driven collar 615. The contour of the cam 798 is such (see Fig. 17) that each possible print cycle after the rotary type selection motion of the print element 591 is completed, the shaft 795 is rocked so as to engage the nose of the aligner 793 with an adjacent one of the teeth 763 of the gear 760. There are 8 notches in the group 763 of gear 760, one for each of the possible rotational positions thereof. The space between adjacent notches in the group 763 is equal to one rotational increment of the print element 591 and the particular notch engaged by the aligner 793, corresponds directly to the increment(s) of set-up rotation previously effected on the print element 591. The nose of the aligner 793 as it moves into engagement with the associated notch adjusts the rotational position of the print element so that it is "precisely" positioned in the desired rotational position, if it was not already so positioned as a result of the actual selection operation.

*Type character selection—the horizontal positioning mechanism*

Referring now to Fig. 42, it will be noted that the carriage structure 570 includes a pulley 803 which is secured to a shaft 805 rotatably supported by a frame 806 and a parallel frame 807 rigidly spaced therefrom by a member 804, the member 806 being rigidly secured to the right end frame 572 of the carriage 570. Also rotatably supported by the frames 806 and 807 is a shaft 808 to which is secured the one end of a lever 810. The lever 810 is secured to the shaft 808 in a position aligned with the pulley 803. It will be recalled from previous discussions that the print element 591 is displaced horizontally on its supporting shaft 592 through an equivalent motion of the member 596 on its guides 594 and 595. A cable 813 having one end secured to the right end (see Fig. 5) of member 596, extends therefrom over the pulley 803 to the free end of the lever 810 to which it is secured. The tension of the spring 811 acting through the linkage traced above, continuously biases the member 596 towards a position so as to engage the frame 572. When the member 596 is engaging the frame 572, the related print element 591 is positioned thereby into its so-called "home" horizontal position. The horizontal selection movement is applied to the member 596 against the action of spring 811 through a so-called horizontal set-up cable 815.

The cable 815 has one end thereof secured to the left end of the member 596 and extends therefrom through a clearance opening in the left frame 571 of the carriage 570, over the pulley 726 of the compensating carriage 716, back through another clearance opening in the left frame 571 of the carriage 570, through an aligned opening in the right end frame 572 of the carriage 570, over a pulley 816 rotatably supported on the right frame 116, over a pulley 817 rotatably supported on the plates 752 and 753 (Fig. 8) over a pulley 818 carried on the one end of a lever 820 which is pivotally supported at 820 on the rear of the plate 752, over a pulley 821 carried by a lever 822 which is pivoted at 823 on the rear of plate, and finally to the one end of a lever 825 to which it is secured, the lever 825 being pivoted at 826 on the rear of the plate 752.

Figures 8, 9, 9A:
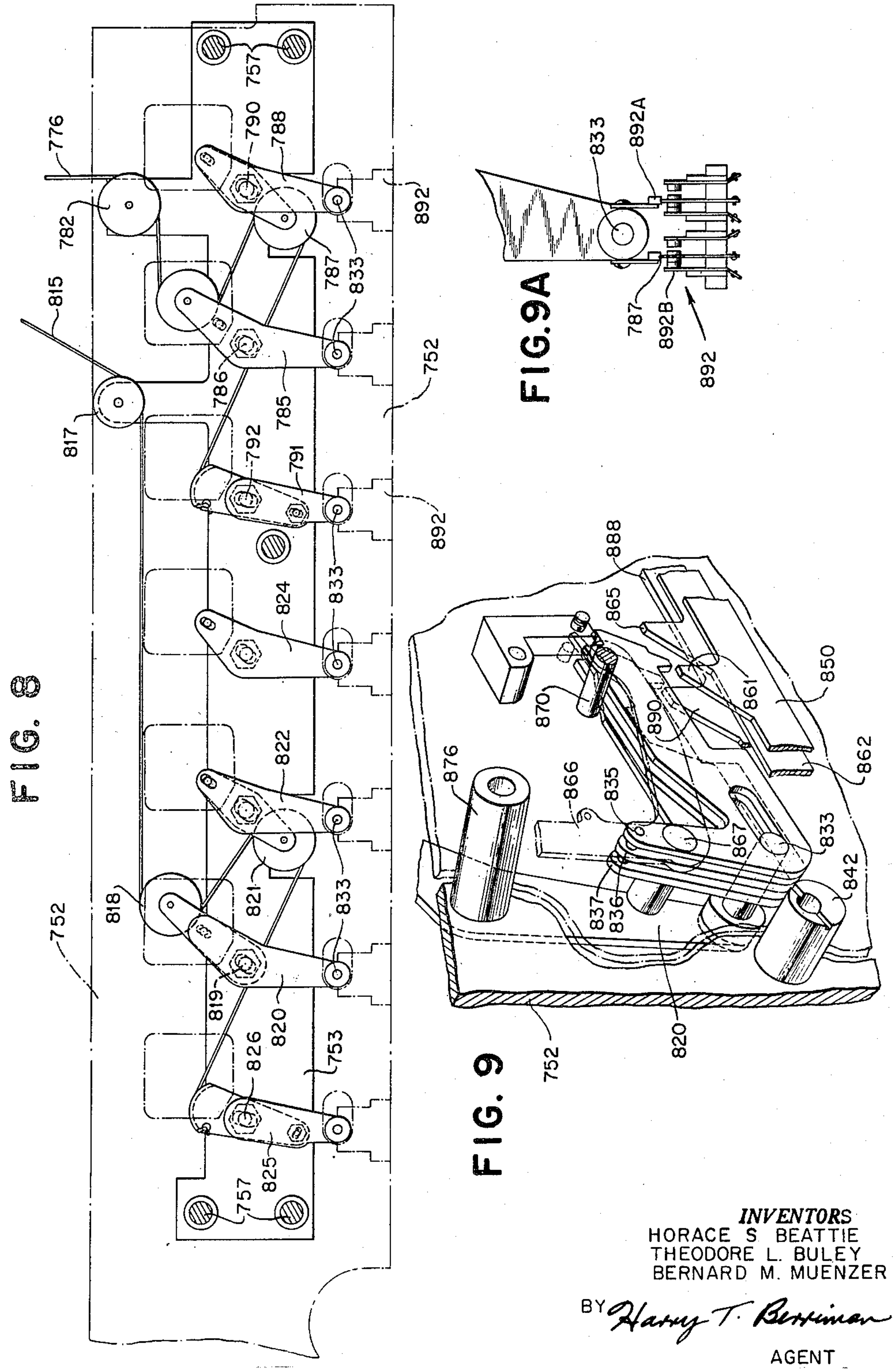
Fig. 8 is an elevation view of the back of the print device set-up mechanism.
Fig. 9 is a perspective view of one of the print device set-up actuations.
Fig. 9A is a view of the check contacts associated with each set-up actuator.

The levers 820, 822, and 825 are all spring biased in a clockwise direction in Fig. 8 and may be rocked singly or in combination through the same angle in a counterclockwise direction, in a manner to be explained. The parts are so proportioned that if the lever 820 is rocked alone, the resultant displacement of the cable 815 is effective to displace the member 596 in turn to print element 591, 3 horizontal increments from its so-called "home" position. Similarly, if lever 822 is rocked alone, the print element is displaced 2 horizontal increments from its "home" position, while if lever 825 is rocked alone, the print element is displaced 1 horizontal increment from its home position. It is thus evident that by actuating the levers 820, 822, and 825, singly and in combination, as indicated along the top of the development view in Fig. 22B, the print element may be displaced horizontally from 1 to 6 increments to present the corresponding band of type therein to the print position. This selectable horizontal positioning of the print element, in combination with the selectable angular positioning thereof, as previously described, permits any one of the 47 possible type elements of the cylinders to be selected for printing, as indicated in Fig. 22B.

It will also be particularly noted that for the same purpose as described previously for the rotational set-up cable 776, the path of the cable 815 between the print element 591 and the set-up mechanism 600, includes an operational engagement with the pulley 726 of the compensating carriage 716. As a result the cable 815 is always taut so that any actuation of the levers 820, 822, and 825, singly or in combination, and irregardless of the columnar position of the carriage 570, effects an unvarying corresponding horizontal displacement of the print element 591.

The print mechanism includes a so-called horizontal aligner 827 (Figs. 5 and 44B) which has a series of notches 828 cut along the one edge thereof, one for each possible horizontal position of the cylinder. The space between adjacent notches 828 is equal to 1 increment of horizontal selective movement of the print element 591. The aligner is secured to a shaft 830 which is rotatably supported by the end frames 571 and 572 of the carriage 570. Also secured to the shaft 830 is a follower 831 which is spring tensioned so as to maintain it operatively engaged with an associated cam 832 carried by the previously mentioned driven shaft 800. The contour of the cam 832 is such (see Fig. 17) that each possible print cycle after the horizontal selection motion of the print element 591 is completed, the shaft 830 is rocked so as to engage one of the notches 828 of the aligner 827 with the edge of an end portion 597 of the member 596. The particular notch 828 engaged corresponds directly to the increment(s) of horizontal movement previously effected on the print element. The engagement of the aligner 827, with the member 596 "precisely" adjusts the horizontal position of the print element 591, if it was not already "precisely" positioned as a result of the actual horizontal selection operation.

In addition to the levers 785, 788, and 791 for effecting the rotational selection movement through cable 776, and the levers 820, 822, and 825 for effecting the horizontal selection movement through cable 815, there is provided an identical lever 824 to the right of the lever 825 in Fig. 8. This 7th lever is identical in construction to the other levers except that it has no operational connection to the print element 591. This 7th lever is adaptable to be rocked through the same fixed angle as the other 6 levers 785, 788, etc. The purpose of the 7th lever will be later explained.

Each of the 7 levers 785, 788, etc. may be selectively rocked through mechanism comprised of a related pin 833 rigidly secured to the lower extremity of the lever. Each pin 833 extends from its associated lever through an adjacent opening in the plate 752 and beyond the front surface of the plate (see Fig. 9). Pivotally supported on each of the pins 833 in front of the plate 752 are a pair of identical so-called feed pawls designated 835 and 836, and a locking pawl 837. The pawls are shown separately in Figs. 10A, 10B, and 10C where it is seen that pawls 835 and 836 are slotted for sliding action on the associated pin 833, while pawl 837 is not slotted. Each of the pawls 835, 836, and 837 associated with a particular one of the levers 785, 788, etc. is guided for motion in a particular operational plane parallel to the plate 752 by its confinement with a corresponding slot of a comb-like member 838 (Fig. 6) the latter being rigidly secured to the plate 752. Each of the pawls is biased in a counterclockwise direction in Fig. 10A, 10B, and 10C on its associated supporting pin 833 and simultaneously in a direction towards the left, by a related individual spring 840 connected therefrom to a spring stud 841 carried by the plate 752. An individual abutment 842 secured to the plate 752 limits the leftward movement of each group of 3 pawls 835, 836, and 837.

Pivotally supported on plate 752 above the right end of each group of 3 pawls is an associated detent 843 which is tensioned counterclockwise in Fig. 6 and Figs. 10A, 10B, and 10C by a spring 845 connected therefrom to a fixed stud carried by the associated member 838. An abutment stud 846 carried by the plate 752 limits the extent to which the detent 843 can rotate clockwise in Fig. 10C. The spring 845 normally maintains the nose of the detent 843 engaged with a mating notch 847 in the right end (see Figs. 10A and 10B) of each of the related pawls 835 and 836, and a surface 848 of the pawl 837. The actual operational purpose of the detent 843 will be later evident.

The pawls 835 of the 7 levers 785, 788, etc. lie in a common plane of a slide 850 which is mounted for horizontal reciprocation on posts 851 carried by the plate 752. The slide 850 is biased toward the left in Fig. 6 by an associated spring 852 so as to maintain a roller 853 thereof in engagement with an operational cam 855. The cam 855 is secured to a shaft 856 which is rotatably supported by suitable bearing inserts carried in the plate 752 and a support plate 857 (see Fig. 7), the latter being rigidly secured to the plate 752. The shaft 856 is continuously rotated through a gear 858 secured thereto and a meshing gear 860 secured to previously mentioned shaft 174, the shaft 174 being rotatably supported by the end frames 114 and 116. There is a tooth 861 on slide 850 for each pawl 835 and as the shaft 856 rotates, the cam 855 reciprocates each slide 850 (see Fig. 17) so that each tooth 861 thereof oscillates below the related pawl 835. If a pawl 835 is rocked clockwise about its pin 833 into the position indicated in the next to the top illustration in Fig. 10A, the pawl 835 will be engaged by the related tooth 861 of slide 850 so as to forcibly rock the associated lever 785, 788, etc. through a predetermined angle.

The pawls 836 of the 7 levers also slide in a common plane of a slide 862 which is mounted in the same manner as slide 850 and is actuated by a cam 863 on shaft 856. Cam 863 has the same configuration as cam 855 but is mounted on the shaft 856 with a 180° displacement from cam 855, so that slides 850 and 862 are reciprocated oppositely. Slide 862 has a tooth 865 for each pawl 836 and, if one of these pawls is rocked clockwise as indicated in the lower illustration of Fig. 10B, it will be engaged by the related tooth 865 to rock that lever 785, etc. counterclockwise. It will be noted from Fig. 17 that the timing relationship between the shaft 174 and the drum shaft 136 is such that 1 revolution of shaft 136 is effected by every 4 drum cycles. With this timing relationship and by means of the 180° displacement of cam 855 from cam 863 on the shaft 174, it is evident that a type selection operation may be effected every 2 drum cycles.

The mechanism for rocking pawls 835, 836 and 837, comprises a lever 866 of which there is one provided for each of the 7 sets of pawls (see Fig. 6). Each lever 866 is pivoted at 867 to the front plate 752 and is biased clockwise by a spring 868 extending therefrom to the related comb member 838. A bail 870 (see Fig. 9) is secured to one arm 871 of each lever 866 and extends laterally therefrom into the plane of the corresponding pawls 835, 836, and 837. Secured to the plate 752 adjacent each of the levers 866 is an associated so-called print control magnet 872 having an armature 873 which, when the magnet is unenergized, is maintained by an armature return spring 875 connected therefrom to the related member 838, in a position engaging a related abutment 876 carried on the plate 752. With an armature 873 in this "unattracted" position, as shown in Fig. 6, the free end thereof abuts a latch surface of an arm 877 of the related lever 866 so as to latch that lever against the action of its associated spring 868. When a lever 866 is in this latched position, the associated bail 870 is positioned in a corresponding so-called "up" position clear of the top edge of the related pawls 835, 836, and 837 as represented in Fig. 9.

Figure 10C:
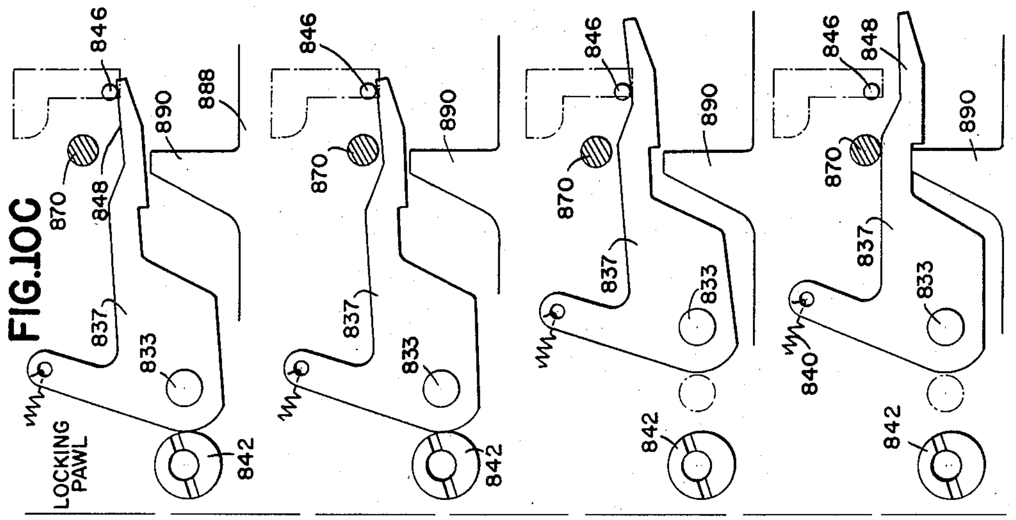
Figs. 10A, 10B and 10C show the print device set-up mechanism at various machine intervals in the operation thereof.
Figure 10B:
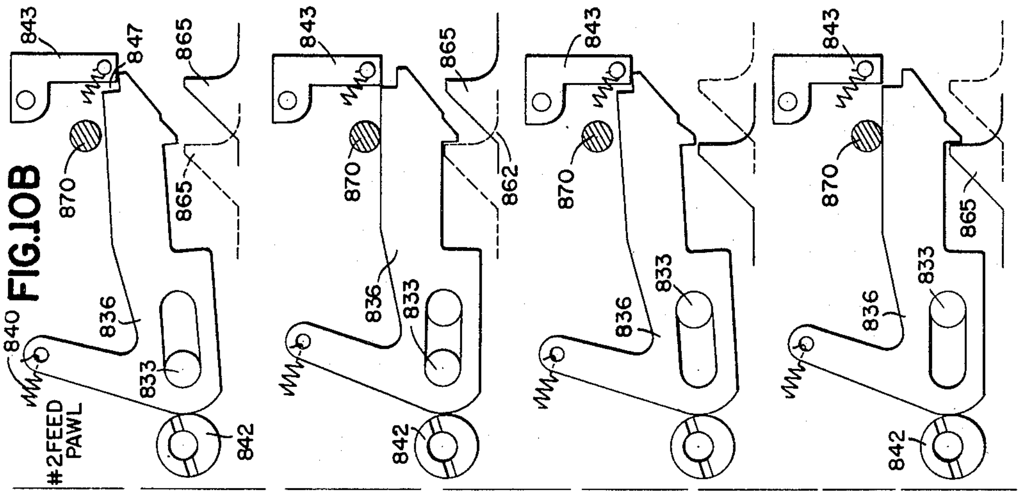

Upon the impulsing of a print magnet 872 in a manner to be explained, the resultant attraction of its associated armature 873, releases the related lever 866 for clockwise rotation in Fig. 6. As a lever 866 rotates, the bail 870 thereof engages the top surface of the related pawls 835 and 836 to displace them clockwise in their pivot 833. This action positions the pawls 835 and 836 on the operational plane of the teeth 861 and 865 of their related slides 850 and 862, respectively as indicated in the next to the top illustrations in Figs. 10A and 10B. It will be noted in Fig. 10A that the slide 850 is indicated as being in its extreme left-hand or restored position while the slide 862 in Fig. 10B is indicated as being in the corresponding extreme right-hand or advanced position. It will also be noted that with the pawls 835 and 836 positioned, as indicated, the notched end 847 of each is clear of operational engagement by the related detent 843.

With the pawls 835 and 836 rocked clockwise, the particular one of the slides 850 or 862 subsequently moving to the right (see Figs. 10A and 10B) or advancing at that time engages the related pawl 835 or 836 to operationally rock the associated lever 785, 788, etc. as previously described. For example, assuming an initial state of the slides, as shown in the next to the top illustration in Figs. 10A and 10B, the subsequent advance of the slide 850 as indicated in the next to the bottom illustration in Fig. 10A, carries the associated pawl 835 therewith to rock the corresponding lever 785, etc. As a pawl 835 is advanced by its slide 850, for example, the alternate pawl 836 remains in its extreme leftward position engaging the abutment 842 with the pin 833 of the rotating lever 785, etc. riding to the right in the slot of the pawl as indicated in the next to the bottom illustration in Fig. 10B.

Figure 10A:
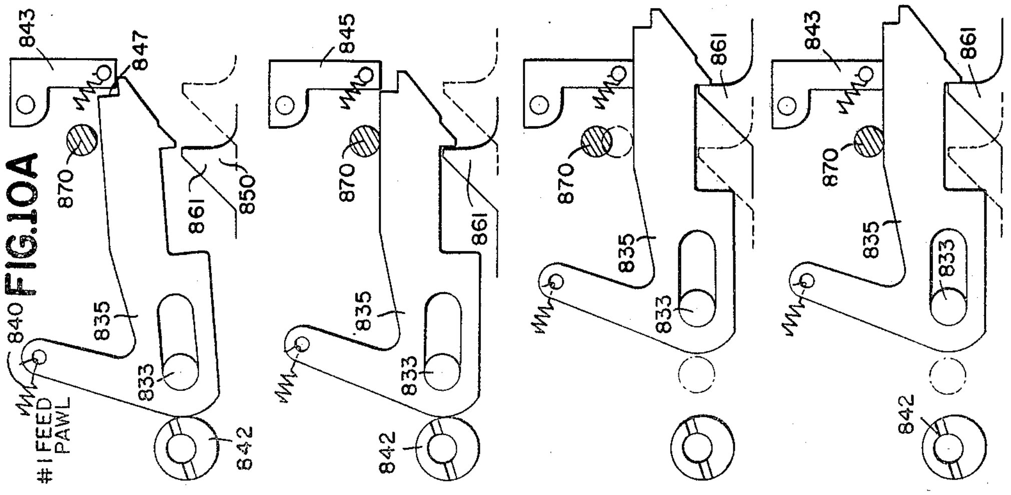

It will be noted in Fig. 10A that the top surface of the pawl 835 for example, as it advances, rides under the end of the associated detent 845 which maintains it positively engaged with the advancing slide 850. As a result, shortly after the pawl 835 for example, starts to advance with its related slide 850, the associated lever 866 and integral bail 870 may be restored and latched in preparation for the next operation. As the bail 870 restores the alternate pawl, such as 836 for example, it follows the restoration movement of the bail from the position indicated in the next to the top illustration in Fig. 10B until the notched end 847 thereof again engages the detent 843 as indicated in the next to the bottom illustration in Fig. 10B.

When the advancing slide 850 and its associated pawl 835 reach their extreme advance position, as indicated in Fig. 10A, the alternate slide 862 is positioned in its extreme leftward or restored position. The mechanism is thus properly conditioned so that if the magnet 872 is impulsed at this time, the pawl 836 is engaged with and subsequently advanced by the associated slide 862 to actuate the lever 785, etc. The firing of the hammer 649 to physically effect the actual printing of a selected character is effected when the selected levers 785, etc. and their actuating slide 850 or 862 reach their extreme advanced or right-hand position in Fig. 6. It will be denoted in Fig. 17 that, at this time, the horizontal and vertical aligners 793 and 827 are engaged so as to accurately lock the print element 591 in the selected position.

For restoring and relatching the levers 866, there is provided a semi-rigid elongated bail 878 which extends through an aligned clearance opening in the arm 877 of each lever 866. The left end of the bail 878 is pivotally connected to a follower 880, the latter being pivotally mounted at 881 on the plate 752 and carrying a roller 882 on one arm thereof for cooperation with a cam 883 secured to the shaft 856. A spring 885 linking the right end (see Fig. 6) of the bail 878 to a stud 886 carried by the plate 752, tensions the bail 878 towards the right in Fig. 6 so as to maintain the associated follower 880 continuously engaged with the cam 883. The cam 883 contains two equally spaced operational dwells, as indicated in Fig. 17, for reciprocating the bail 878 twice during each revolution of the shaft 856, once for every two drum cycles, it being recalled that one revolution of the shaft 856 is effected every 4 drum cycles. Secured to the bail 878 near the arm 877 of each lever 866 is a related relatching member 887. The arrangement of the members 887 on the bail 878 and the timing of the cam 883 to the print operation is such that during the interval when the print magnets 872 may be selectively impulsed to release the related levers 866, in the manner previously explained, the bail 878 is positioned so that each of the associated latch members 887 will not interfere with the possible operational rocking of its related lever 866. As a slide 850 or 862 starts to move to the right to actuate the levers 785, 788, etc. of the particular print magnets previously impulsed, the bail 878 moves toward the left in Fig. 6 with the relatch member of each "released" lever acting upon the arm 877 of the "released" lever 866 to relatch that lever on the armature 813 of the associated, then unenergized, control magnet 872.

The relatch action of the levers 866 is completed at approximately the same time as the advancing slide reaches its extreme right-hand position and the alternate slide reaches its extreme left-hand position in Fig. 6. Thereafter, the print magnets 872 may again be selectively impulsed in accordance with the next desired print character, to rock a new set of pawls accordingly for advance by the alternate slide, while those pawls previously advanced return as the first slide moves to the left (see Fig. 6). Provision is made so that where a selected and actuated lever 866 is again selected by the reimpulsing of the corresponding control magnet 872 for the next desired type selection operation, such lever 866 is not restored but is caused to remain in the actuated position. For this purpose a bar 888 (see Figs. 6, 9, and 10C) is provided which is fixedly mounted on posts 851 and has teeth 890 lying in the plane of movement of the latching pawls 837. When a lever 866 is in its latched position, with both the associated pawls 835 and 836 being in the corresponding restored positions, as shown in the top illustrations of Figs. 10A and 10B, the associated latching pawl 837 is positioned as shown in Fig. 10C with the recessed portion 848 on the top surface thereof being underneath the bail 870. Upon an impulsing of a magnet 872, the resulting rocking of the lever 866 and its associated bail 870 rocks the related pawls 835 and 836 on their lever 785 etc. into the operational plane of the slides 850 and 862, respectively, as previously described. This rocking of the bail 870 does not affect the rotational position of the associated latching pawl 837 on that lever 785, etc., however, since by reason of the recess 849 in the pawl 837, the bail 870 even when in its maximum "downward" position is still clear of the pawl as indicated in the next to the top illustration of Fig. 10C.

During the subsequent advance of either pawl 835 or 836 by their associated slide 850 or 862, respectively, as the case may be, the corresponding motion of the lever 785, etc. advances its latch pawl 837 into the position indicated in the next to the bottom illustration of Fig. 10C wherein a raised shoulder 891 will lie beneath the bail 870. If now the same actuated lever 785, etc. is to be selected for the next desired print selection operation, i.e., in the next ½ revolution of shaft 856, the related lever 866 and its bail 870 will be actuated with pawl 837 in the position of Fig. 10C (next to bottom illustration) and the pawl will be tilted to position it in the plane of the adjacent tooth 890 of the bar 888. This latching rotation of the pawl 837 takes place as the advancing slide 850 or 862 and the associated lever 785, etc. reach their extreme right-hand position, at which time the hammer 651 fires to effect the actual print operation.

With the pawl 837 rotated and the lever 785, etc. in its right-hand position, there is a slight clearance between the tooth 890 of the adjacent bar 888 and the pawl 837, as indicated in Fig. 10C (lower illustration). Thereafter the initial part of the restoring motion of the advanced slide 850 or 862 as the case may be, and the corresponding movement of lever 785, etc., closes the above clearance so that the latch pawl 837 tightly engages the related tooth 890 of the bar 888. This engagement arrests further movement of the lever 785, etc. towards its restored position but does not impede the further restoration of the pawl 835 or 836. With the pawl 837 engaged with the related tooth 890 of the bar 888, and with the continued movement of the previously advanced pawl 835 or 836 toward its restore position, the tension applied from the particular set-up cable through the latched lever 785, etc. is fully effective to maintain the pawl 837 latched on the bar 890. This tension is sufficient to overcome the tension of the related spring 840 tending to unlatch the pawl 837, as the lever 866 and bail 870 restore in their normal manner. A slight undercutting of the latching surface of the pawl 837 also serves to assist the maintenance of the latched pawl relationship until the newly advanced pawl 835 or 836 picks up the particular latched lever 785, etc. to again overthrow it by the previously mentioned clearance motion.

With the lever 785, etc. again in its extreme right-hand position, the actual printing operation is effected as described before. If the latched lever 785, etc. was not selected again so that at the time of the latter print operation, the bail 870 is in its "up" position, the clearance between the previously latched pawl 837 and the tooth 890 of the bar 888, permits the tension of associated spring 840 to be effective to rotate the hook clockwise on lever 785, etc. to a position clear of the related tooth 890. Thereafter, as the advanced slide 850 or 862 restores towards the left, the associated lever 785, etc. and latch pawl 837 restore therewith to their inoperative positions.

The net effect of this latching action is to obviate the return of the print element 591 to home position between successive printing operations, and, where the same type character is to be printed in successive columns, the print element will be positioned for the first such print operation and then held in such position for the desired repeated printing therefrom.

Obviously, where the next print character lies in the same "band" or "line" of the print element, that "line" or "band" will have its selecting connections latched so that the print element is simply repositioned along the previously selected "band" or "line" to the new character therein. To be more specific if (see Fig. 22B) the letter A is first selected, the cylinder is shifted horizontally 3 band positions and rotated 6 angular positions from the home position as previously explained. If the next character selected is the letter I, the carrier remains in its rotational position but shifts 2 bands further to the left.

By providing alternately operating slides 850, and 862, high speed of operation is obtained since while one slide is effecting a selection, the other is being restored. By providing further a latching mechanism so that the restoration of levers required in the next selection is obviated, the extent of movement of the print element is only that required to move directly from one character to the next without an intervening homing action. Due to the high print speed so obtainable, the advance of the carriage 570 across the columns of the print record 599 is continuous with the associated print element 591 accordingly being in motion when the hammer 651 is impelled against each particular desired print character.

Each of the print control magnets 872 of which there are seven in all is assigned a particular one of the bit codings Z1, Z2, 1, 2, 4, 8 and R of the internal machine code. The print magnets 872 coded 4, Z1 and Z2 control, respectively, the operation of the levers 791, 788, and 785 associated with the "rotational" set-up cable 776, while the print control magnets coded 2, 8 and 1 control, respectively, the operation of the levers 825, 822, and 820 associated with the "horizontal" set-up cable 815. The "R" (redundancy) print control magnet 872 controls the operation of the 7th lever 824. The particular horizontal or rotational motion imparted to the print element 591 as a result of the energization of any selected one or ones of the controlling print magnets 872 is summarized in the table below:

| Print magnet: | |
|---|---|
| Z1 | imparts 2 units of rotation to print element |
| Z2 | imparts 4 units of rotation to print element |
| 4 | imparts 1 unit of rotation to print element |
| 1 | imparts 3 units of horizontal motion to print element |
| 2 | imparts 1 unit of horizontal motion to print element |
| 8 | imparts 2 units of horizontal motion to print element |
| R | No motion—used for checking purposes |

For example, to position the print element to print the letter A, as described previously, the Z1, Z2 and 1 print magnets are energized. It will be recalled that the 6 bit binary coding for the letter A is a binary one in the Zone 1, Zone 2, and "1" binary bit positions. The energization of the "1" print magnet effects an actuation of lever 820 and the associated pulley 818. This action accordingly displaces the print element 591, 3 units to the left in Fig. 5 from its home horizontal position. The energization of Zone 1 and Zone 2 print magnets effects an actuation of the respective lever 788 and associated pulley 787, and lever 785 and associated pulley 783. This action accordingly rotates the type cylinder 6 units from its home angular position. As a result of 3 units of horizontal movement and 6 units of angular movement, the desired type letter A is in printing position at the printing line. Each of the 7 levers 785, 788, etc. carries actuating fingers 789 (see Fig. 9A) which, when that particular lever is actuated and is positioned in the general area of its extreme advanced position in Fig. 8, is adapted to transfer a related part so-called check contacts 892 A and B carried on plate 753. Each of the 7 check contacts 892 is designated further as Z1, Z2, 1, 2, 4, 8, or "R" in correspondence to its particular related lever 785, etc. The contacts 892 are connected in a circuit which, as determined by the pattern of contacts closed, checks the accuracy of the type character selection movement applied by the related levers 785, 788, etc. to the print element 591. The details of this circuit will be later explained.

The energization of each of the print magnets 872 is controlled by a related print set-up relay 893, in a manner to be explained. The conversion table in Fig. 38 summarizes the manner in which any one of the possible 26 letters, 10 numbers, and 10 special characters in machine code (6 bit) is translated into the proper horizontal and angular shifting of the type cylinder to position the desired letter at the printing position of the particular column of the record in which the carriage is then positioned.

Information may be printed from either card tracks #1 and #2 or from the counter track 153. All or any selected part of the card track or counter track information may be printed in one or a multitude of print lines or any desired column or columns thereof. A single print line may include information from both selected addresses of the particular card track available thereto and from the counter track 153. During the column by column advance of the print carriage across a print line of the record, the determination as to which columns have printing effected therein and the source from which this print information is obtained, is selectively predetermined by plugboard wiring on the control panel 127. This plugboard wiring includes the use of the address device 427 and the print emitter 337 previously mentioned.

Since the emitter 337 and carriage advancing means are driven from the common shaft 299, the emitter 337 is "timed" with the carriage advancing means and may be considered as a carriage position indicating device, with each segment 320 corresponding to a particular columnar position. Since a printing operation requires not only the selection of the column in which the printing is desired, but also the selection of the particular address of the card track or counter track from which the actual print information is to be obtained, the proper timed correlation of these selection operations is effected by wiring the appropriate hubs of the address device 427 and print emitter 337 in series, the output of the circuit being wired to a print control circuit. For example, if it is desired to print the information in address #9 of the card track (#1 and #2) in column #40 of the print record, the #9 reading exit hub 364 of the address device, is wired to the #40 input hub 353 of the print emitter 337, the corresponding 40th output hub 352 of the emitter being wired to a so-called card list hub 895 (coordinates D; 60–63 in Fig. 12B). As a result, at address #9 time of the drum cycle in which the print carriage is positioned so that the wiper 337A engages the associated 40th segments, a #9 address impulse is applied to the card list hub 895. This impulse causes the information in the corresponding #9 address of the card track to be read out to the print mechanism set-up circuits, so that as the print element reaches column #40 the corresponding desired type character is in printing position.

It will be noted in Fig. 15A that the print emitter segments corresponding to any particular columnar print position are engaged by the associated wiper 337 at a time which actually "leads" the corresponding columnar position of the print carriage in machine time by approximately 4 drum cycles. For example, during the actual drum cycle in which the card list hub 895 is impulsed as described above in reference to a desired print operation in column #40 of the data in address #9 of the card track, the print carriage is not physically in column 40, but in column #38 and may be effecting a printing operation therein of information that was directed thereto four drum cycles previous thereto.

The four drum cycle "lead" of the print selection initiating impulse to the actual corresponding print operation is comprised of two drum cycles in which to set up the proper circuitry as a result of the print initiating (address pulse) pulse, and two more drum cycles to actually set up the print mechanism in correspondence to the state of the set-up circuitry at the end of the initial two drum cycles. During the 2 drum cycles of the actual mechanical selection of the desired type character, the print set-up circuitry is free to be adjusted for the selection of the next type character. This overlapping of mechanical selection of the desired print character and the adjustment of the set-up circuitry for the next print character selection permits printing to be effected at the previously mentioned rate of one print column per two drum cycles, even though the complete circuit set-up and mechanical set-up for printing any particular column actually requires four drum cycles. The circuitry by which a print operation is effected will now be explained in detail.

*Card list*

Assume that it is desired to list (print) in column 40 of successive lines of the print record sheet, the information from column 20 of successive entry records. It will be recalled that the actual print information is not obtained directly from each entry record, but is obtained from the card track (#1 or #2) into which the entry record information was "loaded" in binary coded form, as a result of the sense operation on that record. It will also be recalled that during the sensing of a record and the "loading" of the sensed information into one of the card tracks (#1 or #2), the other card track which contains information from the previously sensed record, is available to the machine for listing, etc. A card list operation of the information in any particular record is accordingly initiated at least 1 card feed cycle after the information in that record was actually sensed.

The control panel wiring required to effect our representative card list operation is shown in Fig. 45 and comprises plugwiring the 20th reading exit hub to the 40th print position entry hub, with the corresponding 40th print position exit hub 352 being connected to the card list hub 895. For our representative print operation it will be assumed that address 20 of the card track #1 contains the letter A in its binary coded form (binary one in zone 1, zone 2, "1" and R cells) and this card track is now available for listing. In our particular representative print operation described hereinafter, the printing action is described, drum cycle by drum cycle, as it occurs, with the 1st drum cycle action occurring as the print carriage is positioned in column 38 of the print record. It will be recalled that the passage of the print carriage through each particular print column requires two drum cycles. Thus for our particular example, the drum cycles labelled 1 and 2 (Representative Print Operation) in Fig. 46 may be considered as occurring when the print carriage is in column 38, the drum cycles 3 and 4 occur when the print carriage is in column 39, and the drum cycles 5 and 6 occur when the print carriage is in column 40.

With the print carriage positioned in column 38 of the print record, it will be noted in Fig. 15A that the wiper 337A of the print emitter 337 is in the 40th segment position. During the first (alternate drum cycle of the 2 drum cycles) when the carriage is in column 38, the activation of the 20th reading exit hub (Fig. 45) completes a circuit through a plugwire 896, the 40th print position entry hub 353, through the related entry segment (see Fig. 13K), the upper 337A, the 40th exit segment, the 40th exit hub 352, a plugwire 897, the card list hub 895, the left section of a follower 898 (Fig. 13I) to condition the one input of the AND unit 900. During address 20 time, the binary coded letter A in address 20 of card track #1 is read out, in a manner previously explained, and applied through the read amplifier 540 (Fig. 13C), and a conductor 901 to the other input of the AND unit 900. The resultant "B" pulses generated on the related output during zone 1, zone 2, 1 and "R" time of address 20 time are representative of the letter "A" in binary coded form and are applied through OR circuits 902, conductor 903 and the right section of a follower 905 to the 1st input of a 3-way AND circuit comprised of units 906A and 906B. The 2nd input of the AND circuit is conditioned positive through conductor 467 by the alternate drum signal, while B pulses are applied through conductor 430 to the 3rd input of the AND circuit. Under the above conditions the 3-way AND circuit is actuated at B time of zone 1, zone 2, 1 and "R" time of address 20. The corresponding pulses (representative of "A") generated on the output thereof are applied through the left section of a follower 907, through a conductor 908, to the one grid input of each of the seven so-called print set-up thyratrons 910 (Fig. 13K), there being a separate thyratron for each of the seven cell intervals zone "1," zone "2," "1," etc. of an address time as indicated. An 8th so-called inversion thyratron 911 is also provided and the purpose of this thyratron will be later explained. The other grid input of each of the seven thyratrons 910 is connected to the corresponding output conductor 440 of the seven bit ring 432.

The plate terminals of each of the seven thyratrons 910 is connected through an associated plate resistor to a common plate line, the latter being connectable through the cam actuated contact CRA–1 to the positive power terminal 486. The cam contact CRA–1 is closed from slightly before each alternate drum cycle, until about one-half of the way through the following drum cycle. This is indicated in Fig. 15A. If it is assumed that the contact CRA–1 is closed, a plate circuit is provided for each of the seven thyratrons 910 through the associated plate resistor during the entire alternate drum cycle of our representative card list operation, as indicated in Fig. 15A and Fig. 46.

With a suitable plate circuit provided for each thyratron 910, it is evident that the thyratron will fire if both grid inputs are rendered simultaneously positive. Consequently, in our example, the coincidence of the zone 1, zone 2, 1 and "R" readout B signals and the 1 of 7, 2 of 7, 3 of 7 and 7 of 7 signals, respectively, causes the corresponding zone 1, zone 2, 1 and "R" thyratrons to be fired, in turn, during address 20 time of the alternate drum cycle in which the print carriage is in column 38. The conductive thyratrons are accordingly representative in binary coded form of the letter A read from address 20 of card track #1.

Each one of the print relays 893, previously mentioned in conjunction with the print mechanism, is connected from the plate terminal of a corresponding one of the thyratrons 910, through an associated diode 913, to a common conductor. The conductor is connectable through the cam actuated contact CRA–2 to the power terminal 486. The contacts CRA–2 are closed from slightly before the end of each alternate drum cycle, through the majority of the following so-called idle drum cycle (Fig. 15A and Fig. 46). Consequently, if it is assumed that the contacts CRA–2 are in the position indicated in Fig. 13K, the closing thereof at the end of the alternate drum cycle applies the positive potential of terminal 486 to each of the print relays 893 to effect an energization of those relays which have their other (plate) terminal being held negative (relative to terminal 486) as a result of the conductive state of the associated thyratron 910. Consequently, in our particular example with the zone 1, zone 2, 1 and "R" thyratrons having been previously rendered conductive as a result of the reading out of the letter "A" from address 20 of the card track #1, the closing of cam contact CRA–2 at the end of this alternate drum cycle (1st cycle in Fig. 46) effects the energization of the zone 1, zone 2, 1 and "R" print relays.

The energization of the zone 1 print relay 893 causes its associated contacts 893—Z1*a, c, d,* and *f* to close and Z1*b* and *e* to transfer from the positions shown in the drawings. Similarly, the energization of the Zone 2, 1 and "R" print set-up relays 893, cause the corresponding contacts 893—Z2*a, b,* 1*a,* 1*b,* 1*e,* 1*i,* 1*m* and "R"*a* to close and contacts Z2*c,* 1*d,* 1*f,* 1*g,* 1*h,* 1*i,* 1*j,* 1*k* and "R"*b* to transfer. With the contacts 893—Z1*a,* Z2*a,* 1*a,* and "R"*a,* closed, the closure of cam contacts CRA–3 shortly before the opening of cam contact CRA–2 (see Figs. 15A and 46), completes a circuit from the power terminal 486, through the contacts CRA–3, through each of the Zone 1, Zone 2, 1 and "R" contacts and an associated hold coil for that set-up relay 893 to ground. Each of the previously energized print relays 893 is accordingly held energized through cam contacts CRA–3 throughout the succeeding alternate drum cycle (third drum cycle), as indicated in Fig. 46.

The readout operation to this point may be summarized as follows: During the first (alternate) drum cycle when the wiper 337*a* of the print emitter 337 engages the 40th segment, the thyratrons 910 are fired in accordance with the readout value. During the following (second) drum cycle, the relays 893 associated with the conductive thyratrons 910 are energized by the closing of cam contacts CRA–2. During the latter part of the second drum cycle and through the succeeding (third) drum cycle, which is an alternate drum cycle, the energized print relays 893 are held energized through cam contacts CRA–3.

Returning again to our example, with the Zone 1, Zone 2, 1 and "R" set-up relays held energized, the closing of the cam contacts CRA–4 from the latter portion of the 2nd drum cycle through the initial portion of the 3rd drum cycle (alternate drum cycle), as shown in Fig. 46, completes a circuit from the power terminal 486, through the contacts CRA–4, to a conductor 915. A first circuit continues from the conductor 915 through the normally closed side of the contacts R19*d* (Fig. 13L) of a so-called inversion relay R19 (it being assumed that the inversion relay is unenergized), through a conductor 916, the normally open side of the contacts Z1*e* of the Z1 set-up relay 893, now closed, through the Zone 1 print magnet 872, to ground, thus energizing the Zone 1 print magnet. A second parallel circuit extends from CRA–4 (Fig. 13J) to the conductor 915 through the normally closed side of the contacts R20*c* of a so-called X eliminate relay R20, through the contacts Z2*b* of the Z2 set-up relay 863, now closed, to energize the Zone 2 print magnet 872. A third circuit extends from the conductor 915 through the normally closed side of the contacts R19*d,* through conductor 916, the normally open side of the contacts 1*d* of the "1" set-up relay 893, now closed, to energize the "1" print magnet 872. A 4th circuit extends from the conductor 915, through the normally closed side of the contacts R19*d,* the conductor 916, a conductor through the normally open side of the contacts R*b* of the R set-up relay 893, now closed, to energize the redundancy print magnet 872.

The closing of cam contacts CRA–4 also near the end of the 2nd drum cycle, completes a circuit therethrough, through the conductor 915, a conductor 918 (Fig. 13K) the normally open side of the contacts 1*f* of the "1" set-up relay 893, now closed (Fig. 13J), through the normally closed side of contacts 8*h* of the "8" set-up relay 893, through the normally closed contacts R21–*a* of a so-called print suppress relay R21, through the hammer control magnet 681 to ground.

With the Zone 1, Zone 2, 1 and "R" print magnets 872 energized from shortly before the end of the 2nd drum cycle (see Fig. 46) until shortly after the beginning of the 3rd drum cycle (print carriage in column 39), the levers 785 and 788 associated with the cable 776, and the lever 820 associated with the cable 815 (see Fig. 8), are actuated during the latter part of the 4th drum cycle and the beginning of the 5th drum cycle so as to select the desired print character "A." As a result of the hammer magnet 681 being energized at the end of drum cycle #2 in our particular example, the associated hammer mechanism is actuated in the manner previously described in detail so that the print hammer 649 strikes at approximately the midpoint of the 5th drum cycle (see Fig. 46). At this time, the carriage is in column 40, and the selected type character "A" is in printing position so that a printing of the letter "A" in column 40 of the print record is effected. This is the desired result.

The actuation of the levers 785, 788, and 820 in response to the energization of their respective Zone 1, Zone 2, and 1 print magnets 872 so as to select the letter "A" for printing, also effects a transferring of the associated Zone 1, Zone 2, and 1 check contacts 892 in Fig. 13J. The simultaneous actuation of the "R" lever (not shown) in response to the energization of its related "R" print magnet 872, effects a closing of its associated "R" contact 892 in the circuit, it being recalled, however, that actuation of the "R" lever (not shown) does not effect the selection movement of the print element 591. During the mid portion of the 5th drum cycle, in our particular example, simultaneous with the actual printing operation of the "A" in column 40, the closing of cam contacts CRA-6 completes a circuit from the power terminal 455, through the normally open side of the Zone 1 check contact 892A, now transferred through the normally open side of the Zone 2 check contact 892A now closed, the normally open side of the "1" print check contact 892B now closed, the normally closed side of the "2" check contact 892A, the normally closed side of the "4" check contact 892A, the normally closed side of the "8" check contact 892A, to the normally open side of the "R" check contact 892A, now closed, to ground. The fact that the check impulse from contacts CRA-6 is shunted to ground through the print check circuit as described above, indicates that the bit count of the type character as actually set is correct, and the character printed is accordingly the same as the character read from the drum. If the check impulse from the contacts CRA-6 is not shunted to ground through the check circuit, it signifies that the bit count of the character printed is odd or incorrect. This indicates either an error in reading from the drum to the print mechanism, or an error in setting up the print mechanism. With the check impulse (CRA-6) not shunted to ground, it is applied from the transfer point of the Z1 check contact 892A, through a conductor 920, through the OR unit 920, to the grid of a thyratron 558 to render the latter conductive. The thyratron unit 558 is similar to the usual thyratron AND unit (Fig. 33) except that one grid is continuously biased positive. With thyratron circuit 558 conductive, a so-called associated error relay R3 connected in the plate circuit thereof is energized.

With relay R3 energized, its associated contacts R3-*a* and R3-*b* open and close, respectively. The opening of the contacts R3-*a* breaks the hold circuit of the Run relay R4. The resultant de-energization of the run relay R4 causes its associated contacts R4-*a*, *b* and *c* to open. It will be recalled that the contacts R4-*c* are in the pick-up circuit of the clutch control relay R8. Consequently, with the contact R4-*c* open, it is impossible to reenergize the clutch control magnet R8 after it is de-energized by the normal opening of its hold circuit. With relay R8 unenergized, its associated contact R8-*b* in the pick-up circuit to the program shaft clutch magnet 204 and card feed shaft clutch magnet 373 remain open and reimpulsing of the clutch magnets is prevented. The machine accordingly "latches" up at the end of the card feed cycle wherein the sense error was detected.

The closing of the contact R3-*b* energizes a check error light 560 on the control panel to give the operator a visual indication of the reason for the machine stopping. The check error light circuit extends from a power terminal 470, through the contacts R3-*b*, now closed, through the check error light 560 to the power terminal 471. After the reason for the print error has been determined, the operator depresses a manual check release key contact 561 (Fig. 13K) which opens an associated contact to de-energize the thyratron 558 and the associated error relay R3. With the relay R3 de-energized, the check error light 560 is extinguished and the pick-up circuit to the Run relay is reestablished so with a depression and release of the start key 499, the machine is again started.

Referring again to Fig. 46, it will be evident that the timing of the various actions for a print operation is such that during the actual printing of a character in any particular column, desired information for printing in the succeeding two columns of the print record is being simultaneously utilized in the print mechanism set-up circuits previously explained. Consequently, as the print carriage is subsequently advanced to the following column and then the column thereafter, the desired print character selection is made for each of these columns and a printing operation is effected therein. For example, in our above example, when the print carriage is in column 38, a print operation may be effected therein of information that was read from the drum tracks approximately 5 drum cycles previous thereto (actually 45 milliseconds) when the carriage was positioned in column 36. At the same time as a print operation is being effected in column 38, drum information for effecting a print operation in column 40 is reading to the print set-up thyratrons 910. With the print carriage in column 39 for effecting printing therein, our "A" thyratron information which is to be printed in column 40, has been "transferred" from the thyratrons 910 to the print relays 893 and the thyratrons may be loaded with new information for effecting a print operation in column 41. This overlapping of operations permits a print operation once every 2 drum cycles, even though the entire sequence of operation for effecting a print operation in any particular print column actually requires 6 drum cycles.

*The line stop operation*

Upon the completion of the printing operation in the last desired column of the print line, a so-called line stop magnet 921 (Fig. 14C) is energized, in a manner to be explained. The energization of magnet 921 attracts its armature 922 (Fig. 4) which effects a corresponding displacement of a pivoted lever 923, against the bias of an associated spring. As the lever 923 rotates, a roller 925 carried thereon acts against the collar 293 of gear 294, and accordingly displaces the gear 294 on its supporting shaft 296 so as to disengage it from the gear 298. With the gear 294 disengaged, the spring wind-up 742 (Fig. 5) through the tape 741 restores the carriages 570, 652 and 716 to their respective "home" positions. The restoring motion of the carriages is effective, in turn, through the tape 730 and pulley 731, to restore the emitter shaft 298 and associated emitters to their corresponding "home" positions. As the print carriage 570 restores past the 15th columnar print position of the print record 599, the cam actuated contact ES-1 associated with emitter shaft 299 closes (see Fig. 15A). The contacts ES-1 are closed during the remainder of the restoration of shaft 299 and also remain closed after the restoration action ceases. The purpose of the contact ES-1 will be later explained. As the shaft 299 approaches its maximum restored position, the cam 748 engages the roller 747 of the link 743 and restores the associated mechanism into the position shown in Fig. 43.

The timing relationship between the print carriage advance operation by the emitter shaft 299, and the columnar movement of a record under the sense brushes 418 is such for each two column advances of the record, the print carriage 570 advances one columnar position relative to the print record 599. If a card sense operation is being effected, which requires that both the card feed shaft 371 and the emitter shaft 299 be rotated as previously described in detail, the line stop relay cannot be impulsed to restore the shaft 299 and its associated emitters and print device, until the sensing operation is completed in the last (80th column) of the entry record at which time, the print carriage 570 will be in its 40 column print position.

It will be recalled that the print position emitter is at all times representative of the print carriage position, consequently, the position of this emitter following the last desired print column may be utilized as an impulse source to energize the line stop magnet 921 and terminate that machine cycle. For example, if print column 68 is the last column in which entry record data is to be printed, the 69th print position control exit hub 347 of the emitter 339 is connected through a plugwire to a so-called line stop hub 926 (coordinates S; 41 to 44 in Fig. 12B). When the print position control emitter 339 reaches its 69th position, a circuit is completed from the power terminal 487 (Fig. 14A), through conductor 495, the normally closed side of the contacts R14–*c* (Fig. 14B) of the jam relay R14, through a conductor 927, the cam contact CRA–5 (Fig. 14C), now closed, the normally open side contacts R1–*c* of the line indicate relay R1, now closed, the normally closed contacts R15–*c* of the 1st card relay R15, to the common of the emitter 339. The circuit continues through the associated wiper 239A in its 69th position to the associated hub 347 (see Figs. 12A and 14C), through a plugwire to the line stop hub 926. The circuit continues from hub 926 through the line stop magnet 921 to ground. The resultant energization of magnet 921 initiates the restoration of the emitters and the print device, as previously described.

If the magnet 921 is not impulsed through the hub 926 under plugboard control from a position of the emitter 339, the magnet 921 is automatically energized by the closing of cam contact ES2 as the carriage advances from its last (80th) possible print position.

*The print record feeding and guiding mechanisms*

The print record 599 is of the continuous form type which is divided by lines of laterally extending scoring perforations at fixed intervals along its length into a series of individual records. The scoring perforations permit one or any multiple of the individual records to be ripped from the continuous form and removed from the print device after a printing operation is completed thereupon. The print record is folded back on itself at each line of scoring perforations so as to form a stack in a suitable supply carton, the record being fed directly from the carton, between guide plates 930 and 931 which are secured to the end frames 114 and 116, between the print carriage 570 movement path and hammer carriage movement path 652, and into operative engagement with a print record advancing or line spacing apparatus, generally designated 931 in Fig. 6, and finally over a fixed guide member 932 carried by the stationary shaft 118, from which the record is discharged from the printing device.

Referring to Fig. 6, the print record advancing mechanism 931 comprises identical left and right frame members 933 which are secured to fixed shaft 935, the latter being supported by the left frame member 114 and right frame member 116 (Fig. 5). Secured to the upper end of each member 933 is a related shaft 936 on which is rotatably mounted an associated sprocket 937. A shaft 938 which is rotatably supported by the end frames 114 and 116, extends through suitably bearing inserts in the members 933. Vertically aligned with each of the sprockets 937 and secured to the shaft 938 for rotation therewith adjacent each of the members 933, is a related sprocket 940 (Fig. 6). Each pair of aligned sprockets 937 and 940 is operatively engaged by an associated endless chain 941. Secured to the usual connecting members 942 between each link of chain 941 is an ear 943 which extends laterally beyond the one side of the chain 941 and overlies but does not engage the associated frame member 933. A pin 945 is secured to this extending portion of each ear, the pin extending outwardly therefrom in a direction away from the frame 933. The pins 945 of each chain thus form an endless loop in a plane parallel to the links of that chain 941.

Secured to and extending between the frame members 933 is a member 946 having a plane record supporting portion 946A. That portion of the record between the member 946 and the support guides 930 and 931 is supported by suitable rollers 947 which are secured to the shaft 938. The pins 945 on the forward portion of each related loop in Fig. 6 extend through mating openings along a related edge of the record 599. Secured to the outer surface of each frame 933 is a plate member 948.

Hingedly mounted on each member 948 is a member 950 which is tensioned by a spring 951 connected therefrom to the member 948. With each member 950 in the position shown in Fig. 6, a planar portion 950A thereof bears against the forward surface of the record 599 to maintain the openings in the adjacent edge of the record engaged with the pins 945. It will be noted that the pins 945 engaged with each edge of the record 599 extend therethrough and into an aligned slot 950B in the associated member 950.

It is evident from the above described mechanism that any clockwise advance of the shaft 938 in Fig. 7 effects, through each of the sprockets 940, a corresponding movement of the related chain 941, the motion of the chain being effective, in turn, through the related pins 945 engaged with the record 599 to advance the record upwardly in Fig. 6. Mechanism to be described hereinafter, is provided for selectively advancing the shaft 938 in angular increments so as to effect line spacing of the print record, as required. When it is desired to insert a fresh continuous record form in the print device or to remove the form from the print device, the hinged members 950 may be manually rotated clear of engagement with the record 599 so that it may be freely removed from engagement with the related pins 945.

*The line space mechanism*

The mechanism for advancing the shaft 938 comprises a 3 armed lever 952 which is pivotally mounted on the shaft 662 as shown in Figs. 7 and 47. Operationally associated with the lever 952 in a so-called line space control magnet 953 which is mounted adjacent the previously mentioned hammer control magnet 681 and is similar thereto. With the magnet 953 unenergized, the end of the associated unattracted armature thereof abuts a latch surface on the one arm 955 of lever 952. As a result, the lever 952 is "latched" against rotation in a counterclockwise direction in Fig. 7 under the urging on associated tensioning spring 956, the latter being connected from the arm 955 to stationary frame structure of the magnet 953. With the lever 952 latched, a roller 957 on a second arm 958 thereof is maintained free of operational engagement with an associated cam 960 which is secured to the previously mentioned driven shaft 168.

Pivotally mounted on the shaft 662 adjacent the member 952 is a 2 armed lever 961. The lever 961 is tensioned counterclockwise in Figure 7 by a spring 962 connected from the one arm thereof to a fixed spring stud 965, so as to maintain a roller carried on the other arm continuously engaged with an eccentric cam 966, the latter being secured to the previously mentioned driven shaft 168. Rotatably supported by the one arm of lever 961 is a shaft 968 to which is secured a pawl-like member 970. A spring 971 connected from the pawl 970 to a fixed stud tensions the pawl and associated supporting shaft 968 counterclockwise in Fig. 7 relative to the lever 961, so as to maintain a nose 972 of the pawl with an arcular cam surface 973 of the third arm of lever 952. The shaft 968 extends through a slot in the left frame member 114 and beyond the member 114 as shown in Fig. 47. A pawl 975 identical to the pawl 970, is secured to this extending portion of the shaft in a position aligned with a ratchet 976, the ratchet being secured to the shaft 938. The pawls 970 and 975 associated with shaft 968 are secured thereto in the same angular position. With the lever 352 latched as shown in Fig. 7, the nose of the pawl 975 is clear of the teeth of the ratchet 976 (see Fig. 48).

The contour of the cam 966 is such that the lever 961 is rocked back and forth on the shaft 662 through an angular increment of sufficient magnitude to effect a related indexing movement of the pawl 975 through a distance equal to one tooth of the ratchet 976. A similar motion of the pawl 970 back and forth on the cam surface 973 of the third arm of lever 952 is also effected for each back and forth rocking of lever 961. The indexing motion of the pawl 975 is, of course, ineffective for effecting an advance of the ratchet 976 and shaft 938 as long as the lever 952 is latched.

To initiate a line space operation, the magnet 953 is impulsed in a manner to be later explained. The resultant attraction of the associated armature unlatches the lever 952 which then rotates clockwise from the position shown in Fig. 7 until the roller 957 thereof engages the cam 960. As the lever 952 rocks clockwise, the associated motion of the integral cam surface 973 permits the pawl 970 and associated shaft 968 to rock counterclockwise relative to the lever 961 so that the nose of the pawl 975 drops into position behind an adjacent tooth of the ratchet 976. The subsequent clockwise motion of the lever 961 on shaft 662 is accordingly effective through pawl 975 to advance the ratchet 976 and associated shaft 938 is effective through the associated sprockets 940 etc. to effect an advance of the print record 599 one print line.

After the advance of the print record 599, the cam 966 rocks the lever 952 clockwise, this action being effective through integral cam surface 973 to disengage the pawl 975 from the ratchet 976 and also relatch the lever 952 on the restored armature of the now unenergized control magnet 953. The mechanism is then in condition for the next print record advance operation. A spring pressed detent 977 pivotally mounted on the outer surface of the frame 114, engages the ratchet 976, as indicated in Fig. 6, to prevent any motion of the ratchet 976 in a counterclockwise direction in Fig. 7. It will be appreciated that by impulsing the control magnet 953 once or a number of times, the record 599 is advanced, correspondingly, one or more lines, as required. Circuit means which can be controlled through plugboard wiring on the control panel 127, are provided for applying 1, 2, or 4 impulses to the magnet 953 at the beginning of a machine cycle so as to effect 1, 2 or 4 line spaces of the print record 599 as desired.

Referring now to Fig. 14C, the line space control circuitry comprises 3 pairs of plughubs 978 (coordinates YZ; 46 to 48 in Fig. 12B) the first pair labeled "1," when linked by a plugwire, causing a single impulse to be routed to the magnet 953 to effect a single line space operation; the second pair labeled "2," when linked by a plugwire, causing 2 impulses to be routed to the magnet 953 to effect 2 line spaces; while the 3rd pair labeled "4" when linked by plugwire, causing 4 impulses to be routed to the magnet 953 to effect 4 line spaces of the print record. The details of the above described line space control circuitry is as follows.

Assuming first that the "1" plughubs are linked by a plugwire, the closing of CRB-4 during the 4th drum cycle of a machine cycle (see Fig. 15A), completes a circuit from the power terminal 489 (see Fig. 14A), through the conductor 495, the normally closed side of the contacts R14–*c* through the conductor 927, the normally closed contacts R15–*d* of the relay R15, the contacts CRB-4, the cam contacts PS-10, now closed (see Fig. 15B), to the "1" hub 978, through a plugwire to the other "1" hub 978, through a conductor 980, a conductor 981, and the line space magnet 953 to ground. The resultant energization of magnet 953 causes a single line space operation of the print record 599 through mechanism previously described. It will be noted in Fig. 15B that the cam contacts PS-10 open shortly after the end of drum cycle #4 and do not close again until drum cycle 3 of the subsequent machine cycle. Consequently, even though the cam contacts CRB-4 close every 4 drum cycles throughout the entire machine cycle, as indicated in Fig. 15A, it is only the single CRB-4 impulse coincident with the closing of PS-10 that can be applied to the magnet 953.

Assuming now that the "2" plughubs 978 are linked by a plugwire, the closing of cam contacts CRB-4 during the 4th drum cycle of a machine cycle, completes a circuit therefrom, through the cam contacts PS-11, the "2" hub 978 through a plugwire to the mating "2" hub, through a conductor 982 etc. to the line space magnet 953, thus advancing the print record 1 line. It will be noted that the cam contacts PS-11 remain closed through an interval spanning a subsequent reclosing of cam contact CRB-4 during drum cycle 8 of this same machine cycle so that the same circuit as described above is again completed to effect a second line operation as desired.

Assuming now that the "4" plughubs 978 are linked by a plugwire, the closing of cam contacts CRB-4 during the 4th drum cycle of a machine cycle, completes a circuit therefrom through cam contacts PS-11 now closed to the "2" hub 978, through a conductor 983 to the "4" hub 978, through a plugwire to the mating "4" hub 978, a conductor 985, a diode 986, to the line space magnet 953 thus effecting a single line space operation. A parallel circuit is also completed from the conductor 985, through the pick-up coil of a so-called line space relay R22 to ground. The resultant energization of the relay R22 causes its associated contacts R22–*a* and *b* to close. The closing of contacts R22–*a* completes a hold circuit for relay R22 from the conductor 927 through the cam contacts PS-12, now closed, a conductor 987, the contacts R22–*a*, a hold coil of the relay R22 to ground. This hold circuit for relay R22 is maintained until PS-12 opens at the end of drum cycle 17 of this same machine cycle.

With the contacts R22–*b* closed, it will be noted in Fig. 14C that the line space magnet 953 is connected therethrough to the cam contact CRB-4. Consequently, each time that CRB-4 closes, a circuit is completed through the contacts R22–*b* to advance the print record 1 line. It will be noted in Fig. 15B that during the interval when relay R22 is held energized with contacts R22–*b* accordingly closed, three separate impulses are applied from CRB-4 through these contacts, thus giving 3 additional line spaces or a total of 4 for this machine cycle. This is the desired result.

*The forms skip control device*

The line space control magnet 953 of the print record advancing or line space mechanism, previously described, may be repeatedly impulsed to rapidly advance or skip the print record over portions thereof wherein no printing is required. This repeated impulsing of the control magnet 953 is effected through circuitry jointly controlled by suitable plugboard wiring of the control panel 127 and a so-called forms skip control device 988 (see Figs. 5 and 6) of the paper tape controlled type.

Referring now to Fig. 6, the forms skip control device 988 comprises a cylindrical member 990 rigidly mounted on a portion of the shaft 938 which extends outward beyond the associated driving ratchet 976 thereof. The cylinder 990 has spaced teeth 991 cut in the periphery thereof, the teeth 991 extending lengthwise on the cylinder as indicated in Fig. 48. The angular spacing between the teeth of member 991 and the teeth of ratchet 976 is identical so that a single tooth advance of member 990 is effected for each single tooth advance of the ratchet 976, and the resultant single line advance of the record strip 599.

The device 988 includes a paper controlling tape 992 which is formed into an endless loop, the peripheral length of the tape being predetermined to exactly correspond to the length of one or more of the individual records of the continuous print form 599. The one end of the loop is supported on the member 990 while the other end of the loop is engaged by a free cylinder (not shown), the weight of the cylinder being sufficient to maintain the paper loop taut. The cylinder 990 carries a band of fixed pins 995 around its mid-portion which are adapted to engage mating openings 996 in the tape loop so that as the member 999 rotates, the tape 992 is driven thereby.

Adapted for cooperation with the paper type 992 and member 990 in a manner to be explained is a switch mechanism which is generally designated 997 in Figs. 5 and 6. The mechanism 997 includes a supporting frame which is comprised of a pair of bracket-like members 998 and 1000 rigidly fastened together. Four identical switch units 1001, 1002, 1003, and 1004 are rigidly secured to the bracket 1000 in a side by side relationship as shown in Fig. 6.

Each switch is comprised of flexible parallel contact members 1006 and 1007 (Fig. 48), the one end of each contact member being freely flexible and having an integral contact area 1008, while the other end thereof is rigidly supported in a sandwichlike supporting structure comprised of various insulating spacers 1009, the members 1006 and 1007, and a conductive terminal member 1011, each contact member to the one side of a circuit to be switched. Screws 1012 extending through each sandwich structure to the bracket 1000 secure the related switch to the bracket. An insulating bushing surrounds each screw along its length where it extends through the related sandwich structure to prevent accidental shorting of the contact members 1006 and 1007 to each other, or to the bracket 1000.

The contact member 1006 of each switch 1001, etc. is engaged by a related actuating finger 1013 which is formed of an insulating material and is secured to the one end of an associated lever 1014. Each lever 1014 is pivotally supported at its other end and accurately maintained aligned with its related contact member 1006 by a comb-like support 1016, the latter being secured to the bracket 998. A star shaped wheel 1017 is rotatably mounted on each lever 1014 in a position such that each tooth of the wheel, if the wheel is rotated, extends in turn beyond the edge of the lever 1014. The dimensions of each star wheel 1017 is such that the distance between successive teeth thereof is equal to the distance between teeth 991 of the member 990.

Extending above and parallel to the member 990 is a shaft 1018 which is rigidly supported at one end by the left frame 114. The switch mechanism is pivotally supported above the member 990 by the engagement of shaft 1018 with suitable aligned openings in the left and right side portions of the bracket 998. A spacer 1019 (see Fig. 5) carried on shaft 1018 between the frame 114 and right end portion of bracket 998, and a collar 1021 secured to the shaft 1018 near its outer end, accurately positions the switch mechanism 988 on the shaft so that each star wheel 1017 is aligned with a related possible track of perforations on the paper tape 992.

A spring 1022 surrounding the shaft 1018 and rigidly fastened at one end to a collar 1021 secured to the shaft with the other end engaging the bracket 998, continuously biases the switch mechanism 988 counterclockwise on the shaft 1018 towards a so-called inoperative position as shown in Fig. 48. It will be noted that counterclockwise motion of the switch mechanism beyond the position indicated in Fig. 48 is prevented by the engagement of bracket 998 with a portion of the shaft 117 which extends beyond the left frame 114.

When desired, the machine operator manually displaces the switch mechanism 988 clockwise on shaft 1018, from the inoperative position shown in Fig. 48 and against the tension of associated spring 1022 to an operative position as shown in Figs. 5 and 6. The mechanism is accurately aligned in its operative position by the engagement of an extending portion 1024 of bracket 998 with an abutment rigidly supported by the left frame 114.

The switch mechanism 988 is locked in its operating position against the action of related spring 1022 by a suitable latch mechanism. The latch mechanism comprises a latch hook 1027 (Fig. 48) which is secured to the one end of a shaft 1028 the latter being pivotally supported by the side portions of the bracket 1000. Also secured to the shaft 1028 is a manual actuating member 1029 (Figs. 5 and 6) which has a finger grip 1029A extending laterally therefrom and into the plane of the side portion of the bracket 1000. A tensioning spring connected between the member 1029 and the bracket 1000 urges the shaft 1028 clockwise in Fig. 48 so as to normally maintain the grip 1029A engaging the bracket 1000.

As the switch mechanism 988 is being rocked from its non-operative into its operative position, the operator through finger grip 1029A rocks the shaft 1028 counterclockwise so that the associated hooked latch will clear a latch pin 1032 rigidly secured to the left frame 114. After the switch mechanism is in its operative position, the operator releases the grip 1029A. The resultant restoration motion of shaft 1028 engages the associated latch 1027 with the pin 1032 is indicated in phantom in Fig. 48 to lock the mechanism in the operative position.

With the switch mechanism in its operative position each of the four star wheels 1017 engages its related track on the paper tape 992 as indicated in Fig. 6. Each track of the tape is perforated representative of the type of skip operation to be controlled thereby. If the area of a track of the loop engaged by the associated wheel 1017 is not perforated, the position of the related lever 1014 is such that the corresponding contact member 1006 is flexed upward in Fig. 48 into engagement with the mating contact member 1007 to close that switch. If on a subsequent line space operation a perforated area of the related track of tape 992 advances under the star wheel 1017, the associated lever 1014 rocks clockwise under the tension of the flexed contact member 1006 so that the tooth of the wheel 1017 extends through the perforation and into the space between the adjacent pair of teeth of the member 990. The lever 1014 rocks clockwise a sufficient amount so that the contact member 1006 moves free of engagement with the mating member 1007 to open that switch.

When desired, the line space control magnet 953 may be linked under plugboard control and through circuitry associated with any predetermined one of switches 1001, etc., to a source of impulses so as to effect repeated line space operations or so-called skipping of the record 599. Once this type of operation is initiated it continues as long as the related switch 1001, etc. remains open. This switch remains open, of course, until a perforated area in the related track of the paper tape 992 is advanced into engagement with the related star wheel 1017. It is thus evident that by perforating each track of the tape at predetermined points and by properly inserting the loop on the member 990 so that when a predetermined line of an individual record of the continuous sheet 599 is in the print position, a corresponding point of the 4 tracks of the loop of paper tape 992 are engaged by the related star wheels 1017, the sheet 599 can be skipped from any print line or lines of one of the individual records thereof to any one of predetermined succeeding lines of that same individual record; or from any print line or lines of one of the individual records of the sheet 599 to a desired print line of the succeeding record.

A forms skip operation is usually initiated after the printing operation is completed in the last desired column of a particular print line. The position of the print position emitter following the last desired print column of a line may, accordingly, be utilized as the initiating source of not only the line stop operation, as described above, but also as the initiating source of any desired forms skip operation. For example, assume that on a particular operation the last desired print column position of a print line is column 69. Also assume that after the print operation is completed in column 69, the print record is to be skipped under the control of track #1 of the forms skip tape 992. The operation would be plugwired by connecting the 70th print position control exit hub 347 (Fig.

12A) to the line stop hub 926 (coordinates S—41 in Fig. 12C) and also to the #1 (corresponding to track #1 of the tape 922) forms skip control hub 1033 (coordinates L; 46 in Fig. 12B).

As the emitter 339 reaches its 70th position after the completion of the print operation in column 69, the closing of cam contact CRA–5 (Fig. 14C) completes a circuit therethrough to initiate the line stop operation in a manner previously explained. A circuit also extends from the 70th hub 347 of the emitter through a plugwire to the #1 forms skip hub 1033, through a pickup coil of the latch type #1 forms skip control relay R5 to ground. The resultant energization of the relay R5 causes its associated contacts R5*a* and R5*b* to be latched closed, and R5*c* to be latched open. With the contacts R5*b* closed, each closing of the cam contact CRB–4 completes a circuit therefrom through a conductor 1036, the contacts R5*b*, the diode 986, etc. to impulse the line space magnet 953 and effect a line space operation.

With the contacts R5*c* open, the circuit to the clutch control relay R8 is disabled so that a new machine cycle cannot be initiated until the forms skip operation terminates.

With the contacts R5*b* closed, it will be noted that a circuit path is available from the #1 tape contact 1001 to the latch trip coil of the #1 forms skip relay R5, and also through a diode 1037 to the associated latch pick-up of relay R5. As long as an unperforated portion of the #1 track of the paper tape 992 is presented to the finger 1013 of the #1 tape contact 1001, the contact 1001 remains open so that the above traced circuit path terminates at this point.

With the advance of a perforation into engagement with the finger 1013 of the #1 tape contact 1001 the contact closes so that with the subsequent closing of cam contact CRB–4 a circuit is completed therefrom through conductor 1036, the #1 tape contacts 1001, the contacts R5*a*, etc. to energize both the pick-up coil and latch coil of the relay R5. With both latch and pick-up coils of the relay R5 being energized simultaneously, the effect of the one nullifies the other so that the associated contacts R5*a*, *b* and *c* remain in their latched positions. The relay R5 is of the type wherein it is the breaking of the latch coil circuit that unlatches the associated contacts. Consequently, as the cam contact CRB–4 opens, the latch coil is actuated to unlatch the contacts R5*a*, R5*b*, and R5*c*, thus terminating the skip operation, and restoring the clutch control circuit so that a new machine cycle may be initiated. The last CRB–4 impulse of a forms skip operation, is of course, also effective in the manner previously described to effect a single line space operation. With this line space operation, the perforation in track #1 of the tape, which indicated the end of the forms skip operation, is advanced out of contact with the associated finger 1013 so that the contact 1001 opens, assuming of course, that the tape is unperforated in this position. Each actual physical line space operation of the record lags the corresponding line space impulse. Consequently in the above described action, the contact 1001 is still closed with the wheel 1017 engaging the perforation in track #1 of the tape 992 at the time that contacts CRB–4 break to unlatch the relay R5.

In a similar manner an energization of the #2 forms skip relay R6 on the #3 forms skip relay R7 through their corresponding hubs 1033, will initiate corresponding forms skip operations with the actual number of lines of skipping being effected being determined by the perforations in the related track of the control tape 992. The contact 1004 operated by the 4th track of the control tape 992 is utilized for controlling a so-called skip overflow operation to be explained hereinafter.

*Skip overflow*

On certain types of print record operations it is required that no printing be effected in certain specified areas of each individual sheet. An example of this type of operation would be where the individual print record sheets are preprinted with certain heading information or wherein it is not desired to print within a specified distance of the lower border of each individual record sheet. If the record sheet is line spaced into one of these no-print areas, it is desired that the print record be skipped to the first permissible print position after the restricted area. This type of operation is controlled by a so-called skip overflow control.

The skip overflow control includes the 4th track of the program tape 992 and its associated switch 1004, the switch terminating in two so-called skip overflow hubs 1038 on the control pawl 127 (coordinates AA; 41–42 in Fig. 12B). The 4th track of the tape 992 is perforated representative of the desired non-print areas of the record sheets. The one skip overflow hub 1038 is plugwired to one of the line stop hubs 926, while the other skip overflow hub 1038 is plugwired to the skip hub 1033 which is to limit the extent of the skip. To effect a skip overflow operation, the 4th track of the loop is suitably perforated so that with the advance of the print record to the last print line prior to a non-print area, the overflow contact finger engages a perforation in the corresponding position of the 4th track of the tape 992 thus closing the overflow contacts 1004. With the contacts 1004 closed, the next line space impulse generated on the line skip hubs 926, whether as a result of the closing of cam contact ES–2 after the advance of the carriage to the 80th column print position or as a result of a pulse applied from a particular hub of the print position control emitter 339 to the other line stop hub 926, is directed from the line skip hub 926 through a plugwire to the one hub 1038, through the closed overflow contacts 1004 to the other hub 1038, through a plugwire to the #1 skip hub 1033. As a result of the impulsing of the #1 skip hub 1033, a record skip operation is initiated in a manner previously explained. The skip operation, once initiated is terminated at a predetermined line of the print record as indicated by an unperforated area in the related position of the associated 4th track of the tape 992, as also previously explained. The #1 skip control as utilized with the above skip overflow is only representative, as either the #2 or the #3 skip controls could be used. In fact by the use of so-called selectors, which will later be explained, the skip overflow operation may be selectively linked to either the #1, #2, or #3 skip control hubs, as desired, in response to certain predetermined conditions of the machine.

*The arithmetic section*

The 80 storage addresses or cells of the previously mentioned counter track 153 are divided into ten groups of 8 addresses each, each group being defined as a so-called storage counter group. The group comprised of addresses 1 through 8 is defined as a counter group #1, the group of addresses 9 through 16, counter group #2, etc., with the last group comprised of addresses 73 through 80 being defined as counter group #10. The division of the counter track into 10 counter groups is shown diagrammatically in Fig. 50. In each counter group, the lowest order address or cell (7 bit) is considered as the units order; the next lowest address, the tens order, etc. For example, in counter group #2, address 9 is the units order, address 10, the tens order, address 11, the hundreds order, etc.

Addition or subtraction of a value in any desired address or group of addresses (up to a maximum of 8) of either card track #1 or #2, to the value in any desired one of the counter groups #1 through #10, is effected in a serial fashion, numeric order by numeric order, through a single order electronic coded binary adder, which is generally designated 1039 in Fig. 13F. The sum or difference value generated by the adder 1039 for each order, is stored temporarily on the previously mentioned temporary storage track 154 (Fig. 13G) and then written in the selected counter group in the same address from which the one digit of the operation was supplied, the original digit therein having been erased after it was read out to the adder 1039. Consequently, at the end of a complete add or subtract operation, the particular counter group which supplied one of the factors of the add or subtract operation, contains the sum or difference value resulting from that operation.

The binary adder 1039 comprises 4 trigger units 1041 each of which is assigned a predetermined weighted value 1, 2, 4 or 8 as indicated. Each of the triggers 1041 is representative of its assigned weighted value, when in its On state (right plate high). The triggers are adapted to represent singly or in combination in coded form, any value from 1 to 15. Succeeding stages of the triggers are interconnected through inverters 1042, 1043, 1044 and 1045 in a well-known manner so as to effect accumulation serially, binary bit position by binary bit position. The adder includes a carry trigger 1047 which when On is representative of the weighted value 16, and is accordingly flipped On during any accumulate operation wherein the 15's capacity of the adder is exceeded.

The entry of a counter track value into the adder 1039 is effected through the contact points **893–1*g*, 893–2*g*, *h*, and *i*; 893–4*h* and *i*, and 893–8*i* of the "1," "2," "4," and "8" numeric print set-up relays 893. The relays 893 are, of course, energized in effecting a card list operation as previously explained. Consequently, as each digit of a card track value is printed in the print record 599, it may also, if desired, be entered into the adder 1039 and added or subtracted from the value in any desired counter storage group. By suspending the firing of the print mechanism hammer 649** through appropriate control panel wiring, it is possible, if desired, to enter a value from the card track into selected one or ones of the counter groups, without actually listing the addend or subtrahend (card track value).

With the set-up relay contacts **893–1*g*, 893–2*g*, etc., adjusted in accordance with a desired entry digit, an impulse is directed therethrough to flip On one or a combination of the triggers 1041 representative, in coded form, of the addend or subtrahend value. Thereafter, the decimal coded digit in the corresponding order of the selected counter group, is read out therefrom through read head 143, and entered serially into the adder 1039 through the inverters 1042, 1043, 1044 and 1045. At the end of the counter read-out operation, the adder is accordingly representative of the sum digit, in binary coded form, it being recalled that the carry trigger 1049**, if On, is considered as having a weight of 16.

After the generation of each sum digit, it is transferred from the adder 1039 to a so-called write register, generally designated 1048 in Fig. 13H. If the sum digit in the write register is less than 10, it is transferred in its binary coded form from the register 1048 to the write head 147 and recorded in an appropriate cell of the associated temporary storage track. If the sum digit in the write register is greater than 9, it is converted from the radix 16 basis of the adder to radix 10 basis by novel conversion circuitry, the conversion process involving the effecting of a decimal carry to the succeeding higher order of the counter group by causing the "1" trigger of the adder 1039 to be flipped On immediately prior to the add operation for the succeeding higher order of the addend value, and a recording of the correct remainder in binary coded form for the order from which the carry was generated in an appropriate cell of the temporary storage track. For example, if the sum digit is 14 in coded decimal form, a decimal carry is effected and the remainder of 4 is written on the temporary storage track. Thereafter, the sum digit, whether identical to the actual digit developed by the adder or the remainder sum digit after correction for decimal carry, is read from the temporary storage track through read head 148, and then recorded through write head 145 in the same order of the selected counter group from which one of the factors of the operation was supplied, this original factor having been erased by the operation of an erase head 144 after the reading of the counter factor to the adder 1039. The operation then continues for the succeeding order of the counter group and card track value, the sum of these newly added orders being increased by "1" if there was a decimal carry effected in the previous operation.

A so-called counter program device which is generally indicated 1049 in Fig. 13G, is provided for activating the read head 143, the erase head 144, and the write head 145, at the proper time in each numeric order add or subtract operation effected. Also, in order to provide the proper timing operation in the transfer of values from the temporary storage track 154, to the counter track 153, the various read, erase, and write heads of these tracks are displaced predetermined angular increments from each other around the periphery of the tracks, the displacement increments being measured in address cells or addresses. For example, the read head 148 of the temporary storage track is displaced 7 addresses from the write head 147 thereof. Consequently, any information recorded in a particular cell of the temporary storage track through the write head 147, is read through the read head 148, seven addresses later in the machine cycle. The selection of the particular one of the ten counter groups of the counter track 153 to which a value is to be added, and a further selection of the particular orders of the selected counter group in proper timed relationship to the entry of the dated orders of the addend or subtrahend into the adder 1039, is effected under the joint control of a so-called counter group selection circuit, generally designated 1050 in Fig. 13D, and a counter position exit circuit, generally designated 1057 in Fig. 13D.

*The counter position exit circuit*

Referring now to Figs. 13B and D, it will be noted that each of the 1 of 8 through 8 of 8 conductors 445 of the 8 stage ring portion 433 of the address device terminates at a so-called counter position exit hub 1052A (coordinates W, X; 41–48 in Fig. 12B). The hubs 1052A are individually labeled 1, 2, 3, etc. in correspondence to the 8 orders units, tens, hundreds, etc., respectively, of each counter group, the 1 or units hub 1052A being connected to the 1 of 8 conductor 445. The 2 or tens hub 1052A being connected to the 2 of 8 conductor 445 etc., a positive output signal is accordingly available at the units exit hub each time the related 1 of 8 stage of the ring is On during a cycle of the address device. The "units" exit hub is accordingly activated at address 1, 9, 17, times etc. such times it will be recalled being coincident with the passage of the units orders of the respective counter group #1, #2, #3, etc. of the counter track under the read head 143. Similarly, an output signal is available at the "tens" exit hub 1052A, when the 2 of 8 stage is On at address 2, 10, 18 times etc., such times being coincident with the passage of the tens orders of the respective counter groups #1, #2, #3, etc. under the read head 143.

It is evident that as each units, tens, hundreds order, etc. of a counter group rotates in turn under the read head 143, the corresponding units, tens, hundreds, etc. counter position exit hubs 1052A are actuated in timed sequence therewith. The purpose of the counter position exit hubs will be later evident.

*The counter selection circuit*

Referring now to Fig. 13D, the counter group selection circuit 1050 comprises an individual diode together with a cathode follower CF3 (see Fig. 26) as previously described for each of the ten counter groups. The cathodes of the diodes of each unit 1053 are electrically commoned and connected to a related one of the 1 of 10 through 10 of 10 output conductors 449 of the ten stage ring 434. The plate of the one diode of the unit 1053 connected to a 100K resistor in series with a 1 of 8 conductor to a related so-called #1 counter group entry hub 1054 (coordinates 1; 55 in Fig. 12B) and also to the grid of a section of an associated follower 1054, the corresponding cathode output terminal of the follower 1054 being connected to a so-called #1 counter group exit hub 1057 (coordinates J; 55 in Fig. 12B). In a similar manner, the cathode of the other diode of the unit 1053 associated with the 1 of 10 conductor 449, is also connected to a related #1 counter group entry hub 1054A (coordinates K; 55) and also to the grid of a section of the associated follower 1054, the corresponding plate output terminal of the follower being connected to an associated #1 counter group exit hub 1057A (coordinates L; 55).

In a manner identical to that described above for the diodes of the unit 1053 associated with the 1 of 10 conductor, the diode unit associated with the 2 of 10 conductor is linked to a corresponding #2 counter group entry hubs and exit hubs. A similar arrangement is provided for each of remaining diode unit 1053 associated with their respective 3 of 10 through 10 of 10 conductors 449, as noted in Fig. 13D.

During the machine time when the 8 orders of the #1 counter group (addresses 1 through 8 of the counter track) are being advanced successively under the read head 143, the 1 of 10 stage of the address device 427 is On and through the associated 1 of 10 output conductor 449, conditions positive the commoned cathodes of the diode unit 1053 associated therewith. If during this time that the cathodes of the diodes of that unit 1053 are so conditioned, a positive signal, the counter position exit signal corresponding to one stage of the 8 stage ring is applied to one of the #1 counter group entry hubs 1054 or 1054A, the plate terminal of the related conditioned diode of unit 1053 shifts positive therewith. The positive shift of the plate of the diode is effective through the associated follower 1053 to shift the related #1 counter group exit hub 1057 or 1057A positive. The #1 counter group exit hub remains positive for the duration of the positive signal applied to the corresponding entry hub, provided, of course, the applied signal does not exceed address 8 time when the 1 of 10 stage of the ring 434 flips Off.

During the machine time when the 8 orders of the #2 counter group (addresses 9 through 16) are being advanced successively under the read head, the 2 of 10 stage of the ring 434 is On and through the associated 2 of 10 conductor 449 conditions positive the commoned cathodes of the diodes of the associated unit 453. Consequently, if a positive signal is applied to one of the #2 counter groups entry hubs during this time, a corresponding signal for the duration of the signal applied to hubs 1054A and 1054 will result in the related #2 counter group exit hub. A similar type of operation may be effected for the #3 through #10 counter group selection circuits as each of the respective counter groups rotates under the head 143.

It is evident from the above construction that by electrically linking, in a manner to be explained, the counter position exit hubs 1052A (Figs. 12B and 13D) relating to the particular order of a counter in which an operation is desired, to one of the entry hubs 1054 and 1054A of the counter group to be selected, output signals will result in the associated counter group exit hub 1057 or 1057A during the passage of the chosen order of the chosen counter under the head 143. These signals are utilized in a manner to be explained to actually initiate the desired representative counter action such as add or subtract.

*The add operation*

In order to give complete understanding of the timing sequences and coaction of the various portions of the arithmetic section a representative accumulate operation will now be described in detail. Assume that counter group #2 contains the value 511 and card track #1 contains the value 913 in columns 2, 3, 4, and it is desired to add these values to achieve a sum of 1424. It will be assumed that it is desired to list the card track value 913 (addend) in columns 7, 8, and 9 of the print record sheet. Fig. 49A shows the control panel wiring required to effect our desired operation.

As the print carriage 570 reaches column 5 of the print record, the wiper 337A of the print emitter 337 engages the 7th segment thereof (see Fig. 15A). At 2 address time of the following drum cycle, which is an alternate drum cycle, the activation of the 2nd reading exit hub 364 (see Fig. 49A) completes a circuit therefrom, through a plugwire 1058 to the 7th print position entry hub 353, through the emitter 337, now in its 7th position, to the associated 7th print position exit hub 1052, through a plugwire 1059 to the card list hub 895. The activation of the card list hub at 2 address time of this alternate drum cycle, which may also be considered as cycle #1 in the timing representation of Fig. 46, reads out the value 9 in address 2 of card track #1 to the print thyratrons 910 in a manner previously explained. The resultant energization of the "1" and "8" thyratrons 910, in turn, effects an energization of the associated "1" and "8" print set-up relays 893 through cam contacts CRA–2 during a portion of the subsequent so-called idle drum cycle, or second cycle as indicated in Fig. 46. With the relays 893–"1" and 893–"8" energized, the closing of the cam contacts CRA–3 completes a hold circuit for the energized "1" and "8" print set-up relays, from the latter part of the idle cycle through the subsequent alternate drum or 3rd cycle as indicated in Fig. 46. Also with "1" and "8" set-up relays energized, the closing of cam contacts CRA–4 starting at the latter part of the idle drum cycle (2nd drum cycle) energizes the "1" and "8" print magnets 872 through contacts of the energized "1" and "8" set-up relays 893 so that 45 milliseconds later (the 5th drum cycle as indicated in Fig. 46) when the print carriage is in column 7, the numeral 9 will be in printing position and a printing operation effected. The details of the printing procedure was fully explained previously.

During the third or alternate drum cycle of the above described action with the "1" and "8" print set-up relays 893 energized and their associated contacts 893–1*g* and 893–8*i* accordingly transferred, the wiper 338A of the delayed counter emitter 338 (see Fig. 13K) is in its 7th position (see Fig. 15A). Consequently, at address 11 time of this cycle, the activation of the #3 (hundreds order) counter position exit hub 1052A completes a circuit therefrom, through a plugwire 1060 (see Fig. 49A) to the 7th counter entry hub 351 through the associated emitter 338 now in its 7th position to the 7th counter + and − exit 349 through a plugwire 1062 to the #2 counter group selection entry hub 1054, through the associated circuit previously explained and now operable since address 11 time falls within counter #2 time as indicated in the diagram of Fig. 50 to the #2 counter group select exit hub 1054A, through a plugwire 1063 to a plus control hub 1064 (coordinates E; 60 to 64 in Fig. 12B) of the adder 1039. It will be recalled that address 9 is the units order of the counter group #2, so that looking at the cells of this counter group in the sequence which they pass any fixed point, the value 511 would appear as 11500000. As a result of the impulsing of the plus hub 1064 at address 11 time, the hundreds order digit "5" of the counter #2 value, is added to the hundreds order digit "9" of the counter track value, it being remembered that the card track value 9 is set up in the relay contacts 893–1*g* and 893–8*i* at this time. The add action is effected as follows:

As soon as the plus hub 1064 (see Fig. 13F) shifts positive at 0 of 7 time of address 11 time as explained above, a circuit extends therefrom through the right section of a follower 1065 to the one input of AND unit 1067. Since this is an alternate drum cycle, the other input of the AND unit 1067 is conditioned positive through the conductor 467 by the alternate drum cycle signal. The AND circuit 1067 is accordingly actuated and acts through the right section of a follower 1068, a so-called "plus" conductor 1069 of the adder, an OR circuit 1070, a conductor 1072, the left section of an inverter unit 1073, a conductor 1074, to the left plate terminal of a so-called Read control trigger 1075 (see Fig. 13G) of the counter program device 1049, to flip the Read trigger On (right plate high), this trigger having been reset to its Off state prior to the above action in a manner that will be later evident. The positive potential of conductor 1072 is also applied to the one input of a unit 1077 which is connected with an AND unit 1078 so as to form a 3-way AND circuit.

At 1 of 7 time of address 11 time, the positive potential of the plus conductor 1069 (see Fig. 13F) is also applied through the normally open side of the "1" print set-up contacts 893–1*g*, now closed, to positively charge a corresponding condenser 1079 through a resistor 1079A which is connected to the left plate of the "1" trigger 1041 of the adder 1039. The positive potential of conductor 1069 is also applied through the normally open side of the "8" print set-up contacts 893–8*i* now closed, to positively charge a corresponding "8" condenser 1079 through a resistor 1079A which is connected to the left plate of the "8" trigger 1041 of the adder 1039.

A 1 of 7 signal is applied through conductor 440 to a second input of the AND unit 1078 (see Fig. 13F) while B pulses are applied through conductors 430 and 1134 to the other input thereof. With the first input of AND unit 1077 being conditioned positive through conductor 1072, the 3-way AND circuit is accordingly actuated at 1B time, and a 1B pulse is generated on the related output conductor 1080. This 1B pulse is applied to the right grid input of the right hand inverter of unit 1082 which results in a so-called $\overline{1B}$ (not 1B or negative 1B) pulse being generated on the output thereof, the latter being applied through a conductor 1083, and a left diode of a related unit 1084 to the capacitor 1079 in the left plate of each of the triggers 1041. Since a capacitor cannot change its potential instantaneously, the $\overline{1B}$ pulse is felt on the plate terminal of the adder triggers which had their capacitors 1079 previously charged positive, and accordingly flips these triggers On (right plate high). Thus, in our particular example, the "1" and "8" triggers 1041 are flipped On at 1B time of address 11 time and are accordingly representative of the addend value 9 standing in the print set-up relay contacts 893–1*g* and 893–8*i*.

At 3B time of address 1 time, the "1" bit of the value 5 (in binary coded form) in address 11 (hundreds order of counter group #2) is read therefrom by the read head 143, and applied through read amplifier 1085 and conductor 1087 to the one input of an AND unit 1088 (see Fig. 13H). With the Read control trigger On, the resultant high potential of the right plate terminal thereof is applied through the right section of a follower 1089, a conductor 1090A to the other input of unit 1088. The unit 1088 is accordingly actuated and the resultant high potential of the related output is applied through the right section of an OR unit 1092, the right section of a follower 1093, and a conductor 1094, to the one input of AND units 1096, 1097, 1098 and 1099 (see Fig. 13F). A 3 of 7 signal is applied from the 7 stage ring through associated output conductor 440 to the input of AND unit 1096. With both inputs of unit 1096 accordingly positive at B time of address 11 time, a 3B pulse is generated on the related output thereof. This 3B pulse is applied through a conductor 1101, and the right section of inverter 1042 to the binary connected "1" trigger 1041. Since this trigger is already On, the −3B pulse applied to its left grid flips it Off (right plate low). As the "1" trigger flips Off, the resultant positive shift of its left plate terminal is inverted in the left section of inverter 1043 and applied to the binary connected input of the "2" trigger to flip it On.

At 5B time of address 11 time, the "4" bit of the value 5 (in binary coded form) in address 11 of the counter group #2 is read therefrom by read head 143, amplified in read amplifier 1085 and applied through conductor 1094 through circuitry previously traced, to the one input of AND unit 1098. A 5 of 7 signal is applied through conductor 440 (5 of 7) to the other input of AND unit 1098, and with both inputs of this AND circuit accordingly positive at 5B time of address 11, a 5B pulse is generated on the related output thereof. This 5B pulse is applied through a conductor 1102 and the right section of the inverter 1044 to the binary connected input of the "4" trigger 1041 to flip it On. At the end of this operation, the 2, 4 and 8 triggers of the adder are On and representative in binary coded form of the sum digit 14, which is the desired result in accumulating the hundreds order digit 5 in the counter group #2 and the hundreds order addend value 9.

The high potential of the right plate of the On "2" trigger 1041, acts through a conductor 1103, the right section of a follower 1104 and a conductor 1106, to positively charge a capacitor 1107 through a resistor 1107A (see Fig. 13H) linked to the left plate terminal of a "2" trigger 1108 of the so-called write register, generally designated 1048 in Fig. 13H, the write register also including "1," "4" and "8" triggers 1041, as indicated. In a similar fashion, the On "4" trigger 1041 of the adder 1039 acts through the left section of follower 1109 and a conductor 1111 to charge the capacitor 1107 via resistor 1107A connected to the "4" trigger 1108 of the register 1048, while the On "8" trigger 1041 of the adder 1039 acts through the right section of follower 1109 and a conductor 1112 to charge the capacitor 1107 via resistor 1107A connected to the "8" trigger of the write register 1048.

The high potential of the right plate of the On "8" trigger 1041 is also applied therefrom, through the right section of follower 1109, to the cathode of the diodes of a unit 1113. The plate of the left diode of unit 1113 is connected through a condenser being connected through conductor 1114 to the left plate of the carry trigger 1047, the plate of the right diode of unit 1113 being connected through a 100K resistor, a conductor 1116 a follower 1117 (see Fig. 13D) and a conductor 1118 to the left plate of the 7 of 7 trigger 435. The purpose of the connection through the right diode of unit 1113 will be later evident. With the adder "4" trigger 1041 "On," the resultant high potential of conductor 1111 is applied to the one input of an OR unit 1119 (see Fig. 13F). Similarly, with the "2" trigger 1041 On, the resultant high potential of conductor 1106 is applied to the other input of OR unit 1119. As a result of either the "4" or "2" triggers of the adder being On, the OR unit 1119 is accordingly actuated and charges the condenser 1114 positive via the 100K resistor, provided that the "8" trigger 1041 is also On and conductor 1112 and the cathode of the left diode of unit 1113 is accordingly high in potential. At 7 of 7 time of address 11 of our particular example, a 7 of 7 signal is applied from the 7 of 7 trigger through associated output conductor 440, to the one input of an AND unit 1121 (see Fig. 13J). With the application of a 7B pulse from B pulse conductor 430 to the other input of unit 1121, a corresponding 7B pulse results in the related output thereof which is applied through a conductor 1122 to the right inverter section of unit 1123 (see Fig. 13H). The resultant inverted or negative 7B pulse generated on the output thereof is applied through the conductor 1124 and the right section of diode units 1084 to the "2," "4," and "8" On triggers of the adder 1039 to reset them Off. The negative shift of the right plate section of the "8" trigger 1041 as it reset Off, is applied through a conductor 1112 to the left diode cathode of unit 1113 to render it heavily conductive so that plate potential drops with the cathode. This drop in plate potential of the diode is transferred through the charged condenser 1114 to pull down the left plate of the carry trigger 1047 and flip it On (right plate high).

The negative 7B pulse on conductor 1124 is also applied through corresponding sections of diode unit 1126 and 1127 to the condensers 1107 of the write register 1048. It will be recalled that the condensers 1107 of the "2," "4," and "8" triggers 1108 of the write register 1048, were previously charged positive as a result of the On state of the "2," "4," and "8" triggers of the adder 1039. As a result, the inverted 7B pulse is effected through these positively charged condensers 1107 and flips the associated 2, 4 and 8 triggers 1108 of the write register On.

During address 11 time with the read trigger 1075 (see Fig. 13G) being On, the resultant high positive potential of the right plate thereof positively changes a condenser in the right grid input circuit of a write trigger 1127. The read trigger 1075, write trigger 1127, and an erase trigger 1128 of the counter program control 1049, are all the same type (see Fig. 13G), in that they may be flipped by applying a negative pulse to the plate terminal of the non-conductive side, or by applying a negative going waveform to a grid input of the conducting side, provided that grid was previously subjected to a positive potential for an appreciable period so as to positively charge the associated grid condenser. At the end of 7 of 7 time of address 11 time, the trailing edge of a 7 of 7 signal from the 7 stage ring on related conductor 440, is applied to the left grid input of the read control trigger 1075 and flips it Off. The resultant negative going shift of the right plate terminal thereof is applied to the right grid input of the write control trigger 1127 and flips it On (right plate high).

At the end of address 11 time of our particular example, the carry trigger 1047 is On, and the write register 1048 is representative, in binary coded form, of the sum digit 14 generated as a result of the hundreds order add operation. With the carry trigger 1047 On, the resultant high positive potential of the right plate terminal thereof is applied through the left section of follower 1129 and conductor 1130 to the one input of a 3-way AND circuit 1131 (see Fig. 13F) comprised of AND units 1131A and 1131B and also through a resistor 1132 to the plate of the right diode of a unit 1133. The cathode of this diode is maintained negative through conductor 1134 except upon the application of a 1 of 7 signal thereto through the 1 of 7 output conductor 440 of the 7 stage ring. Consequently, with the carry trigger 1047 On at 7B time of address 11 and conductor 1134 negative (relative), the diode 1133 is conductive and the diode side of the resistor 1132 and an associated conductor 1136 are at a relatively low potential.

At 1 of 7 time of address 12 time of this same drum cycle, the 1 of 7 signal on conductor 1134 raises the cathode potential of the right diode of unit 1133 and its plate terminal shifts positive. At the end of the 1 of 7 signal, the diode is again rendered conductive. The resultant negative shift of the plate terminal thereof is applied through conductor 1136 to the binary connected grid inputs of the "2" trigger 1108 of the write register 1048 and flips it Off. As the "2" trigger flips Off, the resultant positive shift of its left plate terminal is applied through the left section of an inverter 1158 to the binary connected grid inputs of the "4" trigger 1108 and flips it Off. As the "4" trigger flips Off, the resultant negative shift of its right plate is applied to the binary connected grid inputs of the "8" trigger 1108 and flips it Off. At the end of the above action, all of the triggers of the write register are Off.

With the carry trigger 1047 On, the resultant positive potential of its right plate is applied through the left section of follower 1129 to condition positive the one input of the 3-way AND circuit 1131, as previously explained. Also, since the 1 of 8 stage of the 8 stage ring 433 is not On at address 12 time, the resultant high positive potential of the left plate terminal thereof is applied therefrom through a conductor 1138, a follower 1139 (see Fig. 13D) a conductor 1141, an OR unit 1142 (see Fig. 13H), the right section of a follower 1143, a conductor 1144, to positively condition the 2nd input of the AND circuit 1131 (see Fig. 13F). At 2 of 7 time of address 12, a 2 of 7 signal is applied from the 7 stage ring through associated conductor 440, to the 3rd input of the AND circuit 1131, and with the other two inputs already positive, as described above, the 3-way AND circuit is actuated. The resultant positive output signal therefrom is applied to the left grid input of an inverter unit 1146. The resultant negative shift of the associated commoned plate terminals of both left and right-hand sections of inverter 1146 is applied through a conductor 1147 to the binary connected grid inputs of the "1" trigger 1041 of the adder 1039, and also through a conductor 1148 to the one input of an AND circuit comprised of AND units 1149 and 1151 (see Fig. 13H). The other input of this AND circuit is conditioned positive at this time through a conductor 1152 by a so-called NOT multiply gate thereon, this gate being generated in a manner that will be later evident. With one input negative, the AND circuit is de-energized, the resultant negative shift of the output thereof being applied through a conductor 1153 to the right grid terminal of the read control trigger 1075 (Fig. 13G), it being recalled that the Write control trigger 1127 is already On.

With the carry trigger 1047 On, it also acts through the left section of follower 1129, the conductor 1130, a resistor 1155, to render positive the plate terminal of the left diode section of unit 1133 (see Fig. 13F). The cathode of the diode is normally maintained negative through a conductor 1156, except upon the application of a 3 of 7 signal thereto from the 7 stage ring 432. Consequently, with the carry trigger 1047 On, and conductor 1156 negative at the beginning of address 12 time, the diode is conductive and the diode side of the resistor 1155 and an associated conductor 1157 are at a relatively low potential. At 3 of 7 time with the application of the 3 of 7 signal through conductor 1156 to the diode 1133, the diode is rendered non-conductive and conductor 1157 shifts positive. The positive shift of conductor 1157 is applied through the right section of inverter 1158 (see Fig. 13H) to the "4" trigger 1108 of the write register and flips it On. At the end of 3 of 7 time, the trailing edge of a 3 of 7 signal on conductor 440 (3 of 7) acts upon the left grid input of the carry trigger 1047 and flips it Off.

With the "4" trigger 1108 On, the resultant high potential of its right plate terminal is applied through the right section of the follower 1246 and a conductor 1246A to positively condition the one input of an associated AND circuit 1246B. Thereafter, upon the application of a 5 of 7 signal through a conductor 440 to the other input of AND circuit 1246B, the latter is actuated. The resultant 5 of 7 signal generated in the related output thereof is applied through OR circuit 1165, a conductor 1164, the left section of follower 1166 to a first input of a 3-way AND circuit 1167 (see Fig. 13J) comprised of AND units 1167A and 1167B. With the Write control trigger 1127 On (see Fig. 13G), the high positive potential of its right plate is applied through the left section of follower 1089, a conductor 1168, an OR unit 1170, and a conductor 1171 to positively condition the second input of the AND circuit 1167. B pulses are continuously applied through conductor 430 to the 3rd input of the AND circuit 1167 (see Fig. 13J) and under the above circumstances, the AND circuit is accordingly actuated at 5B time of address 12. The resultant 5B pulse generated on the related output thereof is defined as a Write pulse and is applied through a conductor 1172, an OR circuit 1173, the right section of follower 1166, a conductor 1175, a write amplifier 1176 (see Fig. 13G), to the write head 147 of the temporary storage track. As a result, a binary one is written in the "4" cell of the particular address of temporary storage track which is under the head 147 at that time.

It will be noted in Fig. 13J, that the conductor 1172 is also linked to the binary connected grid inputs of a so-called Write redundancy trigger 1177. As a result, the trailing edge of the 5B write pulse on conductor 1172 flips the trigger 1177 On (right plate high), the trigger having been positively reset Off during the previous cycle of the 7 stage ring by the flipping Off of the 7 of 7 stage trigger, the resultant positive going shift of the left plate of the 7 of 7 trigger 435 being inverted in the right section of unit 442 (see Fig. 13B) and applied through a conductor 1178, and a diode 1180 to the right plate of trigger 1177. The redundancy trigger 1177 "counts" the Write pulses on conductor 1172 to determine if a redundancy bit is required to achieve "even" binary bit coding for the numeral written in the temporary storage track. Thus, in our above example wherein a binary bit is recorded in the "4" cell of the temporary storage track, no more Write pulses are generated on conductor 1172 during the remaining numeric cell times of address 12. Consequently, the trigger 1177 remains On and the resultant high potential of its right plate thereof is applied through the right section of a follower 1181 to the one input of AND circuit 1182, so that upon the application of a 7B pulse through conductor 1122 to the other input of circuit 1182, the latter is actuated. The 7B pulse resulting in its related output terminal is applied through an OR circuit 1183, the right section of follower 1166, conductor 1175, the Write amplifier 1176, to the Write head 147, and accordingly effects the recording of a binary bit in the redundancy cell of the address (storage position) of the temporary storage track. A binary bit in the "4" cell and redundancy cell of an address is the correct coding for the desired hundreds order digit 4, as indicated in the table in Fig. 38.

Simultaneous with the writing of the hundreds order sum digit 4 on the temporary storage track, the value in address 12 or the thousands order counter group #2 is read out therefrom as a result of the Read trigger 1075 being On, in a manner similar to the hundreds order counter group read out operation previously described (address 11 time). This operation is effected in order to add the carry digit to the value in the thousands order of the counter group #2, it being recalled that the "1" trigger was flipped On at 2 of 7 time of address 12 as a result of the carry trigger 1047 being On. In our particular example, the thousands order (address 12) of counter group #2 contains a zero so that, at the end of the add operation performed during address 12 time, the thousands order sum digit of 1 is represented by the On state of the "1" trigger 1041 of the adder.

At 7 of 7 time of address 12 time, the application of a 7 of 7 signal from the 7 stage ring, through related conductor 440, to the A.C. coupled grid input of the left section of an inverter 1123, renders the inverter momentarily conductive and a negative voltage spike results on the related output thereof. This voltage spike is applied through a conductor 1185, and the left diode of diode unit 1186, to the right-hand plate of the On "4" trigger 1108 and resets it Off. The reset signal on conductor 1185 is also applied to the cathode of diode 1187 and the diode unit 1186 (right section) connected to the right plates of the "2" and "8" triggers of the Write register 1048 respectively, but has no effect thereon since these triggers are already Off in our particular example.

With the "1" trigger of the adder 1041 On, the resultant high potential of the right plate thereof is applied through the left section of follower 1104 and conductor 1190, to positively charge the "1" capacitor 1107 of the "1" trigger 1108 of the write register 1048. At 7B time of address 12, after the Write register reset pulse is gone from conductor 1185, the $\overline{7B}$ pulse on conductor 1124 acting through the right diode of 1124A flips the "1" trigger 1041 of the adder 1039 Off, and flips the "1" trigger of the write register 1048 On, as previously described for the "4" Write register trigger 1108. At the end of the 7 of 7 time of address 12 time, the trailing edge of the 7 of 7 signal from the 7 stage ring on related conductor 440, acts through the left grid input of the Read control trigger 1075 to flip it Off (right plate low), and through the left diode section of unit 1191 to the right grid of the erase control trigger 1128 to flip it On. The trailing edge of the 7 of 7 signal is also applied through the diode unit 1192 to the Write control trigger 1127 but has no effect thereon since this trigger is already On. It will be appreciated that if the generated sum digit of the thousands order add operation (effected during address 12 time) has exceeded 10, a carry operation would be initiated in the same manner as for the previously described hundreds order carry operation. Consequently, at the beginning of the succeeding address, the "1" trigger would be flipped On representative of the carry digit, while the read control trigger would be flipped On again so as to effect the entry of the ten thousands order digit of the counter track value into the adder wherein it would be added to the carry digit. This is merely a supposition, however, since in our representative add operation, the thousands order sum digit (carry+0) is only 1.

Recapitulating the action during address 12 times, the "4" of the hundreds order sum digit 14 generated during address 11 time, is written on the temporary storage track, while the carry (1) of the sum digit 14, is added to the thousands order counter value, which in our particular example is zero. The writing of the "4" value is effected under the control of the Write trigger 1127, while the entry of the thousands order counter digit to the adder 1039 is effected under the control of the read control trigger 1075. At the end of address 12 time, the newly generated thousands order sum digit (1) is standing in the Writer register 1048, and the Write trigger 1127 and the erase trigger 1128 of the counter program device 1049 are On, the read control trigger 1075 being Off.

During the subsequent or 13th address time of this same drum cycle, with the "1" trigger 1108 On, the resultant high potential of its right plate thereof acts through the right section of an associated follower 1193 (Fig. 13H) to condition the one input of a corresponding AND circuit 1195. Thereafter, the application of a 3 of 7 signal from the 7 stage ring through corresponding conductor 440 (3 of 7) to the other input of AND circuit 1195, actuates the latter and a 3 of 7 signal results in its related output terminal. The 3 of 7 signal is applied through the associated Or circuit 1196, the conductor 1165, and the left section of follower 1166 (see Fig. 13J) to the first input of the AND circuit 1167. With the second input of circuit 1167 being held positive through conductor 1171 as a result of the Write trigger 1127 being On, and B pulses being applied through conductor 430 to the 3rd input of circuit 1167, the latter is actuated and a 3B Write signal results on conductor 1172. The 3B Write signal is applied through the Or circuit 1173, follower 1166, conductor 1175, and Write amplifier 1176 to the Write head 147 and causes a binary one bit to be recorded in the weight "1" cell of address 12 of the temporary storage track 154. The trailing edge of the 3B Write pulse on conductor 1172 flips the trigger 1177 On. Also the trailing edge of a 3 of 7 signal on conductor 1156 is applied to the "1" trigger 1108 of the Write register 1048 to flip it Off. Since none of the other triggers of the Write register are On, no further Write pulses are generated on conductor 1172 so that at the end of 6 of 7 time, the redundancy trigger 1177 is still in its On state to which it was flipped by the 3B Write pulse. With the trigger 1177 On, the AND circuit 1182 is actuated at 7B time, in the manner previously explained, and through Or circuit 1183 follower 1166 conductor 1175, etc., effects the recording of a binary one in the redundancy cell of address 13 of the temporary storage track. As a result of the above operations, the thousands order digit "1" has been correctly recorded in 7 bit code form in a related address of the temporary storage.

It will be recalled that at the beginning of address 13 time, the erase control trigger 1128 was flipped On. With the trigger 1128 On during the subsequent address 13 time, the resultant high potential of the right plate thereof is applied through a conductor 1198, the left section of a follower 1200 (see Fig. 13H), a conductor 1201, an Or circuit 1202, a conductor 1203, a so-called erase amplifier 1205 to activate an erase head 144 of the counter track. It will be noted that the erase head 144 is displaced counterclockwise from the Read head 143 a distance equal to 2 addresses of the counter track which rotates counterclockwise in Fig. 13G. As a result during address 13 time, the hundreds order (address 11) of counter group #2 from which the hundreds order digit 9 was read through head 143 during address 11 time, passes under the erase head and the digit therein (9) is erased.

Recapitulating the action during address 13 time, the thousands order sum digit 1 (carry) is transferred from the Write register 1048 to a related address of the temporary storage track, while the value in the hundreds order address (11) of counter group #2 is erased. At the end of 7 of 7 time of address 13 time, the trailing edge of the 7 of 7 signal on conductor 440 acts through the diode 1192 to flip the Write control trigger 1127 Off. The trailing edge of the 7 of 7 signal is also applied through diode 1191 to the right grid of the erase trigger 1128, but since this trigger is already On (right plate high) it has no effect thereon.

Referring to Fig. 13G, it will be noted that associated with the temporary storage track 154 is a Read head 148 which is displaced counterclockwise 7 address positions relative to the Write head 147. It will be recalled that during address 12 time of our particular example, the hundreds order sum digit "4" was written in the corresponding address of the temporary storage track 154, with the thousands order digit "1" being written in a succeeding address during address 13 time. Consequently, during address 19 time, the hundreds order sum digit 4 is read from the temporary storage track and transferred through a Read amplifier 1206, a conductor 1207, to the one input of an AND unit 1208. Since this operation is not a multiply operation, the so-called NOT multiply signal is applied through conductor 1152, the left section of an Or unit 1210, the right section of a follower 1211 and conductor 1212, to condition positive the other input of AND circuit 1208. With both inputs positive, AND unit 1208 is accordingly actuated to transfer the hundreds order sum digit (4) therethrough, through a conductor 1213, the left section of an Or unit 1215, the left section of a follower 1216, a conductor 1217, a Write amplifier 1218 to the Write head 145 of the counter track. As a result, during 19 address time in our example, the hundreds order address (11) of counter group #2 is presented to the Write head 145 and the hundreds order sum digit (4) is recorded therein, it being recalled that address 11 supplied the one factor "5" of the add operation, with this 5 representation being erased therefrom during address 13 time as address 11 passed under the erase head 144. In the same manner during 20 address time, the thousands order sum digit "1" is read from the temporary storage track and written in address 12 of the counter track. At the end of these operations, the counter group #2 contains the value 1411 which actually appears in the counter group 11410000. The actual arithmetic operations effected up to this point in our desired add operation of 910+115 may be represented diagrammatically as shown in Fig. 49B.

It will be recalled that the proper timing of the various adder and allied functions are effected under the control of the Read control trigger 1075, Write control trigger 1127, and Erase control trigger 1128 of the counter program unit 1049, an operational cycle of the latter being initiated in our particular example by the routing of the address 11 pulse through the 7th position of the emitter 338 to the plus control hub 1064. Fig. 51B is a diagrammatic representation of the sequence of activation of the triggers 1075, 1127, and 1128, in effecting our particular add operation, described above. The operational cycle of the program device 1049 is completed when all of the control triggers thereof are in an Off position. The sequence of activation of the triggers 1075, 1127 and 1128 of the program device in effecting an add operation wherein there is no carry operation required, are effected in a straight step sequence in three successive address times as indicated in Fig. 51A. Under the conditions as in our hundred order add operation (9+5) wherein a decimal carry is indicated, the resultant On state of the carry trigger 1047 modifies the normal straight step sequencing of the triggers 1075, 1127 and 1128, as fully explained above, by again flipping the Read control trigger 1075 On during 12 address time as indicated in Fig. 51B. With the Read trigger 1075 again On, the entry of the carry digit to the succeeding higher order of the counter group is effected as described. Another carry operation may result during the carry add operation, of course, if the order of the counter group to which the carry is added already contains a 9. Such a carry on a carry operation, causes the Read control trigger 1075 to be again energized during the subsequent address as indicated in Fig. 51C. A carry may accordingly be propagated through one or a number of the higher orders of the counter group, with each individual carry reactivating the Read control trigger 1075 for the subsequent address time.

The above discussion is directed only to a so-called carry to a higher order operation, that is, a carry from one order to a succeeding order. A so-called end around carry from the highest counter order to the units counter order, which is require upon a reversal in sense (negative to positive or positive to negative) of the counter, will be later explained in detail in conjunction with a description of a representative subtract operation.

Returning again to our particular example, with all the triggers of the program device Off, the completion of the required arithmetic operations resulting from the addition of 9 and 5 is indicated, and we are ready to proceed to the addition of the tens order addend value 1 to the tens order counter value 1. Although the actual arithmetic operation has been completed on the hundreds order digits of our two values, the actual printing of the hundreds order addend digit 9 is not effected until 2 drum cycles later when the print carriage is in column 7. The drum cycle between the alternate drum cycle wherein a counter entry operation is effected through the print relay set-up contacts, and the next alternate drum cycle when the addend value may actually be printed, if desired, is referred to as an idle drum and is so indicated in Fig. 46.

The above described operations of the adding of the hundreds order digits 9 and 5, and the resultant carry operation into the thousands order position, are all effected during the particular alternate cycle when the wiper of the emitter 338 is engaging the 7th position segments thereof, this later engagement actually setting up the circuit through which the actual add operation is initiated at address 11 time of this alternate drum cycle.

It will be noted in Fig. 15A that at the same time that the wiper 338A of the delayed counter emitter 338 engages its 7th position segment, the wiper 337A of the print position emitter 337 engages the 8th position segments thereof. Consequently, during this same alternate drum cycle and prior to the actual initiation of the hundreds order add operation at address 11 time thereof as described above, the activation of the #3 Reading Exit Hub 364 completes a circuit therefrom through the plugwire 1058 to the 8th print position entry hub 353, through the emitter 337, now in its 8th position, to the 8th print position exit hub 1052, through the plugwire 1059 to impulse the card list hub 895. The impulsing of the hub 895 during address 3 time effects a readout of the tens order digit "1" from address 3 of the card track #1 to the print thyratrons 910. As a result, two drum cycles thereafter as the hundreds order addend digit 9 is actually being printed, the print setup relay contacts are positioned representative of the tens order addend value. Consequently, with the "delayed" counter emitter 338 then in its 8th position, the activation of the #2 (tens) counter position exit hub 1052A activates the plus hub 1064 therethrough to enter the tens order digit "1" of counter group #2 into the adder 1039 where it is added to the "1" addend value to give a sum digit 2. During this same drum cycle, with the print emitter 337 in its 9th position, the activation of the 4th reading exit hub 364 energizes the card list hub 895 therethrough to read out the units order digit 3 from address 4 of the card track 2 to the print thyratrons.

The actual add operation of the tens order addend digit "1" and counter digit "1" is effected in the same manner as described for the previous hundreds order add operation with the exception that no carry operation is required. The operation of the program device triggers 1075, 1127 and 1128 in controlling this particular add operation would, therefore, be as shown in Fig. 51A. The operation may be summarized as follows: During address 10 time add 1 and 1 to give a tens order sum digit 2, during address 11 time read the sum digit 2 from the Write register 1048 and record it on the temporary storage track 154 during address 12 time erase the tens order digit "1" from address 12 of the counter track 153, and during address 18 time read the tens order sum digit 2 from the temporary storage track 154 and record it in the tens order (address 10) of counter group #2. The arithmetic operations effected may be diagrammatically represented as shown in Fig. 49C.

Two cycles after the tens order add operation, the print carriage is in column 8 and the tens order addened digit "1" is printed. At the same time, with the units order addened digit 3 now represented in the print setup relay contacts of the adder 1039, and with the delayed counter emitter 338 in the 9th position thereof, the activation of the 1 (units) counter position exit 1052A at 9 address time completes a circuit therethrough, through the counter group select circuit to activate the plus hub 1064. As a result, the units order digit "1" in counter group #2 is entered into the adder 1039, where it is added to the "3" addend value to give a units order sum digit 4.

The actual add operation for the units order is effected in the same manner as described for the hundreds order add operation with the exception that no carry operation is required. The operation of the program device triggers 1075, 1127 and 1128 in controlling this particular add operation would, therefore, be as shown in Fig. 51A. The operation may be summarized as follows: During address 9 time add 3 and 1 to give a units order sum digit 4, during address 10 time read the sum digit 4 from the write register 1048 and record it on the temporary storage track 154, during address 11 time erase the units order digit "1" from address 12 of the counter track 153, and during address 17 time, read the units order sum digit 4 from the temporary storage track and record it in the units order (address 9) of counter group #2. The arithmetic operations effected may be diagrammatically represented as shown in Fig. 49D.

Two cycles after the units order add operation, the print carriage is in column 9 and the units order addend digit 3 is printed. As a result of the above described operations, counter group #2 now contains the desired sum value 1424 of our add operation 913+115, while the addend value 913 has been printed in columns 7, 8, and 9 of the print record sheet. These are the desired results and the operation is completed.

If in our above described example, the printing of the addend value 913 was not desired, the control panel wiring would be the same as shown in Fig. 49A, however, the additional control panel wiring as shown in Fig. 52 would also be required. It will be noted in Fig. 52 that the 7th hub 347 of the print position control exit emitter 339 is connected to a so-called print suppress start hub 1220 (coordinates S; 49–50, Fig. 12B), while the 10th hub 347 of the print position emitter is plugwired to a so-called print suppress stop hub 1221.

Returning again to our representative add operation, when the print carriage is in column 5, the print emitter 337 is in its 7th position, as previously explained. As a result, the activation of the 2nd reading exit hub 364 completes a circuit therethrough to energize the card list hub 895 and effect a read out of the hundreds order addend digit 9 from the #2 address of card track #2 the print thyratrons 910. It will be recalled from the detailed description of the print operation, that with one or a combination of the print thyratrons 910 rendered conductive in correspondence to the value read from the card track, the closing of the cam contacts CRA–2 during the following so-called "idle" cycle, causes the print setup relays 893 corresponding to the conductive thyratrons 910 to be energized, these energized relays being held conductive from the latter part of the "idle" cycle through the subsequent alternate drum cycle through cam contacts CRA–3. During the latter part of the idle cycle, the closing of cam contacts CRA–4 completes a circuit through contacts of the energized print setup relays 893 to energize the print magnets 872. This results in the print mechanism being set up representative of the particular read out character (9 in our particular example) when the carriage reaches the related print column (7 in our example) 45 milliseconds later. It will also be recalled that the closing of the cam contacts CRA–4 also completes a circuit through contacts of the print setup relays 893 to energize the hammer magnet 681 which causes the hammer to strike the selected type element when the carriage reaches the desired print column.

Referring now to Fig. 15A, it will be noted that each pair of segments of the print position emitter control exit 339 are engaged in turn during the "idle" and part of the following alternate drum cycle following the particular alternate drum cycle when the corresponding position of the print emitter 337 is engaged by its wiper 337A. Thus, in our particular example, during the idle cycle (and part of the subsequent alternate drum cycle) following the alternate drum cycle when the wiper of the print emitter 337 engages the 7th position thereof to initiate the read out of the "9" (address 2) value to the print mechanism, the wiper 339A engages the 7th position of the print position emitter 339. As a result a circuit is completed from the power terminal 489 (Fig. 14A), through conductor 495, the normally closed side of the contacts R14*c*, conductor 927, the contacts CRA–5, now closed, the normally closed contacts R1*c* of the relay R1, through normally closed contacts of R15*c*, through the 7th position of the emitter 339 to the associated output hub 347, through a plugwire (see Fig. 52) to the print suppress start hub 1220, to impulse the latch pick coil of a so-called print suppress relay R21. With the relay R21 energized, its associated contacts R21*a* in the pickup circuit to the hammer control magnet 681 (see Fig. 13J) are latched open to prevent the closing of cam contacts CRA–4 from energizing the hammer magnet 681. Thus, in our particular example, even though the value 9 is set up on the print mechanism when the carriage reaches print column 7, the hammer 649 does not strike and printing is prevented. In our particular example, printing is prevented in columns 7, 8, and 9 as a result of the contacts R21a being latched in the open position.

When the print position control exit emitter 339 reaches its 10th position, a circuit is completed from the related 10 hub 347 thereof, through a plugwire (see Fig. 52) to the so-called print suppress stop hub 1221, to impulse the unlatch coil (see Fig. 14C) of the print suppress relay R21 and restoring the associated contacts R21a to the normally closed position so that printing operations may again be effected, if desired.

In our particular example wherein printing of the addend value 913 is not desired, it will be appreciated that the reading exit hubs 2, 3, and 4 in Fig. 49A could be wired through any consecutive 3 positions of the print emitter 337 as long as the plus hub 1064 is connected through corresponding positions of the counter emitter 338. It is also necessary for the print suppress start hub 1220 to be connected to the position of the print position control exit emitter 339 corresponding to the first of the chosen 3 consecutive positions of the print emitter 337, while the print suppress stop hub 1221 is connected to the position of the emitter 339 immediately following the position thereof corresponding to the last of the chosen 3 consecutive positions of the print emitter 337.

*The carry circuit*

Although there was described in reference to the addition of the hundreds order digits 9 and 5 of our representative add operation, the manner in which the carry trigger 1047 (Fig. 13F) was flipped On to effect a decimal carry to the thousands order, it is believed that a further discussion of the logic of the carry circuit will be helpful.

The carry circuit may be considered to be comprised of the actual carry trigger 1047 itself, the "8" trigger 1041 of the adder 1039, the diode unit 1113, and the OR circuit 1119. Remembering that the binary adder 1039 has a capacity of 15, it is evident that if the "8" trigger 1041 thereof is flipped Off during an actual add operation (first 6 cell times of an address time), an exceeding of the 15's capacity of the adder is indicated and a decimal carry is, of course, required. A decimal carry is also required if at the end of an add operation, the "8" trigger is On, and either the "2" or "4" triggers is also On to indicate a sum digit of ten or more. This latter condition arose, of course, in the hundreds order of our representative add operation. The components of the carry circuit are interconnected logically in such a manner to determine when the two types of above-mentioned conditions are fulfilled, and accordingly effect a flipping On of the carry trigger 1047.

The first type of carry operation described above is effected as follows: Assume that 9 in print relay 893 is to be added to 8 in one of the counter groups. The positive potential of the $\overline{7 \text{ of } 7}$ conductor 1118 during the first 6 cell times of each address time is applied through the follower 1117, and conductor 1116, to the plate of the right diode of unit 1113. With the value 9 represented the contacts *893–1g* and *893–8i* of the print set-up relays, the "1" and "8" triggers 1041 are flipped On at 1B time of the add operation in the usual manner. Thereafter, the entry of the "8" at 6 of 7 time from the counter group, flips the "8" trigger from its On to Off state. As the "8" trigger flips Off, the resultant negative shift of the right plate thereof is applied through the right section of follower 1109 to the cathode of the right diode of unit 1113, the plate of which is conditioned positive at this time from conductor 1116, as explained previously. Under the above circumstances, the right diode of unit 1113 conducts which shifts the right grid of the carry trigger 1047 negative, thus flipping it On. This is the desired result.

The second type of operation mentioned above is, of course, similar to the carry operation described for the hundreds order add operation of the representative add operation. It will be recalled that at the end of the add operation, the sum digit 14 is represented by the On state of the "8," "4," and "2" triggers of the adder 1039. With the "4" and "2" triggers 1041 On, the resultant high plate potential of the right plate terminals thereof is applied to the plates of the related diodes of the OR circuit 1119. With either (or both) diodes of OR unit 1119 On, the OR circuit is, of course, operated and charges the condenser 1114 positive, provided the "8" trigger 1103 is on so as to act through conductor 1112 to maintain the left diode of unit 1113 On. At 7B time, the inverted 7B pulse on conductor 1124 resets the "8" trigger 1041 Off (also resets "4" and "2" triggers Off). The resultant negative shift of the right plate of the "8" trigger actuates the left diode of unit 1113 and the carry trigger 1047 is flipped On. This is the desired result.

Under the condition wherein at the end of an add operation the "8" trigger 1041 is On, while the associated "2" and "4" triggers are Off (sum digit of 8 or 9), the OR circuit 1119 is inoperative and the condenser 1114 remains uncharged.

With the condenser 1114 uncharged, the plate of the associated diode of unit 1113 remains negative. As a result, the flipping Off of the "8" trigger at 7B time thereafter, applies a negative going shift to the cathode of the left diode of unit 1113, as usual, but this shift has no effect thereon since the related plate is already negative. Consequently, the carry trigger 1047 remains Off. This is the desired result under the above circumstances.

*The subtract operation*

Subtraction is effected in the adder 1039 by the well-known complement method. In order to give complete understanding of the timing sequence and coaction of the various portions of the arithmetic section during a subtract operation, a representative subtract operation will now be described in detail.

Assume that counter group #2 contains the value 215, and the value 102 in addresses 5, 6, and 7 of the card track is to be subtracted therefrom to give the difference value of 113. It will also be assumed that it is desired to list the subtrahend (102) in columns 14 through 16 of the print record. Fig. 53 shows the control panel wiring required to effect our desired subtract operation. It will be noted in Figs. 15A and B that the wiper of the delayed counter emitter 338 is timed to engage a particular pair of related segments 320 (see Fig. 19), two drum cycles after the wiper of the print emitter 337 engages the corresponding segments of that emitter. It will also be noted in Figs. 15A and B that the print carriage 570 lags the print emitter 337 by approximately 2 drums. For example, when the emitter 337 is in the 13th position, the print carriage 570 is in its 12th columnar print position. The counter value 215 is arranged, units position first, in the counter group #2 (columns 9 through 16) in the usual manner and would appear as 51200000.

As the print carriage 570 reaches the 12th column of the print record, the wiper 337A of the print emitter 337 (see Fig. 13K) engages the 14 segment thereof. At 1 of 7 time 5 address time of the following drum cycle, which is an alternate drum cycle, the activation of the 5 reading exit hub 364 (see Fig. 53) completes a circuit therefrom, through the plugwire 1222, the 14th print position entry hub 353, through the associated print emitter 337, now in its 14th position, to the 14th print position exit hub 1052, through a plugwire 1223 to the card list hub 895. The activation of the card list hub 895 at 5 address time of this alternate drum cycle, reads out the hundreds order digit 1 of the subtrahend from address 5 of the card track to the print thyratrons 910, in a manner previously explained. The resultant energization of the "1" thyratron 910, in turn effects an energization of the associated "1" print set-up relays 893 through cam contacts CRA–2 during the subsequent idle drum cycle. With the "1" relay 893 energized, the closing of the cam contacts CRA-3 completes a hold circuit for the "1" relay 893 from the latter part of the idle drum cycle, through the subsequent alternate drum cycle. Also with the "1" relay energized, the closing of cam contacts CRA-4 near the end of the idle drum cycle, energizes the "1" print magnet 872 so that approximately 45 milliseconds later when the print carriage is in column 14, the numeral 1 will be in printing position and a printing operation effected.

During the third (alternate) drum cycle of the above described action, with the "1" print relay energized and the associated contact 893-1*g* to the adder 1039 accordingly transferred, the delayed counter emitter 338 is in its 14th position. Consequently, at 1 of 7 time of 11 address time of the cycle, the activation of the #3 (hundreds order) counter position exit hub 1052A completes a circuit therefrom, through a plugwire 1225, to the 14th counter entry hub 351, the delayed counter emitter 338, now in its 14th position, to the 14th counter + and − exits 349, a plugwire 1226 to the #2 counter group select entry hub 1054, the associated #2 counter group select circuit, now operable, to the #2 counter group select exit hub 1057, through a plugwire 1227 to a minus control hub 1228 (coordinates F; 60 through 64) to the adder 1039. It will be recalled that address 9 is the units order of the counter group #2 so that looking at the addresses of this counter group in the sequence which they pass any fixed point, the counter value 215 would appear at 512, as previously mentioned. As a result of the impulsing of the minus hub 1228 at address 11 time, the hundreds order digit "1" of the card track value, which is now represented by the transferred contacts 893-1*g* of the print set-up relay, is subtracted from the hundreds order digit "2" of counter group #2. The subtract action is effected as follows:

As soon as the minus hub 1228 shifts positive at 1 of 7 time of address 11 time, as explained above, a circuit extends therefrom (see Fig. 13F) through an OR unit 1230, through the left section of follower 1065 to the one input of AND circuit 1231. Since this is an alternate drum cycle, the other input of the AND circuit 1231 is conditioned positive through the conductor 467 by the alternate drum cycle signal. The AND circuit is accordingly actuated and acts through the left section of follower 1068, a so-called "minus" conductor 1232 the OR circuit 1070, the conductor 1072, the left section of the inverter 1073 to the Read control trigger 1075 to flip the latter On (right plate high). The positive potential of the conductor 1072 is also applied to the one input of the 3-way AND circuit comprised of units 1077 and 1078.

At 1 of 7 of address 11 times, the positive potential of the "minus" conductor 1232 is also applied through the normally closed side of the contacts 893-4*i*, the normally closed side of the contacts 892-2*i*, the normally closed side of the contacts 893-8*i*, to positively charge the condenser 1079 of the "8" trigger of the adder 1039.

A 1 of 7 signal is applied through conductor 440 to the second input of the AND circuits 1077—1078, while B pulses are applied through conductor 430 to the 3rd input thereof. With the 1st input of the 3-way AND circuit conditioned positive through conductor 1072, the AND circuit is accordingly actuated at 1B time and a 1B pulse is generated on the related output conductor 1080. The 1B pulse is inverted in the right section of unit 1073 and the resultant $\overline{1B}$ pulse generated on the related output thereof is applied through conductor 1083 and the diodes 1084 to the capacitor 1079 of each of the triggers 1041. With the capacitor 1079 of the "8" trigger positively charged as previously explained, the $\overline{1B}$ pulse is felt on the related plate terminal and this trigger is flipped On. At the end of 1B time of address 11 time, the On "8" trigger is accordingly representative of the 9's complement value 8 of the hundreds order card track value 1.

At 4B time of address 11 time, the "2" bit of value "2" in address 11 of counter group #2 is read therefrom by the read head 143, and applied through read amplifier 1085 and conductor 1087 (see Fig. 13H) to the one input of the AND unit 1088. With the Read Control Trigger 1075 On, the resultant high potential of the right plate terminal thereby is applied through the right section of follower 1089, conductor 1090, to the other input of unit 1088. The unit 1088 is accordingly actuated and the resultant high potential of the related output is applied through the right section of OR unit 1092, follower 1093, and conductor 1094, to the one input of AND units 1096, 1097, 1098, and 1099 (see Fig. 13F). A 4 of 7 signal is applied from the 7 stage ring through corresponding output conductor 440 (4 of 7) to the other input of AND unit 1097. Unit 1097 is accordingly actuated and a 4B pulse generated on its related output thereof. This 4B pulse is applied through a conductor 1233, and the right section of inverter 1043 to the "2" trigger 1041 to flip it On. At the end of this operation, the "2" and "8" triggers of the adder 1039 are On and representative in binary coded form of a sum digit 10.

With the "2" trigger 1041 On, the resultant high potential of its right plate is applied through the right section of follower 1104 and conductor 1106 to positively charge the condenser 1107 of the "2" trigger 1108 of the Write register 1048. In a similar manner, the On "8" trigger of the adder 1039, through the right section of follower 1109, and conductor 1112, positively charges the condenser 1107 of the "8" trigger of the Write register 1048. The positive potential of the conductor 1106 is also applied through the OR circuit 1119 to charge the condenser 1114.

At 7B time, the application of an inverted 7B pulse to the conductor 1124 acts through the diodes 1084 in a manner previously described, of the "2" and "8" On triggers 1041 of the adder and resets them Off. The resultant negative shift of the right plate of the "8" trigger 1041 as it resets Off, is applied through the follower 1109, conductor 1112, diode 1113 (left section), through the positively charged condenser 1114 to flip the carry trigger 1047 On. The inverter 7B pulse On conductor 1124 is also applied through to the Write register 1048 and accordingly acts through the diodes 1084 and the positively charged condensers 1079 to flip the related "2" and "8" triggers On. At the end of 7 of 7 time of address 11 time, the trailing edge of the 7 of 7 signal on conductor 440 flips the read control trigger 1075 Off. As previously described with the Read control trigger right hand plate On at 7 of 7, the Write control trigger 1127 is turned On.

At the end of address 11 time of our particular subtract example, the carry trigger 1049 is On, and the Write register 1048 is representative in binary coded forms of the sum digit 10 generated as a result of the hundreds order subtract operation. With the carry trigger 1047 On, the resultant high positive potential of the right plate thereof is applied through follower 1129 to the one input of a 3-way AND circuit 1131 (units 1131A and B) and also through a resistor 1132 to the plate of the right diode of unit 1133. The cathode of this diode is maintained negative through conductor 1134 except during the presence of 1 of 7 signal therein. With the carry trigger 1047 On, at 7B time of address 11 and conductor 1134 negative, the diode 1133 is operative and the diode side of the resistor 1132 and associated conductor 1136 are at a relatively low potential.

*Address 12 time—same drum cycle*

With the "2" trigger 1108 of the Write register On, the resultant positive potential of the right plate thereof is applied through the right section of follower 1235 and a conductor 1236 to the one input of an AND unit 1237. Similarly, with the "8" trigger 1108 of the Write register On, the resultant positive potential of the right plate thereof is applied through the right section of follower 1160 through a conductor 1238 to the other input of the AND unit 1237. With both inputs of the AND circuit 1237 positive, and AND circuit is actuated and through conductor 1240 and OR 1241 unit tries to shift positive a junction linking the output of an AND circuit 1242 comprised of AND units 1242A, B, and C, the output of the OR unit 1241, and an input of an OR unit 1243. With the "1" trigger 1108 of the Write register Off, the resultant high potential of its left plate is applied through the left section of follower 1193 and a conductor 1245 to the one input of the AND unit 1242B. With the "4" trigger 1108 Off, the resultant high potential of its left plate is applied through the left section of a follower 1246 and conductor 1247 to the input of AND unit 1242A. At 1 of 7 time, a 1 of 7 signal is applied through the proper conductor 440 (1 of 7) to the input of the previously mentioned AND unit 1242C and under the above described circumstances, the junction of the OR circuit 1241, and the 3-way AND circuit 1242, accordingly shifts positive at 1 of 7 time. The positive shift of the junction at 1 of 7 time is applied through OR unit 1243, the conductor 1165 and the left section of follower 1166 (see Fig. 12J) to the related input of the 3-way AND circuit 1167. With B pulses being applied through conductor 430 to the second input of circuit 1167, and with the remaining input conditioned positive through conductor 1171 via conductor 1168 as a result of the Write control trigger 1127 being On, a 1B Write pulse results on the conductor 1172. The 1B Write pulse on conductor 1172 through the usual circuitry effects a writing of a binary one in the Zone 1 cell position of the particular address of the temporary storage track passing the related Write head 147 at that time. The 1B Write pulse on conductor 1172 also flips the redundancy trigger 1177 On.

Also at 1 of 7 time of address 12 time, the 1 of 7 signal on conductor 1134 renders the right diode of unit 1133 high. At the end of the 1 of 7 signal, the diode again falls. The resultant negative shift of the plate terminal thereof is applied through conductor 1136 to the "2" trigger 1108 of the Write register 1048 and flips it Off. The resultant negative shift of the left plate of the "2" trigger as it flips Off, is applied through the left section of inverter 1158 to the "4" trigger 1108 to flip it On. The "4" and "8" triggers of the Write register 1048 are now On.

With the carry trigger 1047 On, the resultant positive potential of its right plate is applied through follower 1129 and conductor 1130 condition positive the one input of AND unit 1131A of the 3-way AND circuit 1131, as previously explained. Also, since the 1 of 8 stage of the 8 stage ring 433 is not On at address 12 time, the resultant positive potential of the $\overline{1 \text{ of } 8}$ signal is applied through conductor 1141, OR circuit 1142 (see Fig. 13H) and conductor 1144 to positively condition the input of the AND unit 1131B. At 2 of 7 time of address 12, a 2 of 7 signal is applied through conductor 440 (2 of 7) to the other input of AND unit 1131A, and with the other two inputs of the 3-way AND circuit 1131 (units 1131A and B) already positive, as described above, the 3-way AND circuit is actuated. The resultant positive output signal therefrom is applied to the left grid input of the inverter unit 1146. The resultant negative shift of the associated commoned plate terminals of both left and right-hand sections of inverter 1146 is applied through diode 1147 to the "1" trigger 1041 of the adder to flip it On, and also through conductor 1148 etc. to the Read control trigger 1075 to flip it On, it being recalled that the Write control trigger 1127 is already On. With all of the triggers 1108 of the Write register 1048 now Off, it will be appreciated that after the 1B Write pulse is generated on conductor 1172, no further Write pulses appear thereon during this address time (address 12). As a result, with the redundancy trigger 1177 (see Fig. 13J) accordingly On at the end of 6 of 7 time, the AND unit 1182 is actuated at 7B time and a binary one is written in the redundancy cell of the temporary storage address. This address now contains a binary one in its Zone 1 and R cells which is the desired coding (see Fig. 38) for our hundreds order sum digit 0.

With the hundreds order carry digit entered into the adder 1039 trigger 1041 On, the On state of the Read trigger 1075 during address 12 time, effects an entry therein of the thousands order counter digit. In our particular example the thousands order counter digit is zero, so that at the end of the add operation, the adder 1039 contains a thousands order sum digit "1." At 7B time of address 12 time, the $\overline{7B}$ pulse on conductor 1124 resets the adder ("1" trigger 1041 flipped Off), flips the "1" trigger 1108 of the Write register 1048 On to complete the transfer of the adder sum digit to the Write register. At the end of 7 of 7 time of address 12 time, the Read control trigger 1075 is flipped Off, the erase control trigger 1128 is flipped On, while the Write control trigger 1127 remains in the On state.

During address 12 time, with the Write control trigger 1127 On, the thousands order sum "1" is read from the Write register 1048 to the temporary storage track 154 in the usual manner. Also during address 13 time, with the erase trigger 1128 On, the information in the hundreds order address (11) of counter group #2 is erased in the usual manner. At the end of 7 of 7 time of address 13 time, the Write control trigger 1127 is flipped Off, while the erase control trigger 1128 remains On.

During 14 address time, with the erase control trigger 1128 On, the information in the thousands order address (12) of counter group #2 is erased. At the end of address 14 time, the erase trigger 1128 is flipped Off to complete the cycle of the counter program unit.

During address 19 time, the hundreds order sum digit 0 is read from the temporary storage track 154 and recorded in the hundreds order address (11) of counter group #2 which is under its related Write head 145 at that time.

During address 20 time, the thousands order sum digit "1" (0+carry from hundreds order) is read from the temporary storage track and recorded in the thousands order address 12 of counter group #2. At the end of the above operation, the counter group #2 contains the value 1015 which is arranged units order first in one counter as 51010000. The actual arithmetic operation effected as a result of the hundreds order operation, and including the resultant entry of a carry into thousands order, is represented diagrammatically in Fig. 54A in that portion labeled "hundreds order operation."

Although the actual arithmetic operation has been completed on the hundreds order digits of our two values, the actual printing of the hundreds order subtrahend digit "1" is not effected until 2 drum cycles later when the print carriage is in column 14. The above described operation of subtracting the hundreds order subtrahend digit "1" from the hundreds order counter digit 2, are all effected during the particular alternate drum cycle when the emitter 338 is in its 14th position.

At the same time that the delayed counter emitter 338 is in its 14th position, the print emitter 337 is in its 15th position. Consequently, during the same alternate drum cycle, and prior to the actual initiation of the hundreds order subtract operation at address 11 time thereof, the activation of the 6th reading exit hub 364 completes a circuit through the 15th position of the emitter 337 to impulse the card list hub 895 at that time, and initiate a read-out of the tens order subtrahend digit 0 of the card track to the print thyratrons 910. As a result, two drum cycles thereafter as the hundreds order subtrahend "1" digit is being printed in the usual manner, the proper contacts of the print set-up relay 893 are positioned representative of the tens order subtrahend value, so that with the delayed counter emitter 338 then its 15th position, the activation of the #2 (tens order) counter position exit hub 1052A activates the minus hub 1228 therethrough. As a result of activating the minus hub at this time (address 10 time), the tens order digit 1 of counter group #2 is entered into the adder where it is added to 9, the 0's complement of the hundreds order subtrahend digit 0, thus giving a tens order sum digit 10. With a tens order sum value of 10 in the adder 1039, a carry into the hundreds order of the counter is effected in the usual mannner. Since the hundreds order prior to the carry operation contained a 0, net result of the hundreds order subtract operation is that a 0 results in the tens order of a 1 in the hundreds order of counter group #2. Since the circuitry by which these actions are effected has been fully explained before, it is not believed necessary to described the details of these operations. The actual arithmetic operation effected as a result of the tens order operation, and including the resultant entry of a carry into the hundreds order, is represented diagrammatically in Fig. 54A in that portion labelled tens order operation. At the end of this operation, counter #2 contains the value 1105 which is represented units order first as 50110000 as indicated. During this same drum cycle when the tens order operation is effected, the print emitter 337 is in its 16th position, so that the activation of the 7th reading exit hub 364 energizes the card list hub 895 therethrough to read out the units order digit "2" of the subtrahend to the print thyratron 910.

Two drum cycles after the tens order operation, the print carriage is in column 15 and the tens order subtrahend digit 0 is printed. At the same time, with the unit order subtrahend digit 2 now represented at the adder input by the proper contacts of the print set-up relays 893, and with the print emitter 337 in its 16th position thereof, the activation of the #1 (units order) counter position exit hub 1052A activates the minus hub 1228 therethrough to enter the 9's complement 7 of the units order subtrahend digit 2 into the adder 1039 where it is added to the units order counter digit 5. The resultant generated sum value 12 effects a carry into the tens order of the counter in the usual manner, while 2 is entered into the units order thereof. Since the tens order prior to the carry entry contained at 0, the net result of the units order operation is that a 2 results in the units order of the counter and 1 in the tens order thereof. The actual arithmetic operation effected as a result of the units order operations, and including the resultant entry of a carry into the tens order, is represented diagrammatically in Fig. 54A in that portion labeled units order operation. At the end of this operation, counter group #2 contains the value 1112 which is represented units order first as 2111 as indicated.

Two drum cycles after the order add operation, the print carriage is in column 16 and the units order subtrahend digit "2" is printed. As a result of the above described operations, the 9's complement 798 of the subtrahend 102 has been added to the first three orders of counter #2 which contained 215, to give a difference value of 1112. The thousands through ten millions orders of the subtrahend corresponding to the related orders (addresses 12 through 16) of counter group #2, while not actually represented in the card track, are understood to be zeros. Consequently, to complete our subtract operation by the complement add operation, it is necessary to add the 9's complement of zero or 9 in other words, to the value in each of the 5 higher orders of counter group #2. This desired operation is set up on the control panel for our particular example by connecting each of the thousands through ten millions counter position exit hubs 1052A through an individual plugwire 1248 to a related so-called comparing entry hub 1250 (coordinates AF, 41–64, in Fig. 12B). Each comparing entry hub 1250 is connected internally through a related isolation diode of a diode unit 1251 (see Fig. 13F) to a pair of related so-called compare exit hubs 1252. For our particular example, the exit hubs 1252 associated with the particular entry hubs 1250 to which the thousands through ten millions counter exit hubs 1052A are wired, are commoned by suitable plugwiring as indicated in Fig. 53. This common connection is then connected through plugwire 1253 to the 19th entry hub 351 of the emitter 338, the related exit hub 349 being connected through the #2 counter group selection circuit for our particular operation, to the counter minus hub 1228.

With the above control panel wiring, the machine is controlled so as to complete our representative subtract operation in the following manner. When the delayed emitter 338 reaches its 19th position, the activation of the thousands order counter exit hub during address 12 time completes a circuit therefrom, through the associated plugwire 1248 to the #1 compare entry hub 1250, through the associated diode 1251 (see Fig. 13F), the related compare exit hub 1252, the plugwire 1253, the 19th position of the emitter 338, the #2 group selection circuit 1050, to energize the counter minus hub 1228. The thousands order hub 1052A is of course, activated at the thousands address time of each counter group, or at 4 address time, 12 address time, 20 address time, etc.; however, it is only during counter #2 time (address 9 through 16 time) that a circuit may be completed from the #2 entry hub 1054 to the exit hub 1057 thereof, as previously explained. During the alternate drum cycle when the delayed emitter 338 is in its 19th position, none of the set-up relays 893 are energized so that the related contacts to the adder 1039 are representative of zero. During 12 address time (thousands order time), the set-up relay contacts are considered as indicating the thousands order subtrahend digit 0, during 13 address time the set-up contacts are considered as indicating the ten thousands order subtrahend digit 0, etc.

Returning now to the consideration of the thousands order operation, as the minus hub 1228 shifts positive at 12 address time through the circuit traced above, the resultant positive potential of the minus conductor 1232 (see Fig. 13F) is applied through the normally closed side of the contacts **893–1*g* to charge the "1" trigger condenser 1079 of the adder 1039, and also through the normally closed side of the contacts 893–4*i*, the normally closed side of the contacts 893–2*i*, and the normally closed side of the contacts 893–8*i* to charge the "8" trigger condenser 1079 of the adder. Thereafter the $\overline{1B}$ pulse on conductor 1083 flips the "1" and "8" triggers 1041 On in the usual manner. With the 9's complement of the thousands order subtrahend digit 0 now entered in the adder, the thousands order digit "1" in counter group #2 is entered therein, in the usual manner. At the end of the thousands order add operation, the "8" and "2" triggers 1041 are On and accordingly representative of a sum digit 10. At the end of address 12 time, the value 10 in the adder 1039 is transferred to the Write register 1048, the adder is reset, and the carry trigger 1047** is flipped On in the usual fashion.

At 1 of 7 time of address 13, the activation of the ten thousands order counter position exit hub 1052A completes a circuit through the 19th position of the delayed emitter 338 and the #2 counter group selection circuit 1050 to again activate the minus hub 1228. The resultant positive potential of the minus conductor 1232 is again applied through the normally closed side of the contacts **893–1*g* to the "1" trigger condenser 1079 and also through the normally closed side of the contacts 893–4*i* etc. to the "8" trigger condenser 1079, so that the following $\overline{1B}$ pulse on conductor 1083 flips the "1" and "8" triggers 1041 On to enter the 9's complement of the ten thousands order subtrahend digit into the adder 1039. With the carry trigger 1047 On, the resultant operation of the AND circuit 1131 at 2 of 7 time, in the usual manner, generates a 2 of 7 signal which is applied through the left section of inverter 1146, and the conductor 1147 to the binary connected grid input of the "1" trigger 1041 of the adder 1039, and accordingly flips it from its On state (previously assumed at 1 of 7 time) to its Off state. The flipping Off of the "1" trigger acts through the left section of inverter 1043 to flip the "2" trigger 1041** On. The "8" and "2" triggers of the adder are now On and representative of a ten thousands order sum digit 10.

In addition to the generation of the ten thousands order sum digit 10 during address 13 time, the fact that the "2" and "8" triggers of the Write register, and the carry trigger 1047 are On, effects a writing of a thousands order digit 0 on the temporary storage track 154. At the end of 3 of 7 time of address 13, the carry trigger 1047 is reset Off in the usual manner. At the end of address 13 time, the ten thousands order sum digit 10 in the adder 1039 is transferred to the Write register 1048 and the carry trigger 1047 is flipped On, in the usual manner.

At one of 7 time of address 14, the activation of the hundred thousands order counter position exit hub 1052A initiates the same actions as during address 13. Consequently, during address 14 time, the ten thousands order digit 0 is written on the temporary storage track 154, while the addition of the 9's complement of the hundred thousands order subtrahend digit 0 and the ten thousands order carry, generates a hundred thousands order sum digit 10. At the end of address 14 time, the 10 in the adder is transferred to the Write register and the carry trigger 1047 is again flipped On in the usual manner.

At 1 of 7 time of address 15 time, the activation of the 1 million order counter position exit hub 1052A initiates the same actions as during address 14. Consequently, during address 15 time, the hundred thousands order digit 0 is written on the temporary storage track, while the addition of the 9's complement of the 1 million order subtrahend digit 9 and the hundred thousands order carry, generates a 1 million order sum digit 10. At the end of address 15 time, the 10 in the adder is transferred to the Write register 1048 and the carry trigger 1047 is again flipped On in the usual manner.

At the 1 of 7 time of address 16 time, the activation of the ten million order counter position exit hub 1052A energizes the counter minus hub 1228 through the 19th position of the delayed emitter 338 etc. As a result, 9 is entered into the adder 1039 through the contacts 893–*1g* and 893–*4i* etc., as before, whereafter the entry of the million order carry digit of 2 of 7 time into the adder, effects the generation of a ten million order sum digit 10. During 16 address time, the 1 million order value 0 is written on the temporary storage track 154 in a manner previously explained. At the end of address 16 time, the value ten in the adder 1039 is transferred to the Write register 1048, and the carry trigger 1047 is again flipped On.

With the "8" and "2" triggers 1108 of the Write register 1048 On at the beginning of address 17 time, and with the Write trigger 1127 still On at this time, the conductor 1172 shifts positive during 1 of 7 time, through action previously explained in detail, to effect a writing of the Zone 1 bit of the ten millions order digit 0 in the related address of the temporary storage track 154. With the carry trigger 1047 On, the conduction of the right diode of unit 1133 at the end of 1 of 7 time, acts through conductor 1136 to flip the "2" trigger 1108 of the Write register 1048 Off, in a manner previously explained in detail.

It will be recalled that an actual carry operation from one order to a succeeding higher order is controlled by the AND circuit 1131 (units 1131A and 1131B) the circuit 1131 being actuated under the simultaneous condition $\overline{1 \text{ of } 8}$ (conductor 1144 positive), carry trigger 1047 On (conductor 1130 positive) and a 2 of 7 signal on related conductor 440. With a carry operation indicated as a result of the ten millions order add operation during address 16 time, it being noted that the ten millions order is the highest order of a counter group, a so-called end around into the units order of the counter group is required, rather than the usual carry to a higher order operation. During address 17 time with the 1 of 8 stage of the ring 433 On, the resultant negative potential of the conductor 1144 prevents a carry operation of the AND circuit 1131 (see Fig. 13F) at 2 of 7 time. However, with the carry trigger 1047 On, the resultant positive potential of conductor 1130 conditions positive the one of a 4-way AND circuit 1256 comprised of AND units 1256A and 1256B. With the 1 of 8 stage of the 8 stage ring 433 On, the resultant 1 of 8 signal on conductor 445 (1 of 8) conditions positive a second input of the circuit 1256. B pulses are applied through a conductor 430 to a 3rd input of the circuit 1256 while a 2 of 7 signal is applied through conductor 440 to the 4th input of the circuit. Under the above conditions, the AND circuit 1256 is accordingly actuated at 2B time of address 17 time. The resultant 2B pulse generated by circuit 1256 is applied through a conductor 1257, the OR circuit 1215 (see Fig. 13G) the left section of follower 1216, the Write amplifier 1218, to the Write head 145, thus recording a binary bit (one) in the Zone 2 cell of the units address (address 9) of counter group #2, which is under the head 145 during address 17 time.

The thousands order digit 0, the ten thousands order digit 0, the hundreds thousands order digit 0, the million order digit 0, and the 10 million order digit 0, are read from the temporary storage track during address time 20, 21, 22, 23 and 24 respectively, and recorded in the related addresses 12 through 16 of counter group #2. At the end of address 24 time therefore, counter group #2 contains the value 00000112 with the units order (address 9) which contains the value 2 also having a bit in its Zone 2 cell. The Zone 2 bit in address (address 9) indicates that the value represented in the numeric cell thereof should be increased by an end around carry. The adding of the end around carry to the units order is effected at 2 of 7 time of address 9 time of the next drum cycle (idle drum) in the following manner. The reading of the Zone 2 bit at 2B time of address 9, completes a circuit from the Read head 143, through the Read amplifier 1085 and the conductor 1087 to condition positive the one input of an AND unit 1258 (see Fig. 13F). A2 of 7 signal is applied through the conductor 440 to the other input of the AND unit 1258. Under the above conditions the AND unit 1258 is actuated at 2B time of address 9 time. The resultant 2B pulse generated in the related output of unit 1258 is applied through the right section of inverter 1146 and conductor 1147 to flip the "1" trigger 1041 of the adder 1039 On. The output from the inverter 1146 is also applied through conductor 1148 etc. to the Read control trigger 1075 to flip it On and initiate a cycle of the program device 1049.

With the Read control trigger 1075 On, the binary coded value 2 in address 9 is read therefrom and entered into the adder in the usual manner. With the "1" trigger 1041 of the adder 1039 On prior to the entry of the value 2, it is obvious that the subsequent entry of the value "2" generated a sum digit 3 in the adder.

At the end of address 9 time, the "3" in the adder is transferred to the Write register 1048, the Read control trigger 1075 is flipped Off, and the Write control trigger 1127 is flipped On, all in the usual manner. During address 10 time, the Write register value 3 is written on the temporary storage track 154. At the end of address 10 time, the Write control trigger 1127 is flipped Off and the erase control trigger 1128 is flipped On. During address 11 time, with erase control trigger 1128 On, the information in address 9 is erased in the usual manner. During address 17 time, the value 3 of the temporary storage track is read therefrom and written in drum address 9. At the end of address 17 time, counter group #2 contains the value 00000113. This is the desired result for our subtraction operation.

The counter action in effecting the above operations for our representative subtract operation, are indicated in diagrammatic form in previously mentioned Fig. 54A.

It will be recalled in our particular example, that under the control of the circuit completed through the 19th position of the delayed emitter 338, the digit 9 was "added" into each of the thousands through ten millions orders of the selected counter group #2. This action was effected after the completion of operations effected in the units, tens, and hundreds operations under control of circuits completed through the 14, 15, and 16 positions of the emitter 338. By wiring the 9's entry control circuit through a position of the emitter 338 prior to the 14th position, the 9's entry into the thousands through the millions orders of the counter group may be effected prior to the operations in the units, tens, and hundreds order thereof. The end result of the entire operation is the same in that a difference value 113 is generated as before; however, the sequence of the various arithmetic operations would then be as diagrammatically represented in Fig. 54B.

In our particular example wherein 102 was subtracted from 215, a positive difference value 113 resulted in counter group #2. However, if subtrahend had exceeded the minuend in magnitude, a negative difference value would result in the counter group, this being indicated by a 9 in the highest order thereof. For example, if we reverse the factors of our previous subtract operation by subtracting 215 in the card track from 102 in counter group 2, a difference value 99999886 results in the counter group, this value being the 9's complement of the desired difference value −113. Fig. 55 is a diagrammatic representation of the various arithmetic steps effected in subtracting 205 from 102. The details of the operation shown in Fig. 55 are believed to be obvious in view of the previous descriptions of the operation of the arithmetic section.

*Counter read-out to print device*

If desired, the value in any selected counter group may be read out therefrom and printed on the record sheet. Referring now to Fig. 56, there is shown the control panel wiring required to effect a printing in columns 15 through 22 of the record sheet, of the information in counter group #2. The control panel wiring from the counter position exits 1052A through the 15th through 22nd positions of the counter emitter 336, through the counter group #2 selection circuit 1050 to a counter read-out hub 1260 (coordinates G; 60–64 in Fig. 12B) initiates the reading out of each order of the counter group #2, in turn, to the print mechanism control circuitry. Circuit means controlled through the hub 1260 are also provided to prevent printing of zeros to the left of the highest order significant digit of the counter value, and to effect a true number printing of a possible negative balance (represented in 9's complement form) in our representative counter #2. If the counter balance is negative (9's complement form) and it prints in its true number form, a negative sign print indication is required. This is provided for in our particular example by plugwiring from any reading exit hub 364, such as #1, through the 23rd position of the counter emitter 336, to a so-called credit (minus) total list hub 1261 (coordinates B; 58–59 in Fig. 12B).

The actual manner in which the above control panel circuitry controls the desired counter read-out operation will now be described first, for the condition wherein counter group #2 contain the positive total 00000113, and second, for the condition wherein counter group #2 contains the negative total −113, which is represented therein in 9's complement form 99999886. Since the timing sequences of the counter read-out operations are difficult to follow by word description, a timing diagram of a portion of the positive counter read-out operation is provided in Fig. 57.

*Counter read-out—positive total counter balance*

Assuming now that counter group #2 contains the value 00000113, the actual read-out to print device operation, is effected as follows: With the print carriage in column 13, the counter emitter 336 is in its 15th position. During counter group #2 time (address time 9 through 16) of the related alternate drum cycle, with the #2 counter group selection circuit accordingly operable, by action previously explained, the activation of the #8 (ten millions order) counter position exit hub 1052A at address 16 time, completes a circuit therefrom through a related plugwire 1259 to the #15 counter entry hub 351, through the 15th position of the counter emitter 336 to the 15th counter read-out exit hub 348, through common plugwire circuitry linking the 15th through 22nd counter read-out exit hubs and a plugwire 1262 to the counter group #2 select entry hub 1054, through the related #2 counter group selection circuit 1050, now operable, to the associated select exit hub 1057, through a plugwire 1264 to the read-out hub 1260. The circuit continues from the counter read-out hub (Fig. 13I) through the right section of follower 898 (Fig. 13I) to condition the one input of AND circuit 1266. The circuit also extends from the output of the follower 898 through the conductor 1267 to the right grid input of a so-called print total trigger 1281 and to the plate of a diode 1280. The circuit comprised of conductor 1267, trigger 1281 etc. is utilized for conversion of a negative counter balance so that we need not be concerned with it during this explanation of a positive counter total read-out. Also during address 16 time, the information in the ten millions order (address 16) of counter group #2 is read therefrom and applied through conductor 1087 to the 2nd input of the AND unit 1266. In our particular example, wherein address 16 contains the decimal value 0, which is represented in binary coded form by the combination of a zone 1 and zone 7 bit (see Fig. 38), the AND circuit 1266 is accordingly activated at 1B and at 7B and through OR circuit 902, conductor 903 and the follower 905, positively conditioning the one input of the 3-way AND circuit 906 (units 906A and B) at 1B and 7B times of address 16 time. It will be recalled that the second input of the AND circuit 906 is conditioned positive through conductor 467 by the alternate drum cycle signal, while B pulses are applied through conductor 430 to the 3rd input of the AND circuit. Under the above circumstances, the AND circuit 906 is actuated at 1B and 7B time of address 16 time and through the left section of follower 907 and conductor 908 renders the Z1 and R thyratrons 910 conductive in the usual manner.

At the end of this same alternate drum cycle when the emitter 339 reaches its 15th position (see Fig. 15A), the resultant activation of the 15th print position control exit hub 347 (cam contacts CRA–5 closed) completes a circuit therefrom through a plugwire 1271 (Fig. 56) to a so-called Field Definition hub 1272 (coordinates P; 41–44 in Fig. 12B). The circuit continues from the hub 1272 (Fig. 13J) through a latch pickup coil of a so-called Zero Suppress relay R22 to ground. The resultant energization of the relay R22 causes its associated contacts R22*a*, *b*, *c*, and *d*, to open. The purpose of this action will be later evident.

With the Z1 and R thyratrons 910 conductive, the closing of the cam contacts CRA–2 at the beginning of the following idle drum cycle (cycle #2 in Fig. 57A) completes the usual circuit to the conductor to energize the Z1 and R setup relays 893 associated therewith.

Figure 13L:
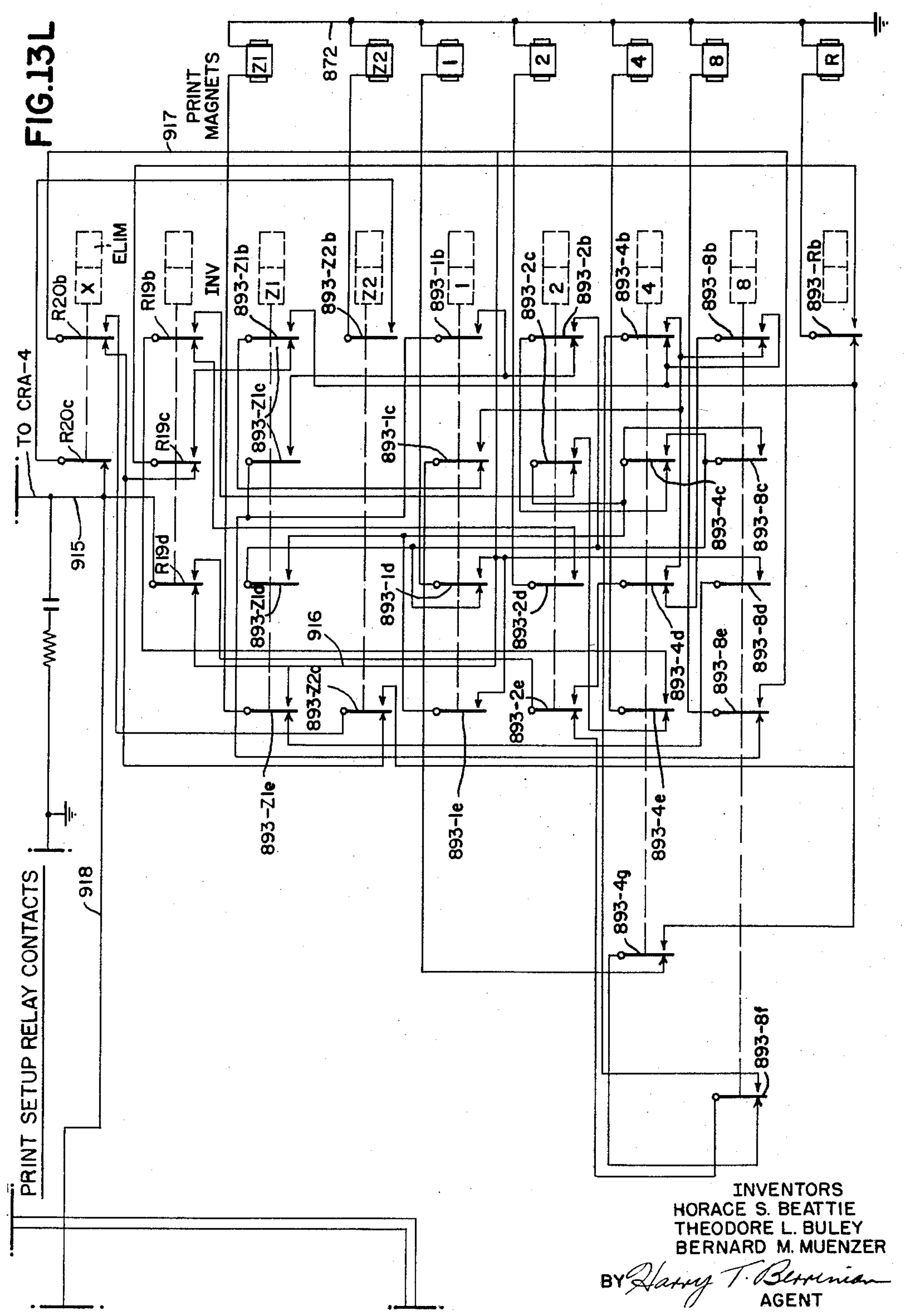

With the Z1 and R setup relays 893 energized and accordingly representative in coded form of the ten millions order digit "0" in counter group #2, the associated contacts 893–Z1*c* and *d* close, and 893R*b*, 893–Z1*b* and *e* transfer in the print magnet circuit (Fig. 13L). The closing of the cam contacts CRA–4 after the midpoint of the following idle cycle (cycle #2 in Fig. 57A), accordingly acts through the print magnet circuit in the usual manner to energize the Z1 and R print magnets 872 corresponding to the energized print setup relays. However, with the contacts R22*a* and R22*b* open as a result of the operation of the suppress relay R22, as described above, the impulse from contacts CRA–4 is not able to reach the hammer magnet 681 in the usual manner, as will be evident from an examination of Fig. 13J. Consequently, two drum cycles later, when the print carriage reaches column 15 on the ten millions order print position for our particular example, the type element is positioned so as to print the tens millions order digit "0" of the counter total. However, since the hammer magnet 681 was not impulsed, the zero printing operation is suppressed and the 15th print column remains blank.

During the third drum cycle (Fig. 57) of the above described action, when the print carriage is in its 14th columnar position and counter emitter 336 is in its 16th position, the activation of the #2 millions order counter position exit hub 1052 (Fig. 56) at address 15 time of this alternate drum cycle, energizes the counter readout hub 1260 through the emitter and the #2 counter group selection circuit 1050. As a result, the millions order digit 0 of the counter #2 is read out to the thyratrons 910 in the same manner as described above for the ten millions order of that counter group. The "0" thyratron information (Z1 and R thyratrons 910 conductive) is then transferred to the print setup relays 893 in the usual manner. With the Z1 and R setup relays 893 energized, the closing of the cam contact CRA–4 transfers the "0" print setup relay information to the print magnets 872, thus initiating a selection of the "0" type character. With the contacts of Zero Suppress relay R22 still latched, however, and with the circuit normally completed from the cam contact CRA–4 through conductor 918 etc. to impulse the hammer magnet 681 cannot be completed. With the hammer magnet 681 unenergized, it is evident that when the print carriage reaches column 16, the printing of the millions order digit "0" setup therein is prevented. The above readout process is repeated for the hundred thousands, ten thousands, and thousands order digits 0 of the counter value, with the actual printing operation being suppressed in corresponding columns 17, 18 and 19 of the print record.

When the print carriage is in column 18 and emitter 336 is in its 20th position, the activation of the #3 hundreds order counter position exit hub 1052A at address 11 time of the related alternate drum cycle, energizes the counter readout hub 1260 therethrough to effect the reading out of the hundreds order counter digit 1. As a result, the 1 and R thyratrons 910 are energized, whereafter, the closing of the cam contact CRA–2 energizes the corresponding setup relays 893–1 and R. Thereafter, the closing of cam contacts CRA–4 energizes the 1 and R print magnets 872 through the contacts 893–1 and 893R*b* of the setup relays 893–1 and 893R. At the same time with a significant figure (1) represented by the contacts 893–1*f*, now transferred (Fig. 13J), of the setup relay 893–1, a circuit is completed therethrough from contacts CRA–4 thus by-passing the open contact R22*a*, to impulse the hammer magnet 681. As a result of the energization of the print magnet 872–1 and R, and the hammer magnet 681, the numeral "1" is printed on the record sheet when the carriage reaches column 20.

At the same time that the hammer magnet 681 is energized as described above, a parallel circuit is completed through a diode 1274 and a latch trip coil of the relay R22, to ground. As a result, the latched contacts of the Zero Suppress relay are restored to their normal position. With the contacts R22*a* closed, printing of any zeros read from the counter to the right of the highest order significant figure thereof, is effected in the usual manner, however, this is actually of no consequence in our particular example since there are no zeros to the right of the hundreds order digit 1.

In the same manner as described above for the hundreds order counter digit 1, the emitter 336 when in its 21 position routes an impulse from the #2-tens order counter exit hub 1052A (Fig. 56) at address 10 time of the related alternate drum cycle to the counter readout hub 1260 to effect a printing of the tens order counter digit "1" when the print carriage reaches column 21. In a similar manner, the units order digit 3 of counter #2 is read out therefrom and printed in column 22 of the record. As a result of the above operations, the total 113 in the counter group #2 has been printed in columns 20, 21 and 22 of the record sheet. This is the desired result.

When the print carriage reaches print column 23, the print position emitter 339 is in its 24 position so that a circuit is completed from the 24th print position control exit hub 347, through a plugwire 1275 (Fig. 56), to a so-called Zero Suppress End hub 1276 (coordinates R; 41–44 in Fig. 12B). The circuit continues from the hub 1276 (Fig. 13J) through a diode 1277 to impulse the latch trip coil of the Zero Suppress relay R22 to unlatch the associated contacts thereof, if they have not already been unlatched as a consequence of the reading and of a significant digit from the counter track. In our particular case, the Zero Suppress latch contacts have already been restored as a result of the read out of the hundreds order digit "1" from the counter group #2, so that the impulsing of the hub 1276 is of no consequence.

*Counter readout—negative total counter balance*

Assuming now that counter group #2 contains the negative total 113, which would be represented therein as 99999886 (see Fig. 55), and with the same control panel wiring as shown in Fig. 56, the counter readout operation is effected as follows: With the print carriage in column 13, the counter emitter 336 is in its 15th position, so that the activation of the #8-ten millions order counter position exit hub 1052A at address 16 time completes a circuit therethrough to activate the counter readout hub 1260. With the counter readout hub activated, the resulting positive potential of conductor 1267 (Fig. 13I) effects a readout of the value 9 in the ten millions order of counter group #2 to render the "1" and "8" thyratrons 910 conductive, in a manner previously explained in detail.

The positive potential of conductor 1267 is also applied through a resistor 1279 to the plate of a diode 1280 and the right grid input of a so-called Print Total trigger 1281. At the end of 5 of 7 time, the trailing edge of a 5 of 7 signal on conductor 440 (5 of 7) is applied to the cathode of the diode 1280, thus rendering the diode conductive. The conduction of the diode 1280 acts through resistor 1279 to pull down the right grid of trigger 1281 and flips it On (right plate high), the trigger 1281 having been positively reset Off previously by a 10 bit ring advance pulse applied to the left grid thereof through conductor 447. With the trigger 1281 now On at the beginning of 6 of 7 time (8 bit time) of this address time, the resultant high potential of the right plate thereof is applied through a follower 1282 to the one input of an AND unit 1284. An 8 of 8 signal is applied through conductor 433 (8 of 8) to the other input of the AND unit 1284. An 8 of 8 signal is generated during each high order (ten millions) time of each of the ten counter groups being read out through counter readout hub 1260, as will be evident upon an examination of Fig. 50. With both inputs accordingly positive during "8" bit time of the ten millions (highest) order time of counter group #2 for our particular example, the AND unit 1284 is actuated and the resultant high potential of the output thereof applied through a conductor 1285 to condition positive the one grid of the inversion thyratron 911.

The other input of the thyratron 911 is linked to the output of an AND unit, one input of which is linked through conductor 1087 to the output of the counter track read amplifier 1085, while a 6 of 7 signal ("8" bit time) is applied through conductor 440 (6 of 7). Since the ten millions order of counter group #2 contains a 9 which is represented by a "1" and "8" bit, the coincidence of the "8" bit read pulse on conductor 1087 and the 6 of 7 signal in conductor 440 (6 of 7), actuates the AND unit 1286, the resultant high output potential thereof being applied through conductor 1284A to the other grid of the inversion thyratron 911. With both inputs of thyratron 911 accordingly positive at 8 bit time (6 of 7) of the ten millions order time (8 of 8) of counter group #2 time, for our particular example, the inversion thyratron 911 is rendered conductive. It is thus evident that with either a coded decimal value 8 or 9 (both have a binary bit in "8" bit position) in the highest order (ten millions order) of a counter from which a readout operation is initiated, the inversion thyratron 911 is rendered conductive to indicate a negative counter balance. The highest order of a counter is thus utilized for sign indication purposes.

At the end of this same alternate drum cycle when the emitter 339 reaches its 15th position (see Fig. 15A), the resultant activation of the 15th print position control exit hub 347 (cam contacts CRA–5 close) completes a circuit therefrom through a plug-wire 1271 (Fig. 56) to the Field Definition hub 1272 to energize the latch pick-up Zero Suppress relay R22 as previously described in relation to the positive counter total readout operation. With relay R22 impulsed, its associated contacts R22*a*, *b*, *c* and *d* are latched open.

With the inversion thyratron 911, and the "1" and "8" thyratrons 910 conductive, the closing of the cam contacts CRA–2 at the beginning of the following idle drum cycle, completes the usual circuit to energize the 893–1 and 893–8 setup relays and actuate their associated relay contacts. The circuit from CRA–2 is also applied through the inversion relay R19 and a latch pickup coil so-called Credit R23 paralleled therewith, to the plate terminal of the now conductive inversion thyratron 911, thus energizing both the relays R19 and R23. With the energization of the pickup coil of the credit relay R23, the associated contacts R23*a* (Fig. 13K) are latched closed for a purpose that will be later evident. With the inversion relay R19 energized, its associated R19*a* and *e*, close, and R19*b*, *c*, and *d* transfer (Fig. 13L). With the contacts R19*a* closed, the relay R19 is held energized through CRA–3 in the same manner as the 893–1 and 8 relays.

With the closing of cam contacts CRA–4 at the midpoint of this same idle cycle (cycle #2 in Fig. 57), the potential of terminal 486 is applied therethrough, through conductor 915, (Fig. 13L) the normally open side of the contacts R19*d*, now closed, the normally open side of the contacts 893–1*e* now closed, the normally open contacts 893–8*d*, now closed, the normally closed side of the contacts 893–Z1*e*, through the Z1 print magnet 872, to ground. A circuit is also completed from the conductor 915, through the normally open side of the contacts R19*d*, now closed, the normally closed side of the contacts 893–2*e*, the normally open side of the contacts 893–8*f*, now closed, the normally closed side of the contacts 893–4*b*, the normally closed contacts 893–R*b*, through the R1 print magnet, to ground. The impulsing of the Z1 and R print magnets effects a selection of the 0 type character (see Fig. 38) or the 9's complement of the value 9 actually represented in the setup relays, this inversion taking place of course, by reason of the inversion relay R19 being energized.

With the closing of cam contacts CRA–4 at the midpoint of this same idle cycle (cycle #2 in Fig. 57), the potential of terminal 486 is also applied therethrough, through conductor 915, conductor 918 (Fig. 13J) the normally open side of the contacts 893–1*f*, now closed, the normally open contacts 893–8*g*, now closed, to the movable contact portions of contacts R22*b* and R19*e*. With the zero suppress relay R22 energized contacts R22*b* are open, and with the inversion relay R19 latched, the associated contacts R19*e* are transferred. The above traced circuit accordingly can proceed no further and the hammer magnet 681 remains unenergized. Consequently, two drum cycles later when the print carriage reaches column 15 on the ten millions order print position for our particular example with the 0 type character then in printing position, the print operation is prevented and this print column remains blank. It will be noted in Fig. 136, that the inversion process (inversion relay R19 energized) between the readout number represented in the setup relays 893, and the 9's complement thereof as actually selected by the print magnets 872, always adjusts for any difference in bit count between the readout number and its 9's complement by energizing or not energizing the Redundancy print magnet, as required. Consequently, if the proper 9's complement type character is physically selected by the print mechanism, the associated print check contacts 892A and 892B in Fig. 13J will print prove so that the error thyratron is not energized.

When the emitter 336 reaches its 16th position during the 3rd drum cycle (an alternate drum cycle), the activation of the millions order counter position exit hub 1052A at address 15 time (7 of 8 time—see Fig. 50) of the corresponding alternate drum cycle, energizes the counter readout hub 1260 therethrough to initiate a readout of the millions order digit 9 of counter #2 to the thyratrons 910. As a result, the "1" and "8" thyratrons 910 are fired in the usual fashion. The activation of the readout hub 1260 also causes the print total trigger 1281 to be again flipped On in the manner previously described. On the address immediately thereafter (address 16 time—8 of 8 time), the "8" bit in the ten millions order of counter group #2 is again read out and with the trigger 1281 On, the conditions for firing the inversion thyratron are fulfilled and the thyratron 911 is accordingly rendered conductive. At the end of this alternate drum cycle, the opening of cam contacts CRA–3 drops out the inversion relay R19 and the 893— "1" and "8" setup relays which were energized as a result of the ten millions order operation.

With the closing of cam contacts CRA–2 at the beginning of the subsequent idle cycle (4th cycle in Fig. 57), and with the "1" and "8" thyratrons 910, and the inversion thyratron 911 conductive, as described above, the corresponding relays 893–1, 893–8, and R19 (inversion) are again energized. The millions order readout operation then proceeds in the same manner as described for the ten millions order operation, in that the 9's complement 0 of the counter digit "9" as represented in the setup relays, is subsequently selected for printing in the related print column 16, as a result of the inversion relay R19 being energized, with the actual printing operation being prevented since the circuit to the hammer magnet 681 cannot be completed. The above readout process is repeated for the hundred thousands, ten thousands, and thousands order digits 9 of counter #2, each of these readout digits being inverted as a result of the detection of the "8" bit in the ten millions order of the counter on each readout operation, with the actual printing operation being suppressed in corresponding columns 17, 18, and 19, by reason of the open circuit due to R22 zero suppress relay.

When the print carriage is in column 18 and emitter 336 is in its 20th position, the activation of the #3 hundreds order counter position exit at 11 address time (which is within counter group #2 time—see Fig. 50) of the related alternate drum cycle, energizes the counter readout hub 1260 therethrough to initiate a reading out of the hundreds order counter digit 8. As a result, the "8" thyratron 910 is rendered conductive. The inversion thyratron 911 is also again energized as a result of the sensing of an "8" bit in the ten millions counter order.

Thereafter the closing of cam contacts CRA–2 energizes the corresponding relays 893–8 and inversion relay R19. Thereafter, the closing of the cam contacts CRA–4 energizes the 1 and R print magnets 872 through contacts of the setup relay 893 and inversion relay R19 (Fig. 13L), it being noted that the value in the setup relays is inverted into its 9's complement value "1" in the print magnet relays. At the same time, with "8" represented in the setup relays, the hammer magnet circuit is now completed from contacts CRA–4, through conductor 915, conductor 918, the normally open side of the contacts 893–1*f*, now closed, the normally closed side of the contacts 893–8*h*, the normally closed contacts R21*a* to the hammer magnet 681. With the 1 and R print magnets 872 energized and the hammer magnet 681 energized, the numeral "1" (the true number representation of the counter order value 8), is printed on the record sheet when the carriage reaches column 20.

At the same time that the hammer magnet 681 is energized, as described above, the unlatch coil of the Zero Suppress relay R22 paralleled therewith is also energized to restore the associated contacts thereof to their normal position. With the contacts of the Zero Suppress relay R22 restored to its normal position, zero printing to the right of the highest order significant figure of the counter, may be effected, if required.

In the same manner as described above for the hundreds order counter digit, the emitter 336 when in its 21st position routes an impulse from the #2—the tens order counter exit hub 1052A at address 10 time of the related alternate drum cycle to the counter readout hub 1260 to effect a readout of the tens order counter digit 8, and a subsequent printing in column 21 of the corresponding inversion digit 1. In a similar manner, the units order digit 6 of counter 2 is read out therefrom and printed in its inverter form as 3 in column 22 of the record sheet. As a result of the above operations, the negative value 113 which is represented in the counter as 99999886, has been read out therefrom and printed in its true form as 113 in columns 20, 21 and 22 of the record sheet.

In order to indicate that the printed value 113 is negative, a credit sign (—) is printed in column 23. This action is effected as follows: With the print position control exit emitter 339 reaching its 23rd position, the closing of the cam contacts CRA–5 completes a circuit therethrough, through a plugwire 1289, to the so-called total credit hub 1261. The circuit continues from hub 1261 (Fig. 13K), through the normally open contacts R23*a* of the Credit relay R23, still latched closed at this time, to a conductor 1290, through a diode 1291 to the hold coil of the setup relay 893–R thus energizing the latter. A circuit is also completed from conductor 1290 through a diode 1292 to the hold coil of the setup relay 893–Z2 to energize it. The energized relays 893–R and Z2 are held energized through cam contacts CRA–3 as previously described. With the 893–Z2 and R setup relays energized, the Zone 2 and R print magnets are thereafter energized in the usual fashion. With the Zone 2 and R print magnets energized, the minus sign (—) type element is selected (see Fig. 38) for printing when the carriage reaches column 23, whereafter, the printing operation is effected in the usual manner.

*Counter reset*

When desired, any selected counter may be reset to zero by erasing all the data therein. Referring now to Fig. 58 there is shown the additional control panel wiring required to effect resetting of counter group #2 after either of the previously described readout operations therefrom. When the counter emitter 336 reaches its 25th position, the activation of a so-called #2 counter reset select hub 1294 (coordinates Z; 55 to 64 in Fig. 12B), during counter group #2 time (2 of 10 time of 10 stage ring), completes a circuit therefrom (Fig. 13D) through a plugwire 1295 to the 25th counter entry hub 351, through the 25th position of the emitter 336 to the 25th readout exit hub 348, through a plugwire 1296, to a reset hub 1297 (coordinates H; 60 to 64 in Fig. 12B). The circuit continues from the hub 1297 (Fig. 13F), through a conductor 1299 to the one input of an AND unit 1300 (Fig. 13J). A 1 of 8 signal is applied through associated conductor 445 to the other input of AND unit 1300. The AND unit is accordingly actuated at 1 of 8 time. At the end of 1 of 8 time, the AND unit 1300 is deenergized and the resultant negative shift of the related output thereof is applied to the right grid of a so-called Reset trigger 1301 to flip it On. The resultant high potential of the right plate terminal of trigger 1301 is applied through OR circuit 1128A to the right grid of the Erase trigger 1128 (Fig. 13G). With the right grid of trigger 1128 positive, the trailing edge of the 7 of 7 signal on conductor 440, renders the left diode of unit 1191 conductive to pull down the right grid of the Erase trigger 1128 and flip it On. The Erase trigger is thus flipped On at the beginning of 3 of 8 time of 2 of 10 time, at which time the units order (address 9) of counter group #2 starts under the Erase head 144, it being recalled that the Erase head 144 is displaced 2 address positions counterclockwise from the read head 143. As the units order of counter group #2 rotates under the head 144, any data therein is erased. In the same manner as the succeeding tens, hundreds, thousands orders etc., rotate thereunder during 4 of 8, 5 of 8, 6 of 8 times, etc., respectively, any data therein is erased, the highest or ten millions order data being erased during 2 of 8 time of 3 of 10 time.

At the end of 1 of 8 time of 3 of 10 time, for our particular example, the trailing edge of the 1 of 8 signal on associated conductor 445, is applied to the left grid of the Reset trigger 1301 to flip it Off. The resultant high potential of the left plate terminal thereof is applied to the one input of an AND unit. The other input of AND unit 1302 is already conditioned positive through a conductor 1304 from the left plate of the Write trigger 1127, which is Off at this time. The AND unit 1302 is accordingly actuated to render positive the left grid of the Erase trigger 1128. At the end of 2 of 8 time of 3 of 10 time, the trailing edge of the 7 of 7 signal on conductor 440 renders the right diode of unit 1191 conductive to pull down the left grid of the Erase trigger 1128 and flip it Off. This completes the reset action for counter group #2 for our representative operation. The timing sequence of the reset action is shown in Fig. 59.

*Special character printing*

In a card list operation (list from card track), or a counter readout operation, any one or combinations of a group of special characters comprised of the dollar sign, the comma, the decimal point, the asterisk, or the lozenge, may be selected for printing in any desired column of the card track information, or the counter total, by appropriate control panel wiring. The control panel wiring required is to wire the appropriate print position control exit hub 347 to the desired special character print column, to a control hub 1305, 1306, 1307, 1308 or 1309 (coordinates B and C, 62 to 64 in Fig. 12B) of the desired special character. For example, if in our previously described counter readout operation for counter #2, it is desired to insert a decimal point between the hundreds and tens orders of the printed counter total 113, the control panel wiring as shown in Fig. 56 and previously explained, would be modified as shown in Fig. 60. It will be noted in Fig. 60 that the 21st print position control exit hub 34 is linked to the decimal hub 1307 with the functions wired through positions 21, 22, and 23 of the emitter 336 in Fig. 56 being shifted one position to the right to the positions 22, 23, and 24 as shown in Fig. 60. With the control panel wiring as shown in Fig. 60, the #2 counter total 113 is printed in columns 20 through 23 inclusive of the record 1.13. The decimal point operation in column 21 is effected as follows:

With the emitter 336 in its 20th position, the hundreds order digit 1 in counter 2 is read out therefrom to the print device in the manner previously explained. Two drum cycles later with the emitter 339 in its 21st position, the activation of the associated 21st print position control exit hub 347 completes a circuit therefrom through a plugwire 1311 to the decimal hub 1307. The circuit continues from the hub 1307 (Fig. 13K) through the normally closed contacts R22*c*, to a conductor 1312, through a diode 1313 to the hold coil of the setup relay 893–Z1, thus energizing the latter. A circuit is also completed from conductor 1312 through diode 1314, diode 1292 to the hold coil of the setup relay 893–Z2 to energize it. A circuit is also completed through diode 1314, and diode 1292 to energize the setup relay 893–R. Other circuits are completed from the conductor 1312, through a diode 1315, a conductor 1317 and through diodes 1318, 1319, 1320 to energize the setup relays 893–1, 2, and 8, respectively, through their hold coils. With the 893–Z1, 893–Z2, 1, 2, 8 and R relays energized, the corresponding print magnets 872 are energized in the usual fashion. With the Z1, Z2, 1, 2, 8, and R print magnets energized, the period or decimal point (see Fig. 38) is selected for printing when the print carriage reaches column 21, whereafter the printing operation is effected in the usual manner. This is the desired result. The remaining information of the tens and units order of the counter is thereafter printed in columns 21 and 22 in the same manner as previously explained.

In substantially the same manner as described above for the decimal point print operation, the activation of the dollar sign hub 1305, energizes the proper setup relays 893–Z2, 1, 2, and 8 to effect the selection and printing of the dollar sign in any desired print column. The remaining special characters, comma, lozenge, and asterisk, are selected for printing in any desired column, in a similar manner.

It will be appreciated that a printing of the dollar sign, comma, lozenge, asterisk, or decimal point may also be effected from the card track by suitably coded information loaded therein from the entry cards. The printing of any selected one or ones of the remaining 7 special characters in Fig. 38 is effected in this manner from card track information, there being no provision for inserting these characters under plugboard control as in the case of the dollar sign, comma, lozenge, decimal point, and asterisk. Included in this last group of plugboard controlled special character printing would be the insertion of the minus symbol to indicate a negative counter total under the control of hub 1261 or the insertion of the minus symbol under the control of a hub 1322 (coordinate B; 60—61 in Fig. 12B) to indicate a negative value in a card track list operation. In the case of the negative indication for a card track value, the negative sign symbol may be carried with the value on the card track, if desired, thus eliminating the necessity for inserting such symbol under plugboard control.

*The multiply operation (in general)*

The subject accounting machine includes a unique multiplying apparatus of sufficient capacity to multiply a multiplicand and multiplier of a maximum of 8 positions (orders) each, to give a product of up to a maximum of 15 positions. The multiplication process in general, comprises a generation of a partial product for order of the multiplier, highest order first, by over and over addition of the multiplicand in accordance with the magnitude of the multiplier digit. Each partial product after generation is added to a properly column shifted total of all previous partial products up to that point of the operation. The partial product total is stored in the ninth and tenth counter group positions (addresses 65 through 79) of the counter track 153. The most significant digit of the partial product total is loaded into counter position 72 subsequent to the generation of the partial product for the highest order multiplier digit. As a result of successive column shifts and assuming an eight digit multiplier, the most significant digit of the final product is in counter track position 79 subsequent to the operation with the lowest order multiplier digit.

The multiply operation includes an initial setup operation of reading the multiplicand digit by digit, from the particular addresses of the card track in which it is stored, to the so-called multiplicand track 157 where it is written 10 times.

To effect this transfer of the multiplicand from the card track to the multiplicand track, a digit by digit list operation of the multiplicand is initiated, highest order first, in a manner previously explained in detail. Two drum cycles after the initiation of the list operation for the highest order of the multiplicand, the print setup relays 893 are energized representative of this multiplicand digit. The contacts 893–1*m*, 893–2*e*, 893–4*j*, and 893–8*k* of the numeric setup relays are referred to as the multiplicand read-in contacts and are arranged in a so-called multiplicand encoder circuit 1323 (Fig. 13E). Assuming a multiplicand of 8 orders, the highest order multiplicand digit now represented in the MC Read In contacts, is read therefrom into each of the positions 8, 16, 24, 32, 40, 48, 56, 64, 72 and 80 of the multiplicand track 151. One print cycle (2 drum cycles) later, the next highest order of the multiplicand is set up in the MC Read In contacts of the print relays 893 and read therefrom into the multiplicand track positions 7, 15, 23, 31, 39, 47, 55, 63, 71, and 79. This action continues until eight multiplicand print cycles are completed at which time the assumed 8 order multiplicand will be completely loaded once into each of what may be considered as ten counter group positions of the multiplicand track 157.

With the multiplicand track fully loaded, a digit by digit list operation of the multiplier is initiated, highest order first. Two drum cycles after the initiation of the list operation of the highest order of the multiplier, the print setup relays 893 are energized representative of this multiplier digit, the contacts 893–1*h*, 1*j*, 1*e*, *k*, *l*, 893–2*j*, *k*, 893–4*k*, 893–8*j* and MR (multiplier) Read In contacts (Fig. 13E) contacts which, dependent upon the magnitude of the multiplier digit represented therein, effect a corresponding repeated entry of the multiplicand from track 157 to the adder 1039. For example, assuming a multiplier digit 7 represented in the MR Read In contacts, read out of the multiplicand track to the adder is effected from address 17 through address 71 of this ×AD cycle (Multiply-Alternate Drum) which accordingly enters the multiplicand 7 times to the adder 1039. Each digit of the multiplicand after entry into the adder 1039 is delayed one address in the Write register 1048 in the usual manner and then transferred therefrom to the so-called partial product accumulation track 158. Seven addresses thereafter, the partial product track amount is read therefrom and re-entered into the adder. At this time, the multiplicand is again entering the adder from the multiplicand track 157 under control of the multiplier digit. Each digit entering the adder from the multiplicand track enters the adder, binary bit by binary position, at approximately the middle of 1, 2, 4, 8, time; while each corresponding digit entering the adder from the track 158, binary bit by binary bit position, is delayed about four microseconds beyond the middle of 1, 2, 4 or 8 time. By reason of this interlaced entry to the adder, 2 digits can be added every 16 microseconds (1 stage of 7 stage ring). By the above action it is evident that the multiplicand is added over and over to progressive totals of itself, a number of times as determined by the magnitude of the controlling multiplier digit. Final partial product accumulation for each controlling order (digit) of the multiplier, occurs in the adder from addresses 65 to 72 of that alternate drum cycle. This final product is written on the partial product track and then into addresses 73 to 80 of the temporary storage track 154.

During the operation with a particular order of the multiplier, the sum of the partial products generated as a result of previous operations with higher orders of the multiplier, is stored in addresses 65 through 79 of the counter track, as previously stated. During the operation with the first (highest order) of the multiplier, the old counter balance (counter groups 9 and 10) is zero, of course. During each ×AD cycle when a partial product is being generated as a result of an operation with a particular order of the multiplier, the counterbalance is circulated from the counter track 153 to the temporary storage track 154 and then back to the counter track to column shift the balance 1 address thus, in effect, multiplying one entire counter balance by ten.

During the subsequent ×NAD (Multiply—not alternate drum) cycle, the column shifted counterbalance enters the adder, and also during this time, the final partial product resulting from the previous multiplier digit operation (×AD cycle) is entering the adder 1039, so that a new product summation for the operation up to that point is generated. This adder operation is effected by the previously mentioned interlace action, with the entry of each digit, binary bit by binary bit, of the final partial product from temporary storage, being delayed 4 microseconds beyond the middle of 1, 2, 4, 8 time. The newly generated product summation is transferred through the Write register 1048, to temporary storage 154 and back to the counter track (addresses 65 through 79).

During the next ×AD cycle, a partial product is generated in accordance with the next order of the multiplier and at the same time, the old counterbalance is column shifted. Thereafter, during the subsequent ×NAD cycle, the old counterbalance and final partial product are added to give a new counterbalance for the operation up to that point. This process is repeated for succeeding lower orders of the multiplier. After the partial product is generated for the lowest order of the multiplier, and the value then added to the counterbalance, the final product is available in columns 65 through 79 of the counter track and may be read out therefrom to the printer.

Although a multiply operation requires that a list operation be initiated for first the multiplicand, and thereafter the multiplier, the actual printing of these factors may be prevented in the usual manner, by suppressing the firing of the print hammer.

It should be mentioned that the counter program 1049 (Fig. 13G) is not used in multiply. Prior to the actual multiply operation, the addresses 65 through 79 of the counter track in which the partial product summation and the final product is eventually stored, is erased completely by a so-called product erase operation. With the counter addresses 65 through 69 erased prior to multiply, it is evident that no end around carry can occur therefrom during multiply, and carries are only to the higher order for product storage. The Read, Write and Erase functions (not the Read, Write, and Erase triggers) relative to the counter track are controlled by gating voltages, <u>Multiply</u>, <u>×AD</u> (multiply alternate drum cycle), and <u>×NAD</u> (multiply not alternate drum cycle), in a manner that will be evident from the following detailed description of a representative multiply operation.

*Representative multiply operation*

Referring now to Fig. 61 there is shown required control panel wiring for effecting a representative multiply operation of 123×123 to give a product of 15129, the multiplier being stored in addresses 9, 10 and 11 of the card track, while the multiplicand to be listed is stored in addresses 5, 6, and 7 of the card track. It is desired that the multiplier be listed in columns 9, 10, and 11 of the print record, the multiplicant listed in columns 5, 6, and 7 of the print record, and the product listed in columns 20 through 24 of the print record.

The manner in which the above representative multiply operation is effected will now be explained in detail. In the following description all actions are referenced directly to the main address timing and not any particular physical drum address position of any of the various storage tracks relative to the related Read, Write, Erase heads, etc. thereof. In those places in the following description wherein circuitry previously described in detail is utilized, only the function effected will be noted. There is shown in Fig. 62, a timing sequence diagram of a multiplication operation of a multiplicand and a single order multiplier digit. Although our representative multiply operation is based on a 3 digit multiplier, Figure 62 will be of aid in visualizing the various timing relations during our representative operation and should be referred to frequently.

Referring now to Fig. 61 when the print emitter 337 reaches its 5th position, the activation of the fifth reading exit hub 364 during address 5 time of the related alternate drum cycle, completes a circuit therefrom through a plugwire 1324, the emitter 337, to the card list hub 895. As a result, a card list operation of the hundreds order multiplicand digit "1" is effected in the usual manner.

During the time that the emitter 337 is in its 5th position, the "delayed" counter emitter 338 is in its corresponding 4th position. As a result, with the activation of the hub 349 at address 66 time of the related alternate drum cycle, a circuit is completed therefrom through the emitter 338, a plugwire 1325 to a so-called Product Erase hub 1327 (coordinates A; 53 in Fig. 12B). The circuit continues from the hub 1327 through an OR unit 1328 (see Fig. 13E) to the one input of an AND unit 1329. The other input of the AND unit 1329 is conditioned positive from the address device 427 through a conductor 1330 during address 66 time of the drum cycle. Under the above circumstances, the AND unit 1329 is accordingly activated. At the end of address 66 time, the trailing edge of the "66" signal on conductor 1330 deactivates the AND unit 1329 and the resultant negative shift of the related output thereof is applied to the right grid of a so-called product erase trigger 1332 to flip it On.

With the trigger 1332 On, the resultant high plate potential of the right section thereof is applied through the left section of a follower 1333, a conductor 1334, the OR unit 1202 (see Fig. 13H), and conductor 1203 to the erase head 144 of the counter track 153. At this time, address position 65 of the counter track 153 is just starting under the erase head 144. As a result, any information in the counter from address 65 on is erased therefrom. The erase action continues until address "0" time when negative shift of the right plate of the "0" trigger 458 as it flips Off, is applied through the right section of follower 459 and conductor 460 to the left grid of the Product Erase trigger 1322 to restore it Off. By the above action it is evident that any information in counter groups 9 and 10 (addresses 65 through 80) is erased therefrom. Addresses 65 through 79 of the counter track are utilized to store the product generated during the subsequent multiply operation.

Two drum cycles after the initiation of the hundreds order multiplicand list operation with the hundred order multiplicand digit represented in the print set-up relays 893, and with the emitter 338 now in its fifth position, the activation of the #3—or the hundreds order counter position exit hub 1052A at address 3 time of the related alternate drum cycle, completes a circuit therefrom through a plugwire 1335, the fifth position of the emitter 338 through a plugwire 1337 to a so-called multiplicand entry hub 1338 (coordinates B; 54 in Fig. 12B). The circuit continues from the hub 1338 (see Fig. 13E) to the one input of an AND circuit 1339. The AND circuit 1339 and an AND circuit 1340 have their plates commoned so that in effect, a four-way AND circuit is formed. A second input of the 4-way AND circuit is conditioned positive each alternate drum cycle by the application thereto through conductor 467 of the alternate drum signal. "A" pulses are applied from the conductor 429, through a cathode follower 1342, and a conductor 1343, to a "third" input of the 4-way circuit.

With the print relay 893–1 energized and accordingly representative of the hundreds order multiplicand digit "one," its associated contacts 893–1_m_ (see Fig. 13E) are closed so that a circuit is available from the positive power terminal 492, through contacts 893–1_m_, now closed, to the plate of a diode 1344. The cathode of the diode 1344 is conditioned by a 3 of 7 signal applied from the conductor 440 (3 of 7), through the left section of a follower 1345 (see Fig. 13H) and a conductor 1347 to the diode 1344. The diode 1344 is accordingly raised positive at 3 of 7 time of address 3, the resultant 3 of 7 signal generated on the related output being applied through an OR circuit 1348 and a conductor 1348A, right side of follower 1362, conductor 1348B to condition the 4th input of the previously mentioned 4-way AND circuit (AND unit 1340 and 1339).

Under the four coincident actions, the four-way AND circuit is accordingly actuated at "A" time of 3 of 7 time of address 3 time and through a conductor 1349 and a Write amplifier 1350 (see Fig. 13G) actuates the Write head 144 of the so-called multiplicand track 157. By the above action, the one hundreds order digit "1" of the multiplicand is recorded in address three of the multiplicand track 157 in binary coded form.

When the #3 hundreds order counter position exit hub 1052A is again actuated at address 11 time of this same drum cycle and with the emitter 338 still in its fifth position, a circuit identical to that traced above is again completed to the multiplicand entry hub 1338. As a result, the hundreds order multiplicand digit "1" is recorded in address 11 of the multiplicand track. The subsequent activation of the #3 hundreds order counter position exit hub 1052A at 19 address time, 27 address time, 35 address time, 43 address time, 51 address time, 59 address time, 67 address time, and 75 address time, and, with the emitter 338 still in its fifth position, the above traced circuit through the multiplicand entry hub 1338 is completed at each of these times, so that the hundreds order multiplicand digit "1" is accordingly recorded in the corresponding addresses 19, 27, 35, etc. of the multiplicand track.

During the alternate drum cycle wherein the multiplicand digit is written 10 times on the multiplicand track as described above, the print emitter 337 is in its sixth position, so that with the activation of the #6 reading exit hub 364 at address 6 time, a circuit is completed therefrom through the sixth position of the emitter 337 to energize the card list hub 895 and initiate the list operation of the tens order multiplicand digit two. Two drum cycles thereafter with the emitter 338 now in its sixth position, and with the tens order multiplicand digit 2 then represented in the set-up relay 893–2, the activation of the #2-tens order counter position exit hub 1052A at addresses 2, 10, 18, 26, 34, 42, 50, 58, 66, 74 times, completes a circuit through the sixth position of the emitter 338 and the plugwire 1337 to the multiplicand entry hub 1338. This action accordingly effects a recording of the tens order multiplicand digit two in the related addresses 2, 10, 18, 26 etc. of the multiplicand track 157, this action being effected in a similar manner to that described for the hundreds order multiplicand digit.

At the same time that the tens order multiplicand digit is being recorded on the multiplicand track ten times as explained above, the print emitter 337 is in its seventh position, so that the activation of the #7 reading exit hub 364 completes a circuit therethrough to the card list hub 895 (see Fig. 61), to initiate a units order multiplicand card list operation. Two drum cycles thereafter, with the units order digit 3 of the multiplicand now represented in the print relays 893, and with the emitter 338 now in its seventh position, the activation of #1 units counter position exit hub 1052A at addresses 1, 9, 17, 25, 33, 41, 49, 57, 65, and 73 address times, completes the usual circuits through the seventh position of the emitter 338 to the multiplicand entry hub 1338 to effect a recording of the units order digit 3 of the multiplicand in corresponding addresses 1, 9, 17, etc. By the above actions, the multiplicand 123 has been written ten times on the multiplicand track, and has been listed in columns five, six, seven of the print record in the usual manner.

When the print emitter 337 reaches its ninth position, the activation of the #9 reading exit hub completes a circuit therefrom, through the ninth position of the print emitter, through a plugwire to the card list hub 895 to initiate a card list operation for the hundreds order digit of the multiplier. Two drum cycles later with the hundreds order of the multiplier now represented by the contacts of set-up relay 893–1 and with the emitter 338 now in its ninth position, the negative shift of a so-called address "0" hub 1352 (coordinates A; 47 in Fig. 12B) at the end of address "0" time of the related alternate drum cycle, is applied therefrom, through a plugwire 1353 (see Fig. 61), through the ninth position of the emitter 338, through a plugwire 1355, to an Enter Multiply hub 1356 (coordinates B; 47 in Fig. 12B). The circuit continues from the hub 1356 (see Fig. 13E) to the right grid of a so-called Multiply Program trigger 1357 to switch the latter from a Not Multiply position to a Multiply position. With the trigger 1357 in its Multiply position, the resultant high potential of the right plate thereof is applied through the right section of a follower 1358 and a conductor 1359 to the one input of an AND circuit 1361. The second input to the AND circuit 1361 is conditioned positive by the alternate drum cycle signal applied thereto through conductor 467. Under the above conditions, the AND circuit 1361 generates an ×AD (multiply—alternate drum cycle) signal which is applied through the left section of a follower 1362, and a conductor 1363 to condition the one input of an AND circuit 1369. It will be noted that the AND circuit 1369 and an AND circuit 1366 are connected so as to form a 3-way AND circuit.

With the hundreds order multiplier digit "1" represented in the contacts of print relay 893–1, the negative shift of the 8 of 10 conductor 449 (see Fig. 13E) beginning of address 65 time of this alternate drum cycle, is applied therefrom through the normally open contacts 893–1l, now closed, the normally closed side of the contacts 893–2_k_, the normally closed side of the contacts 893–4_k_, the normally closed side of the contacts 893–8_j_, a conductor 1367, to the right grid of a so-called Multiplicand Control trigger 1368 to flip the latter On. The resultant high potential of the right plate of trigger 1368 is applied through the right section of a cathode follower 1369A to the one input of the AND circuit 1369. The input of the AND circuit 1366 is conditioned by pulses supplied thereto through conductor 1371A from read amplifier 1371 in response to the reading of information on the mutiplicand track 157. Under the above conditions, it is evident therefore, that the AND circuit formed by units 1366 and 1369 is actuated by the reading of the units digit 3 from address 65 of the multiplicand track. The binary coded "3" information accordingly generated on a related output conductor 1372 of the AND circuit is applied through an OR circuit 1373 (see Fig. 13H), the right section of follower 1093, and conductor 1094, to positively condition a first input of the 4 separate AND circuits 1096, 1097, 1098, and 1099. The second input of the AND circuit 1096 is conditioned by a 3 of 7 signal applied thereto through conductor 440 (3 of 7) the second input of the AND circuit 1097 is conditioned by a 4 of 7 signal applied thereto through conductor 440 (4 of 7). The second input of the AND circuit 1098 is conditioned by a 5 of 7 signal applied thereto through conductor 440 (5 of 7) and the second input of the AND circuit 1099 is conditioned by the 6 of 7 signal applied thereto through conductor 440 (6 of 7), as previously explained. The output of the AND circuit 1096 is linked through the right section of related inverter 1042 to the 1 trigger of the adder. Similarly, the output of the AND circuits 1097, 1098, and 1099 are linked through the right section of associated inverters 1043, 1044, and 1045, respectively, to the corresponding 2, 4, and 8 triggers of the adder 1039, as indicated and as also previously explained.

With the 3 of 7 and 4 of 7 signals successively On the conductor 1094 as a result of the reading out of the binary coded units order digit 3 from the multiplicand track at address 65 time, it is evident that the AND circuits 1096 and 1097 are actuated and through their associated inverters, flip the 1 and 2 triggers of the adder 1039 On to enter the units order digit 3 of the multiplicand into the adder.

With the "1" and "2" triggers 1041 of the adder 1039 On, the subsequent $\overline{7B}$ pulse on the conductor 1124 resets the triggers "1" and "2" triggers 1041 of the adder 1039 and transfers the adder digit "3" to the Write register 1048 by flipping the "1" and "2" triggers 1108 thereof On, in the manner previously explained.

With the "1" and "2" triggers 1108 of the Write register 1048 On and accordingly representative of the units order digit 3 of the multiplicand, the cycling of the 7 stage ring 432 during the following address time 66 of the same alternate drum cycle, reads out the value "3" in the Write register 1048 in the usual manner. The resulting binary coded pulses generated on conductor 1197 are applied through the left section of the follower 1166, and a conductor 1374 (see Fig. 13H) to the cathode input of the left diode of a unit 1376. The associated plate output terminal is linked through a conductor 1377 to the output terminal of an AND unit 1378, so that in effect a 3-way AND circuit is formed. The ×AD signal is applied from the conductor 1363, through the right section of follower 1363, and a conductor 1379 to positively condition one of the inputs of unit 1378. B pulses are applied through conductor 430 to the other input of the unit. Under the above circumstances the 3-way AND circuit is accordingly actuated during the B portion of 3 of 7 and 4 of 7 times of address 66 time, and through a conductor 1381, a Write amplifier 1382 and the Write head 150 to effect a recording of the units order digit "3" of the multiplicand on the partial product track 158.

Also during address 66 time, with the multiplicand control trigger 1368 still On, the tens order digit "2" in address 66 of the multiplicand track 157, is read out therefrom and into the adder 1039, in the same manner as described for the units order multiplicand digit. The tens order of the multiplicand is accordingly entered into the adder 1039 simultaneous with the writing of the units order of the multiplicand from the Write register 1048 to the partial product track 158 in the usual manner. At 7B time of address 66 time, the tens order digit "2" in the adder is transferred to the Write register 1048 in the usual fashion.

During address 67 time of the same cycle, the hundreds order of the multiplicand is read from the multiplicand track and entered into the adder 1039 in the same manner as described previously for the tens and units orders of the multiplicand. At this same time, the tens order digit 2 in the Write register 1048 is read therefrom and recorded on the partial product track in the same fashion as described previously for the units order digit "3" of the multiplicand. At the end of address 67 time, the hundreds order digit "1" of the multiplicand in the adder is transferred to the Write register 1048 in the usual fashion.

During address 68 time the hundreds multiplicand digit "1" in the Write register is transferred therefrom to the partial product track in the same manner as described previously for the tens and units orders of the multiplicand. At the end of address 72 time of this same alternate drum cycle, the trailing edge of the 9 of 10 signal is applied from the conductor 449 to the left grid of the multiplicand trigger 1368 to flip it Off (right plate low). By the above actions, a partial product of 1 times the multiplier or 123 has been generated, which is the desired result for a multiplier digit of "1" (hundreds order).

Referring now to the partial product track 158 it will be noted that previously mentioned Write head 150 through which the multiplicand was written on the partial product track during addresses 66, 67, and 68, is displaced clockwise from the associated Read 157 an angular distance equal to 7 address positions. Consequently, 7 address intervals after the writing of the units order digit "3" of the multiplicand on the partial product track, which is address 73 time (66+7), the units order digit 3 of the multiplicand is Read by the head 157 and applied through a Read amplifier 1383, and a conductor 1384 to the cathode of the right diode of a unit 1386. The associated output terminal thereof is linked to the output of the right diode of a unit 1387 thus forming an AND circuit. At the same time, a 10 of 10 signal is applied from conductor 449 (10 of 10) to the cathode of the right diode of unit 1387. Under the above circumstances, the above AND circuit is actuated, the output thereof being applied through a Write amplifier 1388 and Write head 147, to Write the units order digit 3 of the multiplicand on the temporary storage track 154 in binary coded form. In the same manner, the tens order digit 2 of the multiplicand is read from the partial product track and transferred to the temporary storage track during address 74 time, and the hundreds order digit 3 of the multiplicand is transferred during address 75 time. At the end of address 74, one times the multiplicand or 123 is represented on the temporary storage track 154 in our particular example. This completes the action during this alternate drum cycle as far as our representative hundreds order multiplier digit "1" is concerned.

During the subsequent so-called ×NAD (Multiply—Not Alternate Drum) cycle with the Multiply trigger 1357 still in its multiply position and accordingly acting through conductor 1359 to render positive the one input of an AND circuit 1389, and with the NAD signal (not alternate drum) applied through a conductor 1391 and the right section of follower 1333 to the other input of AND unit 1389, the latter is actuated to supply a so-called ×NAD (multiply—not alternate drum cycle) gate signal to a follower 1342 conductor 1392. The ×NAD signal is utilized in various ways that will be later evident. During each ×NAD cycle, the final partial product in the track 158 resulting from the operation with a particular order of the multiplier, is added to the sum of the preceding final partial products resulting from operations with higher orders of the multiplier (this sum being stored in the counter track) to give a new partial product sum for the operation up to that point. When the partial product is the result of the multiplicand times the highest order of the multiplier, it is obvious that the old counter balances, so that the new partial product sum digit generated in the adder is equal to the partial product previously stored in the track 158. This is the case in our particular example during the ×NAD cycle subsequent to the operation with the hundreds order multiplier digit "1." The new partial product sum generated during an ×NAD cycle, is stored in the counter track 153. The details of the operation during the ×NAD cycle for our representative operation are described hereinafter.

Returning now to our particular example, it will be recalled that as a result of the operation with hundreds order multiplier digit "1," a resultant partial product 123 is stored in the temporary storage track 154. Referring now to Fig. 13G it will be noted that the Read head 148 is displaced counterclockwise 72 addresses from the Write head 149 through which the partial product was loaded into temporary storage. Consequently, 72 addresses plus the duration of the so-called sync pie after the writing of the units order digit 3 of the multiplicand on temporary storage track 154, which is address 65 time of the subsequent not alternate drum cycle (×NAD) the units order digit 3 is Read from the track 154 and applied through Read amplifier 1206, and conductor 1207, to the one input of an AND unit 1394. The output of AND unit 1394 and a similar unit 1396 are commoned so as to form a 4-way AND circuit. A 9 of 10 signal is applied through conductor 449 (9 of 10) to the first input of unit 1396 while an ×NAD gate is applied through conductor 1392 to the second input of the AND unit 1394. There is also provided a single shot multivibrator unit 1397 which is driven through conductor 430 by B pulses. The values of the various components of the multivibrator 1397 (see Fig. 13E) are such that 4 microseconds after a B pulse is applied thereto to actuate it, the multivibrator restores and its left plate shifts positive. This shift is applied through a conductor 1398 to the other input of AND circuit 1396. The multivibrator 1397 thus, in effect, delays the application of each B pulse to unit 1396 by approximately 4 microseconds. By reason of the above described circuitry it is evident that as a result of the reading of the units order digit 3 from the track 154, the above described 4-way AND circuit (units 1394 and 1396) is actuated approximately 4 microseconds past the midpoint of 3 of 7 and 4 of 7 time respectively of address 65 time (×NAD).

The output of the 4-way AND circuit is applied through an OR circuit 1399 and the left section of follower unit 1143 to a conductor 1401 which feeds the one input of 4 separate AND units 1402, 1403, 1404, and 1405. The second input of the unit 1402 is gated by a 3 of 7 signal applied thereto from conductor 440 (3 of 7), through the left section of follower 1345. Similarly, the second input of unit 1403 is gated by a 4 of 7 signal applied thereto from conductor 440 (4 of 7) through the right section of follower 1345; the second input of unit 1404 is gated by a 5 of 7 signal, applied thereto from conductor 440 (5 of 7) through the right section of a follower 1407; while the second input of unit 1405 is gated by a 6 of 7 signal applied thereto from conductor 440 (6 of 7) through the left section of follower 1407.

With both inputs of AND unit 1402 positive during 3 to 7 time of address 65 time of our example, the unit is actuated and through the left section of an inverter 1408 and a conductor 1409 enters "1" to the adder 1039, while with both inputs of unit 1403 positive at 4 to 7 time, the unit 1403 is actuated and through the right section of inverter 1408 and conductor 1410 enters 2 to the adder. The combined result of these actions is that the units digit 3 has been entered into the adder in coded form. The 4 microsecond delay beyond the middle of 3 of 7, 4 of 7, 5 of 7, and 6 of 7 time in entering the adder from the temporary storage track 154 during an ×NAD cycle, permits one digit to enter the adder from the counter track 153 (middle of 3 of 7, 4 of 7, 5 of 7, 6 of 7 time), and a corresponding digit to enter the adder from the temporary storage track 154 during every 16 microseconds. This provision for "interlaced" adding of two digits during each 16 microseconds during the first ×NAD cycle is of no consequence, however, since the counter track value is zero at this time. At the end of address 65 time of this ×NAD cycle, the units order digit 3 is transferred from the adder 1039 to the Write register 1048 in the usual manner.

In the same manner as described above, for the units order digit 3 read from the track 154, the tens order digit 2 is read therefrom during address 66 time of the ×NAD cycle and entered into the adder 1039. Also during address 66 time, with the ×NAD signal acting from conductor 1392, the right section of OR unit 1170 and conductor 1171 to condition the one input of unit 1167A, with B pulses applied through conductor 430 to the other input of unit 1167A, and with readout pulses from the Write register 1048 generated on conductor 1165 in the usual manner and applied through the left section of follower 1166 to one input of AND unit 1167B, the 3-way AND circuit comprised of unit 1167A and the left section of unit 1167B, is actuated and through the OR unit 1173, the follower 1161, the conductor 1175, Write amplifier 1176, and the Write head 147 of the temporary storage track 154, causes the units order digit 3 to be written on the track 154. At the end of address 66 time the tens order digit 2 in the adder is transferred to the Write register 1048 in the usual manner.

During address 67 time, the hundreds order digit "1" is entered from the track 154 into the adder 1039 in the same manner as described above for the other digits of the partial product. Also during address 67 time, the tens order digit 2 is transferred from the Write register 1048 to the track 154 in the same manner as described for the units order digit "1." At the end of address 67 time, the digit "1" is transferred from the adder 1039 to the Write register 1048, whereafter, during address 68 time, the digit "1" is transferred from the Write register 1048 to the temporary storage track 154. At the end of address 68 time, the partial product 123 resulting from the operation of the hundreds (highest order) of the multiplier on the multiplicand is stored in the temporary storage track 154.

Referring now to Fig. 13G, it will be noted that the Read head 148 is displaced counterclockwise 7 addresses from the head 147 through which the partial product 123 was loaded into the temporary storage track 154, as described above. Consequently, 7 address times thereafter the writing of the units digit 3 on the temporary storage track (address 66 time of ×NAD cycle), which is address 73 time of the same ×NAD cycle, the 3 is read therefrom and applied through conductor 1207 to the one input of AND unit 1208. At the same time with Multiply gate signal applied through conductor 1359 (see Fig. 13G) to the one input of an AND unit 1412, and a $\overline{\text{9 of 10}}$ gate (not 9 of 10 time) gate applied from the Off side of the "9" trigger 435 of the 10 stage ring, through a conductor 1413, the left section of follower 1211 to the other input of unit 1412, the latter is actuated and through the OR unit 1210, the right section of follower 1211 and a conductor 1212, gates the other input of the AND unit 1208. Under the above circumstances the AND unit 1208 is actuated and through the OR unit 1215, the left section of follower 1216, conductor 1217, the Write amplifier 1218, and the Write head 145, causes the digit 3 to be written on the counter track 153. In this same manner, the tens order digit "2" is transferred from temporary storage track 154 to the counter track 153 during address 74 of the same ×NAD cycle, with the hundreds order digit "1" being transferred thereafter during address 75 time. With the partial product of 123 resulting from the multiply operation with the highest order of the multiplicand now represented in the counter track, the operation for the hundreds order multiply digit 1 is completed. Referring to Fig. 13E, it will be noted that the Multiply Program trigger 1357, is reset Off at address 80, NAD by the AND circuit connected to the left hand grid thereof.

When the print emitter 337 reaches its 10th position, the activation of the 10 reading exit hub 364 completes a circuit therefrom through the emitter, through the plugwire 1351 to the card list hub 895 to initiate a card list operation for the tens order digit "2" of the multiplier. Two drum cycles later with the tens order of the multiplier now represented by the closed print relay contacts 893–2K and 893–2J and recalling that the Multiply Program trigger 1357 is turned On by the zero address through emitter 338 as shown in Fig. 61, the negative shift of the 7 of 10 conductor 449 at the beginning of address 57 time of this alternate drum cycle is applied therefrom through the normally closed side of the contacts 893–1*k*, the normally open side of the contacts 893–2*k*, now closed, the normally closed side of the contacts 893–4*k*, the normally closed side of the contacts 893–8*j*, and conductor 1367 to flip the Multiplicand Control trigger 1368 On. With the trigger 1368 On, the one input of the AND circuit 1369 is conditioned positive, while the Multiply-Alternate Drum gate (×AD) conditions the other input thereof through conductor 1363. Consequently, with the application of Read pulses through conductor 1371A to the input of associated AND unit 1366, in response to the reading of information on the multiplicand track 157, the 3-way AND circuit (units 1366 and 1369) is again operable. It is thus evident that during address 57 time, the units digit 3 of the multiplicand is read from the track 157 and entered into the adder 1039 through the above 3-way AND circuit and the associated circuitry previously explained in detail in reference to the operation with the hundreds order of the multiplier. At the end of address 57 time, the digit 3 in the adder is transferred to the Write register 1048 in the usual manner.

In a similar manner during address 58 time of this alternate drum cycle, the tens order digit 2 of the multiplicand is read from the multiplicand track to the adder. At the same time, the units order digit "3" in the Write register 1048, is transferred from the Write register to the partial product accumulation track 158 in a manner also previously explained. At the end of address 58 time, the tens order digit 2 is transferred to the Write register 1048 in the usual manner. Thereafter, during address 59 time, the hundreds order digit "1" of the multiplicand is read from the multiplicand track 157 to the adder 1039 while at the same time, the tens order digit 2 is transferred from the Write register 1048 to the partial product accumulation track 158. At the end of address 59 time the hundreds digit "1" is transferred from adder to the Write register 1048, from which it is subsequently transferred to the partial product track 158 during address 60 time.

At address 65 time of this same alternate drum cycle, the units order digit 3 of the multiplicand is read from the track 157 to the adder 1039 as before. During the same address time, the units order digit "3" of the partial product in track 158 is also entered into the adder 1039, the entry from the track 158 being delayed 4 microseconds for each bit position by reason of the multivibrator 1397, as previously described. The adder action generates a sum digit 6 (3+3) which is transferred therefrom to the Write register 1048 at the end of address 65 time.

During address 66 time of the same alternate drum cycle, the tens order digit "2" of the multiplicand is read from the multiplicand track 157 to the adder, as before, while the tens order digit "2" is read from the partial product track 158 to the adder. As a result, a sum digit "4" is generated which is transferred from the adder 1039 to the Write register 1048 at the end of address 66 time. Also during address 66 time, the units sum digit 6 in the Write register 1048 is transferred to the partial product track 158 in the usual manner.

During address 67 time, the hundreds order digit "1" of the multiplicand is read from the Multiplicand track 157 to the adder and the hundreds order digit "1" is read from the partial product track 158 to the adder to generate a sum digit "2." During this same address time the digit "4" in the Write register 1048 is transferred to the partial product track 158. At the end of address 67 time, the sum digit "2" in the adder 1039 is transferred to the Write register 1048 in the usual fashion. During the subsequent address time (address 68), the Write register value 2 is transferred to the partial product track 158. Thus at the end of address 68 time of this alternate drum cycle, the track 158 contains the final partial product 246 which is the correct result for the hundreds order digit "2" of the multiplier times the multiplicand 123.

During the same alternate drum cycle, the counterbalance 123 in counter track 153, which resulted from the previous operation with the hundreds order multiplier digit "1," is column shifted 1 address, or in effect, multiplied by ten, in preparation for the operation during the subsequent ×NAD cycle when it will be added to the newly generated partial product 246 to give a new counterbalance 1476 for the operation up to that point. The actual column shift or multiply by 10 operation of the old counterbalance 123 during this alternate drum cycle is effected as follows: During address 65, the units order digit "3" of the old counter track balance is read therefrom through Read head 143 and applied through the amplifier 1085, the conductor 1087 to the right diode of unit 1090. It will be noted that the output of the right diode of unit 1090 is linked to the output of an AND unit 1414 thus forming a 3-way AND circuit. At this time the ×AD gate pulse is applied from conductor 1363 through follower and a unit 1200 (Fig. 13H) conductor 1379 to the one input of unit 1414 (Fig. 13G) while a 9 of 10 gate is applied from the conductor 449 (9 of 10), through an OR unit 1415 (see Fig. 13H), the left section of follower 1093, and a conductor 1417 to the other input of unit 1414 (see Fig. 13G). Under the above circumstances, the above described 3-way AND circuit is actuated and transmits the "3" data therefrom through a conductor 1418, a Write amplifier 1419 and the Write head 146 to the temporary storage track 154 where it is recorded. In the same fashion during address 66 and 67 times, the tens order digit "2" and the hundreds order digit "1," respectively, are read from the counter track 153 and entered into the track 154.

With the Multiply Program trigger 1357 still On at this time and accordingly acting through OR unit 1328, to condition the one input of AND unit 1329, and when an address 66 signal is applied through conductor 1330 to the other input of AND unit 1329, the unit 1329 is accordingly actuated during address 66 time. At the end of address 66 time, the trailing edge of the address 66 signal in conductor 1330 deactivates the AND circuit 1329 and the resulting negative signal of the related output thereof flips the Product erase trigger 1332 On. With the trigger 1332 On, the resultant high potential of the right plate thereof is applied through the left section of follower 1332, conductor 1334, the left section of OR unit 1202 (see Fig. 13H) conductor 1203, the Erase Amplifier 1205 to the Erase head 144 of the counter track. At this time, the 65th drum address position of the counter track 153, which was read out to the temporary storage track 154 as described above, is rotating under the erase head 144 so that the information therein is accordingly erased therefrom. The Product erase trigger 1332 remains On for the remainder of this ×AD cycle so that it is evident that after each digit of the counterbalance is read through head 143 to the temporary storage track 154, the information therein is erased as that address position of the counter track 153 rotates under the head 144.

Referring now to Fig. 13G, it will be noted that the read head 148 is displaced counterclockwise 9 addresses from the Write head 146 through which the counterbalance was entered to the temporary storage track 154 as described above. Consequently at address 74 time of this same alternate drum cycle, the units order digit "3" is read through head 148, amplified in amplifier 1206 and applied through conductor 1207 to the one input of And unit 1208. At this same time a Not 9 of 10 gate is applied from the Off side of the 9 of 10 trigger 448, through conductor 1413 and the left section of 1211 to the one input of And unit 1412, while the multiply gate is applied through the conductor 1359 to the other input thereof. The resultant Multiply Not 9 of 10 gate accordingly generated on the related output is applied through the OR unit 1210, the right section of follower 1211 to the other input of the AND unit 1208. Under the above circumstances, the digit "3" data is passed through unit 1208, conductor 1213, OR unit 1215, the left section of follower unit 1216, conductor 1217, the Write head 145, to the counter track 153. It will be noted that the Write head 145 is displaced counterclockwise 8 addresses from the Read head 143 through which the counterbalance was previously read out to the temporary storage track 154 as described above. It will also be remembered that any possible data in an address of counter track 153 is erased therefrom by erase head 144, two address times after that address position rotates under the Read head 143.

By means of the above arrangement wherein the heads 143 and 145 of the counter track 153 are spaced 8 addresses apart, while the heads 146 and 148 of the temporary storage track 154 are spaced 9 addresses apart, it is evident that circulating a digit from a given counter track position to the temporary storage track (head 146), and returning to the counter track 157, delays the digit one address. Thus during address 74 for our particular example, the digit "3" is rewritten on the counter track 153 in address 66 thereof, or 1 address delayed from address 65 which originally contained the digit "3" prior to the transfer to the temporary storage track 154. In a similar manner, the tens order digit "2" is read from track 154 during address 75 time and written in address 67 of track 153 or one address delayed from its original position, while the hundreds order digit "1" is read from the temporary storage track 154 during address 76 time and written in address 68 of track 153. Thus at the end of this operation with the value of 123 written 321 in addresses 66, 67, and 68 respectively, of track 153, the counterbalance has been column shifted 1 address or column from its initial position in columns 65, 66, and 67 thereof, or, in effect, multiplied by 10. This is the desired result. Summarizing the machine status up to address 68 time of this alternate drum cycle, the value 1230 is in addresses 65 through 68 of the counter track 153, while the final partial product 246 resulting from the operation with the tens order digit 2 of the multiplicand is in addresses 66, 67 and 68 of the partial product track 158.

At address 73 time of this "same alternate drum cycle," the units digit "6" in the partial product track 158 is read therefrom and transferred to the temporary storage track 154 via head 149. This data on the track 154 will not be read by the head 148 thereof until 72 addresses later, which is address 65 time of the next ×NAD cycle. In a similar manner, the tens order digit 4 of the partial product in address 67 thereof is read during address 74 time of this same alternate drum cycle to the track 154, while the hundreds order digit "2" in the track 158 is read during address 75 time of this same alternate drum cycle to the track 154. Summarizing the machine status at the end of the alternate drum cycle, ×AD the value 1230 is in addresses 65 through 68 of the counter track, while the partial product 246 (tens order multiplier operation) is in drum addresses 65 through 67 of the temporary storage track.

At address 65 time of the subsequent ×NAD cycle, the units order digit "6" of the partial product is read from the track 154 to the adder 1039 and the 0 in column 65 of the counter track 153 is read into the adder in a manner previously explained, to generate a units order sum digit 6 for the multiply operations up to this point. At the end of address 65 time, the units order sum digit "6" in the adder 1039 is transferred to the Write register 1048 in the usual fashion.

During address 66 time of this ×NAD cycle, the tens order digit "3" is read from the counter track to the adder, and the tens order digit "4" is read from the track 154 to the adder, these values being added binary bit by binary bit through the "interlace" add operation previously described to give a tens order sum digit of "7" for the operation up to this point. During this same address time, the units sum digit "6" in the Write register 1048 is transferred therefrom through head 147 to the temporary storage track in the usual manner. At the end of address 66 time, the tens order sum digit "7" in the adder is transferred therefrom to the Write register 1048, as normal.

During address 67 of the ×NAD cycle, the hundreds order digit "2" is read from the counter track 153 to the adder 1039, and the hundreds order digit "2" is read from the temporary storage track 154 to the adder, to give a hundreds order sum digit "4" for the operation up to this point. During this same address time, the tens order sum digit "7" in the Write register 1048 is transferred therefrom to the Temporary storage track 154. At the end of address 67 time, the hundreds order sum digit "4" is transferred from the adder to the Write register 1048 in the usual manner.

During address 68 time of the ×NAD cycle, the thousands order digit "1" is read from counter track 153 to the adder and the thousand order digit "0" (understood) is read from the temporary storage track 154 to the adder to give a thousands order sum digit "1" for the multiply operation up to this point. During this same address time, the hundreds order sum digit "4" is transferred from the Write register 1048 to the Temporary storage track 154 in the usual manner. At the end of address 68 time, the thousands order sum digit "1" is transferred from the adder to the Write register. Thereafter during address 69 time, the thousands order sum digit "1" is transferred from the Write register to the Temporary storage track. At the end of the operation the sum value 1476 for the operation up to this point is in the Temporary storage track. During addresses 73 through 76 time of the same ×NAD cycle, the value 1476 is transferred from the track 154 through head 148, etc. to addresses positions 65 through 68 (6 in address 65, 7 in address 66 etc.) of the counter track 153. With the partial product of 1476 in the counter track, the multiply operation in so far as the hundreds and tens orders of the multiplier are concerned is completed.

When the print emitter 337 reaches its 11th position, the activation of the 11th reading exit hub 364 completes a circuit therefrom (see Fig. 61) through the emitter 337, etc. to the card list hub 895 to initiate a card list operation for the units order digit "3" of the multiplier. Two drum cycles later with the units order digit "3" of the multiplier now represented by the contacts of the print set-up relays 893–1 and 2, and with the Multiply trigger 1357 still in its Multiply position, the negative shift of the 6 of 10 conductor 449 at the beginning of address 49 time of this alternate drum cycle, is applied therefrom through the normally open contacts 893–1*k*, now closed, the normally open side of the contacts 893–2*k* the now closed, the normally closed side of the contacts 893–4*k*, the normally closed side of the contacts 893–8*j*, the conductor 1367, to flip the Multiplicand Control trigger 1368 On. As a result of the Multiplicand trigger being flipped On at this time, the multiplicand is added to itself "3" times by an operation similar to that described for the tens order multiply operation, the final partial product 369 (123+123+123) resulting therefrom being transferred through the Write register 1048 to the partial product track 158, and finally to address 65 through 67 of the temporary storage track 154. During this same alternate drum cycle, the counterbalance 1476 is column shifted or in effect multiplied by ten, in a manner previously described in detail, by circulating it from the counter track 153, through Write head 146 to the Temporary storage track 154, and then back to the counter track 153. At the end of the column shift operation, the counterbalance 1476 originally in columns 65 through 68, is represented as 14760 in columns 65 through 69 thereof. The new counterbalance is arranged in the usual manner with the units order ("0") in column 65, the tens order "6" in column 66 etc.

Summarizing the machine status at the end of the alternate drum cycle, the value 14760 is in columns 65 through 69 of the counter track, while the partial product 369 resulting from the operation with the units order "3" of the multiplier is in addresses 65 through 67 of the temporary storage track, the units order digit "3" being in column 65, the tens order "6" in column 66 etc.

During the next ×NAD cycle, the counter track value 14760 and the partial product 369 are accumulated in the usual manner to give the desired final product of 15129, which is routed through the Write register 1048, the Temporary storage track 154, and finally to addresses 65 through 69 of the counter track 153. There remains only the printing of the product 15129 to columns 20 through 24 of the print record to complete our desired multiply operation.

The printing of the product is effected as follows: When the emitter 337 reaches its 20 position, the activation of the 69th reading hub 364 (see Fig. 61) completes a circuit through the emitter 337 to the card list hub 895 to initiate a listing operation of the ten thousands order digit "9" of the product, the ten thousand order of the product being in address 69 of the counter track as previously mentioned. As a result, a printing of the digit "1" is effected in column 20 of the print by circuitry and mechanism previously explained in detail. In the same manner, the activation of the 68, 67, 66, and 65 reading exits as the emitter 337 is advanced into its 21, 22, 23, and 24 positions, respectively, initiates the printing of the remaining digits of the product in columns 21 through 24 of the print record, to complete the desired product print operation.

When the emitter 337 reaches its 25 position, a circuit is completed from a +100 volt hub 1423 (coordinates D; 47 in Fig. 12B), through a plugwire 1424, the emitter 337, and a plugwire 1425, to the so-called Product Erase Hub 1327. The circuit continues from the hub 1327, through the OR unit 1328 to the one input of the AND unit 1329. The address 66 gate signal is applied through a conductor 1330 to the other input of unit 1329. The "AND" unit 1329 is accordingly actuated at address 66 time. At the end of address 66 time, the "AND" unit 1329 is deactivated and the resulting negative shift of its related output is applied therefrom to the right grid of the Product Erase trigger 1332 to flip it to an erase position. With trigger 1332 in its erase position, the resultant high potential of the right plate thereof is applied through the left section of a follower 1333, the OR unit 1202 (see Fig. 13H) and the conductor 1203 to the erase head 144 of the counter track. At this time the 65th address position of the counter track is revolving thereunder so that the units product digit "9" therein is erased. With the trigger 1332 On, the remaining product data in each of address positions 66 through 69 is also erased therefrom as they rotate in turn under the head 144. The erase head 144 remains activated through address 80 time of this cycle, and through the time of the subsequent "pie," until the falling edge of the address "0" signal at the beginning of the subsequent drum cycle acts through conductor 460 to flip the erase trigger 1332 Off. With the product 15129 erased from addresses 65 through 69 of the counter track 153, our representative Multiply operation is completed.

*The line program magnets—control circuitry*

It will be recalled that each of the 10 line program magnets 247, when impulsed, causes the associated 30 line program contacts 238 to be closed, from drum cycle #13 of that particular machine cycle, until the beginning of drum cycle 10 of the next machine cycle. It will also be recalled that the closing of each of the 30 line program contacts 238 associated with any line program magnet 247, electrically links an associated individual hub 284 provided on the control panel 127 to an associated common hub 283. By reason of this arrangement, up to 30 individual input circuits, each linked by suitable plug wiring to a related one of the common hubs 283, may be simultaneously switched upon the impulsing of one of the magnets 248, to extend each of the 30 input circuits to the corresponding output hub 284 associated with that particular magnet 247. It is thus evident that by plugwiring the various control impulse sources, such as reading exit hub 364 etc., to the common hub 283, these control impulses may be directed through plugwiring extending from the various groups of hubs 284 associated therewith, to effect anyone of a multitude of machine operations, the particular operations effected during any machine cycle being dependent upon which group of line program contacts 238 are closed.

There is provided for impulsing the line program magnets, a so-called line program impulse hub 1427 (coordinates P; 49–51 in Fig. 12B). An impulse is emitted during drum cycles 4 and 5 of each machine cycle from hub 1427, through a circuit extending from the power terminal 489, through the normally closed contacts R14C (Fig. 14B) of a relay R14, through the line program impulse cam contacts P5–7, then closed (see Fig. 15B), through a conductor 1428, the normally closed contacts R9*i* of the MLR #2 relay R9 to the hub(s) 1427. The hub 1427 is usually connected through a plugwire to a common input hub 1429 of so-called selector, there being two types of selectors provided CO Selectors 1430, and Class Selectors 1431.

The line program impulse is routed from the common hub 1429 of the chosen selector to either a Normal (N) output hub 1433, or transfer (T) output hub 1434, the particular output hub selected being dependent upon which of the two possible positions, normal or transferred, the selector occupies at that time. The output hubs of a selector may be individually connected to any one or ones of an individual input hub 1435 of any desired line program magnet 247. The transferring of the selector from either one to its other position, may be effected in response to some predetermined indication as a result of a calculation, in the sensing of a particular character in a particular column of an entry record, etc. It is thus evident that the particular line program magnet 247 impulsed each machine cycle may be controlled in response to certain predetermined conditions, the particular magnet 247 impulsed during a machine cycle causing its associated line program contacts to close to render effective for that cycle, the machine control sequences prewired therethrough. The manner in which predetermined conditions arising in the machine may be utilized to adjust the "program" of the machine, as described above, will be later explained in detail in reference to a particular accounting operation.

*The selectors*

In the subject machine, all the selectors are of the relay actuated switch type wherein a circuit is available between either the common (C) hub 1429 and normal (N) hub 1433, or the common hub 1429 and transfer (T) hub 1434, dependent upon whether the associated selector relay is in an unenergized (Normal) or energized (Transferred) state. Six so-called class selectors 1431 and six so-called CO selectors 1430 are provided.

*CO selectors*

The CO selectors are utilized for effecting variations in machine functions conditioned upon the advance of the print device into predetermined, columnar positions. Each CO selector 1430 is of the latch type and includes a relay R24 having a latch pick-up coil and a latch trip coil. The latch pick-up coil of each CO selector relay R24 is connected to a corresponding P.U. (pick-up) hub 1439 (coordinates I; 43 to 48 in Fig. 12B) provided on the control panel for that selector, while the associated trip coil 1438 is connected to a corresponding D.O. (drop out) hub 1440 (coordinates J; 43–48 in Fig. 12B).

Each CO selector may be picked up or dropped out at the beginning of each machine cycle by plugwiring linking the associated P.U. hub 1439 or D.O. hub 1440 to a pick-up impulse hub 1442 (coordinates Q; 49 to 52 in Fig. 12B), or drop out impulse hub 1443 (coordinates R; 49 to 52 in Fig. 12B), respectively. The drop out impulse is emitted from the hub 1443 during drum cycles 6 and 7 of each machine cycle, by a circuit extending from the power terminal 489 through conductor 495, the normally closed contacts R14C, the conductor 927, the contacts PS–8 (closed during drum cycles 6 and 7—see Fig. 15B), through a conductor 1444, to the hub 1443. Similarly, the pick-up impulse is emitted from the hub 1442 during drum cycles 8 and 9 of each machine cycle, by a circuit extending from the power terminal 489, through conductor 495, contacts R14C, conductor 927, the cam contact PS–9, then closed (see Fig. 15B), through a conductor 1445, to the hub 1442. Each CO selector 1430 controls "4" switch elements, the contact points of each element terminating in "3" associated plug hubs, a common (C) hub 1429, a normal (N) hub 1433, and a transfer (T) hub 1434 (coordinate M to O; 41 to 64 in Fig. 12B).

A CO selector may also be picked up or dropped out upon the advance of the print device into any desired print column, by plugwiring the particular print position control exit hub 347 of the emitter 339 corresponding to the print column in which pick-up or drop out of the CO selector is desired, to the desired selector pick-up hub 1439 or drop out hub 1440.

Referring now to Fig. 63 there is shown a representative manner in which CO selectors 1430 could be utilized. Fig. 63 shows the plugboard wiring required to effect the entry of amounts from four succeeding record fields, field A (columns 6 through 8) field B (columns 10 through 12), field C (columns 14 through 16), and field D (columns 19 through 21), into counter group #2. The plugwiring to effect the required list operation for the desired counter entry operations has been omitted in Fig. 63. It is desired that fields A and C be entered additively, and fields B and D entered subtractively. Since only two counter group select devices (one diode unit 1053) are provided for each counter, each select device is in effect doubled by wiring its exit hub 1057 or 1057A to the common of a CO selector 1430, with the associated Normal hub (N) 1433, and Transfer hub (T) 1434, being connected to the CTR minus hub 1228 and plus control hubs 1064, respectively. The CO selector 1430 is transferred to the proper position so as to select positive or negative entry into the counter #2 as desired from the particular field A, B, C, or D from which the entry is being made.

For example, referring to Fig. 63, it will be noted that as the print carriage reaches column #6, which corresponds to the highest order of field A, the #1 CO selector is picked up by an impulse to the P.U. hub 1439 thereof from the 6th print position control exit hub 347. With the #1 selector transferred, the CTR plus hub 1064 is impulsed by counter position exit impulses applied therefrom in the usual manner, through the selected positions (field A) of the counter emitter 338, the #2 counter group select device 1050 and the transferred side of the #1 selector, thus entering field A additively into counter #2, in a manner previously described in detail. As the print carriage reaches column #10, which corresponds to the highest order of field B, the #1 CO selector is dropped out by an impulse from the 10th print position control exit hub 347. With the #1 CO selector dropped out, the CTR minus hub 1228 impulsed through the #2 counter group select circuit and the normal side of the #1 CO selector, to enter field B subtractively into counter #2, in the usual manner. As the print carriage reaches column #14, which corresponds to the highest order of field C, the #3-CO selector is picked up by an impulse from the 14th print position control exit hub 347. With the #2 CO selector picked up, the CTR plus hub 1064 is impulsed through the alternate #2 counter group select circuit and the transfer side of the #2 selector, to enter field C additively into counter #2 in the usual manner. Finally, as the print carriage reaches column #19, which corresponds to the highest order of field D, the #2 CO selector is dropped out by an impulse from the 19th print position control exit hub 347. With the #2 CO selector dropped out, the CTR minus hub is impulsed through the alternate #2 counter group select circuit and the normal side of the #2 CO selector, to enter field D subtractively into the counter #2 in the usual manner. This completes the operation for counter #2 as far as this particular entry record is concerned. It will be appreciated that the above described use of the CO selectors is only one of the many ways in which they may be used.

*The class selectors*

The class selectors 1431 are utilized for effecting variations in machine functions conditional upon the sensing of a predetermined digit in any desired controlling columns or column of the entry record data. Each class selector controls two switch elements, the contact points of each element terminating in "3" plughubs as previously mentioned, a common (C) hub 1429, a normal (N) hub 1433, and a transfer (T) hub 1434 (coordinates C to H; 41 to 46 in Fig. 12B). Each class selector includes a separate so-called digit (D1) entry hub 1447 (coordinates A; 41–46 in Fig. 12B), and a card column hub 1448 (coordinates B; 41 to 46 in Fig. 12B), each of these hubs feeding a related input of an associated thyratron and unit 1449. The CC hub 1448 of a selector is plugwired to the reading exit position corresponding to the record column which the control digit may appear. The corresponding digit hub 1447 is plugwired to the particular digit hub 563 of the digit emitter (digit selector A, 55–64; B, 55; C, 55—Fig. 12B) corresponding to the magnitude of the predetermined control digit. It is thus evident that upon coincident conditions of the sensing of the predetermined column of the entry record, and the sensing of the predetermined signal digit therein, the thyratron and circuit 1449 of the chosen class selection 1431 is rendered conductive. As a result of the conduction of the thyratron and circuit 1449, a pick-up coil of an associated class selection relay R25 is subsequently energized to transfer the corresponding switch elements.

As a representative example of the above type of operation, assume that a number of records are being processed and that certain special ones of these records contain a control digit "8" in column 58 as shown in Fig. 64. Upon the sensing of each one of these special records, it is desired to transfer class selector #6 during the following machine cycle to thus suspend a usual control function wired from the normal (N) hub 1433 of the selector, and effect a special function wired from the transfer (T) hub 1434 of that selection. The actual control function initiated through the normal (N) hub 1433, and transfer (T) hub 1434, are not specifically indicated. The details of the #6 selector operation in accordance with the above conditions are as follows:

When the 58th column of a "special" entry record reaches the sense position, the sensing of the "8" hub 563, through a plugwire 1452, to the D1 hub 1447, to render positive the associated input of the #6 selector and circuit 1449, at the same time, the 58th reading exit hub impulse is applied therefrom, through a plugwire 1453, to the CC hub 1448, to render positive the associated input of the AND circuit 1449. With both inputs positive, the thyratron 1449 is rendered conductive, the plate circuit for the thyratron extending from the power terminal 489 through conductor 495, conductor 496, conductor 566, through the cam contacts CF7, now closed (see Fig. 15B), through a conductor 1454, a plate resistor 1456, to the plate of the #6 class selector thyratron 1449. At the beginning of drum cycle #2 of the following machine cycle, with the thyratron 1449 still being held conductive through cam contacts CF7, the closing of the cam contacts CF6 completes a circuit from the power line 566, through contacts CF6, a conductor 1457, a diode 1458, and the pick-up coil of the relay R25 of the #6 class selector 1431, to the plate of the associated conductive thyratron 1449. The resultant energization of the relay R25 (CS #6) transfer the associated switch element of the #6 selector, which breaks the circuit between the C hub 1429 thereof and the associated normal hub 1433, and establishes a circuit between the C hub 1429 thereof and the associated transfer (T) hub 1434, in Fig. 64. As a result, the indicated impulse source is now routed so as to initiate the desired special function during this machine cycle. With the CS #6 relay R25 energized, an associated contact R25*a* thereof is also closed so that with the closing of cam contacts CF–5, a hold circuit is established for the selector #6, from the power conductor 566, through contacts R25*a* of CS #6, still closed, the hold coil of relay R25 of CS #6, to ground. The CS selector #6 is accordingly held energized until drum cycle #7 of the subsequent machine cycle when contacts CF–5 open.

Under certain conditions it is useful if upon the sensing of the control digit in the control column, a class selector 1431 be transferred immediately. Class selectors #1 and #2 are accordingly provided with pairs of so-called immediate pick-up hubs 1459 (coordinates I–J; 41–42 in Fig. 12B) for this purpose. If the digit hubs 1447 and CC hub 1448 of the #1 selector, for example, the plugwired as explained in reference to Fig. 64, and if the associated IMM PU hubs are plugwired together, it will be evident from Fig. 14C that if the corresponding thyratron 1449 is rendered conductive as the result of actions previously explained, a companion circuit is also simultaneously completed to immediately pick-up the #1 selector relay R25. This companion circuit extends from the power conductor 566, through the cam contacts CF–7, now closed, conductor 1461 to the #1 IMM PU hub 1459, through a plugwire to the companion #1 IMM PU hub, through the pick-up coil of the associated #1 selector relay R25, to plate of the conductive thyratron 1449.

Each of the #1 and #2 class selectors also includes a pair of so-called delay hubs 1462 (coordinates K–L; 41–42 in Fig. 12B). Dependent upon whether the delay hubs 1462 are plugwire connected or left open, the usual hold circuit for that selector will be established or not established, respectively, if that selector is picked up. For example, if the #1 selector is picked up immediately as described above, and if the associated delay hubs 1462 are not plugwire linked, the selector is dropped out at the end of drum cycle #1 of the following machine cycle by the opening of cam contacts CF–7 (see Fig. 15B). If the #1 selector is picked up immediately during the machine cycle when the control designation is sensed, as described above, and if the associated delay hubs 1462 are plugwire linked, the selector is held energized through cam contacts CF–5 and its own contacts R25*a* throughout the subsequent machine cycle (after the thyratron 1449 is deenergized by the opening on contacts CF–7), and through drum cycle #1 of the subsequent machine cycle when cam contacts CF–5 opens.

If the delay hubs 1462 of either selector #1, or #2, are plugwired linked, and these associated IMM PU hubs 1459 are left unconnected, these selectors if actuated through their associated D1 hubs 1447, and CC hubs 1448, function in the same manner as the other four class selectors.

*The X-eliminate operation*

In many instances it is desirable that a particular column of a series of records be utilized not only as a source of numeric data for machine operations, but also for "special" records be utilized as a combined numeric position and control position. This type of operation is usually effected by the designation of the "special" cards by a preparation in the 11 zone position, or "X" position as it is sometimes referred to. This "X" designation in the "special" records in no way interferes with the entry of the associated numeric data into a counter since it will be recalled that the timing of the counter entry operation is such that zone "bits" are of no significance. The print device, however, is responsive to both zone and numeric indications since it must handle both numeric and alphabetic information. It is thus evident that if a list operation is desired for the numeric data in a column of a series of entry records, in which column for "special" records an 11 or "X" zone indication may also appear to adjust the machine operation, as previously described, this zone indication as far as the numeric list operation is concerned, must be ignored. This type of operation is effected by a so-called "X" eliminate device which, in effect, suppresses the 11 or "X" designation in the "special" records as far as the actual set-up of the print device is concerned.

For example, assume that the numeric value in column 30 of a series of records is to be listed in print column 30 and that on certain special records an "X" signal designation is also present in this column. This "X" designation is eliminated as far as listing is concerned, by the plugboard wiring as shown in Fig. 65. It will be noted in Fig. 65 that the 30th print position control exit hub 347 is plugwired to a so-called X-Eliminate hub 1463 (coordinates F; 53, in Fig. 12B). The actual operation is effected as follows. As the print device advances into print column 30, the 30th print position control exit hub is activated and through a plugwire 1464, and the "X" eliminate hub 1463, energizes the pick-up coil of the so-called "X" eliminate relay R20. With relay R20 energized, its associated contacts R20*a* (Fig. 13J) close, R20*b* transfer, and R20*c* open. With contacts R20*a* closed, a hold circuit is completed for the relay R20 from the power terminal 486 (Fig. 13K) through the cam contacts CRA–4, the conductor 915, conductor 918, the contacts R20*a*, the hold coil of relay R20, to ground. With the contacts R20*c* open, it will be noted in Fig. 13L that the setup impulse from CRA–4 cannot reach the Z2 set-up magnet 872 even though the associated set-up relay contacts 893–Z2*b* is closed as a result of the reading of the "X" from the card track. This action prevents the "X" data from interfering with the desired numeric print operation. The transferring of the contacts R20*b* adjusts the circuit leading to the R (redundancy) print set-up magnet 872, so that an erroneous bit count will not be set up as a result of the prevention of the energization of the Z2-print magnet 872.

*Group control*

Before considering the specific circuits involved in the group control feature of the subject machine, a brief description of the neecssity for this feature will be given.

One of the more common accounting procedures is to enter into a counter, a group or series of individual item amounts of some particular commodity etc., thus achieving a group total for the particular commodity in question. After the entry of the last item amount of a particular group into the counter, the group total then represented in the counter is noted or readout therefrom in some manner, whereafter, the counter is reset and the procedure repeated for the next desired group of item amounts. Any particular group of items may be further divided into sub-groups, and by noting or reading out the counter total after the entry of the last item of each sub-group, and then continuing without resetting the counter, a series of progressive sub-totals and a final group total may be obtained.

The particular point in the counter operation wherein either the counter total should be read out or noted, with or without counter reset, is determined by a change or "break" in correlative group or sub-group identifying data carried with or understood for each item.

The above type of operation is effected in conventional card controlled accounting apparatus by perforating a separate record card representative of each item amount of a group. Each item record is also perforated representative of a particular identifying letter(s), and/or number(s), etc., for the group of which it is an item. The item amounts and associated identifying data of the records, are, of course, arranged in corresponding fields in all the item records. If it is assumed that item records are prepared for more than one group of records, the records are then sorted relative to the data in their identifying fields and accordingly arranged in successive groups in a stack. The records are then fed successively through a first and second sense station of a card controlled tabulator.

The two sense stations of the tabulator and the record feed apparatus thereof, are so arranged that as a record passes through the second sense station, the succeeding record is passing through the first sense station. As a record passes through the second sense station, the information in its item field is read therefrom and entered into a predetermined counter of the tabulator. During the simultaneous passage of a record and its following record through the second and first sense stations, respectively, the information in the identifying field of each is read therefrom and compared. When a difference or so called "group control break," is detected in the compared identifying data of two records, the record being sensed in the second sense station is indicated to be the last item record of a particular group of such records, while the following record is indicated to be the first record of the next group. As a result of the sensing of a "group control break," the record feed apparatus stops, the machine prints the accumulated total, the counter is reset to zero, if so desired, whereafter, the machine automatically starts feeding the cards of the next group. The item amounts in the following records are then entered into the counter until the sensing of a control break indicates the end of the related group, and a counter readout operation is again initiated.

In the subject accounting machine it will be recalled that as the information in an entry record is being read therefrom and loaded into card track #1, for example, the information recorded on the alternate card track #2 as a result of the sensing of the previous entry record, is available to the accounting machine proper for operations therefrom. Group control may accordingly be effected in the subject account machine by comparing the data in any selected field or fields of the coded card track "image" of the previously sensed record, to the data being loaded into a corresponding field or fields of the alternate card track in response to the sensing of the related entry record card. By utilizing the card track image of the previously sensed record as the one information source for the group control operation, rather than the record itself as in the previously described conventional taublation, the need for the usual second sense station is eliminated.

The actual comparing process is effected by comparing, bit by bit, the coded pulses resulting from the sensing of the selected compared field or column of the entry record, to the coded pulses resulting from reading the corresponding field (address) of the card track image (coded form) of the previous entry record. The compare or group control operation may be effected on up to a total of three differing predetermined fields of the entry record, the possible compare fields being defined as major, intermediate, and minor. The initiation of any group indication other than minor "forces" the lesser significant indications as is customary. For example, if major, intermediate, and minor totals are being accumulated, the initiation of a major total cycle will force an intermediate total operation, which in turn, will force a minor total operation. If major, intermediate, and minor totals are being accumulated, the initiation of an intermediate total forces a minor total operation, but not a major total.

The group control operation for any desired predetermined control field of the entry records, is set up on the control panel by plugwiring from the reading exit hub 364 corresponding to the column in the records in which the entry data is represented, to a comparing entry hub 1250 (coordinates AF, 41–64, Fig. 12B), and from the associated comparing exit hub 1252 (coordinates AG–AH, 41–64, Fig. 12B) to either a major, intermediate, or minor total hub 1466, 1467, or 1468, respectively (coordinates AC–AE; 41–42 in Fig. 12B). In addition, the operational circuit of the machine function to be initiated by the control break, is wired through the normally open points of the associated major, intermediate, or minor total relay R12, R11, or R10, respectively. Each of the total relay controls associated contacts R12*a* through *j*, R11*a* through *i*, and R10*a* through *i*, in the usual manner. The contacts R10*e* through *j*, R11*e* through *i*, and R10*e* through *i* are actually transfer contacts. The individual common, normal, and transferred contact portions of each of these transfer contacts are connected to associated so-called common (C) hubs 1469, normal (N) hubs 1470 and transfer (T) hubs 1471 (coordinates AC–AE; 46–60, in Fig. 12B) in the same manner as the previously described selectors. There are thus "6" so called minor total selectors, "4" so-called intermediate total selectors, and "4" so-called major total selectors. If a total relay is unenergized, the common hub 1469 of each associated selector is connected through the related relay contacts to the corresponding normal hub 1470, while with the relay energized, the circuit from each common (C) hub 1469 to associated normal hub 1470 is broken, and a circuit established to the related transfer (T) hub 1471.

As a representative group control operation, assume we have a number of groups of item records, each record containing an item amount in columns 13 and 14 thereof, as in Fig. 66, and a particular identifying group number 10, 20, 30, 40, etc. in columns 25 and 26, there being a number of item records for each such group. Also assume that it is desired to accumulate the item amounts of each group in counter group #2 and obtain a printed total indication of the sum of the item amounts of each group in columns 31 through 33 of a related line of the print record, it being known prior to the operation that any group total will not be more than three digits. Assume also, that it is desired to list each item value of a group in columns 13 and 14 of succeeding lines of the print record and that the total for each group be printed on the print line following the last item list line. As a further condition, it is desired that a single line space be provided between each printed total and the line on which the first item of the next group is printed, the control panel wiring required to effect this operation is shown in Fig. 66, while a portion of the record produced would appear as shown in Fig. 67.

As a preliminary operation to the tabulating procedure, the record cards are sorted on columns 25 and 26 in a conventional sorting machine, thus providing a record stack wherein the individual item records are arranged in groups, with the groups being arranged in ascending order. The record stack is then loaded into the accounting machine and the operation is initiated. If we assume that the card tracks #1 and #2 are empty, and that the data in the first item record of group 10 is being loaded into card track #1, it is obvious that a comparison on the group control field of the empty card track #2 to the corresponding data being loaded into card track #1, will give a control break indication and initiate the prewired total operation. This will cause counter group #2 to print out any previous total that may have been represented therein and reset the counter to zero. Since the manner in which this preliminary reading out and clearing of counter #2, is identical to a total cycle as subsequently initiated by a control break between two actual groups of records in our representative operation, we shall ignore this initial control break and confine our description to the machine operation after card track #1 has been loaded with a group #10 item record.

Referring now to Figs. 66 and 14A, B, and C, and assuming the minor total relay R10 in its unenergized position, a circuit is completed at the beginning of drum cycle #4 of the machine cycle from the power terminal 489, through conductor 495, the normally closed side of relay contacts R14*c*, through conductor 927, the cam contacts PS–7 now closed (see Fig. 15B) through conductor 1428, the normally closed side of relay contacts R9*i*, to the line program impulse hub 1427. The circuit continues from the hub 1427, through a plugwire 1473 (Fig. 66) to a common hub 1469 of the #1 minor total selector, out the associated normal hub 1470, through a plugwire 1474, to the #1 line program P.U. hub 1435, through the #1 line program magnet 247 (Fig. 14A) to ground. The resultant energization of the #1 line program magnet 247 causes its associated contacts 238 to close at the beginning of drum cycle 14. The #1 line program contacts will remain closed through the entire machine cycle and through the first 9 drum cycles of the subsequent machine cycle at which time they are restored by their associated cam 226 in a manner previously explained.

With the line program contacts 238 (#1 L.P. Magnet–13th contacts) closed and when the print emitter 337 reaches its 13 position, the activation of the 13th reading exit hub 364 completes a circuit therefrom, through a plugwire 1475, the 13th L.P. contacts 238, through a plugwire 1476 to the emitter 337, through the 13th position of the emitter 337 and a plugwire 1478, to the card list hub 895, thus initiating a list operation for the order of the item in address 13 of the card track (column 13 of record) in a manner previously explained in detail. Two drum cycles later with the emitter 337 in its 14th position, the activation of the 14th reading exit hub completes a circuit through the 13th contacts (#1 L.P. contacts), out the associated common hub 283, through the emitter 337 etc., to initiate a card list operation for the tens order digit of the item amount. At this same time with the delayed emitter 338 in its 13th position, a circuit is available from the #2 (tens order) counter position exit hub 1052A at address 10 time through a plugwire 1479 through the emitter 338, through a plugwire 1480, the #1–L.P.–16 contacts, now closed, out the related common hub 283 through a plugwire 1481 throuhg the #2 group select circuit, when activated, out the related exit hub 1057, to the common hub 283 of the contacts 238–#1 L.P.–17th position, of #1 LP–17, through the associated #1 LP–17th contacts, now closed, through a plugwire 1483 to the plus hub 1064. As a result of the activation of the hub 1064, the tens order of the item amount (column 13) is entered to the adder, added to the corresponding digit from the counter group #2 (which is zero for the first item record of a group), with the resulting sum digit being entered into counter #2 in the usual manner. In the same manner when the emitter 338 reaches its 14th position, the activation of the units counter position exit hub 1052A at address 9 time, completes a circuit therefrom, through a plugwire 1484 etc., as above, thus entering the units order (column 1) of the item amount into counter group #2.

With the listing of the item amount in columns 13 and 14 of the print record and with the entry of the item amount into the counter group #2, operations with this item record are completed as far as the list and add operation is concerned. However, since the group control operation, to be later explained, requires the sensing of data in columns 25 and 26 of the entry record, carriage return and the resultant initiation of a new machine cycle is not initiated until after sensing of column 26 of the entry record is completed. Carriage return after the 26 column of the record is sensed is effected by plugwiring the 27th exit hub 347 of the print position control exit emitter 339 as indicated. The action is as follows. When the emitter 339 reaches its 27th position, a circuit is available from the corresponding exit hub 347, through a plugwire 1485, contacts 238–#1 LP–15th position, out the associated common hub 283, through a plugwire 1486 to the line stop magnet hub 426. With the impulsing of hub 426, the print carriage is returned and a new machine cycle initiated in a manner previously described.

During the 7th drum cycle of the following machine cycle, an impulse is applied to the line space magnet 953 to advance the print record one line in preparation for the item list operation to be effected during that machine cycle. The line space circuit extends from the power terminal 489 (Figs. 14A, B, C) through conductor 495, the normally closed side of the contacts R14*c*, through conductor 927, the contacts R15*d*, now closed, the cam contacts CRB–4, now closed (see Fig. 15A), the cam contact PS–10, now closed (see Fig. 15B) to the #1 line space hub 978, through a plug wire 1488 (Fig. 66), the contacts 238–#1LP–12th position still closed at this time, out the associated common hub 283, through a plugwire 1489 to the other #1 line space hub 978, through conductor 980 etc., to energize the line space magnet 953. At the end of drum cycle #13, the thirty #1 line program contacts open in the usual manner, however, since the #1 line program magnet was energized as described above, the #1 line program contacts again close at the beginning of drum cycle 14. As a result, during this machine cycle, an item list and add operation will be effected for the related card track data, in the same manner as previously described for the 1st item card date of group #10.

In reference to the group control operation, with the first record of the group having the control identification 10 loaded into car track #1, for example, and with the second record of that group being sensed, the following action takes place. With column 25 of the second record in sensing position under the sense brushes 418, and with the card feed emitter 363 in its related 25th position, the activation of the 25th reading exit position of the address device 427 during address 25 time of the related drum cycle, effects the sensing of the tens order digit "1" of the control digit in column 25 of the sense record in the usual manner. The sensing action for column 25 results in the generation of 3A and 7A write pulses on conductor 529 (Fig. 13A), the write pulses being applied through the write amplifier 538, etc. to effect a recording of the tens digit "1" in address 25 card track #2. The 3A and 7A pulses on conductor 529 are also applied to the left grid of an A.C. coupled inverter 1490. At this same time, the tens order digit "1" of the control data in address 25 of the card track is read out therefrom in its coded form, thus generating 3B and 7B read pulses at the output of the read amplifier 540. These read pulses are applied through the conductor 901 and a conductor 1491 to the right grid of the A.C. coupled inverter 1490.

With the 25th reading exit hub 364 also activated at this time, a circuit is completed therefrom, through a plugwire 1493 (Fig. 66) to the #1 compare entry hub 1250, through the associated diode 1251 connected thereto (see Fig. 13D) to the related #1 compare exit hub, through a plugwire 1494 to the minor total hub 1468, to condition the one grid of an associated thyratron 1495 (see Fig. 13C). The other grid of the thyratron 1495 is connnected by a conductor 1496 to the output of an "AND" circuit 1498. It is thus evident that if the "AND" circuit 1498 is actuated at any time during address 25 time, the minor total thyratron 1495 will be fired thus energizing the related so-called minor group control relay R10 in its plate circuit to indicate a control break in the data being compared.

In our particular example, the "AND" circuit 1498 remains inoperative during address 25 time since there is an agreement between the digit "1" of the entry record and the corresponding digit "1" of the card track. This agreement is determined as follows: The 3A write pulse applied to the left grid of inverter 1490 produces a short duration negative impulse on the output thereof which is applied to a so-called group control trigger 1499 thus flipping it On (right plate high) at the beginning of 3 of 7 time of address 25 time. Approximately 8 microseconds thereafter, the 3B pulse applied to the right grid of inverter 1490 produces a short duration negative impulse on the output thereof which is applied to the trigger 1499 thus flipping it Off at the beginning of the B portion of 3 of 7 time of address 25 time. With the trigger 1499 Off during 3B time, the resultant negative potential of its right plate is applied therefrom to the one input of the "AND" circuit 1498 to disable the latter so that the application of a B pulse (3B in this particular instance) through conductor 430 to the other input of the "AND" circuit 1498 has no effect thereof.

The above action is repeated during 7 of 7 time of address 25 time, the 7A write pulse on conductor acting through the inverter 1490 to flip the trigger 1499 On, and the 7B read pulse on conductor 1491 acting through the inverter 1490 to flip the trigger 1499 Off. With the trigger 1499 Off at 7B time, agreement of the compared bit data is indicated and the "AND" circuit 1498 is maintained inoperative.

At the end of address 25 time, the 25th address hub through conductor 509 and follower 510 shifts conductor 552 negative. The negative potential of the conductor is applied through a diode 1501 (see Fig. 13C) to the right plate of the trigger 1499 to positively reset it Off, if it is On at this time. In our particular example, however, the reset potential or conductor 552 is of no consequence since the trigger 1499 is already Off. During the subsequent NAD (not alternate drum) cycle, the negative potential of the conductor 1500 prevents operation of the trigger 1499 in response to read pulses generated on the output of the read amplifier 540.

During the alternate drum cycle thereafter, with column 26 of the entry record in the sense position and with the emitter 363 now in its 26th position, the activation of the 26 reading exit position at address 26 time, effects the sensing of the units order control digit "0" in column 26 of the record thus generating corresponding 1A and 7A write pulses on the conductor 529. At the same time, the "0" in address 26 of card track #1 is read therefrom thus generating corresponding 1B and 7B read pulses on conductor 901. Also, with the 26th address signal on conductor 1500, the trigger 1499 is again free to operate in response to the output signals from the inverter 1490. Under the above circumstances, the 1A write pulse flips the trigger 1499 On, whereafter the corresponding 1B read pulse flips it Off. The 7A and 7B pulses repeat this action. With the trigger 1499 accordingly Off during B time of each of the 7 cell times of address 26, agreement between the corresponding control digit read from the card and the card track is again indicated and the group control circuit remain inoperative. The above action is repeated during the sensing of each of the following item records of group 10, and the group control circuit remains inoperative as required.

When the first record of the "11" group is in the sense position, the sensing of the hundreds order digit 1 of the control designation "11" in the record, and the reading of the hundreds order digit "1" of the control designation "10" in the card track (last item record of group 10), indicates agreement of the tens order the group control data and the group control circuit 1498 remains inoperative. However, upon the sensing of the digit "1" in column 26 of the record and the application of the corresponding 3A and 7A write pulses to the inverter 1490, and the simultaneous reading of the digit 0 in address 26 of the card track and the application of the corresponding 1B and 7B read signals to the inverter 1490, a control break is indicated by the following action. The 3A write pulse on conductor 529 acts through the inverter 1440 to flip the trigger 1499 On (right). With no corresponding read pulse (3B) on conductor 1491, the trigger 1499 remains On during 3B time and conditions the associated input of the "AND" circuit 1498 positive. As a result, the B pulse (3B) applied to the other input of circuit 1490 through conductor 430 renders the "AND" circuit operable. The 3B signal resulting on the output of circuit 1498 is applied to the 2nd grid of the minor group control thyratron 1495 to fire the latter, since the first grid thereof is already conditioned positive by the 26 address signal applied from the 26th reading exit. The plate circuit for the thyratron 1495 extends from the power terminal 486, through the cam contact PS–3, now closed, through a plate resistor 1503 to the thyratron 1495. With the thyratron conductive, the associated minor control relay R10 paralleled with the plate resistor 1503 is energized and remains energized through drum cycle 12 of the next machine cycle when cam contact PS–3 opens. With relay R10 energized, its associated contacts R10*e* through *j*, transfer so as to open the circuit between each associated common hub 1469 and normal hub 1470, and establish a circuit between each common hub 1469 and the related transfer hub 1471.

During the above machine cycle when the relay R10 is energized as a result of the sensing of the "control break," the machine operation continues in the normal manner so as to list the last item amount and also enter it into the counter #2.

With the relay R10 energized and its associated contacts R10*b* (Fig. 14B) open, the circuit through which the card feed clutch 373 is normally energized cannot be completed. Consequently, as long as relay R10 is energized, further card feed operations are suspended.

During drum cycle #2 of the machine cycle following the detection of the control break, remembering that the #1 line program contacts are still closed at this time (see Fig. 15B), the line space impulse from contact CRB4 is directed through the #1 line program 12th position contacts 238, as before, to cause a single line space operation, thus advancing the print record to the line on which it is desired to print the total for group #10. During the drum cycle 4 of this same machine cycle, the closing of cam contacts PS–7 completes a circuit therefrom to the line program impulse hub 1427, through plugwire 1473 (see Fig. 66) to the common hub 1469 of the #1 minor total selector, out the associated transfer hub 1471, through a plugwire 1504 to the P.U. hub 1435 of the #2 line program magnet. At end of drum cycle 8 of this same machine cycle, the #1 line program contacts are relatched open in the usual manner. At the beginning of drum cycle 14 of this machine cycle the thirty #2 line program contacts 238 are closed as a result of the previous impulsing of the associated #2 line program magnet 247.

With the #2 line program 18th position contacts 238 closed, and when the counter emitter 336 reaches its 31 position, the activation of the hundreds order (#3) counter position exit hub 1052A at address 11 time completes a circuit therefrom, through a plugwire 1505 through the 31st position of the emitter 336 to the related counter readout exit hub 348, through the commoned connections linking the 31st, 32nd, and 33rd counter readout exit hubs 348, through a plugwire 1506, the #2 counter group selection circuit, now operable, through a plugwire 1508, the #2 L.P.–18th position contacts 238, now closed, out the associated common hub 285, and through a plugwire 1509 to the counter readout hub 1260. As a result of the impulsing of the hub 1260 at this time, the hundreds order of counter group #2 is readout to the print record (column 31) in a manner previously explained in detail.

During the next print cycle with the emitter 336 now in its 32nd position, a similar circuit is completed from the #2 tens order counter position exit hub 1052A to readout the tens order of the counter. During the next print cycle with the emitter in its 33rd position, a similar circuit is completed from the #1 units order counter position exit hub 1052A to readout the units order of counter #2.

During the subsquent print cycle, with the emitter 336 in its 34th position, the activation of the 2 of 10 hub 1294 completes a circuit thyratron, through a plugwire 1510, the 34th position of the emitter 336, through a plugwire 1511, the #2–LP–16th position contacts 238, the plugwire 1481, the #2 counter group selection circuit, now operable, through plugwire 1482, through common LP–17 contact 283, through the #2–LP–17th position contacts 238, now closed, through a plugwire 1513 to the counter reset hub 1297. As a result of the impulsing of the hub 1297 at this time, counter #2 is reset in a manner previously explained in detail.

With the advance of the print position emitter 339 to its 35th position, a circuit is completed from the associated 35th print position control exit hub 347, through a plugwire 1514, through the #2 L.P.–15th position contacts 238, now closed, out the associated common hub 283, through the plugwire 1486 to the line stop hub 426, as a result of the activation of the hub 426, the print carriage is returned and a new machine cycle initiated in a manner previously described.

During the 3rd cycle of the following machine cycle, a line space impulse is applied from the power terminal 489, through conductor 495, the normally closed side of the contacts R14*c*, through conductor 927, the 1st card relay contact R15*d*, now closed, the cam contacts CRB–4, now closed (see Fig. 15A), the cam contact PS–11 (now closed see Fig. 15B), to the 2 line space hub 978. The circuit continues from hub 978 through a plugwire 1515 (see Fig. 66) to the #2 L.P.–11 position contacts 238, still closed at this time, out the associated common hub 283, through a plugwire 1516 to the other #2 line space hub 978, through a conductor 982 etc. to the line space magnet 953, thus line spacing the print record one space. During drum cycle #8 of the same drum cycle with the cam contacts PS–11 still closed at this time, the closing of contacts CRB–4, again completes the same circuit as traced above thus line spacing the print record one more space. By the above action it is evident that a line space has been provided between the group total of the previous group and the print line now in printing position and on which will be printed the first item amount of the next group 11.

During drum cycle #4 of this same machine cycle, a circuit is completed from the line program impulse hub 1427, through the normal plugwire 1473 to the common hub 1469 of the #1 minor total selector, out the associated normal hub 1470 (the relay R10 having been deenergized) by the opening of contacts PS–3 during drum cycle 13 of the total cycle), through the plugwire 1474 to the #1 L.P.P.U. hub 1435. At the end of the drum cycle 8, the 2 L.P. selector contacts are relatched open in the usual fashion. As a result of the impulsing of the #1 line program magnet as described above, the associated line program contacts "1" through "30" are closed starting at drum cycle #14 of this cycle. With the #1 L.P. contacts closed, the item amount for the first record data of group 11, is listed and entered into adder 1039 in the same manner as previously described for the group 10 item values. This operation is repeated for successive item amounts of group 11 until the sensing of a control break initiates a counter readout and reset operation for the group 11 sum, in the same manner as described above for the group 10 total operation.

*Major and intermediate totals—Separate line operation*

It was mentioned previously that the initiation of any group indication other than minor, "forces" the lesser significant group control indications. The manner in which this "forcing" is effected will be evident from an examination of Fig. 13C wherein it will be noted that if the major group control relay R12 is energized as the result of the detection of a major control break, the relay contacts R12*e* thereof closes to also energize the intermediate control relay R11 by paralleling it with the major relay R12. Similarly, the energization of the intermediate control relay R11 causes its associated contacts R11*e* to close to energize the minor group control relay R10 by paralleling it with the intermediate control relay R11. Since the major, intermediate and minor control relays R12, R11, and R10 are energized through a common circuit including cam contact PS–3, it is evident that assuming the condition wherein major, intermediate, and minor totals are being accumulated and appropriate plug wiring is provided for printing each total in a particular field of the print record, the initiation of any control operation other than minor forces the lower significant total operations with all totals being printed in their predetermined print fields on the *same* print line. In order to permit the printing of the intermediate and major totals on separate print lines, if so desired, circuit means have been provided for maintaining the relays R12 and R11 energized through circuits other than cam contact PS–3, until the actual print cycle when the desired print line is in position. The action also requires that the control function to be controlled by the intermediate and major control relays be initiated only during the particular print cycle when required, even though that control relay may be held energized through a number of print cycles.

For example, assume that minor, intermediate, and major totals are being accumulated and it is desired that each class of total print on a separate line as diagrammatically represented in Fig. 68B. Fig. 68A shows the additional control panel plug wiring for effecting the sequence of operations. Since the actual operational plugwiring for effecting the printing of a group total in the proper predetermined columns of the print record, as cojointly controlled by the various emitters and the reading exit hubs, has been explained in detail, this wiring is not shown in Fig. 68A and will not be explained. For our particular operation, it will be assumed that the major total operation is effected through the #4 L.P. contacts, the intermediate total operation is effected through the #3 L.P. contacts, and the minor total operation is effected through the #2 L.P. contacts with the item list operation being effected through the #1 L.P. contacts. In the following discussion, the sequence of operations will be traced as initiated from a major group control break, since this operation will include the intermediate and minor control sequences and will render obvious the sequences as initiated from either an intermediate or minor control break.

Referring now to Fig.68A it will be noted that with none of the group control relays energized, the line program impulse is directed during drum cycle #4 of each machine cycle from hub 1427, through a plugwire 1518 to the common hub 1469 of the #1 minor total selector (relay R10), out the corresponding normal hub 1470, through a plugwire 1519 to the common hub 1469 of the

#1 intermediate total selector (relay R11), out the corresponding normal hub 1470, through a plugwire 1520 to the common hub 1469 of the #1 major total selector (relay R12), out the associated normal hub 1470, through a plugwire 1521 to the #1 line program P.U. hub 1435. The impulsing of the #1 hub energizes the associated #1–L.P. magnet 247 as previously explained. The energization of the #1–L.P. magnet 247 causes the associated contacts "1" through "30" thereof to close in the usual manner at the beginning of drum cycle 14 of the same machine cycle. The proper circuits to list each item amount and also enter it into a major total counter, intermediate total counter, and a major total counter, are routed through the #1–L.P. contacts in a manner that is obvious from previous discussion. In addition, group control comparisons are effected on predetermined major, intermediate, and minor control fields in a manner that is also evident from previous discussion. As long as there are no control breaks sensed, it is evident that the #1–L.P. magnet is picked up each machine cycle to continue the item entry operations.

If during an item entry machine cycle, a major control break is sensed, the major relay R12 is energized, which in turn effects the energization of the intermediate relay R11, and the minor relay R10, in a manner previously described. With relay R12 energized, the closing of the associated contacts R12*a* establishes a hold circuit for the relay R12 from the power terminal 486 (see Fig. 13C) through the cam contacts PS–5 (now closed—see Fig. 15B); through a plugwire 1523 linking a pair of so-called major extra line hubs 1524 (coordinates AE; 43–44 in Fig. 12B), through the contacts R12*a*, and a hold coil of the relay R12 to ground. With the relays R11 and R10 energized and their associated contacts R11*b* and R10*d* closed, other hold circuits are established as follows: A second hold circuit for the major relay, which bypasses the cam contact PS–5, the circuit extending from the terminal 492, through the contacts R11*b*, the one hub 1524, the plugwire 1523 etc. to the hold coil of the relay R12. A third hold circuit is established for the relay R12, from the terminal 486, through cam contacts PS–4, the contacts R10*d*, the contacts R11*b* etc. to the hold coil of relay R12. A hold circuit for the intermediate relay is established from the terminal 486, through cam contacts PS–4, through a plugwire 1525 linking a pair of so-called intermediate extra line hubs 1526 (coordinates AD; 41–42 in Fig. 12B), through the contacts R11*a* and the hold coil of the relay R11 to ground.

During drum cycle 4 of the machine cycle following the item list cycle when the major control break was sensed, with the #1–L.P. contacts still in their closed position at this time, a single line space operation is completed through the predetermined one of the #1–L.P. contacts in the usual manner, thus correctly positioning of the print record to receive the minor total. During drum cycles 4 and 5 of this same drum cycle, the line program impulse PS–7 is applied from the hub 1427, through plugwire 1518, through the transferred side of the #1 minor total selector, since relay R10 is still being held energized through cam contacts PS–3 at this time, through a plugwire 1528 (see Fig. 68A) to the #2 line program P.U. hub 1435, to impulse the #2 line program magnet 247. The #1 line program contacts are relatched open at the end of drum cycle #8, whereafter, the #2 line program contacts are closed starting at drum cycle #14 as a result of the above described impulsing of the #2–L.P. magnet 247. With the #1–L.P. contacts open during this cycle, the usual item list and counter entry operations are prevented. With the #2–L.P. contacts closed during this cycle, predetermined circuits are completed therethrough to effect readout and reset of the minor counter as desired.

Referring now to Figs. 15B and 13C, it will be noted that with the breaking of cam contacts PS–3 during drum cycle #14 of the minor total cycle, the major total thyratron 1495 becomes non-conductive, and the pick-up coils of the minor total relay R10, intermediate total relay R11, and major total relay R12 are deenergized. The minor relay R10 has no hold coil so with the deenergization of the pickup coil thereof by the opening of contact PS–3, the relay R10 is accordingly deenergized and its associated contacts restore to their normal positions. The opening of the contacts PS–3 does not drop out the intermediate total relay R11, however, since the cam contacts PS–4 closed at this line (see Fig. 15B), a hold circuit is available therefore from the terminal 486, through contacts PS–4, the hubs 1526 and associated plugwire 1525, the contacts R11*a*, through the hold coil of relay R11 to ground. The major relay R12 is also held energized through cam contacts PS–5 during the minor total cycle.

During drum cycle #4 of the machine cycle following the minor total cycle, with the #2 L.P. contacts still in their closed positions at this time, a single line space operation is completed through a predetermined one of the #2 L.P. contacts in the usual manner, thus correctly positioning the print record to receive the intermediate total. During drum cycles 4 and 5 of this same drum cycle, the line program impulse is applied from the hub 1427, through plugwire 1518, through the normal side of the #1 minor total selector, since relay R10 is now deenergized, through plugwire 1519, through the transferred side of the #1 intermediate total selector, since relay R11 is still energized at this time, through a plugwire 1529 to the #3 line program P.U. hub 1435, to impulse the #3 line program magnet 247. The #2 line program (L.P.) contacts are relatched open at the end of drum cycle #7, whereafter, the #3 line program contacts are closed starting at drum cycle #14, as a result of the above described impulsing of the #3–L.P. magnet 247. With the #3–L.P. contacts closed during this cycle, predetermined circuits are completed therethrough to effect readout and reset of the intermediate total counter as desired.

Referring now to Figs. 15B and 13C, it will be noted that with the breaking of cam contacts PS–4 during drum cycle 11 of the intermediate total cycle, the intermediate total relay R11 hold circuit is broken so that this relay is deenergized and the associated contacts thereof restored to their normal position. The major total relay R12, however, remains held energized during the major total cycle cam contacts PS–5.

During drum cycle #4 of the machine cycle following the intermediate total cycle, with the #3–L.P. contacts still in their closed positions at this time, a single line space operations is effected through a predetermined one of the #3–L.P. contacts in the usual manner, thus correctly positioning the print record to receive the major total. During drum cycles 4 and 5 of this same drum cycle, the line program impulse is applied from the hub 1427, through the plugwire 1518, through the normal side of the #1 minor total and #1 intermediate total selectors, through plugwire 1520, the transferred side of the #1 major total selector, since relay R12 is energized at this time, through a plugwire 1530 to the #4 line program P.U. hub 1435, to impulse the #4 line program magnet 247. The #3 line program (L.P.) contacts are relatched open at the end of drum cycle 8, whereafter, the #4 line program contacts are closed starting at drum cycle 14 as a result of the above described impulsing of the #4–L.P. magnet 247. With the #4–L.P. contacts closed during this machine cycle, predetermined circuits are completed therethrough to effect readout and reset of the major total counter as desired.

Referring now to Figs. 15B and 13C, it will be noted that with the breaking of cam contacts PS–5 during drum cycle #9 of the major total cycle, the hold circuit for the major relay R12 is broken so that R12 is deenergized and the associated contacts thereof restored to their normal positions.

During drum cycle 4 of the machine cycle following the major total cycle, with the #4–L.P. contacts still in their closed positions at this time, a single line space operation is effected through a predetermined one of the #4–L.P. contacts in the usual manner, thus correctly positioning the print record to receive the first item list data for the next group. During drum cycles 4 and 5 of this same drum cycle, the line program impulse is applied from the hub 1427, through the plugwire 1518, the normal side of the #1 minor total, #1 intermediate total, and #1 major total selectors, since the total relays are all now unenergized, through the plugwire 1521 to the #1 line program P.U. hub 1435. The impulsing of the hub 1435 energizes the associated #1–L.P. magnet 247 which causes its associated contacts "1" through "30" thereof to close in the usual manner at the beginning of drum cycle #13 of the same machine cycle. The proper circuits to list each item amount and also enter it into the major counter, intermediate counter, and minor counter, are routed through the #1–L.P. contacts as previously explained. The #1–L.P. magnet will be energized each machine cycle thereafter to effect repeated item list operations until the sensing of a control break again initials a total cycle or cycles, as described above.

*Manual final total*

Under some circumstances it is desirable if a final total operation is initiated by manual control at the end of an operation, rather than by automatic control. For this purpose there is provided a manual S.P.S.T. final total switch 1532 (see Fig. 14A). The two switch points of the switch 1532 are each linked by internal machine wiring to a corresponding so-called final total hub 1533A and B on the control panel (coordinates W: 49–50 in Fig. 12B). If it is desired that the final total operation be manually or automatically initiated, at the discretion of the operator, when the final total point is reached in an operation, the line program impulse source (hub 1427) is plugwired directly or indirectly (through a selector, the line program contact etc. as previously explained) to the one final total hub 1533, while the associated final total hub 1533 is plugwired to the pick-up hub 1435 of the particular line program magnet 247 whose associated contacts are wired so as to effect the final total, when closed. It is thus evident that if the switch 1532 is closed at the beginning of the accounting operation, the generation of the final total signal condition will permit the line program impulse to be routed therethrough to automatically initiate a final total. If the final total switch 1532 is open at the beginning of the accounting operation, the machine will stop when the final total point is reached. If the operator then closes the switch 1532, the final total will be effected thereafter as desired, to complete this particular accounting operation.

*The set-up change*

Under some circumstances, the control panel plugwiring for effecting two different desired accounting operations, may have a number of similar plugboard designated functions and a number of dissimilar functions. Under these conditions it is desirable if instead of having two distinct prewired control panels for each such operation, or having the operator manually adjust the plugwire wiring of a single panel in conformity with which one of the two operators is to be effected, there be provided a single control panel with both possible operating procedures set up therein, the particular procedure controlling the operation at any one time be selected by manually settable switches. For the purpose there is provided two S.P.D.T. so-called set-up change switches 1534 (see Fig. 14A). The movable contact element of each switch is linked to an associated so-called common hub 1535 (coordinates V; 49–50 in Fig. 12B) while each of the fixed contact elements is connected to a related Normal (N) hub 1536 (coordinates U; 49–50 in Fig. 12B) or Transferred (T) hub 1537 (coordinates T; 49–50 in Fig. 12B). The function initiating signal source is plugwired to the Common (*c*) hub 1535, while each of the individual functions to be controlled by the signal impulse, as determined by the Normal or Transferred position of that set-up switch, is plugwired from the corresponding N hub 1536 or T hub 1537, respectively. It will be appreciated that a single set-up switch 1534 may be utilized to select either of two multi-function procedure, rather than either of two single functions, by routing a line program impulse therethrough to either of two predetermined line program magnets, the contacts of each of the latter being prewired to effect the plurality of functions desired when that magnet is actuated.

*Multi-line read operation*

Under certain conditions it may be required that a printing operation be effected on more than one print line of the various fields of data in a single entry record. This type of operation is referred to as a multi-line read operation. A representative accounting operation wherein the MLR procedure is required would be a typical billing operation. In the usual billing operation, each customer's name, street address, and city-State location, is carried in a so-called header card and is to be printed on nine successive print lines on the upper portion of the bill in the accepted manner. Subsequent to the printing of the header data for each bill, the individual items billed are listed on successive print lines from successive item detail records.

It will be recalled that the listing of the data in any particular entry is not effected until the machine cycle subsequent to the cycle when that entry record was sensed. The list operation is effected from a stored representation of the entry record in one of the two card tracks. During the listing of the data of an entry record from one of the card tracks, the alternate card track is loaded in response to the data then being sensed in the next entry record. It will also be recalled from previous discussions that as natural sequence of events, a new card feed cycle is initiated subsequent to each carriage return operation. It is thus evident that in a Multi-line read operation since a header card serves as a data source for more than 1 print line, the usual initiation of a new card feed subsequent to each carriage return, must be suspended once a header list operation is initiated. Normal card feed operations remain suspended until the print operation is completed in the last desired line from that header card data. In order to initiate the MLR operation when required, each header on MLR entry record is distinguished from its following detail records and the detail records of the preceding group, by a predetermined control digit in a predetermined control column.

As a representative MLR operation, assume that a billing application is to be performed when in each customer's name, street address, and city-State location, is to be listed on three successive print lines from data supplied by an associated MLR card. The customer's name list is to be controlled through contacts of the #2 line program magnet 247 by a procedure previously explained in detail, the street address list is to be controlled through contacts of the #3 line program magnet, and the city-State list is to be controlled through contacts of the #4 line program magnet, the operations such as list, etc. to be effected in the individual items billed to each customer, are to be controlled through contacts of the #1 line program magnet. The MLR records are to be distinguished from the detail records by the presence of the digit 8 in column 35 thereof.

Referring now to Fig. 69 there is shown the control panel wiring required to effect the above operation. In Fig. 69 only the plugwiring required to pickup the various line program magnets to effect the list operations as mentioned above is indicated, the actual plugboard wiring through which each actual list operation is effected when the related line program magnet is energized being omitted. The control panel plugwiring required for recognition of the MLR in header records comprises plugwiring from the "8" digit emit hub 563 corresponding to the magnitude of the predetermined control digit, to a MLR DI (digit) hub 1539 (coordinates B; 56, in Fig. 12B), and plugwiring from the 35th reading exit hub 364 to a MLR CC (card column) hub 1540 (coordinates B; 57 in Fig. 12B). If we assume that the #1 line program contacts are closed so that an item list operation is being effected from the one card track data, and if during this same cycle a MLR entry record is being sensed, the action is as follows:

The DI and CC MLR hubs 1539 and 1540 are each linked to a related input of a thyratron and circuit 1541 (see Fig. 14C) and upon the coincident conditions of the sensing of the control digit "8" in the control column 35, the thyratron 1541 is accordingly rendered conductive. The plate circuit for the thyratron 1541 extends from the power conductor 566, through the cam contact CF7 (closed during sensing of card column) (see Fig. 15B), through a plate resistor 1542 to the plate of the thyratron 1541. With the thyratron 1541 conductive and the plate side of the resistor 1542 at a corresponding low potential, a circuit is also completed from the power line 566, through cam contacts CF6, conductor 1547, a diode 1544 the normally closed contacts R9*b* of the MLR "2" relay R9, through the pick-up coil of a MLR relay R26, to ground, the resultant energization of the MLR #1 relay R26 causes its associated contacts R26*a* to close and R26*b* to open. With the contacts R26*a* closed, the closing of cam contacts CF6 at the beginning of drum cycle 2 of the following machine cycle (see Fig. 15B) completes a circuit from the power line 566, through contacts CF6, conductor 1457, contacts R26*a*, the pickup coil of the MLR #2 relay R9, to ground. The resultant energization of the MLR #2 relay R9, causes its associated contacts R9*a* through *i* to be actuated. With the contacts R9*b*, now open, the MLR #1 relay R26 is deenergized, whereafter the opening of the cam contact CF7 drops out the thyratron 1541.

With the contacts R9*a* now closed, a hold circuit is completed for the MLR #2 relay R9 from the power line 495, the normally closed contacts R27*a* of a relay #3 MLR relay R27, a conductor 1545, the contacts R9*a*, the hold coil of the MLR #2 relay R9, to ground. The above hold circuit for MLR #2 is maintained until the #3 MLR relay R27 is energized (contacts MLR3–1 open) in a manner to be later explained.

With the contacts R9*i* (see Fig. 14A) now transferred, the line program impulse source (cam contact PS–7) is now linked to a so-called MLR impulse hub 1546 (coordinates P; 52 Fig. 12B) rather than the line impulse hub 1427. Consequently the line program impulse is applied therefrom during drum cycles 4 and 5 (see Fig. 15B), through a plugwire 1547 (see Fig. 69) to the common hub 283, through the associated closed contacts 1 of the #1 line program magnet 247 to the related hub 284, the contacts "1" through "30" of the #1 program magnet 247 being closed at this time as a result of an assumed impulsing of the #1 P.U. hub 1435 from the line program impulse hub 1427 at the beginning of the previous machine cycle (item list operation). The circuit continues from the hub 284 of the 1st contact of the #1 program magnet, through a plugwire 1549 to the P.U. hub 1435 of the #2 line program magnet and then to the #2 line program magnet 247 to actuate it. The #1 line program contacts are relatched open at the end of drum cycle 8 of the cycle, whereafter, at the beginning of drum cycle 14, the #2 line program contacts close as a result of the previous impulsing of the related magnet 247. With the #2 line program magnet contacts closed, the list operation of the name field of the MLR record, which is now represented on the one card track in proper translated form, is effected from the card track in a manner previously described in detail. During this same machine cycle, the entry record following the MLR is sensed and the data loaded into the other card track. As a result of the opening of the R9*b* (see Fig. 14B) during the first MLR machine cycle, the usual circuit from CRB–3 therethrough to the card feed clutch can no longer be established. As a result, the card feed clutch 373 latches up at the end of the first MLR machine cycle to prevent the feeding of any further records until the MLR operation is completed.

After the completion of the name list operation during the first MLR machine cycle, the carriage is returned and the print record advances 1 print line in a manner previously described. With the contacts R9*i* still transferred, the next line program impulse is accordingly applied during drum cycles 4 and 5 from the MLR hub 1546 through plugwire 1547 to the common (*c*) hub 283 of the 1st position contacts of the line program contacts, through the 1st position contacts of the #2 line program group, closed at this time, out the related #2 hub 284, through a plugwire 1550, to the P.U. hub of the #3 program magnet etc. to energize the #3 line program magnet. The #2 line program contacts are latched open at the end of drum cycle #7 of this second MLR machine cycle, whereafter, at the beginning of drum cycle #14, the thirty contacts of the #3 line program group closes as a result of the previous impulsing of the related #3 magnet as described above. With the #3 line program magnet contacts closed, the list operation of the street address field of the MLR data is effected from the card track data during this second MLR machine cycle.

After the completion of the street address list operation during the second MLR machine cycle, the carriage is returned and the print record advanced 1 print line in the usual manner. With the contacts R9*i* contacts still transferred, the next line program impulse is accordingly applied during drum cycles 4 and 5 from the MLR hub 1546 to the C hub 283 of the first position contacts of the line program selectors, through the related #1 contacts of the #3 program selector, still closed at this time, out the associated #3 hub 284, through a plugwire 155, the P.U. hub 1435 of the #4 program magnet etc. to energize the #4 line program magnet. The #3 line program contacts are latched open at the end of drum cycle #7 of the 3rd MLR machine cycle, whereafter, at the beginning of drum cycle #14, the #4 line program contacts close as a result of the previous impulsing of the related #4 magnet 247 as described above. With the #4 line program magnet contacts closed, the list operation of the city-State field of the MLR data is effected from the card track data during this third MLR machine cycle.

With the advance of the print carriage from the last desired print column position of the city-State data to the next print column position, the activation of the associated print position control exit hub 347, which is assumed as the 31st for our representative MLR operation as indicated in Fig. 69 completes a circuit therefrom through a plugwire 1552 to the C hub 283 of the #2 ("2" of "30") contacts of the line program selectors, through the related #2 contacts of the #4 line program selector, still closed at this time, out the associated #4 hub 284, through a plugwire 1554 to a so-called MLR stop hub 1555 (coordinates C; 56–57 in Fig. 12B). The circuit continues from the hub 1555, through a latch pickup coil (see Fig. 14C) of the MLR #3 relay R27, to ground. The resultant energization of the relay R27, latches its associated contacts R27*a* open, R27*b* closed, and R27*c* transferred.

With the contacts R27*a* open, the hold circuit to the #2 MLR relay R9 is broken so that relay R9 is deenergized, with relay R9 deenergized, the associated contacts thereof restore to their normal positions. With the contacts R9*b* again closed, the card feed clutch magnet circuit is restored so that card feed operations are again effected in the usual fashion. With the contacts **R9*i* transferred to their normal position as shown in Fig. 14A, the line program impulses are again emitted from the hub 1427 rather than the MLR hub 1546. Consequently each line program impulse thereafter, is directed through a plugwire 1556 to energize the #1 line program magnet 247** circuitry to effect the item list operation and any allied functions are completed through the #1 line program magnet contacts, when closed. It is thus evident that the item detail list operation and allied operations are repeated for each successive detail card, until a heading operation is again initiated in response to the sensing of the next MLR record.

Returning again to the consideration of the MLR operation, it will be recalled that the MLR operation, once initiated continues as long as the #2 MLR relay R9 remains energized. With the relay R9 energized various contacts thereof are positioned as previously explained, however, the purpose of some of these contacts was not described in the previous discussion. Assuming the relay R9 energized, the purpose of these contacts thereof is as follows:

The contacts R9*b* are provided so as to permit proper machine operation in those cases wherein two MLR records are sensed successively. Thus with the contacts R9*b* open, it is impossible for the #1 MLR relay R26 to be reenergized on the cycle following the sensing of a first MLR record, even though during this cycle the thyratron and unit 1449 is fired as a result of the sensing of the second MLR. This sensed indication of the second MLR record is not lost, however, since the card feed latches up at the end of this cycle and the associated contacts CF–7 accordingly remain closed (see Fig. 15B) to maintain the thyratron "and" conductive. After the completion of the MLR operation for the first record, the dropping out of relay R9 and the resultant closing of contacts R9*b*, picks up the #1 MLR relay R26 again since the thyratron 1449 is still conductive. The picking up of relay R26 accordingly initiates a second MLR operation as required by the second MLR record.

The closing of the R9*d* contacts when relay MLR #2 (R9) is energized, provides a by-pass around the hopper contact R2*a* and card lever contact R13*d* in the start key circuit, to permit the machine to be restarted under the special condition wherein the machine is stopped during a MLR operation, with the simultaneous conditions of the hopper 368 being empty R2*a* open and the card lever relay R13 being unenergized (R13*d* open).

The opening of the R9*e* contacts when relay R9 is energized, disables the final total key circuit so that if the machine is stopped during a MLR operation, a final total operation cannot be effected until the interrupted MLR operation is completed.

The contacts R9*f* are the transfer type and internally linked to corresponding plughubs labeled C (common), N (normal) and T (transfer) in Fig. 12B (coordinates AC–AE; 62 in Fig. 12B) respectively to form the usual selector. The contacts R9*g* are similarly connected to also form a #2 MLR selector (coordinates AC–AE; 63 in Fig. 12B). The pair of #2 MLR selectors may be utilized to select various circuits in functions in accordance with the state (normal or transferred) thereof, in the same manner as described for other selectors previously mentioned. The R27*c* (#3 MLR) contacts and R26*c* (#1 MLR) contacts are also utilized to form selectors, the hubs thereof be positioned at coordinates AC–AE, 64 and 61, respectively, in Fig. 12B.

*The jam circuit*

A so-called jam circuit is provided to signal the operation when the card feed path is jammed. The detection of a card feed jam also stops all operational functions in the machine and maintains the status quo so that as often the jam conditions is removed, the machine operation may be reinitiated with no loss of data.

Referring now to Fig. 15B it will be recalled that as the first record of a stack in the hopper is fed therefrom, the leading edge of the record causes the card lever contact 494 to be closed at approximately drum cycle 13 of that machine cycle, in a manner previously described. The subsequent closing of cam contacts CF–3 completes a circuit from the power line 496, through the contacts CF–3, the contacts 494, now closed, to energize the so-called CL (card lever) relay R13. The energization of the CL relay R13 causes its associated contacts R13*a*, *c*, *d*, and *g*, to close R13*b* and *e* to open, and R13*b*, to transfer. After cam contacts CF3 open, the CL relay R13 is held energized by a circuit extending from the power line 496 through the contacts CF4 and the contacts R13*a*, until drum cycle 14.2 of the next cycle of operation of the program and card feed shafts. By this time, all subsequent card will be engaging the rollers 393 and 394 to reestablish the pickup circuit to the relay R13 through CLC contacts 494 and cam contacts CF3 so that, in effect, the CL relay R13 once energized, remains energized as long as nothing interferes with the feeding of records from the hopper 368. It will be appreciated that the entry records need not be fed successively in order for the CL relay R13 to be maintained energized. Thus in those cases such as MLR operation, and print operations in columns 40 through 80 of the print record, wherein the card feed operations are suspended for a variable length of time, the CL relay R13 is held energized through cam contacts CF4, which are closed (see Fig. 15B) as long as the card feed clutch is latched.

In view of the above timing relationships it is evident that if in any particular card feed cycle the card feed jams, the bottom record in the hopper is unable to feed, therefrom and close the contacts 494 to reenergize the CL relay R13 in the usual manner. With the CL relay R13 reenergized and assuming cards in the hopper so that the hopper contacts 494 are closed, the closing of cam contacts CF10 at the beginning of drum cycle #16 of the "Jam" machine cycle, completes a circuit from the power terminal 489, through the conductor 495 and 496, through the closed hopper contacts 494, the contacts R13*b*, now closed as the relay R13 is unenergized, the cam contact CF10, and finally through the "Jam" relay R14 to ground. The resultant energization of the jam relay R14 causes its associated contacts R14*a*, *d*, *f*, and *g* to close, R14*b* and *e* to open, and R14*c* to transfer the purpose of each of the contacts of the "Jam" relay R14 will now be explained in detail.

The closing of the contacts R14*a* completes a hold circuit for the "Jam" relay R14, from the power line 496, through the cam contact CF–1, a conductor 1557 the contacts R14*a* to the relay R14. With the contacts R14*d* closed, a circuit is completed from the 6.3 volts A.C. terminals 470 and 471 to light a "Jam" indication light 1559. With the contacts R14*e* open, the 100 v. reset line 1560 is opened to reset and stop the address device 427. With the address device 427 inoperative, any machine functions plugwired for initiation under control of the address device (reading exit hubs 364) are accordingly prevented during this cycle.

With the "Jam" contact R14*b* open, the pickup circuit is the first card relay R15 is disabled through drum cycle #9 of the machine cycle following the "Jam" machine cycle. If the pickup circuit of the first card relay was not so disabled, the closing of the cam contacts CF10 at the beginning of drum cycle #3 of the first machine cycle after the correction of the "Jam" condition, would complete the usual "first card" circuit through the closed hopper contact 494 and the namely closed contacts R13*b* (closed when CLC is unenergized as would be the case at the time when cam contacts CF1 close during the first machine cycle following the "Jam" cycle). If the first card relay R15 was so energized during the cycle following the removal of the "Jam," the usual first card feed cycle suppression of machine functions would be effected. As a result of this action, the data in the one card track would be "lost." The R14*b* contacts by preventing the recognition of the first feed cycle following the removal of the "Jam" as a "first card cycle," permits the machine to immediately process data on the first machine cycle following the "Jam."

With the "Jam" relay R14 energized and the associated contacts R14*c* accordingly transferred, the circuit leading from the power terminal 489 through conductor 495 etc. to the print position emitter 339 is agreed to prevent the initiation of any print position controlled functions during the "Jam" machine cycle. The transferring of the R14c contacts services a companion function to that described above for the contacts R14b and that they disable the power circuits to cam contacts CF11 and CF–12. Consequently the closing of contacts CF11 and CF12 (see Fig. 14B) is ineffective for impulsing the alternate card feed relays R16 and R17 respectively. This is an essential action since the maintenance of the status quo of machine, upon the sensing of the "Jam" condition, includes the maintenance of the alternate card relay R16 and R17 in their same position. If the status of the alternate card feed relays was not so maintained, the feeding of the record card after the removal of the "Jam" condition, would cause that card data to be written on the opposite card track to which it would ordinarily have written, to thus erroneously erase the unprocessed data therein. This action would also cause the data to be reprocessed from the same track as was previously processed on the cycle prior to the "Jam" cycle.

With the "Jam" relay R14 energized and the contacts R14g closed, the closing of the cam contact PS–6 at the beginning of drum cycle #14 of the "Jam" machine cycle, completes a circuit from the power terminal 1489, through a conductor 1561, the contacts PS–6 and the contacts R14g to energize a so-called "Jam" magnet 1562. With the "Jam" magnet 1562 energized, the armature 1564 engages a projecting portion of the restoration bail 271 (see Fig. 18) of the line program contacts so as to prevent them restoring at the start of the next machine cycle. Thus the status quo of the line program contacts is also maintained so that on the resumption of machine operation after the removal of the "Jam" condition, the same line program contacts are closed during the first machine cycles as were closed when the "Jam" condition arose.

In summation, the purpose of the "Jam" relay R14 is to indicate the failure of feeding of the bottom record in the hopper by lighting the "Jam" light and also to maintain the status quo of the various controlling circuits of the machine, so that after the "Jam" condition is corrected, the machine may be started again and operations continue from the point of interruption.

While there have been shown and described and pointed out the fundamental novel features of the invention as applied to a preferred embodiment, it will be understood that various omissions and substitutions and changes in the form and details of the apparatus illustrated and its operation may be made by those skilled in the art, without departing from the spirit of the invention. It is the intention, therefore, to be limited only as indicated by the scope of the following claims.

What is claimed is:

1. In combination, sensing apparatus for sensing a column of a record for data representations therein, said sensing apparatus including an input terminal for receiving a signal to render it operable for the duration of said signal, means for advancing a record card having a fixed number of columns, column by column into cooperating relationship with said sensing apparatus, a rotating storage drum having a magnetizable storage channel for storing magnetic representations of data, said channel having a number of storage positions equal in number to the columns in said record, a recording head positioned adjacent said channel so that the storage positions thereof rotate successively thereunder, said drum rotating at a speed to present all storage positions thereof successively to said head during the presentation of each column of said record to the sensing apparatus, a synchronizing channel of indexing signals extending circumferentially about said drum, a drum addressing device having a number of output signal sources equal in number to the number of storage positions of said storage channel, said addressing device being responsive to said indexing signals to generate an output signal successively in each of said outputs as the corresponding storage position of said storage channel is rotating under said recording head, a distributor having a common output and a plurality of contact inputs equal in number to the columns in said record, said contact inputs being connected successively to said output in synchronism with the presentation of the corresponding column of said record to the sensing aparatus, means linking each of said address device outputs to a corresponding one of said distributor inputs and said distributor common output to said sensing apparatus signal input terminal, wherein as each record column is in the sense position, said sense apparatus is rendered operable as the corresponding storage position rotates under said recording head, and means responsive to said sensing apparatus for actuating said recording head to store in the storage position a magnetic representation of the sensed record representation.

2. In combination, sensing apparatus for sensing a column of a record for data representations therein, said sensing apparatus including means responsive to a gate impulse for rendering the sensing apparatus operable for the duration of the gate impulse, means for advancing a record card having a fixed number of columns, column by column into cooperating relationship with said sensing apparatus, a rotatable member having a storage channel divided into a number of storage positions equal to the number of columns in said record, magnetic recording means associated with said storage channel, means for rotating said rotatable member at a speed so that all storage positions of said storage member are presented to said recording means during the presentation of each column of the record to said sensing apparatus, means operable in synchronism with the rotation of said member for producing a distinct gate signal during the passage of each storage position under said recording means, distributor means synchronized with said record advancing means for routing the gate signal corresponding to each storage position to said sense apparatus when the corresponding column is in the sense position, and means responsive to said sensing apparatus for actuating said magnetic recording means.

3. In combination, sensing apparatus operable to simultaneously sense all the index points of a column of a record for data representations therein in a first combinational code, means responsive to a received gate impulse for rendering said sensing apparatus operable for the duration of said impulse, means for advancing a record card having a fixed number of columns, column by column into cooperating relationship with said sensing apparatus, a rotatable magnetic drum storage device having a data storage channel extending circumferentially thereabout, said channel being divided into a number of storage sections equal in number and corresponding to the columns in said record, each said sections being subdivided into successively arranged bit areas each of which is assigned a predetermined coded significance in accordance with a second combinational code, said storage drum also including a timing signal track extending circumferentially around said drum, a magnetic recording head associated with said storage channel, means for rotating said drum so that all storage sections that are presented to said recording head during the presentation of each column of said record to said sense apparatus, magnetic means associated with said timing track for reading said timing signals, a cyclically operable first counting circuit responsive to said magnetic means for sequentially generating output signals coincident with the passage of each bit area of a storage position past said magnetic recording head, second counting means advanceable one position upon receipt of an output pulse from said first counting means upon the completion of each cycle thereof, for generating a distinct output gate pulse coincident with the passage of each storage position past said magnetic recording head, distributor means synchronized with said record advancing means for routing the gate signal corresponding to each storage position to said sense apparatus when the corresponding column is in sense position, translating means responsive to said sense apparatus and said first counting means for generating signals in said second combinational code of the data sensed, and means for applying said generated signals to said magnetic recording head.

4. In combination, sensing apparatus for sensing a column of a record for data representations therein, said sensing apparatus including means responsive to a timing signal for rendering the sensing apparatus operable, means for advancing a record card having a fixed number of columns, column by column into cooperating relationship with said sensing apparatus, a rotatable member having a data storage channel extending circumferentially thereabout, said storage channel having a storage section for each of said columns of the record, recording means cooperating with said storage channel, means for rotating said rotatable member, means synchronizing said rotating means with said record advancing means so as to present all storage sections of said channel to said recording means during the presentation of each column of said record to said sensing means, a source of periodic indexing signals associated with said rotatable member, a counting circuit responsive to said indexing signals to generate timing signals identifying each storage section as it is presented to said recording means, routing means directing each timing signal to said sensing apparatus when the corresponding column of the record is in sense position, and means responsive to said sense apparatus for actuating said recording means.

5. In combination, apparatus operable to sense a column of a record card for data designations therein, means for successively presenting the columns of a record card to said sensing apparatus, a magnetic storage drum having a number of storage positions equal to the columns in a record, recording means cooperating with said drum, means for rotating said drum in synchronism with said card presenting means so that all storage positions of said drum are successively presented to said recording means during the presentation of each column of the record to said sensing means, means associated with said drum for emitting a timing signal coincident with the passage of each storage position past said record means, means for applying each timing signal to said sensing apparatus when the corresponding column is in sense position to render said sensing apparatus operable to sense the data in said column, and means responsive to said sensing apparatus for actuating said recording means to record in the storage position corresponding to said sensed column, a magnetic representation of said sensed data.

6. In combination, sensing apparatus operable to sense a column of a record card for data designations therein, means for successively presenting the columns of a record card to said sensing apparatus, a magnetic storage drum having a number of storage positions equal to the columns in a record, recording means cooperating with said drum, means for rotating said drum in synchronism with said card presenting means so that all storage positions of said drum are successively presented to said recording means during the presentation of each column of the record to said sensing means, means associated with said drum for emitting a gate signal coincident with the passage of each storage position past said record means, means for applying each gate signal to said sensing apparatus when the corresponding column is in sense position to render said sensing apparatus operable to sense the data in said column, transmitting means operable to transmit said sensed data from said sensing apparatus to said recording means, a bistable element operable to first and second stable states, said element when in said first state rendering said transmitting means operable, means for applying each gate signal rendering said sensing apparatus operable, also to said bistable element with the leading edge of said gate signal operating said element to said first state, and means responsive to the trailing edge of said gate signal for operating said bistable element to said second state.

7. In combination, a multi columnar print record, a single element print device, means for advancing said print device to present it successively to the columns of a print line of said record, actuating means associated with said print device and responsive to received impulse for effecting the printing of a desired print character in a desired column of said print record, a rotatable storage drum having a magnetizable channel for storing data, said channel being divided into a number of storage positions equal in number to the columns of said record, means for loading said channel with magnetic representations of data, a magnetic reading head associated with said channel for reading the magnetic representations of data in the sections of said channel as they rotate successively thereunder, said head generating signal impulses corresponding to the data read from each section, a coincidence device having an output and two inputs and adapted to generate on the output a signal as a result of any coincident presence of signals on said two inputs, means applying said reading head signals to one of said inputs, means for rotating said drum in synchronism with said print device advancing action so as to present all sections of said channel to said reading head at least once during the advance of said print device from one print column to the successive print column, a synchronizing channel of indexing signals extending circumferentially about said drum, a drum addressing device having a number of output signal sources equal in number to the number of storage positions of said data channel, said addressing device being responsive to said indexing signals to generate an output signal successively on each of said outputs as the corresponding storage position of said storage channel is rotating under said reading head, a distributor having a number of pairs of inputs and outputs equal to the number of columns in said print record, means for operating said distributor so as to connect each pair of inputs and outputs successively in time relationship with the advance of said print device, means for connecting the output signal source of said address device corresponding to the particular storage position of said channel from which a data readout is desired to the input of the pair of distributor contacts corresponding to the print column in which it is desired to print the data, means for connecting the output of said latter pair of distributor contacts to the other input of said coincidence device, and means for connecting the output of said coincidence device to said print device actuating means.

8. In combination, a serial type printer, means for advancing said printer to printing position in successive columns of a print line of a print record, actuating means associated with said print device and responsive to received impulses for effecting the printing of a desired print character in a desired print column of the print record, a rotating magnetic storage element having a circumferentially extending channel in successive sections of which items of data are recorded in the form of discrete magnetic spots, reading means associated with said channel for reading the magnetic spots and transmitting signals corresponding thereto, means for rotating said element in timed relationship with said columnar printer advancing means so as to present all sections of said channel to said reading means at least once during the advance of said printer from one print column to the successive print column, means operable in synchronism with the rotation of said storage element for producing an individual gate signal as the data in the corresponding section is read by said reading means, routing means operable in timed relationship with said printer advancing means, coincidence means for generating on an output thereof a signal during any coincident presence of signals on first and second inputs thereof, means applying the signals transmitted from said reading means to the first input of said coincidence device, presettable selecting means for selecting any predetermined storage sections of said channel and any predetermined columnar print positions of said printer to print the data as represented in said predetermined storage sections, said selecting means including said routing means for applying the gate signal corresponding to each said predetermined sections of said channel from which it is desired to print the data represented therein to the second input of said coincidence device as said printer approaches each said predetermined print columns, and means for applying the output of said coincidence device to said actuating means for causing said printer to print in each said predetermined columns the data each from said predetermined related storage sections.

9. In combination, a serial type printer, means for advancing said printer to printing position in successive columns of a print line of a print record, a rotatable storage drum having a magnetizable storage channel around the periphery thereof, said channel being divided into a number of character storage positions with each character position being subdivided into a number of serially arranged bit positions, each assigned a coded significance in accordance with a predetermined combinational binary coded decimal code and representative thereof when a magnetic bit is stored therein, means for loading data into said character positions, by magnetizing one or a combination of the bit areas of each character position in accordance with the character to be represented therein in means operable in synchronism with the rotation of said drum for producing indexing signals, one signal for each bit area of said storage channel, a first counting circuit responsive to said indexing signals and having a counting capacity equal to the number of bit areas in a character position, said counting circuit being connected to recycle, a second counting circuit having a capacity equal to the number of character positions of said storage channel, said counter being connected to recycle and being advanced one count by said first counting circuit upon the completion of each cycle of said first counting circuit, said second circuit including means for generating a distinct output gate signal during the period of each count thereof, reading means associated with said storage channel for reading the magnetic spots sequentially and transmitting signals corresponding thereto, means for rotating said drum in timed relationship with said printer advancing means so as to present all positions of said channel to said reading means at least once during the advance of said print device from one print column to the successive print column, routing means operable in timed relationship with said columnar printer advancing means, coincidence means for generating output signals corresponding to the overlap of signals applied to first and second inputs thereof, means applying the signals transmitted from said reading means to the first input of said coincidence device, a plurality of thyratrons, one for each of said bit areas of a character position, each said thyratron having first and second control grids, means including said first counting circuit for conditioning the first grid of each of said thyratron in timed relationship with the passage of corresponding bit areas of a character position under said reading means, presettable selecting means for selecting any storage positions of said channel and any predetermined columnar print positions of said print to print the data as represented in said predetermined related storage positions, said selecting means including said routing means for applying the gate signal corresponding to each said predetermined storage positions to the second input of said coincidence device during a drum cycle as the print device approaches said predetermined related columnar print position, means applying the output of said coincidence device to the second grid of all said thyratrons wherein those thyratrons having both grids simultaneously conditioned by signals are rendered conductive, and means controlled in accordance with the pattern of thyratrons rendered conductive for actuating said printer to print in each predetermined column the print character corresponding to data readout of the predetermined related character position of said drum.

10. In combination, a serial type printer, means for advancing said printer to printing position in successive columns of a print line of a print record, a rotatable storage drum having a magnetizable storage channel around the periphery thereof, said channel being divided into a number of character storage positions with each character position being subdivided into a number of serially arranged bit positions, each assigned a coded significance in accordance with a predetermined combinational binary coded decimal code and representative thereof when a magnetic bit is stored therein, means for loading data into said character positions, by magnetizing one or a combination of the bit areas of each character position in accordance with the character to be represented therein, means operable in synchronism with the rotation of said drum for producing indexing signals, one signal for each bit area of said storage channel, a counting circuit responsive to said indexing signals and having a capacity equal to the number of bit areas in a character position, said counting circuit being connected to recycle, a plurality of thyratrons, one for each of said bit areas of a character position, each said thyratrons having first and second control grids, reading means associated with said storage channel for reading the magnetic bit positions through sequentially and generating signals corresponding thereto, means including said counting circuit for conditioning the first grid of each of said thyratrons in timed relationship with the passage of corresponding bit areas of a character position of said channel under said reading means, transmitting means selectably operable to apply said generated signals from said reading means relating to a selected character position to the second grid of all said thyratrons wherein those thyratrons having both grids simultaneously conditioned by signals are rendered conductive, means resetting said thyratrons prior to the transmission of any character representative signals thereto, means for rotating said drum in timed relationship with said printer advancing means so as to present all positions of said channel to said reading means at least once during the advance of said print device from one print column to the successive print, selecting means presettable to select a desired character position for printing and the print column in which said character is to be printed, means controlled by said selecting means to render said transmitting means operable during the reading of said selected character position and the advance of said printer towards the desired print column, and means operable in response to the pattern of thyratrons rendered conductive as a result of the reading out of the selected character for actuating said print device to select and print the corresponding print character.

11. In combination, a serial type printer, means for advancing said printer to printing position in successive columns of a print line of a print record, a plurality of type character selection actuators associated with said printer each said actuators being assigned a coded significance in accordance with a predetermined combinational code, said actuators being operable singly or in combination to select any one of plurality of possible print characters of said printer for printing in a column of said record, a rotating storage element having a circumferentially extending magnetizable channel, said channel being divided into a number of character storage positions with each character position being subdivided into a number of serially arranged bit positions, each assigned a coded significance in accordance with said print device actuator code and representative of said coded significance when a magnetic bit is stored therein, means for loading data into said character positions, means associated with said channel for reading the magnetic spots and transmitting signals corresponding thereto, means for rotating said element in timed relationship with said columnar printer advancing means so as to present all sections of said channel to said reading means at least once during the advance of said printer from one print column to the successive print column, means operable in synchronism with the rotation of said storage element for producing an individual gate signal as the data in the corresponding character section is read by said reading means, routing means operable in timed relationship with said printer advancing means, coincidence means for generating on an output thereof a signal as a result of any coincident presence of signals on first and second inputs thereof, means including said routing means for applying the gate signal corresponding to the section of said channel from which it is desired to print the data represented therein to the first input of said coincidence device prior to the advance of said print device to the desired print column, means applying the signals transmitted from said reading means to the second input of said coincidence device, a plurality of relays, one for each of the elements of said combinational code, means responsive to output signals from said coincidence device for setting said relays in accordance with the bit representations of the character section readout, means responsive to the set relays for rendering corresponding one of said actuators operable to select the type character corresponding to said readout character for printing in the selected print column, comparison means, means responsive to said set relays for entering a corresponding character representation into said comparison means, means responsive to said operated actuators for entering a corresponding character representation into said comparison means, and means for emitting a print error signal from said comparison means upon a difference in entered character representation from said actuators and relays.

12. In combination, a single element print device, means for advancing said print device to successive print positions of one print line of a print record, a distributor having a number of individual switching elements, said distributor being advanced in synchronism with said print device advancing means so as to close each switching element, in turn, as the print device approaches a corresponding columnar print position, a magnetic storage drum having a multiposition storage track and a sync track, means for rotating said drum at least once during the advance of said print device from one columnar print position to the successive position, means for loading magnetic representations of data into the storage position of said storage track, means for reading the magnetic representations of said storage positions and transmitting signals corresponding thereto, all storage positions being read during each rotation of said drum, drum addressing means driven by said sync track for generating a distinct address gate signal during the reading of the data from a corresponding storage position, means for applying each gate signal to any predetremined one of the switching elements of said distributor, and means cojointly responsive to said reading means and the particular gate signal routed through each switching element of said distributor when closed, to actuate said print device to print in the corresponding print column the character read by said reading means.

13. In combination, a single element print device means for advancing said print device to successive columnar print positions of a print line of a print record, a distributor having a number of individual switching elements, said distributor being advanced in synchronism with said print device advancing means so as to close each switching element, in turn, as the print device approaches a corresponding columnar print position, a magnetic drum having a multi position storage track and a sync track, means for rotating said drum two complete revolutions for each columnar advance of said print device, means for loading magnetic representations of data into the storage positions of said storage track, means for reading the magnetic representations of said storage positions and transmitting signals corresponding thereto, all storage positions being read during each rotation of said drum, drum addressing means driven by said sync track for generating a distinct address gate signal during the reading of the data from a corresponding storage position, means responsive to said sync track for generating a signal during the entire period of every alternate drum rotational cycle, means for applying each gate signal from said address device to any predetermined one of the switching elements of said distributor as determined by the particular print column in which it is desired to print the data in the storage position related to said gate signal, coincidence means for generating output signals corresponding to the overlap of signals applied to first, second, and third inputs thereof, means applying the signals transmitted from said reading means to said first input, means for applying said alternate drum cycle signal to said second input, means applying the particular gate signal from each associated predetermined switching element of said distributor, when closed, to said third input, first circuit means settable each alternate drum cycle in response to output signals from said coincidence device, second settable means settable at the end of each alternate drum cycle in response to the setting of said first settable means, and means responsive to the setting of said second circuit means for actuating said print device to select and print in the proper column the data readout of the chosen storage position.

14. In combination, a rotatable magnetic storage drum, a first data storage channel on the periphery of said drum, said channel having a predetermined number of serially arranged storage positions, with each storage position being adapted to store a digit in serial-binary coded form, a second data storage channel having a number of storage positions equal to and identical to said first channel, the storage positions of said second channel being divided into groups of equal numbers of storage positions each group comprising a counter register of a fixed number of orders, a channel of indexing signals on the periphery of said drum, means for loading number data representations into the storage positions of said first storage channel, a reading device for picking up data representations from said first channel, a reading device associated with said second channel for picking up data representations therefrom, a recording device associated with said second channel and angularly spaced from the same channel reading device around the periphery of said drum in the direction of rotation thereof, an erase device associated with said second channel and positioned between the reading and recording device thereof, drum addressing means driven by said indexing signals, a first distributor having a number of positions equal to the number of storage positions in a channel of said drum, means for operating said distributor and rotating said drum in timed relationship so that a successive position of said distributor is activated during a fixed number of cycles of rotation of said drum, a second distributor similar to said first distributor, means for operating said second distributor in timed relationship with said first distributor so that the positions of said second distributor are each activated at a fixed time after the activation of the corresponding position of said first distributor, a binary coded electronic adder including means settable representative of a desired addend digit, means including a preselected position of said first distributor and said addressing means for routing the output of said first channel reading device in response to the reading of a preselected storage position of said first channel, to said presetting means to adjust them in correspondence to the read-out value representation; means including the corresponding position of said second distributor and said addressing means for entering signal manifestations in parallel of the value represented in said presetting means into said adder, and then subsequently in response to the reading device of said second channel, entering serially, signal manifestations of the value represented in a preselected order of a preselected counter register into said adder to generate therein a sum in binary coded form, means for actuating said erase device as the selected order of the selected counter register rotates thereunder after the read-out to the adder, to erase the value representation therein, and means for transferring the sum representation in said adder to said recording means as the selected order of the selected counter rotates thereunder subsequent to said erase action to record in that storage position the sum in binary coded form.

15. In combination, a rotatable magnetic storage drum, first and second identical storage channels on the periphery of said drum, each said channels having a predetermined number of serially arranged storage positions, with each storage position being adapted to store a digit in serial-binary coded form, a third data storage channel having a number of storage positions equal to and identical to said first channel, the storage positions of said third channel being divided into groups of equal numbers of storage positions, each group comprising a counter register of a fixed number of orders, a channel of indexing signals on the periphery of said drum, means for loading numeric data representations into the storage positions of said first storage channel, a reading device for picking up data representing signals from said first channel, a reading device associated with said third channel for picking up data representing signals therefrom, a recording device associated with said third channel and angularly spaced from the same channel reading device around the periphery of said drum in the direction of rotation thereof, an erase device associated with said third channel and positioned between the reading and recording device thereof, a recording device associated with said second channel, a reading device associated with said second channel and angularly spaced in the direction of rotation of said drum from the same channel reading device, drum addressing means driven by said channel of indexing signals, a first distributor having a number of positions equal to the number of storage positions in a channel of said drum, means for operating said distributor and rotating said drum in a timed relationship so that a successive position of said distributor is activated during a fixed cyclical rotation of said drum, a second distributor identical to said first distributor, means for operating said second distributor in timed relationship with said first dstributor so that the positions of said second distributor are each activated at a fixed time after the activation of the corresponding position of said first distributor, a binary coded electronic adder including means settable representative of a desired addend digit, means including a preselected position of said first distributor and said addressing means for routing the output of said first channel reading device in response to the reading of a value representation from a preselected storage position of said first channel to said settable means to adjust them in correspondence to the readout value representation, means including the corresponding position of said second distributor and said addressing means for entering signal manifestations in parallel of the value represented in said settable means into said adder and then subsequently in response to the reading device of said third channel, entering serially, signal manifestations of the value represented in a preselected order of a preselected counter register into said adder to generate therein a sum in binary coded form, means for actuating said erase device as the selected order of the selected counter register rotates thereunder after the readout to the counter, to erase the value representation therein, means for reading out signal manifestations of the sum in said adder to said recording device of the second channel to record therein the sum digit, and means responsive to said related reading device associated with said second channel in response to the reading of said sum digit representation to transmit signal manifestations to the recording means of said third channel to record in the selected order of the selected counter register a signal manifestation of the sum digit in binary coded form.

16. In combination, a rotatable magnetic storage drum, first and second data channels on the periphery of said drum, said channels having an equal number of character storage positions in which magnetic representations of data can be stored serially by character, with each character being represented in a combinational binary code, the magnetic representations of each character in a storage position being arranged serially by bit, the storage positions of said second channel being considered in groups of equal size, each group being representative of a counter register of a fixed number of orders; a channel of indexing signals on the periphery of said storage drum, means for loading numeric data representations into the character storage positions of said first storage channel, a reading device associated with said second channel for picking up data representing signals therefrom, a recording device associated with said second channel and angularly spaced from the related reading device around the periphery of said drum in the direction of rotation thereof, an erase device associated with second channel and positioned between the reading and recording device thereof, drum addressing means driven by said channel of indexing signals, a first distributor having a number of positions equal to the number of storage positions in a channel of said drum, means for operating said distributor and rotating said drum in a timed relationship so that a successive position of said distributor is activated during a fixed cyclical rotation of said drum, a second distributor identical to said first distributor, means for operating said second distributor in timed relationship with said first distributor so that the positions of said second distributor are each activated at a fixed time after the activation of the corresponding positions of said first distributor, a binary coded electronic adder including means settable representative of a desired addend digit, means including a preselected position of said first distributor and said addressing means for routing the output of said first channel reading device in response to the reading of a value representation from a preselected storage position of said first channel, to said settable means to adjust them in correspondence to the read out value representation, means including the corresponding position of said second distributor and said addressing means for entering the value represented in said settable means into said adder and then subsequently in response to the reading device of said second channel, entering a representation of the value manifestation of a preselected order of a preselected counter register into said adder to generate therein a sum in binary coded form, means for actuating said erase device as the selected order of the selected counter register rotates thereunder after the read-out to the adder, a temporary storage device, means for transferring signal manifestations of said adder sum to said temporary storage device, and means for transferring signal manifestations of the sum representation in said temporary storage to said second channel recording device as the selected order of the selected counter register which supplied one of the factors of the operation rotates there under to record therein a representation of the sum.

17. In combination, a rotatable magnetic storage drum having a first data channel on the periphery thereof, wherein data may be stored serially by character, with each character being represented in a combinational binary coded decimal form, a character designation being stored serially by bit, a second data channel on the periphery of said drum and similar to said first channel, the character positions of said second channel being divided into equal groups, each group forming a counter register, a channel of indexing signals on the periphery of said drum, drum addressing means driven by said channel of indexing signals, a binary coded adder having a decimal capacity greater than ten and including means settable representative of a desired addend digit, means for loading numeric data representations into the character positions of said first channel, first distributor means having a number of positions equal to the number of character positions of one of said drum data channels, means for rotating said drum and operating said distributor in a timed relationship so that a successive position of said distributor is activated during a fixed cyclical rotation of said drum, a second distributor identical to said first distributor, means operating said second distributor in timed relationship with said first distributor so that the positions of said second distributor are each activated at a fixed time after the activation of the corresponding position of said first distributor, means including a preselected position of said first distributor and said addressing means for reading the character representation in a chosen storage position of said first channel and generating signals in correspondence thereto, means responsive to said generated signals to adjust said adder settable means in correspondence thereto, means including the corresponding position of said second distributor and said addressing means for entering the value represented in said settable means into said adder, and then reading the value designation in a selected order of a selected counter register of said second channel to said adder to generate therein a sum in binary coded form, means for erasing the selected order of the selected counter register after the read-out to the adder, a binary coded register responsive to signal representations of values, means transmitting signals representative of the sum in said adder to said register, equating means sensing the binary coded sum in said adder to determine if a decimal carry is required, means responsive to said equating means when the need for a decimal carry is detected to adjust said register value to the proper binary coded form minus tens carry, and means for recording in said selected order of said selected counter register after said erase operation the sum represented in said register.

18. Apparatus as in claim 17 further characterized by means resetting said adder upon the transference of the sum value therein to said register, means responsive to said equating means when the need for a decimal carry is detected thereby to enter a decimal carry in binary coded form into said reset adder, and means also responsive to said equating means in response to the detection of the carry condition for effecting another cycle of the adder operation by reading out the successive higher order of said selected counter register to said adder to generate a value representation adjusted for carry therein, erasing the order of the selected register supplying the one factor of the decimal carry operation after the readout thereof to said adder, and repeating the action of said transmitting means, equating means, and recording means.

19. In combination, a rotatable magnetic storage drum, a first data channel on the periphery thereof for storing number representations serially, digit by digit, with each digit representation being stored serially, bit by bit, in a binary coded combinational code; a second channel on said drum similar to said first channel, the digit representing positions of said second channel being arranged in equal groups, each group representing a counter register of a fixed number of orders, a channel of indexing signals on the periphery of said drum, drum addressing means driven by said channel of indexing signals, a binary coded electronic adder including means settable representative of a desired addend digit, means for loading digit representations into the digit positions of said first channel, first selection means including said drum addressing means for selecting a digit position of said first data channel, means for reading out the selected digit position of said first channel and setting said adder settable means in accordance with the numeric value representation thereof, second selection means including said drum addressing means for selecting a desired order of a desired counter register of said second channel, means rendered operable in response to the selection action of said second selection means to enter the numeric representation in said settable means into said adder, means for subsequently reading out signal manifestations of the selected order of said selected counter register to said adder to generate therein a desired sum representation, means for erasing the data designation in said selected order of the selected counter register subsequent to readout, and means for reading out the sum representation in said adder and recording it in the erased selected order of the selected counter register.

20. Apparatus as in claim 19 further characterized in that said adder has a decimal capacity greater than 9, equating means sensing the sum in said adder to determine if it is greater than 9, and means responsive to said equating means when the sum in said adder is greater than 9, to adjust said sum to proper binary coded form minus 10's carry prior to the recording in the erased order of said selected counter register.

21. Apparatus as in claim 20 further characterized by means resetting said adder, means responsive to said equating means when the need for a decimal carry is detected thereby to enter a decimal carry in binary coded form into said reset adder, and means also responsive to said equating means in response to the detection of the carry condition to actuate said second selection means to select the succeeding higher order of said selected register and to effect another adder operation to adjust the next higher order of said counter register for the decimal carry.

22. Apparatus as in claim 19 further characterized in that said electronic adder is a plural order binary adder including a carry device settable upon an exceeding of the capacity of said adder, said adder having a capacity greater than 10 by a predetermined amount, means sensing the sum in said adder after an operation thereof and setting said carry device if the sum therein is greater than 9 but less than the capacity of said adder, and means responsive to said carry device if set to adjust said sum to proper binary coded form minus 10's carry prior to the recording in the erased order of the selecter counter register.

23. In combination, a rotatable magnetic storage drum, a first data channel on the periphery thereof for storing numeric representations serially, digit by digit, with each digit representation being stored serially, bit by bit, in a binary coded combinational code, a second channel on said drum similar to said first channel, the digit representing positions of said second channel being arranged in equal groups, each group representing a counter register of a fixed number of orders, a channel of synchronizing signals on the periphery of said drum, drum addressing means driven by said channel of synchronizing signals, a binary coded adder including means settable representative of a desired addend digit, means for loading digit representations into the digit positions of said first channel, first selection means including said drum addressing means for selecting a digit position of said first data channel, means for reading out the selected digit position of said first channel and setting said adder settable means in accordance with the numeric value representation thereof, an adder program device having first, second, and third stages and including means responsive to said indexing signals for activating said stages for fixed intervals in sequence upon an initiation of a cycle of said program device, second selection means including said drum addressing means for selecting a desired order of a desired counter register of said second channel, means rendered operable in response to the selection action of said second selection means to initiate a cycle of said program device, means responsive to said first stage of said program device when activated to enter the numeric representation in said settable means into said adder and subsequently reading out signal manifestations of the selected order of said selected counter register to said adder to generate therein a desired sum representation, temporary storage means, means including said second stage of said program device when activated for transferring a signal representation of said adder sum digit from said adder to said temporary storage and resetting said adder, means including the third stage of said program device when activated for erasing the data designation in said selected order of the selected counter register, and means for reading out the sum representation in said temporary storage means and recording it in the erased order of said selected counter register.

24. Apparatus as in claim 23 further characterized in that said adder has a decimal capacity greater than 10, equating means sensing the binary coded sum in said adder to determine if a decimal carry is required, and means responsive to said equating means when the need for a decimal carry is detected to adjust said sum in temporary storage to proper binary coded form minus tens carry prior to readout to the erased order of said selected counter register.

25. Apparatus as in claim 24 further characterized by means resetting said adder on the transference of the sum therein to said temporary storage, means responsive to said equating means when the need for a decimal carry is detected thereby to enter a decimal carry in binary coded form into said reset adder, and means also responsive to said equating means in response to the detection of the carry condition to initiate another cycle of said adder program device so as to effect an adjustment of the next higher order of said counter register for the decimal carry.

26. In combination, a rotatable magnetic storage drum, a first data channel on the periphery thereof for storing number representations serially, digit by digit, with each digit representation being stored serially, bit by bit, in a binary coded combinational code, a second channel on said drum similar to said first channel, the digit representing positions of said second channel being arranged in equal groups, each group representing a counter register of a fixed number of orders, a channel of indexing signals in the periphery of said drum, drum addressing means driven by said channel of indexing signals, a first plural order binary adder including a carry device normally set by the exceeding of the capacity of said adder, said adder having a capacity greater than 10 by a predetermined amount, said adder including means settable representative of a desired addend digit, means for loading digit representations into the digit positions of said first channel, first selection means including said drum addressing means for selecting a digit position of said first data channel, means for reading out the selected digit position of said first channel and setting said adder settable means in accordance with the numeric value representation thereof, second selection means including said drum addressing means for selecting a desired order of a desired counter register of said second channel, means rendered operable in response to the selection action of said second selection means to enter the numeric representation in said settable means into said adder, means for subsequently reading out signal manifestations of the selected order of said selected counter register to said adder to generate therein a desired sum representation, means for erasing the data designation in said selected order of the selected counter register subsequent to the readout thereof to said adder means sensing the sum in said first adder after an operation thereof and setting said carry device if the sum therein is greater than 9 but less than the capacity of the adder, a second adder having a capacity equal to said first mentioned adder but not having a carry device, means transferring the sum in said first adder to said second adder, means responsive to said first adder carry device if set, to enter signals representative of a correction value equal to the difference between 10 and the radix of said first adder into said second adder, means for reading out the sum representation in said second adder and recording it in the erased selected order of the selected counter register, and means for resetting said second adder subsequent to said readout.

27. Apparatus as in claim 26 further characterized by means operable concurrent with the transferring of the sum in said first adder to said second adder to reset said first adder, said associated carry device remaining unaffected by said reset action, means responsive to said carry device if set to enter a carry into said reset first adder, means also responsive to said carry trigger, if set, to actuate said second selection means to select the succeeding higher order of said selected counter register and to effect another cycle of operation of said adder to adjust the next higher order of said counter register for the decimal carry, and means for resetting said carry device after it initiates the additional cycle of operation of said adder in preparation for a possible new setting thereof as a result of said additional cycle.

28. Apparatus as in claim 26 further characterized in that first and second adder each has a capacity of 15 and said correction representation entered into said second adder under control of said first adder carry device, when set, is the value 6.

29. Apparatus as in claim 26 further characterized in that said first adder comprises four electronic devices having first and second stable states, said devices being assigned weighted values 1, 2, 4, and 8, and each representative of its assigned value when in said first state, said devices being interconnected so as to accumulate in accordance with the rules of binary arithmetic, said associated carry device also comprising an electronic bistable device assigned a 16's carry representation value and representative thereof when in a first stable state.

30. Apparatus as in claim 29 further characterized in that said means sensing the sum in said first adder comprises circuit means monitoring the 8, 4, and 2 bistable devices of said first adder, and further circuit means responsive to said monitoring means when the 8 and either or both the 4 and 2 stable devices are in said first stable state at the end of an adder cycle, to transfer said carry bistable device from its second to its first stable state.

31. In combination, a serial type printer, means for advancing said printer to printing position in successive columns of a print line of a print record, a plurality of type character selection actuators associated with said printer, each said actuators being assigned a coded significance in accordance with a predetermined combinational code, said actuators being operable singly or in combination to select any one of a plurality of possible print characters of said printer for printing in a column of said record, a rotatable magnetic storage drum, a first data channel on the periphery thereof for storing numeric representations serially digit by digit, with each digit representation being stored serially bit by bit, in the same binary coded combinational code as assigned to said actuators, a second channel on said drum similar to said first channel, the digit representing position of said second channel be arranged in equal groups, each group representing a counter register of a fixed number of orders, a channel of timing signals on the periphery of said drum, drum addressing means driven by said channel of timing signals, a binary coded electronic adder including addend entry means settable in said same binary coded form, means for loading digit representations into the digit positions of said first channel, first distributor means having a number of positions equal to the number of character positions of one of said drum data channels, means for rotating said drum and operating said distributor in a timed relationship so that a successive position of said distributor is activated during a fixed cyclical rotation of said drum, a second distributor identical to said first distributor, means operating said second distributor in timed relationship with said first distributor so that the positions of said second distributor are each activated at a fixed time after the activation of the corresponding positions of said first distributor, first selection means including a preselected position of said first distributor and said addressing means for reading the digit representation in a chosen digit position of said first channel and generating binary coded signals in correspondence thereto, circuit means responsive to said generated signals and settable in correspondence thereto, means responsive to the setting of said circuit means for rendering operable said type character selection actuators singly or in combination to effect a selection and printing in the proper column of said print record the digit representation readout of the chosen storage position, means also responsive to the setting of said circuit means to adjust said adder addend entry means in correspondence to said readout digit representation, second selection means including said address means and the position of said second distributor corresponding to the position of said first distributor which effected said readout, for entering the digit represented in said addend entry means into said addend and then reading the digit designation in a selected order of the selected counter register of said second channel to said adder to generate therein a sum digit in binary coded form.

32. Apparatus as in claim 31 further characterized in that said printer includes a print hammer which is operated after each type character selection operation to actually physically effect the printing of the selected type character, a third distributor having a number of positions equal to the number of possible columnar print positions of said print device, means for operating said third distributor in timed relationship with said printer advancing means so that the positions of said third distributor are each activated at a fixed time prior to the advance of the printer to the corresponding print column, and means including a preselected position of said third distributor for preventing the operation of said print hammer to suppress the printing when the print device reaches the corresponding print column of the type character selected by said actuators for printing in that column.

33. Apparatus as in claim 31 further characterized by means for erasing the selected order of the selected counter register after the reading out thereof to the adder, and means for subsequently recording in said erased counter register order the sum digit generated in said adder.

34. Apparatus as in claim 31 further characterized in that said circuit means includes a plurality of binary coded relays, each relay having a number of individual contacts thereof, one set of the contacts of said relays controlling said type character selection actuators, and another set of the contacts of said relays controlling the adder addend entry means.

35. Apparatus as in claim 34 further characterized in that said entry means includes said one set of the contacts of said relays, the contacts being arranged in a logical network having two inputs, one input if selected, causing said digit representations in said network to be entered in true form to said adder and the other input, if selected, causing said digit representation in said network to be entered in complement form to said adder, and means for selecting either the first input or second input of said network dependent upon whether an additive or subtractive entry is desired to said adder.

36. In combination, a serial type printer, means for advancing said printer to printing position in successive columns of a print line of a print record, a plurality of type character selection actuators associated with said printer, each said actuators being assigned a coded significance in accordance with a binary combinational code, said actuators being operable singly or in combination to select any one of a plurality of possible print characters of said printer for printing in a column of said record, a rotatable magnetic storage drum, a data storage channel on the periphery of said drum, said channel having a predetermined number of serially arranged digit storage positions, with each digit position being adapted to store a digit serially in binary coded form, the digit positions of said channel being divided into equal groups, each group comprising a counter register of a fixed number of orders, a channel of timing signals on the periphery of said storage drum, drum addressing means driven by said timing signals, a distributor having a number of positions equal to the number of digit positions of said channel, means for operating said distributor, said print device advancing means, and said drum in timed relationship so that a successive position of said distributor is activated during each of a fixed cyclical rotation period of said drum, and said print device is advanced to a successive print device during a period equivalent to said cyclical rotation period of said drum; means including said addressing means and successive preselected positions of said distributor to select the digit positions of a desired counter register in sequence from the higher orders toward the lower, one order being selected each cyclical rotation period of said drum, a reading device associated with said channel for picking up and transmitting digit representing signals from each selected counter register order, and circuit means responsive to said transmitted signals for rendering said selection actuators operable singly or in combination to select and effect a printing of the digit represented in said selected order of the register.

37. In combination, a single element print device including a plurality of type character selection actuators, each assigned a coded significance in accordance with a binary combinational code, said actuators being operable singly or in combination to select any one of a plurality of possible print characters of said print device for printing in a column of a print record, a cyclical storage drum having a plurality of multi order, serially arranged counter registers on the surface thereof, the orders of each register being arranged serially and adapted to store a digit in a binary combinational code in a serial fashion, reading means associated with said drum for reading the orders of each register serially and reading the registers serially, a channel of timing signals on said drum, addressing means driven by said timing signals, a distributor having a number of positions equal to the total number of digit storage positions of said registers, common driving means for advancing said print device to successive columnar print positions of a record, advancing said distributor so as to activate the positions of said distributor successively, and rotate said drum, the timing relationship being such that the time periods for effecting a fixed cyclical rotation of said drum, a single columnar advance of said print device, and a one position advance of said distributor, are equivalent in length, means including said addressing means and successive preselected positions of said distributor, to select the digit positions of a desired counter register in sequence from the higher orders towards the lower, one order being selected during each said cyclical rotation of said drum, a reading device associated with said registers for picking up and transmitting digit representing signals from each selected counter register order, and circuit means responsive to said transmitted signals for rendering said selection actuators operable singly in combination to select and effect a printing of the digit represented in said selected order of the selected register.

38. In combination, a serial type printer, means for advancing said printer to printing position in successive columns of a print line of a print record, a plurality of type character selection actuators associated with said printer, each said actuators being assigned a coded significance in accordance with a binary combinational code, said actuators being operable singly or in combination to select any one of a plurality of possible print characters of said printer for printing in a column of a print line of said record, a rotatable magnetic storage drum, a data storage channel on the periphery of said drum, said channel having a predetermined number of serially arranged digit storage positions, with each digit position being adapted to store a digit serially in binary coded form, the digit positions of said channel being divided into equal groups, each group comprising a counter register of a fixed number of orders, a reading device associated with said channel for picking up digit representing signals and generating corresponding digit representing a signal on an output thereof, a channel of timing signals on the periphery of said storage drum, means responsive to said timing signals for generating a distinct gate signal coincident with the passage of each order of a counter register under said reading device, each counter order gate signal being generated on an individual output, a plurality of counter register switching circuits, one for each counter register, means also responsive to said timing signals for closing each counter register switching device as all orders of the corresponding counter register are passing under said reading device, a distributor having a number of pairs of inputs and outputs equal to the number of digit storage positions of the data channel of said drum, means for operating said distributor and rotating said drum in timed relationship so that a successive pair of input-output contacts of said distributor are connected during the presentation of all digit positions of said channel at least once to said reading means, a coincidence device having first and second inputs, means applying the output of the reading device to the first input of said coincidence device, means preconnecting the address device counter order gate signal outputs to the inputs of successive pairs of inputs-outputs of said distributor in correspondence to the columns of a print record in which a printing of the data represented in the order of a chosen counter register are desired, means for connecting all the related outputs of said latter pairs of inputs-outputs and the counter register switching circuit corresponding to the chosen counter register, a gate signal being accordingly generated on the output of said latter register switching circuit during the passage of the chosen order of the chosen counter register under the related reading device, means applying the output of said chosen register switching circuit to the second input of said coincidence device, and circuit means responsive to the output of said coincidence device for rendering said selection actuators operable singly or in combination to select and effect a printing of the digit representation readout of the related order of the chosen counter register.

39. In combination, a single element print device, a print record, means for advancing said print device to successive columnar print positions of a print line of said print record, a plurality of type character selection actuators associated with said print device, each said actuators being assigned a coded significance in accordance with a predetermined binary code, said actuators being operable singly or in combination to select any one of a plurality of possible print characters of said print device, a magnetic storage drum, a storage channel having a fixed number of digit storage positions arranged serially around the periphery of said drum, numeric data being stored in each digit position serially, bit by bit, in a binary coded decimal form, the digit positions of said channel being divided into groups of equal size, each group forming a counter register of a fixed number of orders; a reading head associated with said channel for reading the bits thereof and generating signals representative thereof, circuit means responsive to signals and settable representative of a value in said binary code, transmitting means interposed between said reading head and circuit means, control means responsive to received signals for rendering said transmitting means operable, a channel of timing signals on said drum, timing means driven by said timing signals, a counter order gate circuit driven by said timing means, said circuit having a number of output signal exits, one for each order of a counter register, a gate pulse being generated on each output signal exit during the passage of a particular order of any one of said counter registers under said reading head, a group of counter register switching circuits, one for each counter register, each switching circuit having an input and an output, said switching circuits being responsive to said timing means with each switch being closed during the passage of the entire related counter register under said reading means, a distributor having a switch position for each columnar print position of a print line of said record, each switch position having an input and an output, means for operating said distributor in timed relationship with said print device advancing mechanism so that each switch position thereof is closed in succession as the print device advances successively toward the related columnar print positions, the closing of a switch position leading the actual presentation of the print device to the related columnar print position by a predetermined time interval, means for rotating said drum in time relationship with said distributor so that all orders of all registers are presented to said reading head at least once during the advance of said print device towards each columnar print position, means for preconnecting each counter order gate circuit output relating to the orders of a counter register which it is desired to readout to said print device, to the input of a particular switch position of said distributor in correspondence to the print column of said record in which it is desired to print said counter register order value representation, the desired highest order gate circuit output being connected to the switch position corresponding to the highest columnar order print position, the next lower order gate circuit output being connected to the succeeding distributor switch position, and so forth; means for preconnecting all the outputs of said selected switch positions relating to the counter register order print columns to an electrical common, means for prelinking said electrical common to the input of the counter register switching circuit relating to the stored counter register representation which it is desired to print, means for preconnecting the output of the desired counter register switching means to said transmitting control means, said transmitting means being accordingly operable during each interval when the preselected order of the preselected counter passes said reading head during the interval when the corresponding distributor switch position is closed, and means responsive to the setting of said circuit means to operate said selection actuators singly or in combination to select and effect a printing of the digit represented in said selected order of the selected register in the selected print column.

40. Apparatus as in claim 39 with the further provision of apparatus for erasing the data in a selected counter register after the printing of the data therein, said erasing apparatus comprising an erase device associated with said channel, said erase device being displaced angularly from said related channel read head in the direction of rotation of said drum, by a distance equal to the spacing between a predetermined number of said channel digit positions, a counter register gate circuit driven by said timing means, said circuit having a number of output signals exits, one for each counter register, a gate pulse being generated on each signal exit during the passage of the related counter register under said read head, means for preconnecting the signal exit corresponding to the register to be erased, of said counter register gate circuit, to the input of any switch position of said distributor subsequent to the position thereof relating to the columnar printing order of the lowest order of the register selected for total printing; a control circuit including delay means responsive to a counter register gate signal applied thereto to generate an erase gate signal equal in length to the applied register gate signal, but delayed in time by an interval equivalent to the spacing between said read and erase head, means for preconnecting the output of said selected erase position of said distributor to said control circuit to apply the selected register gate signal thereto, and means for applying said erase gate signal to said erase device to erase all digit positions of the counter register selected for erasing.

41. Apparatus as in claim 40 further characterized in that said control means includes a reset trigger flipped On by the leading edge of said applied counter register gate signal, an erase trigger, coincidence means responsive to the On state of said reset trigger and said timing means to flip said erase trigger On thus generating the erase gate signal, and means responsive to said timing means for resetting said erase trigger Off after an interval sufficient to erase the selected register.

42. Multiplying apparatus comprising, in combination, a rotatable drum storage device having a plurality of data storage channels thereon, one of said channels storing magnetic representations of multipliers and multiplicands, means for selecting a desired one of said stored multiplicand representations, means reading out said selected multiplicand representation and generating signals representative thereof, means responsive to said generated signals to record a magnetic representation of said multiplicand, ten times on another of said channels, an accumulator including an adder, means for selecting a desired one of said multipler representations, means for reading out said selected multiplier representation, digit by digit, and generating signal manifestations thereof, means responsive to the generated signal manifestations of an multiplier digit in accordance with the represented value thereof, for reading out the multiplicand a corresponding number of times from said 10 times storage channel, means responsive to said last mentioned read-out means to enter a multiplicand representation serially digit by digit, a corresponding number of times into said accumulator to generate therein a partial product means for storing a product manifestation, means for transferring the contents of said product storage, if any, and the partial product representation relating to a multiplier digit in said temporary storage, to said accumulator to generate therein a partial product summation, means for transferring said partial product summation from said accumulator back to said product channel, and means to column shift the partial product summation on said product track one order prior to the subsequent product summation.

43. Multiplying apparatus as in claim 42 further characterized in that said column shift means comprises still another one of said drum storage channels, the partial product summation being transferred to said last mentioned track from said product storage, and then retransferred back to said product storage, the transfer and retransfer timing being such as to column shift said product summation one order in said product storage.

44. Multiplying apparatus as in claim 42 further characterized in that said means responsive to said generated signals to record a magnetic representation of said multiplicand, ten times or another of said channels comprises a plurality of relays each assigned a coded value and representative thereof when energized, said relays being energized singly or in combination in response to the represented numeric magnitude of the generated signals of each order of said selected multiplicand as read out, each of said relays having first and second contacts controlled thereby, and multiplicand encoder means including the first contacts of said relays, for recording a magnetic representation of each multiplicand digit as represented in said first contacts, ten times in said other channel.

45. Multiplying apparatus as in claim 44 further characterized in that said means responsive to the generated signal manifestations of each multiplier digit in accordance with the represented value thereof for reading out the multiplicand a corresponding number of times from said ten times storage channel, comprises said relays which are energized singly or in combination in response to the represented numeric magnitude of the generated signals of each order of said selected multiplier as read out, and multiplier control circuit means including the second contacts of said relays, for reading out the multiplicand representations a corresponding number of times from said ten times channel in correspondence to each multiplier digit as represented in said second contacts of the relays.

46. Multiplying apparatus as in claim 45 further characterized in that said multiplier control means includes, a magnetic reading device cooperating with said ten times channel for reading out and generating signal manifestations of the cultiplicand representations stored therein, the stored multiplicand representations being read out in succession with the orders of each read out multiplicand representation being also read out in succession, a coincidence device having an output and first and second inputs and adapted to generate in the output, signals corresponding to the overlap of signals applied to the inputs, means applying said generated signals resulting from the reading of said ten times channel to the first input of said coincidence device, signal generating means controlled by the second contacts of said relays in accordance with the magnitude of each multiplier digit representation when set therein, for generating a gate signal of a length to span the reading time of a corresponding number of multiplicands from said ten times channel, means applying said generated gate signal to the second input of said coincidence device, and means applying the output of said coincidence device to said accumulator.

47. Multiplying apparatus comprising, a rotatable drum storage device having a plurality of data storage channels thereon, one of said channels storing magnetic representations of multipliers and multiplicands, means for selecting a desired one of said stored multiplicand representations, means for reading out said selected multiplicand representation, digit by digit, and generating signals representative of each digit as read out, settable circuit means responsive to said generated signals and set representative of each multiplicand digit read out, serial printing means controlled by each setting of said circuit means for effecting a listing of the read out multiplicand digit, means also controlled by each multiplicand digit setting of said circuit means to record a corresponding magnetic digit representation in a related storage order of each of 10 multiplicand storage registers arranged on another one of said channels, the entire multiplicand being accordingly recorded ten times in said channel after the reading out of the last order of the selected multiplicand, an accumulator including an adder, for selecting a desired one of said stored multiplier representations subsequent to the recording of said multiplicand 10 times on the related channel, means for reading out said selected multiplier representation, digit by digit, and generating signal manifestations thereof, means responsive to the generated manifestations of each multiplier digit in accordance with the represented numeric magnitude thereof, for reading out the multiplicand, digit by digit, a corresponding number of times from said 10 times storage channel, means responsive to said last mentioned read out means to enter the read out multiplicand representations, digit by digit, a corresponding number of times into said accumulator to generate therein a partial product for the related multiplier digit, means including another channel of said drum for storing a product representation, means to transfer the contents of said product channel, if any, to said accumulator to generate therein a partial product summation, means for transferring said partial product summation from said accumulator back to said product channel, and means to column shift the partial product summation in said product track one order prior to the subsequent product summation.

48. Multiplying apparatus comprising, a rotatable drum storage device having a plurality of data storage channels thereon, one of said channels storing magnetic representations of multipliers and multiplicands, means for selecting a desired one of said stored multiplicand representations, means for reading out said selected multiplicand representation, digit by digit, and generating signals representative of each digit as read out, settable circuit means responsive to said generated signals and set representative of each multiplicand digit read out, serial printing means controlled by each setting of said circuit means for effecting a listing of the read out multiplicand digit, means also controlled by each multiplicand digit setting of said circuit means, to record a corresponding magnetic digit representation in a related storage order of each of 10 multiplicand storage registers arranged on another one of said channels, the entire multiplicand being accordingly recorded ten times on said channel after the reading out of the last order of the selected multiplicand, an accumulator including an adder, means for selecting a desired one of said stored multiplier representations subsequent to the recording of said multiplicand 10 times on the related channel, means for readout said selected multiplier representation, digit by digit, and setting said circuit means representative of each multiplier digit read out, said circuit means controlling said serial printing means for effecting a listing of each multiplier digit read out, means also controlled by each multiplier digit setting of said circuit means for reading out the multiplicand a corresponding number of times from said 10 times channel, means responsive to said last mentioned read out means to enter the read out multiplicand representations into said accumulator to generate therein a partial product for the related multiplier digit, for storing a product representation, means to transfer the contents of said product storage, if any, to said accumulator to generate therein a partial product summation, means for transferring said partial product summation from said accumulator back to said product storage, means to column shift the partial product summation in said product storage one order prior to the subsequent product summation, and means for reading the final product out of said product storage, digit by digit, and setting said circuit means representative of each final product digit read out, said circuit means controlling said serial printing means for effecting a listing of each final product digit read out.

49. Apparatus as in claim 48 further characterized in that said serial printing means includes a single print element having a plurality of print characters embossed thereof, a plurality of print character selection actuators operable singly or in combination in accordance with the setting of said settable circuit means to select the corresponding print character for printing, print hammer means normally operable subsequent to each type character selection operation to physically effect the actual print operation, and means settable to prevent the operation of said hammer to suppress the listing of the multiplicand, multiplier, or product as desired.

50. Multiplying apparatus comprising a rotatable drum storage device having a plurality of data storage channels thereon, one of said channels storing magnetic representations of multipliers and multiplicands, means for selecting a desired one of said stored multiplicand representations, means for reading out said selected multiplicand representation, digit by digit, and generating signals representative of each digit as read out, a plurality of multi-contact relays, each relay assigned a coded significance and settable singly or in combination representation of each multiplicand digit in response to said generated signals, multiplicand encoder means including a set of contacts of said multi-contact relays to record a magnetic digit representation of the multiplicand digit read out in a related storage order of each of 10 multiplicand storage registers arranged on another one of said channels, the entire multiplicand being accordingly recorded ten times on said channel after the reading out of the last order of the selected multiplicand, an accumulator including an adder, means for selecting a desired one of said stored multiplier representations subsequent to the recording of said multiplicand 10 times on the related channel, means for reading out said selected multiplier representation, digit by digit and setting said relays in correspondence thereto, multiplier encoder means including another set of contacts of said multi-contact relays, for reading out the multiplicand, digit by digit, a number of times from said 10 times channel in correspondence to the magnitude of the multiplier digit represented in said relays, means responsive to said last mentioned read out means to enter the read out multiplicand representations into said adder to generate therein a partial product for the related multiplier digit, means including another channel of said drum for storing a product representation, means to transfer the contents of said product channel, if any, to said accumulator to generate therein a partial product summation, means for transferring said partial product summation from said accumulator back to said product channel, and means to column shift the partial product summation in said product track one order prior to the subsequent product summation.

51. Multiplying apparatus comprising a rotatable drum storage device having a plurality of data channels thereon, one of said channels storing magnetic representations of multiplicands and multipliers, means for selecting a desired one of said stored multiplicand representations, means reading out said selected multiplicand representation and generating signals representative thereof, means responsive to said generated signals to record a magnetic representation of said multiplicand, ten times on another of said channels, an accumulator including an adder, means for selecting a desired one of said multiplier representations, means for reading out said selected representation, digit by digit, and generating signal manifestations thereof, settable means responsive to the generated signal manifestations of each multiplier digit and set in accordance with the represented numeric magnitude thereof, means cooperating with said ten times channels for reading out and generating signal manifestations of the multiplicand stored therein, each stored representation of the multiplicand being read in sequence, with each digit position of a multiplicand being read in sequence, a coincidence device having an output and first and second inputs and adapted to generate on the output signals corresponding to the overlap of signals applied to the inputs, means applying said generated signals resulting from the reading of said ten times channel to the first input of said coincidence device, means controlled by said settable means in accordance with the magnitude of the multiplier digit representation set therein for generating a gate signal of a length to span the reading time of a corresponding number of the multiplicands, from said ten times channel, means applying said gate signal to the second input of said coincidence device, means applying the output of said coincidence device to said accumulator to generate therein a partial product for the related multiplier digit, means including another channel of said drum for storing a product manifestation, means for transferring the contents of said product channel, if any, to said accumulator adder to generate therein a partial product summation, means for transferring said partial product summation from said accumulator back to said product channel, and means to column shift the partial product summation on said product track one order prior to the subsequent product summation.

52. Multiplying apparatus comprising, in combination, a rotatable drum storage device having a plurality of data storage channels thereon, each of said channels being adapted to store numeric data serially, digit position by digit position, one of said channels storing magnetic representations of multipliers and multiplicands, means for selecting a desired one of said stored multiplicand representations, means reading out said selected multiplicand representation serially, digit by digit, and generating signals representative thereof, means responsive to said generated signals to record a magnetic representation of said multiplicand, ten times on another of said channels, means for selecting a desired one of said multiplier representations, means for reading out said multiplier representation, digit by digit, and generating signal manifestations thereof, single order settable means responsive to the generated signal manifestations of each multiplier digit and set in accordance with the represented numeric magnitude thereof, means for resetting said settable means prior to the setting of each succeeding multiplier digit representation therein, means controlled in accordance with each multiplier digit setting of said settable means for reading out a corresponding number of multiplicands from said ten times track, each multiplicand being readout serially, digit by digit, with the multiplicands being readout in succession, a single decimal order adder including carry means, means responsive to said last mentioned multiplicand readout means to enter signal representations of each multiplicand digit into said adder counter, a single order storage register, means transferring the counter representation resulting from each multiplicand digit entry to said register and resetting said counter prior to the entry of the next order of a multiplicand therein, means transferring each digit representation in said register to a digit position of another channel of said drum, said latter channel being defined as a partial product accumulator channel, means for reading out said last mentioned digit position of the accumulator channel after a predetermined delay interval, means responsive to said last mentioned readout means to enter said digit representation to said adder, the time interval in circulating each adder digit therefrom to said register, to said accumulator channel and back to said adder being such that the corresponding order of the next multiplicand representation read from said ten times track is added thereto in said adder with the multiplicand being accordingly added serially, digit by digit, over and over, to progressive totals of itself a number of times as determined by the magnitude of the controlling multiplier digit, with a partial product relating to each multiplier digit finally resulting on said accumulator channel, means for storing a product, means for transferring the contents of said product channel, if any, and the partial product representation on said accumulator channel resulting from a multiplier digit, to said adder to generate therein a partial product summation for the multiply operation up to that point, said product summation taking place prior to the generation of the partial product for the succeeding order of the multiplier, means for transferring said partial product summation from said adder back to said product storage, and means to column shift the partial product summation in said product storage one order prior to the next product summation.

53. Multiplying apparatus comprising, in combination, a rotatable storage drum having a number of magnetizable channels around the periphery thereof for storing magnetic representations of data, each said channels having an equal number of serially disposed digit storage positions, each digit storage position being adapted to store a digit in a combinational binary coded form, the bit positions of each digit position also being disposed serially, means for loading one of said channels with representations of multipliers and multiplicands, a magnetic reading head associated with said channel storing multipliers and multiplicands for reading the magnetic representations of data from said channel as they rotate successively thereunder and generating output signal representations of the read data, a channel of timing signals extending circumferentially about said drum, a drum addressing device having a number of output signal sources equal in number to the digit position of a storage channel of said drum, said addressing device being responsive to said timing signals to generate an output signal successively on each of said outputs as the corresponding digit position of said multiplier-multiplicand storage channel is rotating under said reading head, a distributor having a number of switch positions equal to the digit positions of a storage channel of said drum, means for advancing said distributor and rotating said drum in timed relationship so that all digit positions of said multiplier-multiplicand storage channel are presented to said related reading head at least once during the closing of any particular switch position of said distributor, said switch positions being closed successively, means for preconnecting succeeding output signal sources of said addressing device corresponding to the channel digit positions in which a desired multiplicand is stored, to chosen succeeding switch positions of said distributor, an output signal being accordingly available on the output of each of said chosen switch positions when that position is closed and the corresponding digit position of said multiplier-multiplicand channel is passing under said reading head, means for preconnecting succeeding output signal sources of said addressing device corresponding to the channel digit positions, highest order first, in which a desired multiplier is stored, to chosen succeeding switch positions of said distributor, an output signal being accordingly available on the output of each of said latter chosen switch positions when that position is closed and the corresponding digit position of said multiplier-multiplicand channel is passing under said reading head, the latter chosen group of distributor switch positions relating to said multiplier being closed subsequently in time to the chosen group of switch positions relating to said multiplicand, signal transmitting means rendered operable in response to the signals generated by said reading means and a cojoint output from each chosen distributor switch positions, single order settable circuit means responsive to the signals from said transmitting means relating to each other of the multiplicand, and thereafter to each order of the multiplier, and set in accordance with the magnitude thereof, means for resetting said circuit means after a predetermined time interval for each setting thereof, means controlled in response each multiplicand digit setting of said circuit means, to record a corresponding magnetic bit representation in a related digit position of each of ten multiplicand storage registers arranged on another of said drum channels, the entire multiplicand being accordingly recorded ten times on said channel after the setting of the last order of said multiplicand in said circuit means, an accumulator including an adder means controlled in response to each multiplier digit setting of said circuit means for reading out the multiplicand a corresponding number of times from said register channel, means responsive to said last mentioned read out means to enter the read out multiplicand representations into said accumulator to generate therein a partial product for the related multiplier digit, means including another channel of said drum for storing a product representation, means to transfer the contents of said product channel, if any, to said accumulator to generate therein a partial product summation, means for transferring said partial product summation from said accumulator back to said product channel, and means to column shift the partial product summation on said product channel one order prior to the subsequent product summation.

54. Apparatus as in claim 53 further characterized in that said means controlled in response to each multiplier digit for reading out the multiplicand a corresponding number of times from said ten times channel comprises, a magnetic reading device cooperating with said ten times channel for reading out and generating signal manifestations of the multiplicand representations stored therein, each stored representation of the multiplicand being read out in sequence, a coincidence device having an output and first and second inputs and adapted to generate on the output, signals corresponding to the overlap of signals applied to the inputs, means applying said generated signals resulting from the reading of said ten times channel to the first input of said coincidence device, signal generating means controlled by said settable circuit means in accordance with the magnitude of each multiplier digit representation when set therein, for generating a gate signal of a length to span the reading time of a corresponding number of multiplicands from said ten times channel, means applying said generated gate signal to the second input of said coincidence device, and means applying the output of said coincidence device to said accumulator.

55. Apparatus as in claim 53 further characterized in that said signal transmitting means rendered operable in response to the signals generated by said reading means and a cojoint output from each chosen distributor switch position comprises, a coincidence device having an output and first and second inputs and adapted to generate on the output signals corresponding to the overlap of signals applied to the inputs, means applying said generated signals resulting from the reading of the multiplier-multiplicand storage channel by said associated reading head to the first input of said coincidence device, electrical common means linking the output of all said preselected distributor positions and the second input of said coincidence means, and means linking the output of said coincidence means to said single order settable circuit means.

56. Apparatus as in claim 53 further characterized in that said means to column shift the partial product summation on said product channel one order prior to the subsequent product summation comprises, a magnetic reading device cooperating with said product channel for reading the digit positions of said partial product successively as they rotate thereunder and generating signals corresponding thereto, another one of the storage channels of said drum defined as a temporary storage channel, a recording device cooperating with said latter channel, means applying said generated signals from said product channel reading device in response to the reading of the digit positions thereof to said temporary storage channel recording device to record therein corresponding magnetic representations, a magnetic reading device associated with said temporary storage track and spaced from the related recording device in the direction of rotation of said drum an angular distance equal to a predetermined number of digit positions of said channel, for reading the digit positions thereof successively a predetermined time after data was recorded in each such digit position through the related recording device, said reading device generating signals corresponding to the read data, an erase device associated with said temporary storage track to erase the data in the digit positions thereof after they are read by said related reading device, a recording device associated with said product storage channel and spaced from the related reading device by an angular distance equal to a predetermined number of digit positions, an erase device interposed between said reading and recording device to erase the data in said digit positions successively subsequent to the reading thereof by said reading device and prior to the presentation of said digit positions to said related recording device, means applying the signals generated by said temporary storage reading device to said product storage channel recording device to re-record therein, digit position by digit position, the product summation originally therein, said predetermined spacing between the reading and recording devices of said product and said temporary storage channel being such that the circulation of said product summation requires a time equivalent to 1 complete cycle of rotation of said storage drums plus 1 digit position.

57. Apparatus according to claim 53 further characterized in that said settable circuit means comprises a plurality of multi-contact relays, a multiplicand encoder including a set of contacts of said multi-contact relays, and a multiplier encoder including a second set of contacts of said multi-contact relays, said multiplicand encoder controlling the recording of a magnetic bit representation in the proper digit position of each of said ten multiplicand storage registers in accordance with each multiplicand digit setting of said relays, and said multiplier encoder controlling the reading out of the multiplicand a number of times from said ten times channel in accordance with each multiplier digit setting of said relays.

58. Apparatus as in claim 57 further characterized by a serial single element print device, means for advancing said print device to successive columnar positions of a print line of a print record in a timed relationship with the closing of successive switch positions of said distributor, a plurality of type character selection actuators operable singly or in combination to select any one of the possible type character of said print device for printing, and circuit means including still another set of contacts of said multi contact relays for operating said actuators singly or in combination in accordance with the digit setting of said relays.

59. Multiplying apparatus comprising a rotatable storage drum having a plurality of data storage channels around the periphery thereof, each said channels being divided into a number of serial disposed digit storage positions with each digit position being subdivided into a number of serially arranged bit positions, each assigned a coded significance in accordance with a predetermined combinational binary coded decimal code and representative thereof when a magnetic bit is stored therein, means for loading multipliers and multiplicands into one of said channels by magnetizing one or a combination of the bit areas of each digit position in accordance with the digit to be represented therein, the orders of each multiplier and multiplicand being stored in successive digit positions, means operable in synchronism with the rotation of said drum for producing indexing signals, one signal for each bit area of a storage channel, a counting circuit responsive to said indexing signals and having a capacity equal to the number of bit areas in a digit position, said counting circuit being connected to recycle, a plurality of thyratrons, one for each of said bit areas of a digit position, each said thyratrons having first and second control grids, reading means associated with said multiplier-multiplicand storage channel for reading the magnetic bit positions sequentially and generating signals corresponding thereto, means including said counting circuit for conditioning the first grid of each of said thyratrons in timed relationship with the passage of corresponding bit areas of a digit position of said multiplier-multiplicand storage channel under said reading means, transmitting means operable to apply said generated signals from said reading means to the second grid of all said thyratrons wherein those thyratrons having both grids simultaneously conditioned by signals are rendered conductive, means for selecting a desired one of said stored multiplicands, means controlled by said selecting means for rendering said transmitting means operable during the reading of succeeding digit positions of said selected multiplicand during every other rotational cycle of said drum, said transmitting means being operated to transmit the signal representation of the selected multiplicand at the rate of one digit position every two rotations of said drum, means for resetting said thyratrons prior to the transmission of each digit representing signals thereto, means controlled in accordance with the pattern of thyratrons rendered conductive for each digit of the multiplicand to record a corresponding magnetic digit representation in a related storage order of each of ten multiplicand storage registers arranged on another one of said channels, the entire multiplicand being accordingly recorded ten times on said channel after the reading out of the last order of the selected multiplicand to said thyratrons, an accumulator including an adder means for selecting a desired one of said multipliers, means controlled by said latter selecting means for rendering said transmitting means operable during the reading of succeeding digit positions of said multiplier in the same manner as for said multiplicand, means controlled in accordance with the pattern of thyratrons rendered conductive for each digit of the selected multiplier, for reading out the multiplicand a corresponding number of times from said ten times channel during a single rotation of said drum, means responsive to said last mentioned read out means to enter the read out multiplicand representations into said accumulator generate therein a partial product for the related multiplier digit, means for storing a product representation, means to transfer the contacts of said product storage, if any, to said accumulator to generate therein a partial product summation, means for transferring said partial product summation from said accumulator back to said product storage, and means to column shift the partial product summation in said product storage one order prior to the subsequent product summation.

60. Multiplying apparatus comprising a rotatable magnetic storage drum having a plurality of data storage channels on the periphery thereof, each of said channels having an equal number of digit storage positions, wherein number data may be stored serially by digit, with each digit being stored serially by bit in a binary coded decimal form, the digit positions of one of said channels being divided into ten groups of equal size to form ten storage registers of a fixed number of orders, means for loading one of said channels other than said register channel with multipliers and multiplicands, a reading device for reading the digit positions of said multiplier-multiplicand storage channel as they rotate thereunder and generating signals corresponding to the data therein, signal responsive first circuit means settable representative of a digit in binary coded decimal form, signal transmission means interposed between said reading device and said circuit means for transmitting said generated signals from said reading device to said circuit means to effect an equivalent setting thereof, said transmission means being rendered operative during the duration of an applied gate signed to a control input thereof, a recording device associated with said register channel and responsive to received signals to record magnetic representations of data in the orders of said registers as they rotate thereunder, first distributor routing means, second distributor routing means identical to said first distributor means, driving means for rotating said drum and operating said distributors in timed relationship, said second distributor lagging said first by a time interval equivalent to an operational cycle of said drum, a channel of timing signals on said drum, drum addressing means driven by said timing signals for generating a distinct digit position gate impulse as each digit position of said multiplier-multiplicand channel rotates under said related reading device, and generating a distinct register order gate signal as each order of a register of said register channel rotates under said related recording device, means including said first distributor and digit position gate signals of said addressing device, for applying digit position gate signals corresponding to the digit positions of said multiplicand-multiplier storage channel in which a desired multiplicand is stored, to said transmitting means, the gate signals relating to each chosen digit position being applied successively, one impulse each succeeding operational cycle of said drum to accordingly effect a setting of said first circuit means at a rate of one multiplicand digit per operational cycle of said drum, second circuit means settable representative of a digit in binary coded form, means for transferring each digit setting of said first circuit means to said second circuit means prior to the succeeding operational cycle of said drum, multiplicand encoder means including said second distributor and register order gate signals of said addressing device, for actuating said register channel recording device in accordance with the digit setting of said second circuit means, to record a magnetic representation of the multiplicand digit setting in said second circuit means one in the proper order of each of said ten registers, all orders of the chosen multiplicand being accordingly completely recorded in said ten registers after the operational drum cycle succeeding the operational cycle when the last order of the multiplicand is readout to said first circuit means, means including said first distributor and digit position gate signals of said addressing device for applying digit position gate signals corresponding to the digit positions of said multiplicand-multiplier storage channel in which a desired multiplier is stored to said transmitting means subsequent to the recording of the complete multiplicand in said registers, the gate impulse relating to each chosen multiplier digit position being applied successively, one impulse each succeeding operational cycle of said drum to accordingly effect a setting of said first circuit means at a rate of one multiplier digit per operational cycle of said drum, means for transferring each multiplier digit setting from said first to said second circuit means, prior to the succeeding operational cycle of said drum, multiplier control means responsive to each multiplier digit setting of said second circuit means for reading out the multiplicand a corresponding number of times from said register channel, an accumulator including an adder, means responsive to said last mentioned readout means to enter a representation of the chosen multiplicand a corresponding number of time into said accumulator to generate therein a partial product, for storing a product manifestation, means for transferring the contents of said product storage means, if any, to said accumulator to generate therein a partial product summation, means for transferring said partial product summation from said accumulator back to said product storage means, and means to column shift the partial product summation in said product storage means one order prior to the subsequent product summation.

61. Apparatus as in claim 60 further characterized in that each said distributors includes a number of individual switch positions equal to the digit storage positions in anyone of said channels, said timing relationship between said drum and said distributors being such that a successive switch position of said first distributor is closed during each succeeding operational cycle of said drum, the corresponding switch position of said second distributor being closed during the succeeding operational cycle of said drum.

62. Apparatus as in claim 61 further characterized in that said addressing means includes a number of digit position gate output hubs, one for each digit position gate signal, a number of register order gate output hubs, one for each register order gate signal, and wherein said means including said first distributor and said digit position gate signals for applying digit position gate signals corresponding to the digit positions of said multiplicand-multiplier storage channel in which a desired multiplicand is stored to said transmitting means, includes preconnected wires linking each of the successive desired digit position gate hubs to successive chosen switch position of said first distributor, the outputs of said chosen switch positions being commoned and linked to said control input of said transmitting means.

63. Apparatus as in claim 62 further characterized in that said means including said second distributor and register order gate signals of said addressing device for actuating said register channel recording device in accordance with the digit setting of said second circuit means, includes preconnected wires linking each of the desired register order hubs to successive switch positions of said second distributor corresponding to the chosen switch positions of said first distributor, the outputs of said second distributor being electrically commoned, a control circuit linked to said commoned output and rendered operative by each register order gate signal applied thereto, said control circuit, when operative, generating signals representative of the digit setting of said second circuit means, and means for applying said generated signals to said register channel recording means to record a magnetic representation of the digit represented in said second circuit means in the register order under said recording means at that time.

64. Apparatus as in claim 60 further characterized in that said first circuit means comprises a plurality of thyratrons rendered conductive singly or in combination in accordance with the signals applied thereto by said transmission means, said second circuit means comprises a plurality of relays one for each of said thyratrons, and said means for transferring each digit setting of said first circuit means to said second circuit means comprises a circuit connection linking one side of each said relays to the plate of the related thyratron and the other side of all said relays through a common cam actuated contact to a power source, said cam actuated contacts being closed at fixed intervals by a cam operationally linked to and timed with said driving means, the closing of the cam actuated contact energizing those particular relays whose related thyratrons are conductive.

65. Apparatus as in claim 64 further characterized in that the plate circuit of each of said thyratrons is linked through a common cam actuated contact to a power source, said latter cam actuated contact being closed at fixed intervals by a cam operationally linked to and timed with said driving means, said cam contact associated with said thyratrons, when closed, permitting said thyratrons to be rendered conductive in response to signals applied thereto by said transmission means, the subsequent opening of said thyratron cam contacts resetting all of said thyratrons to a non-conductive state.

66. Apparatus as in claim 65 further characterized in that each of said relays includes a number of contacts controlled thereby, a hold coil for each of said relays, another cam actuated contact, an actuating cam for said latter cam contact, said cam being operationally linked to and timed with said driving means, and circuit means including one of said contacts of each relay and the associated hold coil connected through said latter cam actuated contacts to a power source for holding each relay energized, after the related conductive thyratron is reset.

67. Multiplying apparatus comprising, in combination, a rotatable magnetic storage drum having a plurality of data storage channels and a sync track on the periphery thereof, each of said channels having an equal number of digit storage positions, wherein number data may be stored serially digit by digit, with each digit being stored serially by bit in a binary coded decimal form, the digit positions of one of said channels being divided into ten groups of equal size to form ten storage registers of a fixed number of orders, a recording device associated with said register channel for recording in any order of any-one of said registers as that order rotates thereunder, means for loading one of said channels other than said register channel with multipliers and multiplicands, a reading device for reading the digit positions of said multiplier-multiplicand storage channel as they rotate thereunder and generating signals corresponding to the data therein, all storage positions being read during each rotation of said drum, drum addressing means driven by said sync track for generating a distinct address gate signal during the reading of data from a corresponding digit position by said reading device, a first distributor having a plurality of individual switching elements, one for each storage position of any one of said channels, means for advancing said distributor and said drum in timed relationships so as to close each switching element successively, at the rate of one switch position per two complete cycles of rotation of said drum, every two complete cycles of rotation of said drum being considered an operational cycle of said drum, means for applying each gate signal from said addressing device relating to the corresponding orders of said multiplier-multiplicand storage channel in which a desired multiplicand is stored, to succeeding chosen switching elements of said distribution, means for applying each gate signal from said addressing device relating to the corresponding orders of said multiplier-multiplicand storage channel in which a desired multiplier is stored, to succeeding chosen switching elements of said distributor, said latter chosen switching elements being subsequent to said multiplicand related elements, a second distributor having a plurality of individual switch elements equal to said first distributor, means for advancing said second distributor in timed relationship with said first distributor to each switch element thereof is closed one operational cycle of said drum after the closing of the corresponding element of said first distributor, register order gate signal means also driven by said sync track for generating a distinct register order gate signal as each corresponding order of successive ones of said registers rotate under said associated recording device, gate signal circuit means also driven by said track for generating an alternate drum cycle gate signal spanning the time of every alternate drum revolution of said drum, means applying each register order gate signal relating to the corresponding orders of said chosen multiplicand, to succeeding switching elements of said second distributor corresponding to the chosen switching elements of said first distributor, coincidence means for generating output signals corresponding to the overlap of signals applied to first, second, and third inputs thereof, means applying the signals transmitted from said reading means to said first input, means for applying said alternate drum cycle signal to said second input, means applying the particular gate signal from each said chosen switching elements of said first distributor to said third input, first circuit means settable representative of a decimal digit in said binary coded decimal form and set in response to an output from said coincidence device, said circuit means being accordingly set first, digit by digit, representative of succeeding orders of said chosen multiplicand during the alternate drum cycle of succeeding operational cycles of said drum, and then set, digit by digit representative of succeeding orders of said chosen multiplier during the alternate drum cycle of succeeding operational cycles of said drum, second circuit means settable at the end of each alternate drum cycle in response to a setting of said first circuit means, multiplicand encoder means responsive to each register order gate signal from one of said chosen switch elements of said second distributor and the corresponding multiplicand digit setting of said second circuit means to actuate said register channel recording means to record a magnetic representation of the multiplicand digit once in the proper order of each of said ten registers, all orders of the chosen multiplicand being accordingly eventually recorded in said ten registers, multiplier control means responsive to each multiplier digit setting of said second circuit means for reading out the multiplicand a corresponding number of times from said register channel during the alternate drum cycle portion of the operational drum cycle subsequent to the operational cycle when said second circuit means is set representative of that multiplier digit, a signal responsive accumulator including an adder, means responsive to said register channel readout means to enter signal representations of the chosen multiplicand a corresponding number of times into said accumulator to generate therein a partial product, means for storing a product manifestation, means for transferring the contents of said product storage means, if any, to said accumulator to generate therein a partial product summation, means for transferring said partial product summation from said accumulator back to said product storage means, and means to column shift the partial product summation on said product channel one order prior to the subsequent product summation.

68. Apparatus as in claim 67 further characterized by timing means responsive to said alternate drum cycle gate circuit means for timing the multiplication operation during each operational drum cycle so that each partial product is generated during the alternate drum cycle portion of the related drum operational cycle of two drum cycles, the shift operation of the partial product summation resulting from previous orders of the multiplier in said product storage means is effected also during the alternate drum cycle portion of the drum operational cycle, and the addition of the product summation resulting from previous orders to the partial product generated in response to the new order of the multiplier, is effected during the NOT alternate drum cycle portion of the drum operational cycle for that order of the multiplier.

69. Multiplying apparatus comprising a rotatable storage drum having a number of magnetizable channels around the periphery thereof for storing magnetic representations of data, each said channels having a number of serially disposed digit positions, each digit storage position being adapted to store a digit by a recording of a magnetic bit therein, singly or in combination in binary coded form, the digit positions of one of said channels being divided into ten groups of equal size to form ten storage registers of a fixed number of orders, a signal responsive recording device associated with said register track and operable to record in digit positions thereof as they rotate under said recording device, means for loading one of said channels other than said register channel with multipliers and multiplicands, a reading device for reading the magnetic represenations in the digit positions of said multiplier-multiplicand storage track as they rotate thereunder and generating signals corresponding to the digits represented therein, first routing means having a number of routing positions equal to the digit storage positions of said multiplier-multiplicand storage channel, second routing means identical to said first routing means, means for rotating said drum and operating said first routing means in timed relationship so that during every operational cycle of said drum comprised of a first and second rotational cycle of said drum, a succeeding routing position of said first routing means is rendered effective, means for operating said second routing means in timed relationship with said first routing means, so that a routing position of said second routing means is rendered effective during the operational cycle of said drum following the operational cycle when said corresponding routing positions of said first routing means is effective, means associated with said drum for generating timing signals, circuit means responsive to said timing signals for generating a distinct gate signal as each digit position of said multiplier-multiplicand storage channel is read by said related reading device, circuit means also responsive to said timing means for generating a drum cycle gate signal during the first drum cycle of each operation cycle of said drum, selection means including means for preconnecting said first routing means and digit position gate circuit means, to select the generated signals relating to succeeding orders of a desired one of said stored multiplicands, and then succeeding order of a desired one of said multipliers at a rate of one digit per operational cycle of said drum; means responsive to said first drum cycle gate signal to further select said signals relating each order of said chosen multiplicand and multiplier only during the first drum cycle of each related operational cycle of said drum, first circuit means responsive to said first drum cycle selected signals of each chosen digit and set representative thereof, second circuit means, means transferring any digit setting of said first circuit means at the end of the first drum cycle of an operational cycle to said second circuit means, gate signal generating means also responsive to said timing signals for generating a distinct register order gate signal as each order of any one of said registers rotates under said related recording device, means for preconnecting said second routing means and said gate signal generating means to select the order of all of said registers corresponding to the order of said multiplicand digit in said second circuit means during the operational drum cycle following the selection of that multiplicand digit, means also responsive to said first drum cycle gate signal to further select said particular order of all said registers during only the first drum cycle of the related operational cycle of said drum, means controlled in response to the multiplicand digit representation setting of said second circuit means to actuate said register channel recording device to record a corresponding multiplicand digit representation in the selected order of each of said ten registers during the first drum cycle of the related operational drum cycle, the entire multiplicand being accordingly recorded ten times on said channel after the readout and recording of the last order of the multiplicand in said ten registers, an accumulator including an adder, means controlled in response to each multiplier digit setting of said second circuit means for reading out the multiplicand a corresponding number of times from said register channel, means responsive to said last mentioned readout means to enter the readout multiplicand representations into said accumulator to generate therein a partial product for the related multiplier digit, means for storing a product representation, means to transfer the contents of said product channel, if any, to said accumulator to generate therein a partial product summation, means for transferring said partial product summation from said accumulator back to said product channel, and means to column shift the partial product summation on said product channel one order prior to the subsequent product summation.

70. Apparatus as in claim 69 further characterized in that said means controlled in response to each multiplier digit setting of said second circuit means for reading out the multiplicand a corresponding number of times from said register channel, comprises a reading device associated with said register channel for reading the data in the digit position thereof as they rotate successively thereunder, and generating output signal representations of the read data, means controlled in response to each multiplier digit setting of said second circuit means for selecting the generated signals from said readout device relating to a corresponding number of multiplicands during each drum cycle of the corresponding operational cycle of said drum, and means responsive to said first drum cycle gate signal to further select said selected multiplicand signals only during the first drum cycle of each related operational cycle of said drum.

71. Apparatus as in claim 69 further characterized in that said second circuit means comprises a plurality of relays, one relay for each bit area of a digit position of said channels, each relay having a number of sets of contacts, said relays being energized singly or in combination representative of the digit manifestation transferred thereto from said first circuit means, and said means controlled in response to the multiplicand digit representation setting of said second circuit means comprises multiplicand encoder means including one set of the contacts of said relays linked in a logical circuit having an output, means also driven by said timing signals to interrogate said logical circuit and generating signals on said output representative of the multiplicand digit representation therein, and means applying said generated signals to said register channel reading device.

72. Apparatus as in claim 69 further characterized in that said means controlled in response to each multiplier digit setting of said second circuit means comprises multiplier control means including another set of the contacts of said relays linked in a logical circuit having an output, means also driven by said timing signals to interrogate said latter logical circuit and generate an output signal in said associated output at a differential time in the drum cycle in correspondence to the magnitude of the multiplier digit representation therein, and means responsive to said generated signal to read out the multiplicand a number of times in correspondence to the particular time when said signal is generated.

73. Apparatus as in claim 72 further characterized in that said means responsive to said differential time generated signal to the particular time when said signal is generated comprises, a reading device associated with said register channel for reading the digit positions thereof as they rotate successively thereunder and generating signals corresponding to the read data, a coincidence device adapted to generate on an output thereof signals corresponding to an overlap of signals applied to first, second, and third inputs thereof, means applying the signals generated by said register channel reading device to the first input of said coincidence device, means applying said first drum cycle gate signal ot the second input of said coincidence device during operations with any order of said chosen multiplier, an electronic device having first and second stable states and adapted when in either stable state to generate a related output gate signal, means applying said differential time generated signal to said bistable device to transfer it to said first stable state at a corresponding time in the related drum cycle, means applying the gate signal generated by said electronic device when in said first state to the third input of said coincidence device, means for resetting said electronic device if in said first state to said second state at the end of each drum cycle, and means applying the output signals generated by said coincidence device to said accumulator.

74. Multiplying apparatus comprising, a rotatable storage drum having a number of magnetizable channels around the periphery thereof for storing magnetic representations of data, each said channels having a number of serially disposed digit storage position, each digit storage position being adapted to store a digit by a recording of one of a combination of bits therein in accordance with a predetermined code, the digit positions of one of said channels being divided into ten groups of equal size to form ten storage registers of a fixed number of orders, means for loading one of said channels with representations of multipliers and multiplicands, a reading device for reading the digit positions of said multiplier-multiplicand storage channel as they rotate thereunder and generating signals corresponding to the digits represented therein, a recording device associated with said register channel and responsive to received signals to record in the digit positions of said register channel as they rotate thereunder, first routing means having a number of routing positions adapted to be closed sequentially, means for rotating said drum and operating said first routing means in timed relationship so that a succeeding routing position is closed during each operational cycle of said drum, second means similar to said first routing means, means for operating said second routing means in timed relationship with said first means so that a routing position of said second routing means is closed during the operational cycle of said drum following the operational cycle thereof when the corresponding routing position of said first routing means was closed, drum addressing means driven in snychronism with said drum, selection circuit means controllable to select the signals generated by said reading device relating to a desired digit position of said related channel, signal responsive first circuit means settable representative of a digit in coded form, means for preconnecting said addressing means, said first selection circuit means and a group of succeding positions of said first routing means so as to render operable said selection circuit means to select the signals from said reading device relating to a desired multiplicand at a rate of one multiplicand digit per operational cycle of said drum, means applying the selected signals to said first circuit means, second circuit means settable representative of a digit in coded form, means transferring any digit setting of said first circuit means at the end of an operational cycle of said drum to said second circuit means, means controllable to transmit signals representative of the digit setting of said second circuit means to said recording device to record a corresponding digit representation in desired digit positions thereof, means for preconnecting said addressing means, said transmitting means, and a group of succeeding positions of said second routing means corresponding to the chosen group of said first routing means, to control said transmitting means to effect a recording of each multiplicand digit setting in said second circuit means at the beginning of an operational cycle of said drum in the related order of all ten registers of said channel during the following operational cycle of said drum, said actions being repeated until the chosen multiplicand is completely recorded in all said ten registers, means for preconnecting said addressing means, said selection circuit means, and a group of succeeding positions of said first routing means subsequent to said multiplicand related group, so as to render operable said selection means to select the signals from said reading device relating to a desired multiplier at a rate of one multiplier digit per operational cycle of said drum, said selected signals effecting a corresponding setting of said first circuit means, which is transferred to said second circuit means at the end of the operational cycle of said drum, multiplier control means responsive to each multiplier digit setting in said second circuit means at the beginning of an operational cycle of said drum, for reading out the multiplicand a corresponding number of times from said register track during the following operational cycle of said drum and generating signals representative thereof, a signal responsive accumulator including an adder, means applying said multiplicand signals to said accumulator to generate therein a partial product, a temporary storage device, means for transferring the partial product generated in said accumulator for each multiplier digit to said temporary storage device, means including another channel of said drum for storing a product manifestation, means for transferring signals representative of the contents of said product channel, if any, to said accumulator to generate therein a partial product summation, means for transferring said partial product summation from said accumulator back to said product channel, and means to column shift the partial product summation in said product channel one order prior to the subsequent product summation.

75. Apparatus as in claim 74 further characterized in that said multiply control means includes a bistable device having a multiply and not a multiply position and adapted when in said multiply position to render said multiply control means effective, said bistable device being normally in said not multiply position, means for flipping said bistable device from said not multiply to said multiply position at the beginning of each operational cycle of said drum when a digit of the chosen multiplier is represented in said second circuit means and means for flipping said bistable device from said multiply to said not multiply position after each multiplier digit operation.

76. Apparatus as in claim 75 further characterized in that said bistable device has an input responsive to a received signal to flip it from either position to its other position, and wherein said means for flipping said device from its not multiply to its multiply position, and then from its multiply to its not multiply position comprises means associated with said addressing means emitting a signal at the beginning of each operational cycle of said drum, said signal being available at an output source, means for preconnecting said output signal source through the positions of said second routing means corresponding to the positions of said chosen multiplier group of positions of said first distributor, to said bistable device input, means associated with said addressing means for generating a timing signal as the last digit position of the multiplier multiplicand storage channel rotates under the related reading device each operational cycle of said drum and means applying said latter signal to said bistable device to reset it in the NOT multiply position.

77. Apparatus as in claim 74 further characterized by an erase device associated with said product channel and operable to erase the data in digits positions of said channel as they rotate thereunder, means responsive to a received signal to render said erase device operable to erase the product digit positions thereof during the operational drum cycle when said signal is received, a signal source for emitting a signal each operational cycle of said drum, and means for preconnecting said signal source through any position of said second routing means preceding the chosen group thereof relating to the chosen multiplicand.

78. Apparatus as in claim 74 further characterized in that only a predetermined number of digits positions of said product channel are utilized as a product register, an erase device associated with said product channel and operable to erase the data in digit positions of said channel as they rotate thereunder, said erase device being rendered operable for the duration of a signal applied thereto, a coincidence device adapted to generate on an output thereof, signals corresponding to the overlap of signals applied to first and second inputs thereof, a D.C. signal source, means for preconnecting said D.C. signal source through the position of said second routing means preceding the chosen group thereof relating to the chosen multiplicand to the first input of said coincidence device, means associated with said addressing means for emitting a signal when the first order of said product register of said channel approaches said erase device, means for applying said emitted signal to the second input of said coincidence device, a trigger device having an On and Off position and adapted when On to apply a signal to said erase device to render it operable for the duration of said signal, said trigger including a signal responsive input through which it is flipped from its Off to On state, means for applying the signal generated in said coincidence device output on the coincidence of signal on the inputs thereof to said trigger to flip it On, and means associated with said addressing means to reset said trigger Off after the last order of the product register of said channel passes said erase device.

79. Multiplying apparatus comprising, in combination, a rotatable storage drum having a number of magnetizable channels around the periphery thereof for storing magnetic representations of data, each said channels having a number of serially disposed digit storage positions, each digit storage position being adapted to store a digit by a recording of one in combinations of magnetic bits therein in accordance with a predetermined code, the digit positions of one of said channel being divided into ten equal groups, each group forming a register of a fixed number of orders, means for loading one of said channels with representations of multipliers and multiplicands, first routing means having a number of routing positions adapted to be closed sequentially, second routing means similar to said first routing means, means for rotating said drum and operating said first and second routing means so that succeeding routing positions thereof are closed each succeeding operational cycle of said drums, any particular position of said second routing means being closed during the operational cycle following the operational cycle when the corresponding position of said first routing means is closed, electronic drum addressing means driven in synchronism with said drum, first circuit means settable representative of a decimal digit in said coded form, at a rate of one digit per operational cycle of said drum, second circuit means settable representative of a decimal digit in said coded form, means for transferring any setting of said first circuit means to said second at the end of an operational cycle of said drum, said first circuit means being then free to accept a new digit setting during th succeeding operational cycle, means operable to select any desired digit position of said multiplier-multiplicand channel at a rate of one digit position per operational cycle of said drum, means including said addressing means and succeeding routing positions of a group of positions of said first routing means, as closed, to actuate said selection means to select the digit positions of a desired multiplicand of said multiplier-multiplicand channel, means for reading out the data in each digit position of the chosen multiplicand during the operational cycle when selected and setting said first circuit means in correspondence to the readout digit representation, means operable to select a desired order of all said registers during an operational cycle of said drum, means including said addressing means and succeeding routing positions of said second routing means corresponding to said group of said first routing means, to actuate said register order selection means to select the order of each said registers corresponding to the order of the multiplicand digit represented in said second circuit means, means controlled in accordance with the digit setting of said second circuit means to record a corresponding digit representation in the selected order of all said ten registers during an operational cycle of said drum, said readout of the succeeding orders of a chosen multiplicand, and the recording of a representation of each readout digit during the following operational cycle of said drum, continuing until the chosen multiplicand is recorded completely in each of said ten registers, means including said addressing means and succeeding routing positions of a group of positions of said first routing means as closed subsequent to said multiplicand related group of said first routing means, to actuate said selection means to select the digit positions of a desired multiplier from said multiplier-multiplicand channel, means for reading out the data in each digit position of the chosen multiplier during the operational cycle when selected and setting said first circuit means in correspondence to the readout digit, a signal responsive accumulator including an adder, means responsive to each multiplier digit setting of said second circuit means during the associated operational cycle to readout the multiplicand from a corresponding number of said ten registers and generating readout signals representative thereof, means applying said latter signals to said accumulator to generate therein a partial product, means storing a product manifestation, means for transferring signals representative of the contents of said product storage, if any, to said accumulator to generate therein a partial product summation, means for transferring said partial product summation from said accumulator back to said product storage, and means to column shift the partial product sumation in said product storage on order prior to the subsequent product summation.

80. Multiplying apparatus comprising a rotatable magnetic storage drum having a plurality of data storage channels and a sync track on the periphery thereof, each of said channels having a number of digit storage positions wherein data may be stored serially by digit, each stored digit being represented in binary coded decimal form, the digit positions of one of said channels being divided into ten groups of equal size to form ten storage registers of a fixed number of orders, means for loading one of said channels other than said register channel with magnetic representations of multipliers and multiplicands, electronic drum addressing means driven by said sync track, a first routing device having a number of routing positions which are closed successively at a rate of one position per operational cycle of said drum, second routing means similar to said first routing means, each position of said second routing means being closed during the operational cycle of said drum following when the coresponding position of said first routing means was closed, means controlled jointly by said addressing means and succeeding routing positions, as closed, of a prechosen group of positions of said first routing means, to readout the digit positions of chosen one of the multiplicands from said multiplier-multiplicand channel at a rate of one order per operational cycle of said drum, settable first circuit means responsive to said readout means and set in correspondence to the represented value of each digit as readout, settable second circuit means, means for transferring any digit setting of said first circuit means at the end of an operational cycle of said drum to said second circuit means, means controlled jointly by said addressing means, succeeding routing positions, as closed, of a group of positions of said second routing means corresponding to said prechosen group of said first routing means, and each digit setting of said second circuit means, to record during the related operational cycle, a magnetic representation of the multiplicand digit setting of said second circuit means in a corresponding order of each of said ten registers, said action being repeated during succeeding operational cycles of said drum for each multiplicand digit setting of said second circuit until said chosen multiplicand is completely recorded in each of said ten registers, means controlled by said addressing means and succeeding routing positions, as closed, of a second prechosen group of positions of said first routing means subsequent to said multiplicand related group of said first routing means to readout the digit positions of a chosen one of the multipliers from said multiplier-multiplicand channel at a rate of one order per operational cycle of said drum, said first circuit means being set in accordance with each digit of the multiplier as readout, with each multiplier digit setting of said first circuit means being transferred to said second circuit at the end of each related operational cycle of said drum, an electronic adder, means responsive to each multiplier digit setting of said second circuit means to readout during the following operational cycle of said drum, the multiplicand representation from a corresponding number of said registers, means responsive to said latter readout means to enter signal representations of said readout data to said electronic adder to generate therein a partial product, a temporary storage device, means for transferring the partial product resulting in said adder for each multiplier digit to said temporary storage device, means including another channel of said drum for storing a product representation, means for transferring the contents of said product channel and the partial product representation relating to a multiplier digit in said temporary storage, to said adder to generate therein a partial product summation, means for transferring said partial product summation from said adder back to said product channel, and means to column shift the partial product summation on said product channel one order prior to the subsequent product summation.

81. Multiplying apparatus as in claim 80 further characterized in that said temporary storage device comprises a storage register having a number of digit storage positions equal to the number of orders of one of said multiplicand storage register, and said adder comprises a single decimal digit-binary coded trigger adder including decimal carry means, means for transferring the adder representation resulting from each particular multiplicand digit entry to said counter, to a related order of said counter register and resetting said counter prior to the entry of the next order of the multiplicand therein, means for reading out the digit representative of each order of said counter register after a predetermined delay, at which time the corresponding multiplicand digit readout of a succeeding one of said multiplicand storage registers is entering said counter, means responsive to said last mentioned readout means to enter the corresponding digit representation into said counter during the same digit position interval that the digit of the corresponding order of multiplicand in the succeeding one of said multiplicand storage registers is entered to said counter, thus generating a partial product digit, said actions being repeated with the multiplicand being accordingly added serially, digit by digit, over and over, to progressive totals of itself a number of times as determined by the magnitude of the controlling multiplier digit, with a final partial product relating to that multiplier digit finally resulting in said counter storage register.

82. Apparatus as in claim 81 further characterized in that said storage register comprises another channel of said drum, recording means through which each sum digit generated by said adder is recorded in a digit position of said storage register channel, reading means associated with said storage register channel for reading the data in each digit position a predetermined time after that digit position was recorded therein during the same operational cycle of said drum, said read data being reentered into said adder during the same digit position interval that the digit of the corresponding order of the multiplicand representation in the succeeding one of said multiplicand storage registers is entered to said counter, the actual time during that digit position interval when entry is effected from the counter register channel being slightly delayed in correspondence to the actual entry from said register so that an interlaced add operation is effected.

83. In a cyclically operable accounting machine apparatus for sensing multi-columnar records successively for data designations therein and for storing a representation of the data in each record sensed during the sensing of the subsequent record and including apparatus for comparing the data in any desired column of a record, as sensed, to the corresponding columnar data of the record previously sensed comprising, in combination, a record sense station, cyclically operable means for advancing records successively to said station on successive machine cycles, sensing apparatus arranged in said sense station for sensing a column of a record for data representation therein and emitting signals representative thereof, means for successively presenting the columns of a record in said sense station to said sensing apparatus, a rotatable storage member having a pair of magnetizable data storage channels, each said storage channels having a digit storage position for each of the columns of a record, a magnetic reading and recording device for each of said channels and arranged relative thereto so that corresponding digit positions of each said channels rotate simultaneously under the associated reading and recording device, each said device being selectably operable to record magnetic representation of data in the digit positions of the related channel in response to signals applied thereto, or to read the magnetic representations of data in the digit positions of the related channel and generate signals corresponding thereto, means timed with said successive record advancing means to select during each machine cycle, one of said magnetic reading recording devices to record and the other channel device to read, and on the succeeding machine cycle select the alternate operation of said devices, means for rotating said drum in synchronism with said card presenting means, means associated with said storage member for generating synchronizing signals representative of the angular position of said member, signal transmitting means timed jointly in response to said synchronizing signals and in accordance with said card presenting means to transmit the signals generated in response to the sensing of each column of a record to the reading-recording device selected for recording that machine cycle, as the corresponding digit storage position passes thereunder, this effecting a magnetic recording of the sensed columnar data therein; a comparison device for comparing signals applied to each of two inputs thereof and generating an output signal upon a difference in compared signals, and means for routing said transmitted signals resulting from the sensing of any selected columns of the record in said sense station to one input of said comparison device, and the signals generated in response to the reading of corresponding digit storage positions of the channel storing a representation of the previously sensed record to the other input of said camparison device.

84. In a cyclically operable accounting machine, apparatus for successively sensing multi-columnar records for data designations therein during successive machine cycles and for storing a representation of the data in each record sensed during the sensing of the subsequent record and including apparatus for comparing the data in any desired column of a record as sensed to the corresponding columnar data of the record previously sensed comprising, in combination, a record sense station, cyclically operable means for advancing records successively to said station in successive machine cycles, sensing apparatus arranged in said sense station for sensing a column of a record for data designations therein and generating signals corresponding thereto, said sensing apparatus including means responsive to a gate signal for rendering the sensing apparatus operable, means for successively presenting the columns of a record in said sense station to said sensing apparatus, a rotatable storage member having a pair of magnetizable data storage channels, each said channels having a digit storage position for each of the columns of a record, a magnetic reading and recording device for each of said channels and arranged relative thereto so that corresponding digit positions of each said channels rotate simultaneously adjacent the associated reading-recording device, each said devices being selectably operable to record magnetic representations of data in the digit positions of the related channel in response to signals applied thereto, and to read the magnetic representation of data in the digit positions of the related channel and generate signals corresponding thereto, means timed with said successive record advancing means to select during each machine cycle, one of said magnetic devices to record and the other device to read and on the succeeding machine cycle reverse the operation of said devices, means for rotating said rotatable member, means synchronizing the rotation of said member with said record presenting means so as to present all digit storage positions of each of said channels to the related reading-recording device during the presentation of each column of a record to said sensing apparatus, a source of periodic indexing signals associated with said rotatable member, a counting circuit responsive to said indexing signals to generate timing gate signals identifying each storage section as it is presented to said related reading-recording device, routing means directing each timing signal to said sensing apparatus when the corresponding column of a record is in sense position, means for transmitting the signals generated by said sensing apparatus in response to the sensing of each column of a record to the magnetic device selected for recording during that machine cycle, as the corresponding digit storage position passes thereunder, this effecting a magnetic recording of the sensed columnar data therein, a comparison device for comparing signals applied to each of two inputs thereof and generating an output signal upon a difference in compared signals, and means for routing said transmitted signals generated in response to the sensing of any selected columns of the record in said sense station to one input of said comparison device, and the signals generated in response to the reading of corresponding digit storage positions of the channel storing a representation of the previously sensed record, to the other input of said comparison device.

85. In a cyclically operable accounting machine having a single sense station through which data is entered into said machine on successive machine cycles from successive multi-columnar entry records at the rate of one record per machine cycle, and for comparing the data in a record presently in said sense station with the data in a record previously in said sense station comprising in combination, means for advancing records successively to said sense station, a line of sensing devices in said sensing station, means for advancing each record card when in said sense station so as to present the columns thereof successively to said sensing devices, a rotating magnetic storage drum having a pair of storage channels, each channel having a number of storage positions equal to the columns of an entry record, a pair of magnetic devices, one for each of said channels and selectably operable to record magnetic representations of data in the storage positions of said related channel to read the magnetic data representation therein, said devices being so positioned relative to each of said channels and to each other so that corresponding digit positions of each said channels are presented simultaneously to the related magnetic device, means timed with said successive record advancing means, to select one of said magnetic devices to read and the other to record during a record entry cycle and to alternate the function of said devices each successive record entry cycle, means responsive to said sensing device to actuate the magnetic device selected for recording during any particular record entry cycle to record in each of the digit positions of said related channel a representation of the data as sensed in each related column of a record, and comparison means jointly responsive to said record sensing device on the sensing of preselected columns of an entry record, and said particular device reading the corresponding digit storage positions of the channel storing a representation of the previously sensed record, for emitting a signal when the data in any one of said preselected columns and the corresponding digit storage positions of said channel are different.

86. Apparatus as in claim 85 further characterized in that each of said magnetic devices are also selectably operable to erase the magnetic data representations in the storage positions of the related channel as they are presented thereto, and means also timed with said successive record advancing means to select each of said devices to erase all the data in a channel immediately prior to the entry of new data therein in response to the sensing of a record.

87. Apparatus as in claim 86 further characterized in that each of said magnetic devices includes a read, a record, and an erase coil, and said means to select the erase, read, or record function of a device includes circuitry to select either the read, record, or erase coil in correspondence to the related function required of that magnetic device.

88. Apparatus as in claim 85 further characterized in that said means timed with said successive record advancing means to select one of said magnetic devices to read and the other to record during a record entry cycle, and to alternate the function of said devices each successive record entry cycle comprises, first and second multi-contact latch type relays, each relay having a pick-up and a latch trip coil, said pick-up coil when impulsed actuating said related contacts from a first to a second operation position, said contacts being latched in said second position until a subsequent impulsing of the associated latch trip coil restores the latched contacts to said first operational position, circuit means including contacts of said first relay when in said first operational position and contacts of said second relay when in said second operational position, to select one of said magnetic devices to record and the other to read, circuit means including contacts of said first relay when in said second operational position and contacts of said second relay when in said first operational position, to select the alternate one of said devices to record and its companion device to read first circuit means timed with said successive record advancing means for emitting a first impulse prior to each record sense operation, second circuit means also timed with said successive record advancing means for emitting a second impulse prior to each record sense operation but following said first emitted impulse, means including a contact of said second relay when in said second operational position to route said first impulse to the latch pick-up coil of said first relay, and when in said first operational position to route said first impulse to the latch trip coil of said first relay, and means including a contact of said first relay when in said second operational position to route said second impulse to the latch trip coil of said first relay, and when in said first operational position to route said second impulse to the latch pick-up coil of said first relay, the action being such that during successive card entry cycles, said first and second relays are always in alternate operational states, with the state of each particular relay being alternated every cycle.

89. Apparatus as in claim 88 further characterized in that each of said magnetic devices includes a read and a record coil, the selection of a magnetic device to read or record comprising a linking of circuitry through contacts of said first and second relays to the read or record coil of the related magnetic device, as required.

90. Apparatus as in claim 89 further characterized in that each of said magnetic devices also includes an erase coil, with the further provision of third circuit means also timed with said successive record advancing means for emitting an erase impulse prior to each record sense operation and spaced between the impulse emitted by said first and second circuit means, and means including a contact of said first relay when in said second operational position and a contact of said second relay also in said second operational position to route said erase impulse to the erase coil of the magnetic device associated with the one storage channel, and including a contact of said first relay when in said first operational position and said second relay also in said first operational position, to route said erase impulse to the erase coil of the magnetic device associated with said other storage channel, thus erasing all old data from a channel prior to the recording of new data therein.

91. In a cyclically operable accounting machine having a single sense station through which data is entered into said machine or successive machine cycles from successive multi-columnar entry records at the rate of one record per machine cycle, apparatus for comparing the data in a record presently in said sense station with the data in a record previously in said sense station comprising, in combination, means for advancing records successively to said sense station, sensing apparatus arranged in said sense station and operable to simultaneously sense all the index points of a column of a record for data representations therein in a first combinational code, means responsive to a received gate impulse for rendering said sensing apparatus operable for the duration of said impulse, means for advancing each entry record when in said sense station, column by column into cooperating relationship with said sensing apparatus, a rotatable magnetic drum storage device having a pair of data storage channels in the periphery thereof, each of said channels being divided into a number of digit storage positions equal in number and corresponding to the columns in an entry record, each said digit storage positions being subdivided into bit areas each of which is assigned a predetermined coded significance in accordance with a second combinational code, said storage drum also including a timing signal track extending thereabout, a magnetic device associated with each of said channels and selectably operable to read or record in the digit storage positions of the related channel as desired, each said devices being positioned so that corresponding digit positions of each said channels are presented simultaneously thereto, means timed with said successive record advancing means to select one of said magnetic devices to read and the other to record during a record entry cycle, and alternate the function of said devices one each successive record entry cycle, means for rotating said drum so that all storage sections of each said channels are presented to the associated magnetic device during the presentation of each column of an entry record to said sense apparatus, magnetic means associated with said timing track for reading said timing signals, a cyclically operable first counting circuit responsive to said magnetic means for sequentially generating output signals coincident with the passage of each bit area of a storage position past said related magnetic device and a distinct output pulse upon the completion of each cycle thereof, second counting means advanceable one position upon receipt of the cycle complete output pulse from said first counting means for generating a distinct output gate pulse coincident with the passage of each storage position of a channel past said related magnetic device, distributor means synchronized with said entry record column by column advancing means for routing the gate signal corresponding to each storage position to said sense apparatus, when the corresponding column is in sense position, translating means responsive to said sense apparatus and said first counting means for generating signals in said second combinational code of the data sensed, means applying said latter generated signals to the magnetic device selected for recording to record in each of the digit positions of said related channel a representation of the data sensed in each related column of an entry record, comparison means for comparing first and second applied signals and generating on an output terminal a signal indication when there is a difference in said first and second applied signals, and means for applying said generated signals resulting from the sensing of the columns of each entry record to said comparison device, and for also applying signals generated by the particular one of magnetic devices selected for reading during that entry cycle to said comparison device.

92. Apparatus as in claim 91 further characterized by apparatus for generating on a distinct difference signal terminal, a signal corresponding to any possible difference signal generated by said comparison device for a particular selected column or columns of each entry record and the corresponding stored data of the previously sensed record as represented in one of the channels of said drum, said apparatus comprising a thyratron having first and second control grids and adapted when conductive to generate said difference signal indication in said difference signal terminal, means for applying the output of said comparison device to the first input of said thyratron, and means for routing to the second input of said thyratron the gate signals of said second counting means corresponding to the column of the entry records for which a difference signal indication is desired on said terminal if a difference in compared signals is sensed by said comparison device.

93. Cyclically operable apparatus for sensing successive multi-columnar records for data designation therein and for storing the sensed data from each record during the sensing of the subsequent record signal, representations of said stored record data being transmitted as desired during the sensing of the subsequent record, said apparatus comprising, in combination, a sense station having sensing apparatus therein, cyclically operable means for advancing records successively to said sense station, means for advancing each record when in said sense station so as to present the columns thereof successively to said sensing apparatus, a constantly rotatable magnetic storage medium having a pair of record tracks, each track having a number of serially arranged item storage positions corresponding to the number of columns in each record, an electro-magnetic recording-reading device associated with each said channels and selectably operable to record or read as required, means controlled by said cyclically operable record advancing means to select the electro-magnetic device of one track to read and the other to record, and to reverse the function of the devices each successive record entry cycle, means for driving said drum and said columnar record advancing means in timed relationship so that all item storage positions of said tracks are presented to their related magnetic device during the presentation of each column of a record to said sensing apparatus, a source of synchronizing pulses disposed serially on another track of the storage medium, means controlled by the synchronizing pulse track to generate a gate impulse during the passage of each item storage position of a record channel under its associated magnetic device, a commutator having a number of segments equal to the columns in an entry record and operatively linked to said record columnar advancing means so that a related segment thereof is chosen during the presentation of each column of a record to said sensing apparatus, circuit means interconnecting said commutator and said impulse generating means to route during the presentation of each succeeding column of a record to said sensing apparatus, a gate impulse to said sensing apparatus to activate it during the interval that the corresponding item storage position is presented to either magnetic device, means responsive to the data in a column of said record as sensed by the sensing apparatus to actuate the magnetic device chosen for recording that record entry cycle, transmitting means operable to transmit data designations in response to the magnetic device chosen for reading in any record entry cycle, a second commutator having a number of segments equal to the columns in an entry record, means for driving said second commutator in timed relationship with said magnetic storage medium so that each segment is chosen in succession at a rate of at least one segment per operational cycle of said storage medium, and circuit means interconnecting said second commutator and said impulse generating means to route during any predetermined rotational cycle of said storage medium, a transmitting device activate impulse to said transmitting device as a desired item storage position of a channel is read by the particular magnetic device reading at that time.

References Cited in the file of this patent

UNITED STATES PATENTS

| | | |
|---|---|---|
| 2,047,505 | Hausheer | July 14, 1936 |
| 2,080,649 | Breitling | May 18, 1937 |
| 2,350,499 | Dickinson | June 6, 1944 |
| 2,605,964 | Ghertman et al. | Aug. 5, 1952 |
| 2,675,427 | Newby | Apr. 13, 1954 |
| 2,702,380 | Brustman et al. | Feb. 15, 1955 |

UNITED STATES PATENT OFFICE

CERTIFICATE OF CORRECTION

Patent No. 2,946,504 July 26, 1960

Horace S. Beattie et al.

It is hereby certified that error appears in the printed specification of the above numbered patent requiring correction and that the said Letters Patent should read as corrected below.

Column 150, line 50, for "selector" read -- selected --; column 162, line 49, for "other" read -- order --; column 166, line 21, for "one" read -- once --; column 168, line 31, for "to" read -- so --; line 38, after "said" insert -- sync --; column 171, line 25, after "signal", (first occurrence), insert -- to readout the multiplicand a number of times in correspondence --; line 73, after "second" insert -- routing --.

Signed and sealed this 25th day of April 1961.

(SEAL)
Attest:

ERNEST W. SWIDER
Attesting Officer

DAVID L. LADD
Commissioner of Patents